US009007883B2

(12) United States Patent
Inoue et al.

(10) Patent No.: US 9,007,883 B2
(45) Date of Patent: Apr. 14, 2015

(54) OPTICAL RECORDING AND READING METHOD, OPTICAL RECORDING AND READING APPARATUS, OPTICAL RECORDING MEDIUM, AND METHOD FOR PRODUCING AN OPTICAL RECORDING MEDIUM

(71) Applicants: Motohiro Inoue, Tokyo (JP); Tomoki Ushida, Tokyo (JP); Atsuko Kosuda, Tokyo (JP); Takashi Kikukawa, Tokyo (JP)

(72) Inventors: Motohiro Inoue, Tokyo (JP); Tomoki Ushida, Tokyo (JP); Atsuko Kosuda, Tokyo (JP); Takashi Kikukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 26 days.

(21) Appl. No.: 14/103,082

(22) Filed: Dec. 11, 2013

(65) Prior Publication Data
US 2014/0169147 A1 Jun. 19, 2014

Related U.S. Application Data

(62) Division of application No. 13/365,341, filed on Feb. 3, 2012, now Pat. No. 8,630,156.

(30) Foreign Application Priority Data

| Feb. 4, 2011 | (JP) | 2011-022478 |
| Mar. 30, 2011 | (JP) | 2011-073929 |
| Mar. 30, 2011 | (JP) | 2011-073930 |
| Mar. 30, 2011 | (JP) | 2011-073931 |
| Mar. 30, 2011 | (JP) | 2011-073932 |
| Mar. 30, 2011 | (JP) | 2011-073933 |
| Mar. 30, 2011 | (JP) | 2011-073934 |

(51) Int. Cl.
*G11B 7/24* (2013.01)
*G11B 7/09* (2006.01)
(Continued)

(52) U.S. Cl.
CPC ............... *G11B 7/0903* (2013.01); *G11B 7/09* (2013.01); *G11B 7/1267* (2013.01); *G11B 7/14* (2013.01);
(Continued)

(58) Field of Classification Search
CPC ............... G11B 2007/0013; G11B 7/24038; G11B 7/24; G11B 7/00; G11B 7/00745; G11B 27/243
USPC ......... 369/44.37, 275.3, 93, 94, 53.22, 47.27, 369/275.2, 275.4, 53.23, 53.24, 44.26, 369/53.28
See application file for complete search history.

(56) References Cited

U.S. PATENT DOCUMENTS

2009/0316537 A1   12/2009   Nakatani et al.
2012/0201110 A1   8/2012   Inoue et al.

FOREIGN PATENT DOCUMENTS

JP   1990-301020 A   12/1990
JP   1991-225650 A   10/1991
(Continued)

OTHER PUBLICATIONS

Chimura et al., "Proposal for a multilayer read-only-memory optical disc structure", Applied Optics 45(8):1794-1803 (2008).
(Continued)

*Primary Examiner* — Nabil Hindi
(74) *Attorney, Agent, or Firm* — Porzio, Bromberg & Newman, P.C.

(57) ABSTRACT

An optical recording medium includes a recording and reading layer that is previously staked or formed afterword and has no concavo-convex pattern for tracking control, and a servo layer in which a concavo-convex pattern or a groove for tracking control is formed. Information can be recorded in the recording and reading layer while tracking is performed using the servo layer.

77 Claims, 75 Drawing Sheets

(51) Int. Cl.
*G11B 7/1267* (2012.01)
*G11B 7/24018* (2013.01)
*G11B 7/2403* (2013.01)
*G11B 7/24038* (2013.01)
*G11B 7/2405* (2013.01)
*G11B 7/24079* (2013.01)
*G11B 7/14* (2012.01)

(52) U.S. Cl.
CPC .......... *G11B 7/24018* (2013.01); *G11B 7/2403* (2013.01); *G11B 7/24038* (2013.01); *G11B 7/2405* (2013.01); *G11B 7/24079* (2013.01)

(56) References Cited

FOREIGN PATENT DOCUMENTS

| | | |
|---|---|---|
| JP | 1992-332940 A | 11/1992 |
| JP | 1998-269575 A | 10/1998 |
| JP | 2008097693 A | 4/2008 |
| JP | 2008097694 A | 4/2008 |
| JP | 2008108383 A | 5/2008 |
| WO | 2008099708 A1 | 8/2008 |

OTHER PUBLICATIONS

Inoue et al. "512 GB Recording on 16 layer Optical Disc with Blu-Ray dis based Optics", Proc of SPIE 7730 77300D-1.

Kikukawa et al., "Recording Characteristics of 10-layer Recordable Optical Disc and a Prospect for over 500 Gbyte Recording", Japanese J Applied Physics 49 08KF01-2 (2010).

Mishima et al., "150 GB, 6-layer write once disc for Blu-ray disc system", Proc of SPIE vol. 6282 62820I-1-11.

Mitsumori et al., "Multilayer 500Gbyte Optical Disc", Japanese J Applied Physics 48 03A055 (2009).

Ogasawara et al. "16 layers Write Once Disc with a Separated Guide Layer", Tech. Dig. Of International Symposium on Optical Memory 2010, 224-225 (2010).

Office Action issued by Japanese Patent Office in corresponding co-pending Japanese Patent Application No. 2011-073932 dated Jun. 13, 2014.

| | PRACTICAL EXAMPLE 1 | PRACTICAL EXAMPLE 2 | PRACTICAL EXAMPLE 3 | COMPARATIVE EXAMPLE 1 | COMPARATIVE EXAMPLE 2 | COMPARATIVE EXAMPLE 3 |
|---|---|---|---|---|---|---|
| THICKNESS OF MAIN REFLECTIVE MATERIAL OF SERVO LAYER (nm) | 91 | 91 | 80 | 80 | 20 | 10 |
| MATERIAL OF SERVO LAYER | Ag-Cu | Ag-Cu | Ag | Ag | Ag | Ag |
| MATERIAL OF BUFFER LAYER | TRANSPARENT RESIN | TRANSPARENT RESIN | DYE-CONTAINING TRANSPARENT RESIN | TRANSPARENT RESIN | TRANSPARENT RESIN | TRANSPARENT RESIN |
| THICKNESS OF BUFFER LAYER (μm) | 30 | 40 | 30 | 40 | 40 | 40 |
| AMOUNT OF REFLECTED LIGHT OF SERVO LAYER FOR RECORDING/READING BEAM (mV) | 74.0 | 112.0 | 740.0 | 5000.0 | 1615.0 | 930.0 |
| AMOUNT OF REFLECTED LIGHT OF RECORDING/REPRODUCING LAYER FOR RECORDING/REPRODUCING BEAM (mV) | 84.5 | 160.0 | 160.5 | 216.0 | 82.0 | 174.5 |
| RATIO BETWEEN AMOUNTS OF REFLECTED LIGHT | 0.9 | 0.7 | 4.6 | 23.1 | 19.7 | 5.3 |
| NOISE CONTAINED IN REPRODUCED SIGNAL (TRACKING SIGNAL) | EXTREMELY SUPERIOR | EXTREMELY SUPERIOR | SATISFACTORY | EXTREMELY INFERIOR | EXTREMELY INFERIOR | EXTREMELY INFERIOR |
| TRACKABILITY USING REPRODUCED SIGNAL (TRACKING SIGNAL) | POSSIBLE | POSSIBLE | POSSIBLE | NOT POSSIBLE | POOR | POSSIBLE |
| COMPREHENSIVE RATING | SATISFACTORY | SATISFACTORY | SATISFACTORY | EXTREMELY POOR | POOR | POOR |
| OPTICAL REFLECTANCE OF SERVO LAYER FOR BLUE BEAM 405 nm IN WAVELENGTH | (EXTREMELY) LOW | LOW | LOW | (EXTREMELY) HIGH | MEDIUM | LOW |
| OPTICAL REFLECTANCE OF SERVO LAYER FOR RED BEAM 650 nm IN WAVELENGTH | LOW | MEDIUM | MEDIUM | HIGH | LOW | MEDIUM |

Fig.16

OPTICAL RECORDING AND READING METHOD, OPTICAL RECORDING AND READING APPARATUS, OPTICAL RECORDING MEDIUM, AND METHOD FOR PRODUCING AN OPTICAL RECORDING MEDIUM

CROSS-REFERENCE TO RELATED APPLICATION

This application is a divisional application of U.S. patent application Ser. No. 13/365,341 filed Feb. 3, 2012 which claims priority to JP 2011-022478 filed Feb. 4, 2011, JP 2011-073934 filed Mar. 30, 2011, JP 2011-073929 filed Mar. 30, 2011, JP 2011-073931 filed Mar. 30, 2011, JP 2011-073930 filed Mar. 30, 2011, JP 2011-073932 filed Mar. 30, 2011, JP 2011-073933 filed Mar. 30, 2011, all of which hereby incorporated in their entireties by reference into this application.

BACKGROUND OF THE INVENTION

1. Field of the Invention

The present invention relates to an optical recording medium including a plurality of recording and reading layers, an optical recording and reading method and an optical recording and reading apparatus that record information on the optical recording medium, and a method for producing the optical recording medium.

2. Description of the Related Art

Conventionally, optical recording media such as a CD-DA, a CD-ROM, a CD-R, a CD-RW, a DVD-ROM, a DVD-R, a DVD+/−RW, a DVD-RAM and a Blu-ray Disc (BD) have been widely used for viewing digital moving image content or recording digital data. Among them, in the BD, which is regarded as one of next-generation DVD standards, a wavelength of laser light used for recording and reading is set to be short, that is, 405 nm, and a numerical aperture of an objective lens is set to 0.85. In an optical recording medium conforming to the BD standard, tracks are formed at a pitch of 0.32 μm. In this way, data of 25 GB or more can be recorded/read on/from one recording and reading layer of the optical recording medium.

Incidentally, capacities of moving images and data are expected to increase more and more in the future. Accordingly, there has been considered a method for increasing a capacity of the optical recording medium by providing multiple recording and reading layers in the optical recording medium. For the optical recording medium according to the BD standard, there has also been reported a technique for realizing an ultra-high capacity of as much as 200 GB by providing six to eight recording and reading layers (see I. Ichimura et. al., Appl. Opt, 45, 1974-1803 (2006), and K. Mishima et. al., Proc. of SPIE, 6282, 628201 (2006)).

On the contrary, if the multiple recording and reading layers are provided in the optical recording medium, formation of concavo-convex patterns such as grooves/lands for tracking control on each recording and reading layer leads to a complicated medium configuration, causing concern about difficult eccentricity adjustment work and the like. Moreover, a stamper as a mother die for forming the concavo-convex patterns is required for each provision of the recording and reading layer. Thus, a larger number of layers increases the number of times of use of this stamper, and accordingly increases production costs.

Consequently, in recent years, there has been proposed a technique for separately providing servo layers having concavo-convex patterns and grooves, and recording and reading layers not having the concavo-convex patterns and the grooves, in an optical recording medium, and recording information on the recording and reading layers by using a beam dedicated to recording and reading, while obtaining tracking signals from the servo layers by using a beam dedicated to tracking control (see Japanese Patent Laid-Open Nos. 2008-97693 and 2008-97694).

More recently, there have been proposed techniques of a 20-layered ROM type optical recording medium (see A. Mitsumori et. al., Jpn. J. Appl. Phys., 48, 03A055 (2009)), a 10 to 16-layered write-once optical recording medium (see T. Kikukawa et. al., Jpn. J. Appl. Phys., 49, 08KF01 (2010), M. Inoue et. al., Proc. SPIE, 7730, 77300D (2010), and M. Ogasawara et. al., Tech. Dig. of International Symposium on Optical Memory 2010, 224 (2010)), and the like. Use of an optical system (a wavelength and a numerical aperture) similar to the BD standard has become likely to be able to achieve a recording capacity on the order of 500 GB.

Moreover, for the purpose of simultaneously reading two layers, there has also been proposed a technique for alternately stacking recording layers having concavo-convex patterns and grooves, and recording layers not having the concavo-convex patterns and the grooves (see International Publication No. WO2008/099708).

However, according to the technique of International Publication No. WO2008/099708, an increase in the number of the recording and reading layers causes the number of the recording layers having the concavo-convex patterns and the grooves to increase, which, after all, leads to the complicated medium configuration, the difficult eccentricity adjustment work and the like.

Moreover, according to the techniques of Japanese Patent Laid-Open Nos. 2008-97693 and 2008-97694, as the number of the recording and reading layers increases, a distance between the recording and reading layer and the servo layer increases, and thus a thickness tolerance can easily occur between both layers. Specifically, the recording and reading beam applied to the recording and reading layers performs focus control, and the tracking beam applied to the servo layers performs only tracking control. In other words, a focus of the tracking beam depends on the focus control performed by the recording and reading beam. As a result, when the thickness tolerance becomes large, a focus position of the tracking beam varies to destabilize the tracking signal, which causes a problem that sufficient tracking control cannot be performed. In order to solve this problem, it is conceivable to introduce a focus servo mechanism also into an optical system of the beam performing the tracking control. Correction of the thickness tolerance is, however, limited, and the introduction of the focus servo mechanism also causes a problem of a large optical pickup.

In particular, if the recording and reading beam and the tracking beam share one objective lens, the focus positions of the both beams need to be shifted from each other by setting different spread angles for the both beams being caused to enter the objective lens. As the difference between the spread angles of the both beams becomes larger, a shift between the tracking control performed by the tracking beam and the tracking control required for the recording and reading beam becomes larger. For example, there has been a problem that a tracking position is greatly shifted from a recording position on a warped optical recording medium or the like.

Moreover, as the number of the recording and reading layers on the optical recording medium is increased, a distance for moving a recording and reading beam spot into a stacking direction increases. As a result, there has been a disadvantageous problem with comatic aberration caused by a tilt or the like in recording and reading.

Moreover, in the case of the techniques of Japanese Patent Laid-Open Nos. 2008-97693 and 2008-97694, as well as International Publication No. WO2008/099708, for example, there has been a problem that, when the beam dedicated to recording and reading passes through a desired recording and reading layer, this leakage light is reflected by the servo layer to cause crosstalk. In particular, when the number of the recording and reading layers is increased, a reflectance of each recording and reading layer must be reduced. Thus, there has been a problem of an increase in an amount of the leakage of the beam dedicated to recording and reading.

Furthermore, when the number of the recording and reading layers is increased, the recording and reading layers are disposed over a wide range in a thickness direction in the optical recording medium. As a result, a recording and reading optical pickup is required to focus the beam on the wide range in the thickness direction. Thus, a large spherical aberration correction range must be set. Accordingly, there has been a problem of a complicated and larger configuration of the optical pickup, and also, a long seek time for the recording and reading layers with the optical pickup.

Moreover, the increase in the number of the recording and reading layers causes the capacity of the optical recording medium to increase, which, however, does not solely lead to improvement in a recording and reading speed. For example, if the recording capacity of the optical recording medium increases without the improvement in the recording speed, there has been a problem that a user has to wait longer in recording work and feels reduction in convenience.

Furthermore, if information is recorded on an optical recording medium including a plurality of recording and reading layers, OPC (Optimum Power Control) for optimizing recording laser power and its output parameter needs to be performed for each recording and reading layer. It should be noted that, according to this OPC, a recording power level (Pw), an erasing power level (Pe) and the like of a laser are optimized by recording random data in a trial writing area of each recording and reading layer while varying output power in a stepwise manner, and then reproducing and analyzing this recorded data. With employment of the OPC, the laser power can be optimized immediately before recording, in consideration of a usage environment such as a temperature, an individual difference in a laser included in a drive, degradation of each recording and reading layer over time, and the like. However, there has been a problem of an increase in a preparation time before recording, for this optimization.

In particular, when information is continuously recorded across the plurality of recording and reading layers, also in order to maintain continuity of an information transfer rate, a preparatory operation is required for previously performing the OPC for all the plurality of recording and reading layers that are recording targets, and retaining different output parameters for the respective recording and reading layers, in a storage memory. As a result, there has been a problem of a further increase in the preparation time before recording.

Moreover, in the OPC, since the random data is recorded while the output power is varied in a stepwise manner, an extraordinarily high power beam is applied to the trial writing area to form an abnormal mark. For example, while the OPC is performed for a trial writing area of one particular recording and reading layer, if an abnormal mark has been formed in a trial writing area of a recording and reading layer adjacent to this layer, noticeable reflection noise is caused by this abnormal mark so that correct OPC cannot be performed. In order to eliminate this problem, a larger trial writing area must be prepared so that the random data to be recorded in the OPC is controlled so as not to overlap between the adjacent recording and reading layers. As a result, there has been a problem that, as the number of the recording and reading layers is increased for the purpose of increasing the capacity of the optical recording medium, the trial writing area of each recording and reading layer must be larger and a user data area is decreased.

As in Japanese Patent Laid-Open Nos. 2008-97693 and 2008-97694, as well as International Publication No. WO2008/099708, in the optical recording medium provided with the servo layers and the recording and reading layers separately, a shift in a radial direction can easily occur at a recording mark forming position on the recording and reading layer farther from the servo layer. Accordingly, there has been a problem that the larger trial writing area also needs to be secured in anticipation of this shift, and the user data area is further decreased. Moreover, for example, in order to increase the recording and reading layers, when a plurality of servo layers are formed on one plane side of the optical recording medium, internal stress caused in film formation can easily incline toward one side of the optical recording medium, and thus warpage or distortion occurs on the optical recording medium. Since the shift in the radial direction can more easily occur at the recording mark forming position, also due to this warpage or distortion, there has been a problem that a further larger trial writing area must be secured.

According to the techniques of Japanese Patent Laid-Open Nos. 2008-97693 and 2008-97694, there is a process of alternately stacking the recording and reading layers and spacer layers, in production of the optical recording medium. Thus, the internal stress caused in each film formation inclines toward one plane of the optical recording medium. As a result, there has been a problem that large warpage or distortion can easily occur on the optical recording medium. In particular, the increase in the number of the recording and reading layers causes an amount of accumulated internal stress to increase, and also causes an amount of deformation of the optical recording medium to increase. There has been a problem that the deformation of the optical recording medium causes a tracking beam spot to be shifted from the recording and reading beam spot, and causes a tracking property to be significantly degraded.

As seen from the above, as in the techniques of Japanese Patent Laid-Open Nos. 2008-97693 and 2008-97694, the optical recording medium provided with the servo layers and the recording and reading layers separately is required to further reduce the warpage or the deformation amount of the medium. In order to reduce the warpage or the deformation amount, it is also conceivable to use an ultra-rigid body such as a glass substrate, which, however, increases the production costs.

Furthermore, if the plurality of servo layers are formed in one optical recording medium, positions of the grooves/lands of the respective servo layers may be shifted from one another. In this case, a relative position of a recording mark to be formed on the recording and reading layer differs depending on which servo layer has been used for recording. In such a situation, for example, complicated control is required to simultaneously record information on two recording and reading layers, or to simultaneously reproduce data recorded on the two recording and reading layers.

SUMMARY OF THE INVENTION

The present invention has been made in view of the above described problems, and it is an object of the present invention to provide an approach for always stably performing tracking control for an optical recording medium including servo layers and recording and reading layers. Moreover, it is another object of the present invention to improve signal quality in recording and reading. It is another object of the present invention to provide an optical recording and reading approach capable of improving a transfer rate even if multiple recording and reading layers are provided in the optical recording medium. It is another object of the present invention to suppress warpage or deformation on a produced optical recording medium, and to enable efficient recording and reading. It is another object of the present invention to provide an optical recording and reading approach capable of suppressing complication of an optical pickup in an optical recording and reading apparatus, while increasing the number of the recording and reading layers, and capable of efficiently performing recording and reading, and the like.

The present inventors have made extensive studies, and the above object is achieved by the following means.

The present invention for achieving the above object is an optical recording and reading method for recording information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, wherein information is recorded in the recording and reading layer while tracking is performed using the servo layer.

In the optical recording and reading method for achieving the above object according to the above invention, the optical recording medium has a plurality of the recording and reading layers, the method comprising: a servo layer using step of recording information in one of the recording and reading layers while performing tracking using the servo layer; and a recorded area using step of recording information in another one of the recording and reading layers while performing tracking using information recorded area in the one of the recording and reading layers.

In the optical recording and reading method for achieving the above object according to the above invention, a recording and reading beam having a second wavelength shorter than a first wavelength is applied to the recording and reading layer to record or read information while a tracking beam having the first wavelength is applied to the servo layer to perform tracking control, and wherein a reflectance of the servo layer at a time when light of the recording and reading beam having the second wavelength is applied through the recording and reading layer to the servo layer is lower than a reflectance of the servo layer at a time when light of the tracking beam having the first wavelength is applied through the recording and reading layer to the servo layer.

In the optical recording and reading method for achieving the above object according to the above invention, the optical recording medium has a first set of a plurality of the recording and reading layers arranged on a side of a first surface, and a second set of a plurality of the recording and reading layers arranged on a side of a second surface opposite to the first surface, wherein the number of layers of the second set of the recording and reading layers is equal to the number of layers of the first set of the recording and reading layers, and wherein a first recording and reading operation for recording or reading information by applying a first recording and reading beam through the first surface to the first set of the recording and reading layers and a second recording and reading operation for recording or reading information by applying a second recording and reading beam through the second surface to the second set of the recording and reading layers are performed simultaneously.

In the optical recording and reading method for achieving the above object according to the above invention, the optical recording medium has a substrate, the servo layer is formed on one face of the substrate, a first recording and reading layer is arranged on a side of the servo layer of the substrate, and a second recording and reading layer is arranged on a side opposite to the servo layer of the substrate, and information is recorded in the first recording and reading layer and the second recording and reading layer while tracking control is performed using the servo layer.

In the optical recording and reading method for achieving the above object according to the above invention, the optical recording and reading method further comprising: a first recording operation for recording information by applying a first recording and reading beam to a first recording and reading layer while performing tracking control by applying a tracking beam to the servo layer; and a second recording operation for recording information by applying a second recording and reading beam to a second recording and reading layer while performing tracking control using the tracking beam and the servo layer that are common with the first recording operation.

In the optical recording and reading method for achieving the above object according to the above invention, a first recording and reading layer is arranged on a side of a first surface of the optical recording medium with respect to the servo layer, and a second recording and reading layer is arranged on a side of a second surface of the optical recording medium with respect to the servo layer, the method comprising: a first recording operation for recording information in a first rotation direction as viewed from the first surface by applying a first recording and reading beam through the first surface to the first recording and reading layer while performing tracking control by applying a tracking beam to the servo layer; and a second recording operation for recording operation in a second rotation direction opposite to the first rotation direction as viewed from the second surface by applying a second recording and reading beam through the second surface to the second recording and reading layer while performing tracking control using the servo layer that is common with the first recording operation, wherein the second recording operation is performed simultaneously with the first recording operation.

The present invention for achieving the above object is an optical recording and reading apparatus that records information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, wherein the optical recording and reading apparatus records information in the recording and reading layer while performing tracking using the servo layer.

In the optical recording and reading apparatus for achieving the above object according to the above invention, the optical recording medium has a first set of a plurality of the recording and reading layers on a side of a first surface, and a second set of a plurality of the recording and reading layers on a side of a second surface opposite to the first surface, wherein the number of layers of the second set of the recording and reading layers is equal to the number of layers of the first set of the recording and reading layers, the optical recording and reading apparatus comprising: a first recording and reading optical system that is arranged on the side of the first surface of the optical recording medium, and that records or reads information by applying a first recording and reading beam through the first surface to the first set of the recording and reading layers; and a second recording and reading optical system that is arranged on the side of the second surface of the optical recording medium, and that records or reads information by applying a second recording and reading beam through the second surface to the second set of the recording and reading layers.

In the optical recording and reading apparatus for achieving the above object according to the above invention, the optical recording medium has a substrate, and a plurality of the recording and reading layers are arranged on a side of the servo layer with respect to the substrate, the recording and reading apparatus further comprising: a tracking optical system that applies a tracking beam to the servo layer; a first recording and reading optical system that records information by applying a first recording and reading beam to a first recording and reading layer while tracking control using the tracking optical system is performed; and a second recording and reading optical system that records information by applying a second recording and reading beam to a second recording and reading layer while tracking control using the tracking optical system is performed.

In the optical recording and reading apparatus for achieving the above object according to the above invention, the optical recording medium has a first set of a plurality of the recording and reading layers between a first surface of the optical recording medium and the servo layer, and a second set of a plurality of the recording and reading layers between a second surface of the optical recording medium and the servo layer, the optical recording and reading apparatus further comprising: a tracking optical system that applies a tracking beam to the servo layer; a first recording and reading optical system that records information in a first rotation direction as viewed from the first surface by applying a first recording and reading beam through the first surface to the first recording and reading layer while tracking control using the tracking optical system is performed; and a second recording and reading optical system that records information in a second rotation direction opposite to the first rotation direction as viewed from the second surface by applying a second recording and reading beam through the second surface to the second recording and reading layer while tracking control using the tracking optical system is performed, wherein the second recording and reading optical system performs the recording simultaneously with the recording which the first recording and reading optical system performs.

The present invention for achieving the above object is an optical recording medium comprising a servo layer having a concavo-convex pattern or a groove for tracking control and a recording and reading layer having no concavo-convex pattern for tracking control, the recording and reading layer being previously stacked or formed afterward, wherein information is recorded or read by applying a recording and reading beam to the recording and reading layer while applying a tracking beam to the servo layer to perform tracking control.

In the optical recording medium for achieving the above object according to the above invention, information is recorded or read by applying a recording and reading beam having a second wavelength shorter than a first wavelength to the recording and reading layer while applying a tracking beam having the first wavelength to the servo layer to perform tracking control, and wherein a reflectance of the servo layer at a time when light of the recording and reading beam having the second wavelength is applied through the recording and reading layer to the servo layer is lower than a reflectance of the servo layer at a time when light of the tracking beam having the first wavelength is applied through the recording and reading layer to the servo layer.

In the optical recording medium for achieving the above object according to the above invention, the optical recording medium further comprising a substrate, wherein the servo layer is formed on one face of the substrate, wherein a first recording and reading layer is arranged on a side of the servo layer of the substrate, and a second recording and reading layer is arranged on a side opposite to the servo layer of the substrate, and wherein information is recorded in the first recording and reading layer and the second recording and reading layer while tracking control is performed using the servo layer.

In the optical recording medium for achieving the above object according to the above invention, the optical recording medium further comprising, as the servo layer: a first servo layer having a concavo-convex pattern or a groove for the tracking control in a first spiral direction; and a second servo layer having a concavo-convex pattern or a groove for the tracking control in a second spiral direction opposite to the first spiral direction, wherein a first set of a plurality of the recording and reading layers are arranged on a side of a first surface of the optical recording medium with respect to the first and second servo layers, and wherein a second set of a plurality of the recording and reading layers are arranged on a side of a second surface of the optical recording medium with respect to the first and second servo layers.

The present invention for achieving the above object is a method of manufacturing an optical recording medium, the method comprising the steps of: forming a servo layer having a concavo-convex pattern or a groove for tracking control on one face of a substrate made of a light transmitting material; simultaneously stacking a first buffer layer to be arranged on a side of the servo layer of the substrate and a second buffer layer to be arranged on a side opposite to the servo layer of the substrate; and simultaneously stacking a first recording and reading layer to be arranged on a side of the first buffer layer and a second recording and reading layer to be arranged on a side of the second buffer layer, wherein the first recording and reading layer has a planer structure with no concavo-convex pattern for tracking control, and the second recording and reading layer has a planer structure with no concavo-convex pattern for tracking control.

According to the present invention, for the optical recording medium including the servo layers and the recording and reading layers, it is possible to record information on the recording and reading layers while always stably performing the tracking control for the optical recording medium.

According to the present invention, in the optical recording medium including the servo layers and the recording and reading layers, it is possible to improve the signal quality in recording and reading.

Moreover, it is possible to improve the transfer rate even if the multiple recording and reading layers are provided in the optical recording medium.

Furthermore, for the optical recording medium including the servo layers and the recording and reading layers, it is possible to efficiently perform recording and reading, while suppressing the warpage or the deformation.

It is possible to suppress the complication of the optical pickup in the optical recording and reading apparatus, while increasing the number of the recording and reading layers, and to efficiently perform recording and reading.

BRIEF DESCRIPTION OF THE DRAWINGS

FIG. 16 is a table showing evaluation results of practical examples and comparative examples;

DETAILED DESCRIPTION OF THE PREFERRED EMBODIMENTS

Embodiments of the present invention will be explained below in detail with reference to the accompanying drawings.

Figure 1:
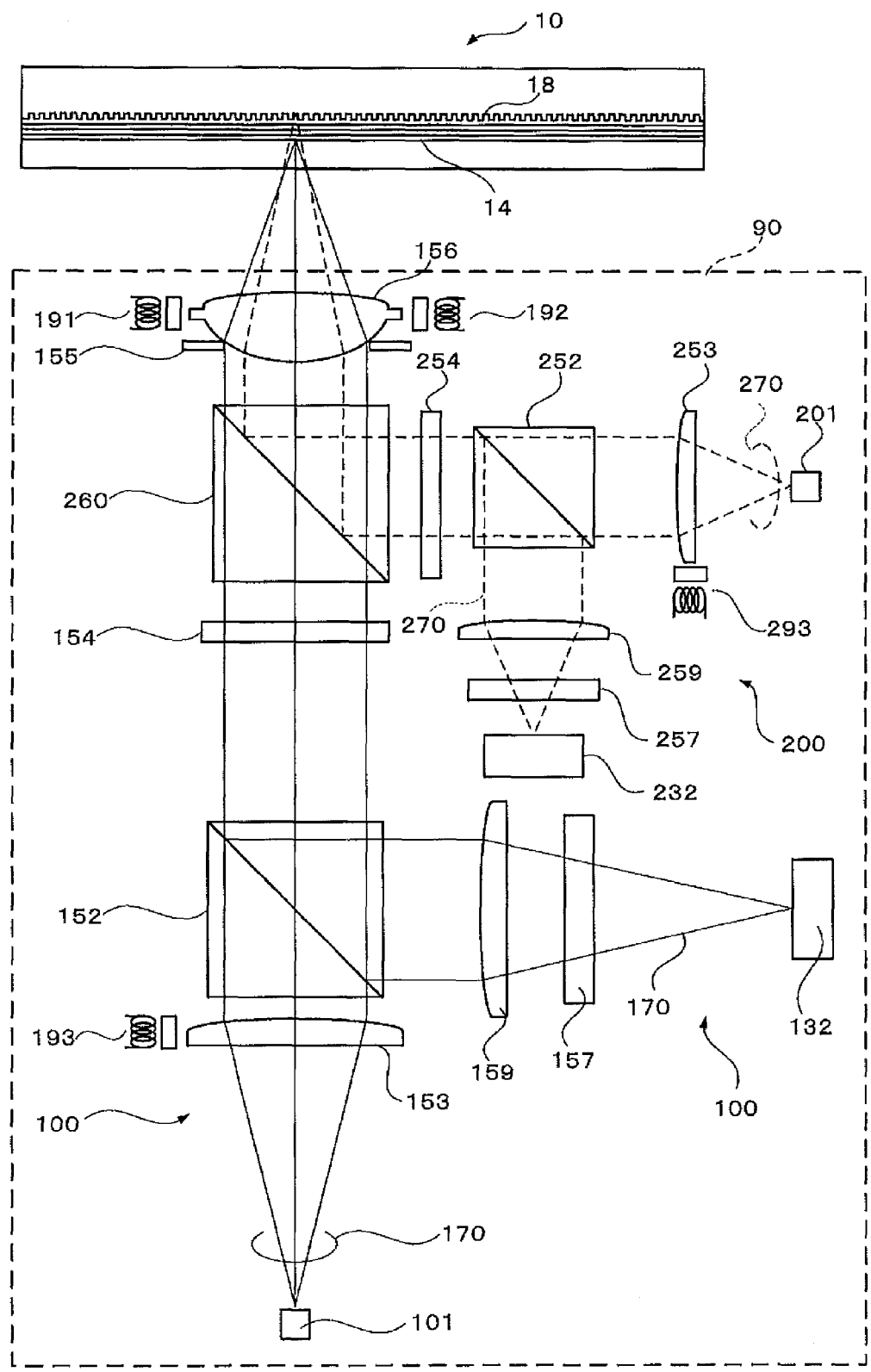
FIG. 1 is a block diagram illustrating a structure of an optical pickup that realizes an optical recording and reading method of an optical recording medium according to an embodiment of the present invention.

FIG. 1 shows an optical recording medium 10 according to a first embodiment of the present invention and a configuration of an optical pickup 90 used for recording and reading in this optical recording medium 10. The optical pickup 90 includes a first optical system 100 and a second optical system 200. The first optical system 100 denotes an optical system (i.e. recording and reading optical system) that performs recording/reading for a group of recording and reading layers 14 of the optical recording medium 10. The second optical system 200 denotes an optical system (i.e. tracking optical system) that performs tracking control using a servo layer 18 (described later) and a recorded area of the group of recording and reading layers 14 when recording information in the group of recording and reading layers 14 using the first optical system 100.

A divergent recording and reading beam 170 with a blue wavelength of 380 to 450 nm (405 nm in this case), which is emitted from a light source 101 of the first optical system 100, transmits through a collimated lens 153 having spherical aberration correcting means 193 and enters into a polarizing beam splitter 152. The beam 170 having entered into the polarizing beam splitter 152 transmits through the polarizing beam splitter 152, converts into a circularly polarized light by further transmission in a quarter-wave plate 154 and then enters into a beam splitter 260 of the second optical system 200. This beam splitter 260 is set to have a high transmittance and low reflectance. To be more specific, it is set such that the ratio of the transmittance to the reflectance is 10 times or more. Therefore, the beam 170 transmits through the beam splitter 260 and converts into a converging beam by an objective lens 156. This beam 170 converges into one of the group of recording and reading layers 14 and the servo layer 18 of recording and reading targets which are formed inside the optical recording medium 10.

The objective lens 156 is controlled by an aperture 155, where the numerical aperture NA is set between 0.70 and 0.90 (0.85 in this case). For example, the beam 170 reflected in the group of recording and reading layers 14 transmits through the objective lens 156, the beam splitter 260 and the quarter-wave plate 154, converts into a linear polarized light different from that on an outward path by 90 degrees and then is reflected in the polarizing beam splitter 152.

The beam 170 reflected in the polarizing beam splitter 152 goes through a condenser lens 159, converts into a converging light and enters into an optical detector 132 via a cylindrical lens 157. Here, an astigmatism is attached to the beam 170 when the beam 170 goes through the cylindrical lens 157.

The optical detector 132 has four light receiving unit (not shown) and outputs current signals corresponding to respective amounts of received light.

From these current signals, for example, a focus error (hereinafter referred to as "FE") signal by an astigmatic method, a tracking error (hereinafter referred to as "TE") signal by a push-pull method limited on reproduction and a reading signal of information recorded in the optical recording medium 10 are generated. The FE signal and the TE signal are subjected to amplification and phase compensation to a desired level, and then feedback-supplied to actuators 191 and 192 and subjected to focus control and tracking control. It should be noted that tracking control in the first optical system 100 is utilized only at the time of reproduction.

A divergent tracking control beam 270 with a blue wavelength of 380 to 450 nm (405 nm in this case), which is emitted from a light source 201 of the second optical system 200, transmits through a collimated lens 253 having spherical aberration correcting means 293 and enters into a polarizing beam splitter 252. The beam 270 having entered into the polarizing beam splitter 252 transmits through the polarizing beam splitter 252, further transmits through a quarter-wave plate 254 for the second optical system, converts into a circularly polarized light and then is reflected in the beam splitter 260. This beam 270 further converts into a converging beam in the objective lens 156 and converges into one of the servo layer 18 and the group of recording and reading layers 14 which are formed inside the optical recording medium 10. For example, the beam 270 reflected in the servo layer 18 transmits through the objective lens 156 and is reflected in the beam splitter 260, converts at the quarter-wave plate 254 into a linear polarized light different from that on an outward path by 90 degrees and then is further reflected in the polarizing beam splitter 252. The beam 270 reflected in the polarizing beam splitter 252 goes through a condenser lens 259, converts into a converging light and enters into an optical detector 232 via a cylindrical lens 257. Here, an astigmatism is attached to the beam 270 when the beam 270 goes through the cylindrical lens 257.

The optical detector 232 has four light receiving unit (not shown) and outputs current signals corresponding to respective amounts of received light. From these current signals, a TE signal by a push-pull method is generated. It should be noted that, in a case where information is recorded even in the servo layer 18, a reading signal may be generated from the current signals. On the side of this optical detector 232, although an FE signal has not to be generated, it is natural that an FE signal may be generated.

It should be noted that, as described above, the beam splitter 260 is set to have a high transmittance and low reflectance.

Accordingly, a part of a return light, which is emitted from the light source 101 of the first optical system 100 and reflected in part of the group of recording and reading layers 14, is reflected in the beam splitter 260 and proceeds to the side of the second optical system 200. By contrast, a large part of a return light, which is emitted from the light source 201 of the second optical system 200 and reflected in the servo layer 18 or the recorded area in the group of recording and reading layers 14, transmits through the beam splitter 260 and proceeds to the side of the first optical system 100. That is, in the first optical system 100 and the second optical system 200, as long as the substantially same light source with a blue wavelength of 380 to 450 nm is adopted, it is inevitable that their return lights are mixed. However, since the first optical system 100 and the second optical system 200 have different focus positions in the optical recording medium 10 and therefore spread angles of the beams 170 and 270 are different from each other, by extracting one of the beams 170 and 270 using a given-shape slit or aperture (not shown) and then entering it into the optical detector 132 or 232, an influence due to mixing is eliminated.

Especially, if it is set that a difference between a focus position of the beam 170 in the first optical system 100 in the optical recording medium 10 and a focus position of the beam 270 in the second optical system 200 in the optical recording medium 10 always falls within a certain range, it is possible to simplify the structures of the above-noted slit and aperture, so that it is possible to separate the beams more easily. To stabilize the focus distance gap, it is preferable that the focus position of the recording and reading beam 170 and the focus position of the beam 270 for servo are closer to each other because the error becomes smaller.

When information is recorded in the group of recording and reading layers 14 in the first optical system 100, a TE signal of the second optical system 200 is subjected to amplification and phase compensation to a desired level, and then feedback-supplied to the actuators 191 and 192 and subjected to tracking control. As a result, based on the tracking control in the second optical system 200, the first optical system 100 is made to record information in the group of recording and reading layers 14. It should be noted that, in the present embodiment, when information recorded in the group of recording and reading layers 14 is reproduced, the first optical system 100 is made to uniquely perform tracking control utilizing a recording mark on the group of recording and reading layers 14. On the other hand, it is naturally possible to perform reproduction utilizing the tracking control in the second optical system 200.

Figure 2:
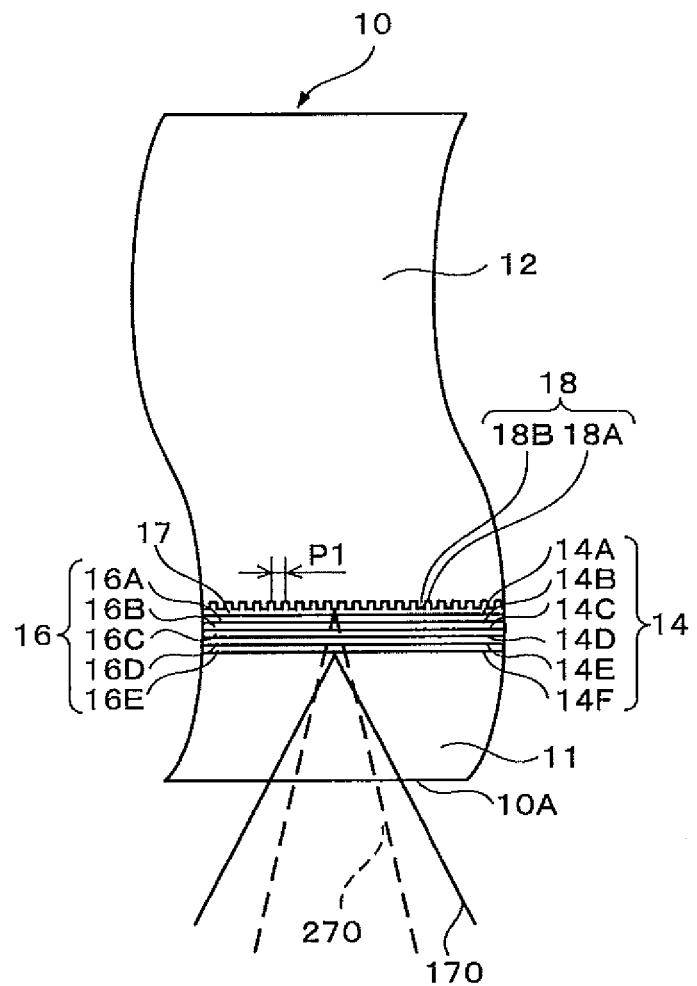
FIG. 2 is a sectional view illustrating a multilayer structure of the optical recording medium.

FIG. 2 shows a cross-section structure of the optical recording medium 10 according to the present embodiment in a large size.

The optical recording medium 10 has a discoid shape having an external diameter of approximately 120 mm and a thickness of approximately 1.2 mm. This optical recording medium 10 is configured with a cover layer 11, the group of recording and reading layers 14, a group of intermediate layers 16, a buffer layer 17, the servo layer 18 and a support substrate 12 from the side of a light incident surface 10A.

The group of recording and reading layers 14 is configured with first to sixth recording and reading layers 14A to 14F, which are configured to be able to record information. These first to sixth recording and reading layers 14A to 14F employ a planar structure having no concavo-convex pattern or grooves for tracking control, and, when the recording beam 170 of high energy is applied from the first optical system 100, form recording marks. It should be noted that, as a kind of this group of recording and reading layers 14, there are a write-once recording and reading layer in which information can be added but cannot be rewritten, and a rewritable recording and reading layer in which information can be rewritten.

The support substrate 12 denotes a discoid-shaped substrate having a thickness of 1.0 mm and a diameter of 120 mm for maintaining a thickness (of approximately 1.2 mm) required for the optical recording medium, and the servo layer 18 is formed on a surface of the side of the light incident surface 10A of this support substrate 12. To be more specific, a land 18A and a groove 18B are formed in a spiral manner in a direction from around the center part to the outer edge in the side of the light incident surface 10A of the support substrate 12. These land 18A and groove 18B function as a concavo-convex pattern (or grooves) for tracking control and guide the beam 270 of the second optical system 200.

It should be noted that it is possible to use various materials as a material of the support substrate 12, such as a glass, ceramics and resin. Out of these, a resin is preferable in view of moldability. Resin examples include a polycarbonate resin, olefin resin, acrylic resin, epoxy resin, polystyrene resin, polyethylene resin, polypropylene resin, silicone resin, fluorine resin, ABS resin and urethane resin. Out of these, the polycarbonate resin and the olefin resin are especially preferable in view of workability. It should be noted that the support substrate 12 does not operate as a light path of the beam 270 and therefore needs not have a high optical transparency.

The servo layer 18 formed on the support substrate 12 is configured by forming tracking control a concavo-convex pattern (i.e. groove and land) and a reflecting layer on the surface of the support substrate 12. Especially, in the present embodiment, a recording film that can record information is provided. This recording film has substantially the same film structure as those of the recording and reading layers 14A to 14F (described later). It should be noted that, if an information recording function is not necessary in this servo layer 18, a metal layer such as Ag may be formed to simply function as an optical reflecting film.

A pitch P1 of adjacent lands 18A or grooves 18B in the servo layer 18 is set to be equal to or lower than 0.37 μm (e.g. within a range between 0.26 μm and 0.35 μm). To be more specific, the pitch P1 is set to a value close to 0.32 μm. A track pitch P2 of the recording marks recorded in the recording and reading layers 14A to 14F is set in substantially the same way as the pitch P1 of the lands 18A and the grooves 18B. As a result, the track pitch P2 between recording marks is set to be lower than 0.37 μm. Preferably, it is set within a range between 0.26 μm and 0.35 μm. More preferably, it is set to a value close to 0.32 μm.

As a result, the track pitch P2 recorded in the recording and reading layers 14A to 14F has a value around 0.32 μm compatible to the BD standard. The pitch P1 (around 0.32 μm) of the lands 18A or the grooves 18B in the servo layer 18 has a size in which tracking by the beam 270 of a blue wavelength range is sufficiently possible.

The buffer layer 17 is configured with a light-transmitting acrylic ultraviolet curable resin and corresponds to the film thickness of one of first to fifth intermediate layers 16A to 16E (described later). Here, it is set to 12 μm which is one of the film thicknesses of the first to fifth intermediate layers 16A to 16E.

The first to sixth recording and reading layers 14A to 14F, which are stacked on the side of the light incident surface 10A of the buffer layer 17, each have a three-layer structure in which a dielectric film is stacked on both sides of a write-once recording film (not shown). It should be noted that the first to sixth recording and reading layers 14A to 14F are configured such that, for example, the optical reflectance, absorptance and transmittance are optimized for the beam 170 of a blue wavelength range (i.e. short wavelength) in the first optical system 100.

The dielectric film of each recording and reading layer also has a basic function of protecting a write-once recording film and plays a role of enlarging an optical characteristic gap between before and after recording mark formation.

It should be noted that, in a case where the beam 170 is applied, the record sensitivity is likely to decrease when energy absorbed in the dielectric films is higher. Therefore, to prevent this, it is preferable to select a material having a low absorption coefficient (k) in a wavelength range of 380 nm to 450 nm (particularly 405 nm), as a material of those dielectric films. It should be noted that TiO2 is used as a material of the dielectric films in the present embodiment.

A write-once recording film between dielectric films denotes a film in which an irreversible recording mark is formed, and there is a large gap of reflectance with respect to the beam 170 between a part in which the recording mark is formed and other parts (i.e. blank range). As a result, it is possible to record/read data.

The write-once recording film is formed to contain materials including Bi and O as major ingredients. This write-once recording film functions as an inorganic reaction film and is configured such that the reflectance significantly varies depending on a chemical or physical change by heat of laser light. As specific materials, it is preferable to contain Bi—O or Bi-M-O (where M is at least one kind of element selected from Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga and Pb) as major ingredients. It should be noted that Bi—Ge—O are used as materials of a write-once recording film in the present embodiment.

It should be noted that, although a case has been described where a write-once recording film is adopted in the first to sixth recording and reading layers 14A to 14F, it is equally possible to adopt a phase-change recording film in which iterative recording is possible. In this case, it is preferable that the phase-change recording film contains SbTeGe as major ingredients.

The group of intermediate layers 16 has the first to fifth intermediate layers 16A to 16E in order from the side farthest from the light incident surface 10A, where these layers are stacked between the first to sixth recording and reading layers 14A to 14F. The first to fifth intermediate layers 16A to 16E are each configured with an acrylic or epoxy ultraviolet curable resin. It is preferable to set the film thicknesses of these first to fifth intermediate layers 16A to 16E to values equal to or less than 20 μm to increase the number of layers, where the film thickness of the first intermediate layer 16A is 16 μm, that of the second intermediate layer 16B is 12 μm, that of the third intermediate layer 16C is 16 μm, that of the fourth intermediate layer 16D is 12 μm and that of the fifth intermediate layer 16E is 16 μm. That is, intermediate layers having two kinds of film thicknesses (16 μm and 12 μm) are alternately stacked. As a result, as the inter-layer distances between the first to sixth recording and reading layers 14A to 14F, the first distance (16 μm) and the second distance different from this first distance (12 μm) are alternately set in order from the side of the light incident surface. Here, the gap between the first distance and the second distance is set to 4 μm. By this means, it is possible to reduce the inter-layer crosstalk. It is natural that the same film thickness may be set for all of the group of intermediate layers 16.

The cover layer 11 is configured with a light-transmitting acrylic ultraviolet curable resin in the same way as in the group of intermediate layers 16, where the film thickness is set to 38 μm.

As a result of configuring the optical recording medium 10 as above, the servo layer 18 is in a position 0.122 mm (i.e. 122 μm) apart from the light incident surface 10A, the first recording and reading layer 14A which is the farthest from the light incident surface 10A in the group of recording and reading layers 14 is in a position 0.11 mm (i.e. 110 μm) apart from the light incident surface 10A, the second recording and reading layer 14B is in a position 94 μm apart from the light incident surface 10A, the third recording and reading layer 14C is in a position 82 μm apart from the light incident surface 10A, the fourth recording and reading layer 14D is in a position 66 μm apart from the light incident surface 10A, the fifth recording and reading layer 14E is in a position 54 μm apart from the light incident surface 10A, and the sixth recording and reading layer 14F which is the nearest to the light incident surface 10A is in a position 38 μm apart from the light incident surface 10A. Further, the entire thickness of the group of recording and reading layers 14 (i.e. the distance between the first recording and reading layer 14A and the sixth recording and reading layer 14F) is 72 μm.

Also, in the optical recording medium 10 of the present embodiment, compared to the group of recording and reading layers 14, the servo layer 18 is placed in a position farther from the light incident surface 10A. By this means, it is possible to reduce a harmful influence given from the land 18A and the groove 18B for tracking to the recording and reading beam 170 applied to the group of recording and reading layers 14.

Next, a method for producing the optical recording medium 10 according to the present embodiment will be explained.

First, by a polycarbonate resin mold injection method using a metal stamper, the support substrate 12 in which grooves and lands are formed is produced. Using the mold injection type, basic information to be held in advance at the time of medium production is preformatted in this support substrate 12, where the basic information includes address information of the group of recording and reading layers 14, recording conditions including a recording and reading power, and position or inter-layer distance of the recording and reading layers 14A to 14F. To be more specific, basic information is preformed using wobble of the land 18A or the groove 18B. It should be noted that a method of producing the support substrate 12 is not limited to the injection molding method and a 2P method or other methods are possible.

After that, in the support substrate 12, the servo layer 18 is formed on the surface of the side on which grooves and lands are provided. The servo layer 18 is formed by stacking a dielectric film, write-once recording film and dielectric film in order (i.e. reflecting film and protect film) using a sputtering method or vapor-phase epitaxial method to function as a recording film.

Next, the buffer layer 17 is formed on the servo layer 18. The buffer layer 17 is formed by, for example, filming viscosity-controlled acrylic or epoxy ultraviolet curable resins in a spin coat method and irradiating these with ultraviolet for curing. It should be noted that, instead of ultraviolet curable resins, it can also be formed by attaching a light transmitting sheet made of light transmitting resins onto the servo layer 18 using an adhesive bond or adhesive compound. Also, if necessary, in the case of forming grooves or pits required for recording in this buffer layer 17, it is possible to form the grooves or pits by attaching a light transmitting resin stamper to spin-coated ultraviolet curable resins in the 2P method and irradiating these with ultraviolet for curing.

Next, the first recording and reading layer 14A is formed. To be more specific, it is formed by layering a dielectric film, write-once recording film and dielectric film in order using a vapor-phase epitaxial method. Especially, it is preferable to use a sputtering method. After that, the first intermediate layer 16A is formed on the first recording and reading layer 14A. The first intermediate layer 16A is formed by, for example, filming viscosity-controlled ultraviolet curable resins in a spin coat method and irradiating these ultraviolet curable resins with ultraviolet for curing. By repeating this procedure, the second recording and reading layer 14B, the second intermediate layer 16B, and so on, are stacked in order.

When the sixth recording and reading layer 14F has been layered, the cover layer 11 is formed on the result to complete the optical recording medium 10. It should be noted that the cover layer 11 is formed by, for example, filming viscosity-controlled acrylic or epoxy ultraviolet curable resins in a spin coat method and irradiating these with ultraviolet for curing. It should be noted that, although the above-noted producing method has been described in the present embodiment, the present invention is not limited to this producing method and other producing technologies are adoptable.

Figure 3:
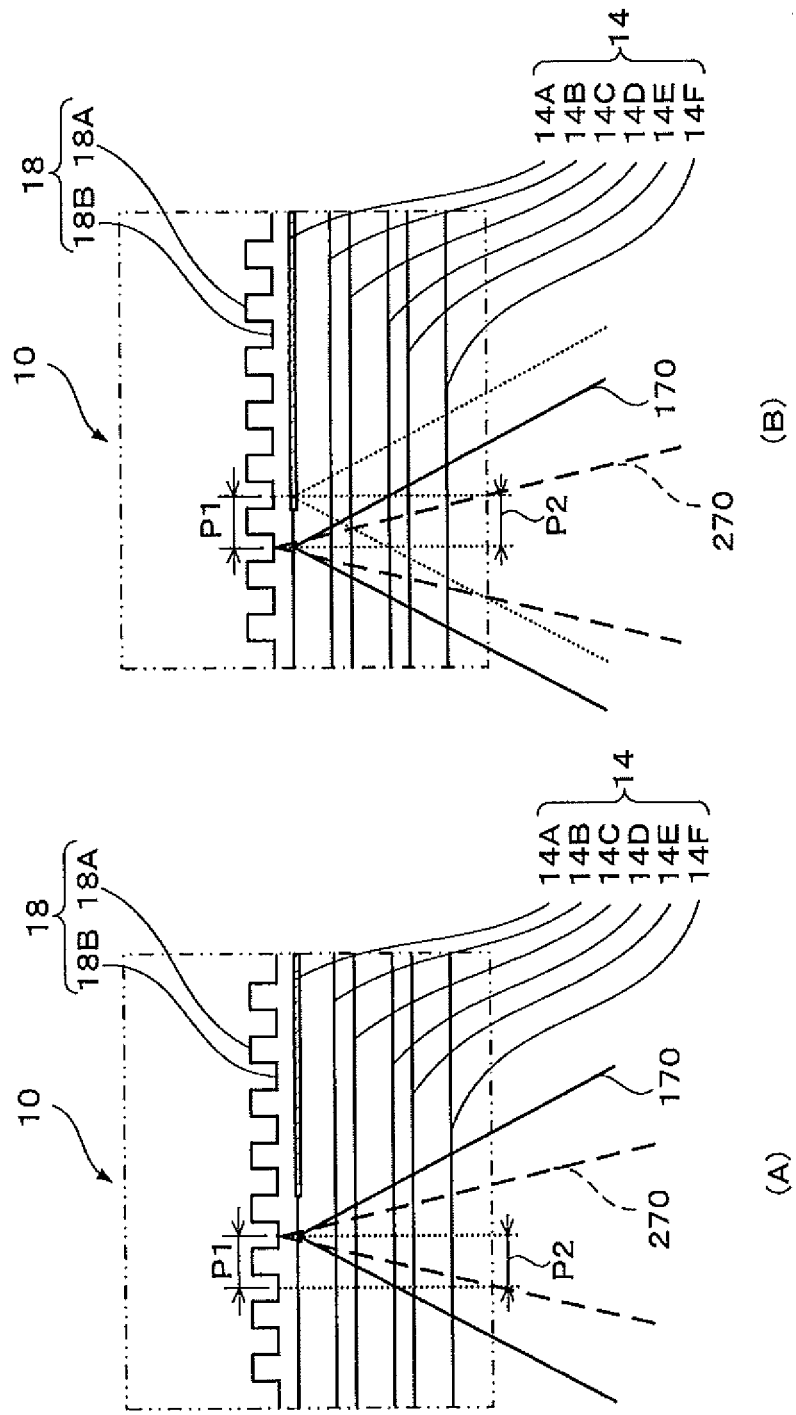
FIG. 3 is an enlarged sectional view illustrating a recording procedure of the optical recording and reading method.

Next, with reference to FIG. 3, a method for recording and reading information in the optical recording medium 10 of the preset embodiment will be explained using the optical pickup 90.

<Recording in Servo Layer/General-Purpose Step>

When information is recorded in the servo layer 18 of this optical recording medium 10, a conventional known method is used. To be more specific, using only the first optical system 100, information is recorded on the groove 18B while applying the beam 170 to the servo layer 18 and performing tracking control and focus control using the groove 18B. The same applies to reproduction.

<Recording in First Recording and Reading Layer/Servo Layer Using Step>

When information is recorded in the first recording and reading layer 14A adjacent to the servo layer 18, first, the beam 270 of the blue wavelength range of the second optical system 200 is applied to the servo layer 18 to perform tracking. To be more specific, as shown in FIGS. 3A and 3B, a spot of the beam 270 is applied to the groove 18B in the servo layer 18 to perform tracking. At the same time of this operation, the recording beam 170 of the blue wavelength range of the first optical system 100 is applied to the first recording and reading layer 14A.

As a result, while performing tracking of the groove 18B, information is recorded in the first recording and reading layer 14A along the groove 18B. As a result, the track pitch P2 of a recording mark formed in the first recording and reading layer 14A matches the pitch P1 between the grooves 18B. It should be noted that, in the servo layer 18, for example, information related to a basic system about the optical recording medium 10 and information related to the number of layers in the group of information recording layers 14 are recorded in advance in recording pits or BCA (Burst Cutting Area), so that these items of information are reliably read before tracking control starts. The basic information related to the optical recording medium contains a position of the servo layer 18, positions of the first to sixth recording and reading layers 14A to 14F and rules related to the inter-layer distance in the group of recording and reading layers.

When required information has been recorded in the first recording and reading layer 14A, additional information (such as address information related to recording and content information) of this time is recorded in the side of the servo layer 18 and the operation ends. It should be noted that, although the recording in the servo layer 18 in this case is performed using the beam 170 as the general-purpose step described above, it is natural that the recording may be directly performed using the beam 270 subjected to tracking control. By gathering management information in the servo layer 18, it is possible to easily find from which the recording starts at the next recording/reading.

It should be noted that, if the servo layer 18 does not have a recording layer, for example, it is preferable to maintain a management area in part of the first recording and reading layer 14A which is the farthest from the light incident surface 10A (i.e. which is the closest to the servo layer 18), and record the management information therein.

After that, in a case where the recording of information with respect to the first recording and reading layer 14A restarts, first, the management information recorded in the servo layer 18 is reproduced, a position in which the previous recording is completed in the first recording and reading layer 14A is checked, and the recording continues from the position. By this means, in the servo layer using step, a recording operation reliably continues until the recording of information with respect to the entire data area in the first recording and reading layer 14A is completed. Even in a case where an available data area is provided in a halfway manner or an unrecorded space has to be maintained if necessary, information continuity is maintained by recording dummy information therein. As a result, the entire data area in the first recording and reading layer 14A becomes a recorded area.

<Recording in Second Recording and Reading Layer/Recorded Area Using Step>

Figure 4:
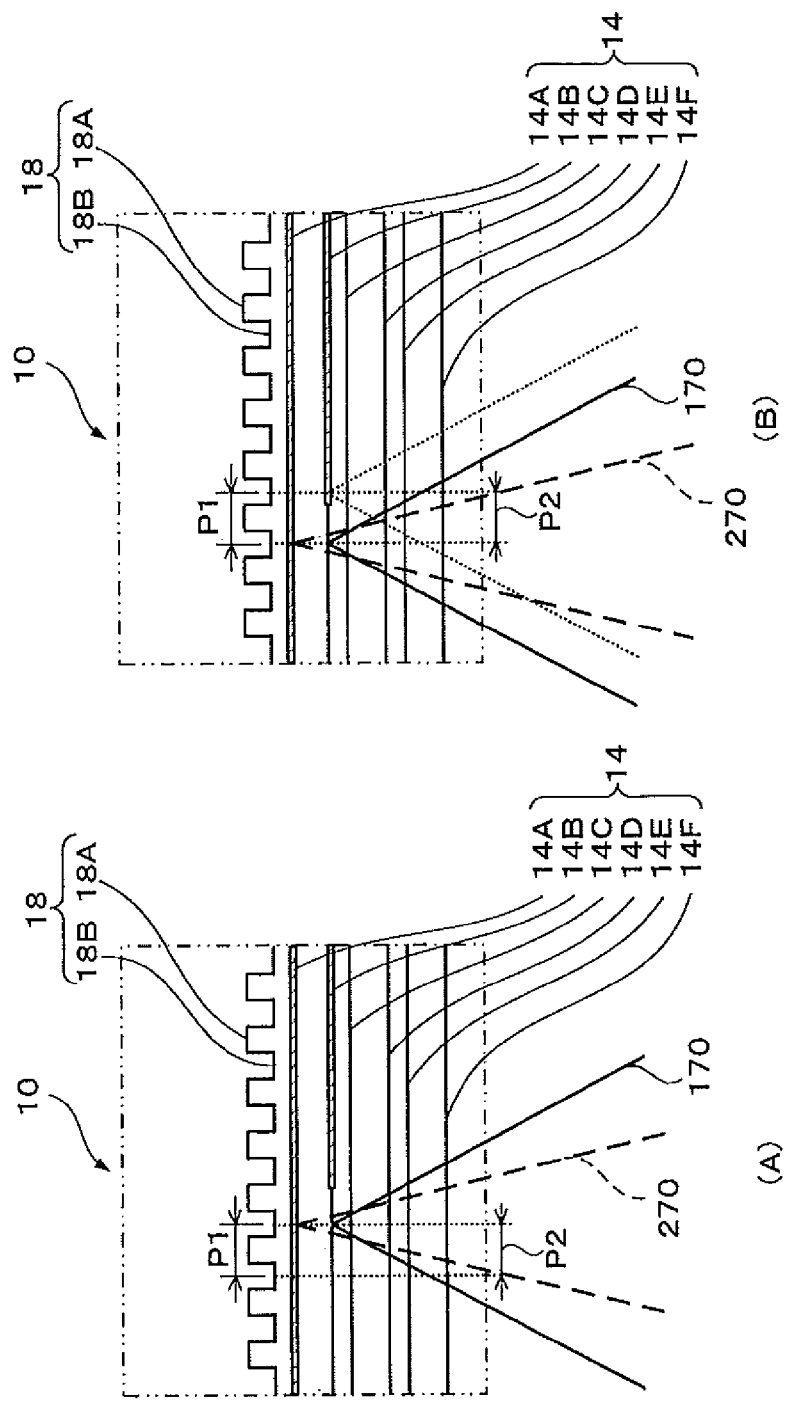
FIG. 4 is an enlarged sectional view illustrating a recording procedure of the optical recording and reading method.

When information has been recorded in the entire data area of the first recording and reading layer 14A, next, information is recorded in the second recording and reading layer 14B adjacent to the first recording and reading layer 14A. In this case, as shown in FIGS. 4A and 4B, first, by applying the tracking control beam 270 of the second optical system 200 to the recorded area of the first recording and reading layer 14A, tracking control is performed using the reading signals. Together with this operation, recording is performed by applying the recording beam 170 of the first optical system 100 to the second recording and reading layer 14B. It should be noted that, after the recording of required information is completed, additional information (such as address information related to recording and content information) of this time is recorded in the side of the servo layer 18 and the operation ends.

After that, in a case where the recording of information with respect to the second recording and reading layer 14B restarts, first, the management information recorded in the servo layer 18 is reproduced, a position in which the previous recording is completed in the second recording and reading layer 14B is checked, and the recording continues from the position. By this means, in the recorded area using step, a recording operation reliably continues until the recording of information with respect to the entire data area in the second recording and reading layer 14B is completed. Even in a case where an available data area is provided in a halfway manner or an unrecorded space has to be maintained if necessary, information continuity is maintained by recording dummy information. As a result, the entire data area in the second recording and reading layer 14B becomes a recorded area.

<Recording in Third and Later Recording and Reading Layers/Recorded Area Using Step>

When information has been recorded in the entire data area of the second recording and reading layer 14B, next, information is recorded in the third recording and reading layer 14C adjacent to the second recording and reading layer 14B. In this case, by applying the tracking control beam 270 of the second optical system 200 to the recorded area of the second recording and reading layer 14B, tracking control is performed using the reading signals. Together with this operation, recording is performed by applying the recording beam 170 of the first optical system 100 to the third recording and reading layer 14C. The following procedure is the same as in the recorded area using step explained in the second recording and reading layer 14B, and therefore an explanation will be omitted. By repeating the above-noted procedure, information is recorded in the first to sixth recording and reading layers 14A to 14F in order.

It should be noted that, for example, when information recorded in the first recording and reading layer 14A is reproduced, first, the servo layer 18 is reproduced using the beam 170 of the first optical system 100 to read the above-noted basic system and additional information based on the record (such as content information recorded in the first recording and reading layer 14A). After that, based on these items of information, the beam 170 of the first optical system 100 is moved to the first recording and reading layer 14A to access a predetermined address and perform reproduction. At this time, tracking may be performed using a recording mark recorded in the first recording and reading layer 14A. Therefore, it is possible to eliminate the beam 270 of the second optical system 200 during content reproduction in the first recording and reading layer 14A.

As described above, the optical recording medium 10 and the optical recording and reading method in the present embodiment include: a servo layer using step of recording information in the group of recording and reading layers 14 while performing tracking using the servo layer 18; and a recorded area using step of recording information in another group of recording and reading layers 14 while performing tracking using recorded areas of information in the recording and reading layers 14. As a result, when information is recorded in the group of recording and reading layers 14 for the first time, tracking control is performed using the servo layer 18 in a positive manner in the servo layer using step. On the other hand, if a data area of one of the recording and reading layers becomes a recorded area, the procedure proceeds to the recorded area using step. As a result, it is possible to record information in other recording and reading layers while performing tracking control using the recorded area of the recording and reading layer.

By this means, even if the number of layers in the group of recording and reading layers 14 increases, it is possible to shorten the distance between the recorded areas in the group of recording and reading layers 14 in which tracking control is performed and unrecorded areas in the recording and reading layers in which information is recorded (i.e. layer-direction distance). As a result, it is possible to decrease a thickness tolerance occurring between the tracking control beam 270 and the recording and reading beam 170, so that it is possible to stabilize tracking signals without performing focus control of the tracking control beam 270 independently.

Especially, according to the present embodiment, in the servo layer using step, information is recorded in the first recording and reading layer 14A adjacent to the servo layer 18. As a result, it is possible to decrease the inter-layer distance between the servo layer 18 and the first recording and reading layer 14A (particularly, it is possible to set the distance equal to or less than 20 µm), so that it is possible to stabilize tracking signals. Also, even in the recorded area using step, for example, in the case of using a recorded area of the first recording and reading layer 14A, information is recorded in the second recording and reading layer 14B adjacent thereto. In the case of using a recorded area of the second recording and reading layer 14B, information is recorded in the third recording and reading layer 14C adjacent thereto. In this way, by placing a recording and reading layer for tracking control and a recording and reading layer of the recording target in adjacent positions, similarly, it is possible to stabilize tracking signals more significantly.

Further, in the present embodiment, in both the servo layer using step and the recorded area using step, a recording operation continues until the recording of information is completed in the entire data area in a recording and reading layer of the recording target. It should be noted that "continuing" means that no area in which tracking is impossible is provided by remaining an unrecorded status in a data area of a recording and reading layer of the recording target. Therefore, by controlling an unrecorded area not to be formed in a data area of a recording and reading layer as in the present embodiment, it is possible to provide stabled tracking control to other recording and reading layers.

Also, in the present embodiment, a waveform of the tracking beam 270 and a waveform of the recording beam 170 are set to be in the same blue wavelength area and be the same wavelength. Further, in the servo layer 18, a recording and reading film in which information can be recorded is formed by one of these beams 170 and 270. By using the servo layer 18 effectively as a recording layer, it is possible to increase the recording capacity of the optical recording medium 10 and record management information in this servo layer 18. For example, by reading the management information recorded in this servo layer 18 at the time of a recording and reading start, it is possible to quickly find the recording start position and the reproducing start position in the group of recording and reading layers 14, so that it is possible to enhance the recording and reading efficiency.

In this optical recording medium 10, the thickness of the buffer layer 17 placed between the servo layer 18 and the first recording and reading layer 14A is substantially the same as one of the thicknesses in the group of intermediate layers 16. By this means, it is possible to shorten the distance between the servo layer 18 and the group of recording and reading layers 14 and stabilize tracking signals in the servo layer 18. Also, the distance between the servo layer 18 and the group of recording and reading layers 14 is shortened, so that, at the time of making the servo layer 18 function as a recording and reading layer, it is possible to use the first optical system 100 as is for recording and reading in the group of recording and reading layers 14. Particularly, by the first optical system 100, it is possible to facilitate position estimation of the servo layer 18 and to easily use the servo layer 18 as part of the group of recording and reading layers 14 in the first optical system 100.

It should be noted that, in this optical recording medium 10, to suppress a crosstalk, two kinds of thicknesses are set for the group of intermediate layers 16 and large and small film thicknesses are alternately set. Therefore, in the present embodiment, by setting the thickness of the buffer layer 17 to 12 µm which is the film thickness of the second intermediate layer 16B, the alternate relationship between two kinds of thicknesses is maintained. By this means, it is arranged such that the servo layer 18 does not have harmful effects when the first recording and reading layer 14A is reproduced.

Also, in the present embodiment, compared to the group of recording and reading layers 14, the servo layer is placed in a position furtherer from the light incident surface in the optical recording medium 10. BY this means, it is possible to directly form the concavo-convex pattern (i.e. the land 18A and the groove 18B) on the support substrate 12, so that it is possible to create the servo layer 18 easily and reduce a manufacturing cost.

In the optical recording medium 10 of the present embodiment, although a case has been limitedly described where the servo layer 18 is placed in a furtherer side from the light incident surface 10A than the group of recording and reading layers 14, the present invention is not limited to this. Also, although a case has been limitedly described where six or more recording and reading layers are provided as the group of recording and reading layers 14, the present invention is not limited to this.

Figure 5:
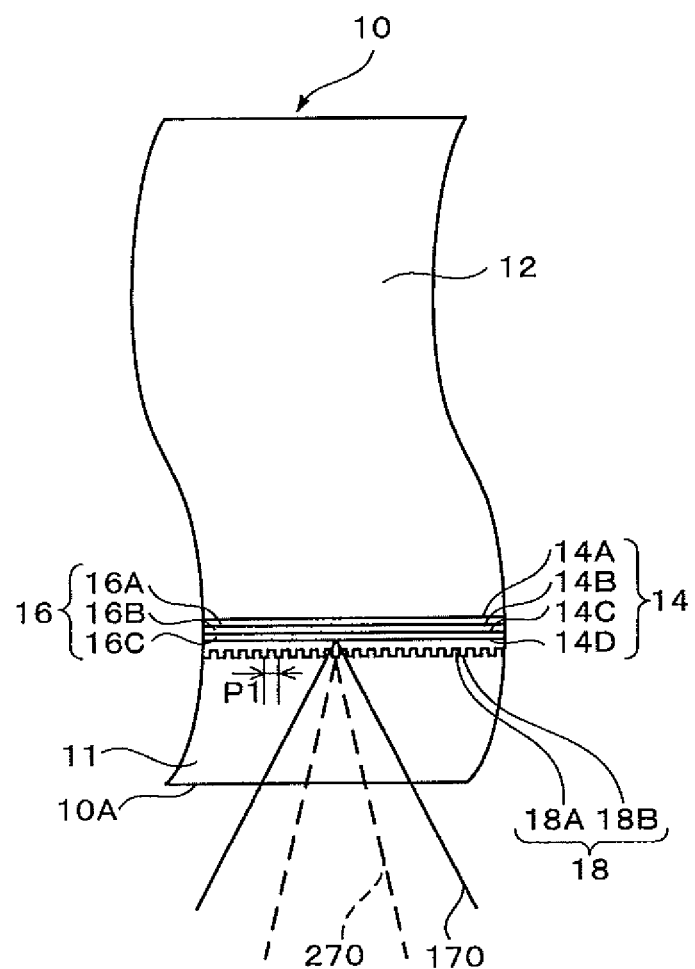
FIG. 5 is a sectional view illustrating another example of the multilayer structure of an optical recording medium used in an optical recording and reading method according to an embodiment of the present invention.

FIG. 5 shows a case where, as the optical recording medium 10 according to other embodiments, the servo layer 18 is placed in a position closer to the side of the light incident surface 10A than the four-layer group of recording and reading layers 14. By this means, the servo layer 18 becomes close to the light incident surface 10A, so that it is possible to enhance the expandability of an aberration correcting range and therefore enhance the tracking accuracy. It should be noted that, although a Fig. is not shown here, it is possible to place a servo layer in the intermediate of the group of recording and reading layers.

Figure 6:
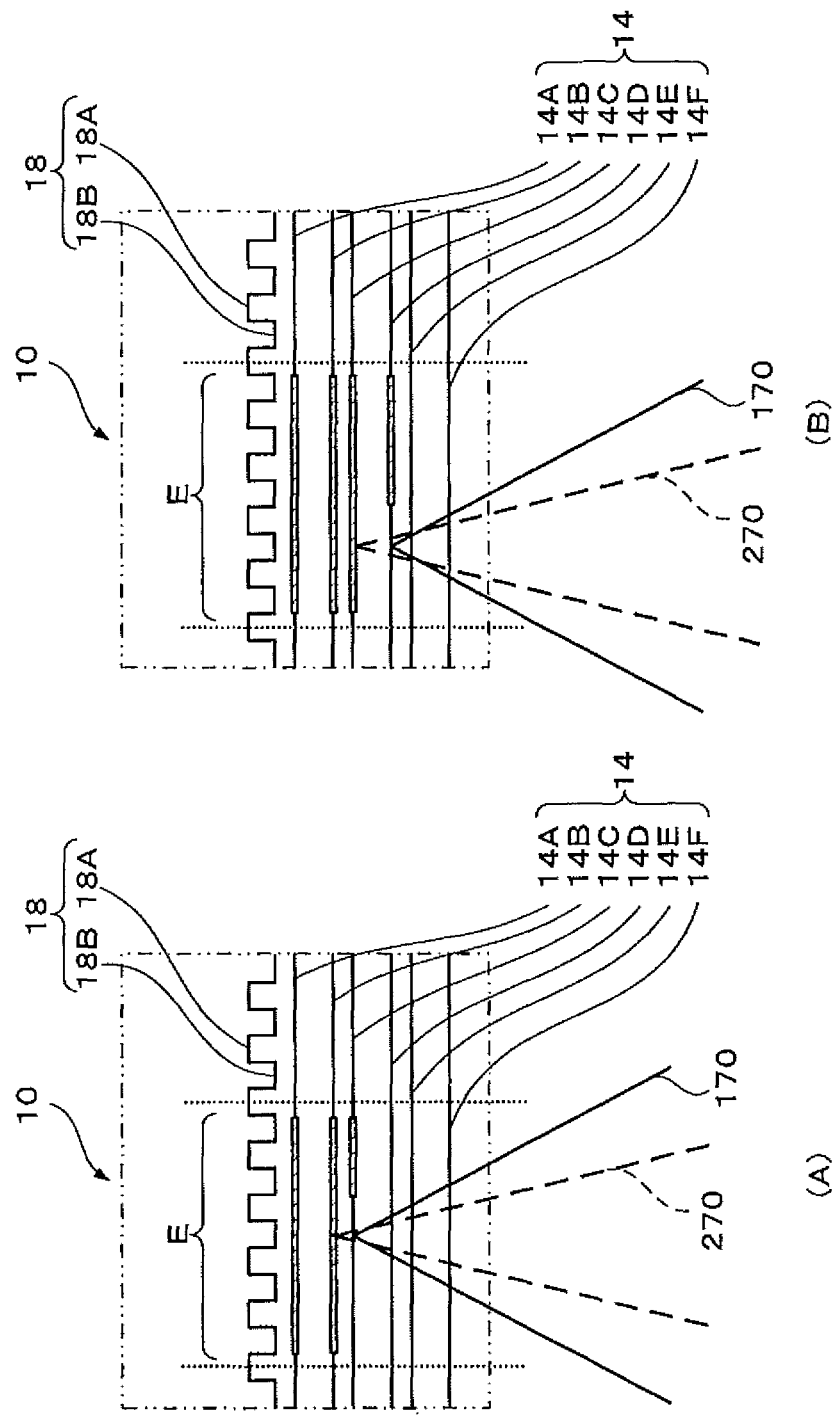
FIG. 6 is an enlarged sectional view illustrating another example of the recording procedure of the optical recording and reading method.

Further, in the optical recording and reading method of the present embodiment, a recording operation continues until the recording of information is completed in the entire data area in a recording and reading layer of the recording target, in both the servo layer using step and the recorded area using step. However, the present invention is not limited to this. For example, as shown in FIGS. 6A and 6B, it is possible to divide the data area of the group of recording and reading layers 14 into a plurality of areas E in the radius direction and perform recording every area E in the layer direction.

Figure 7:
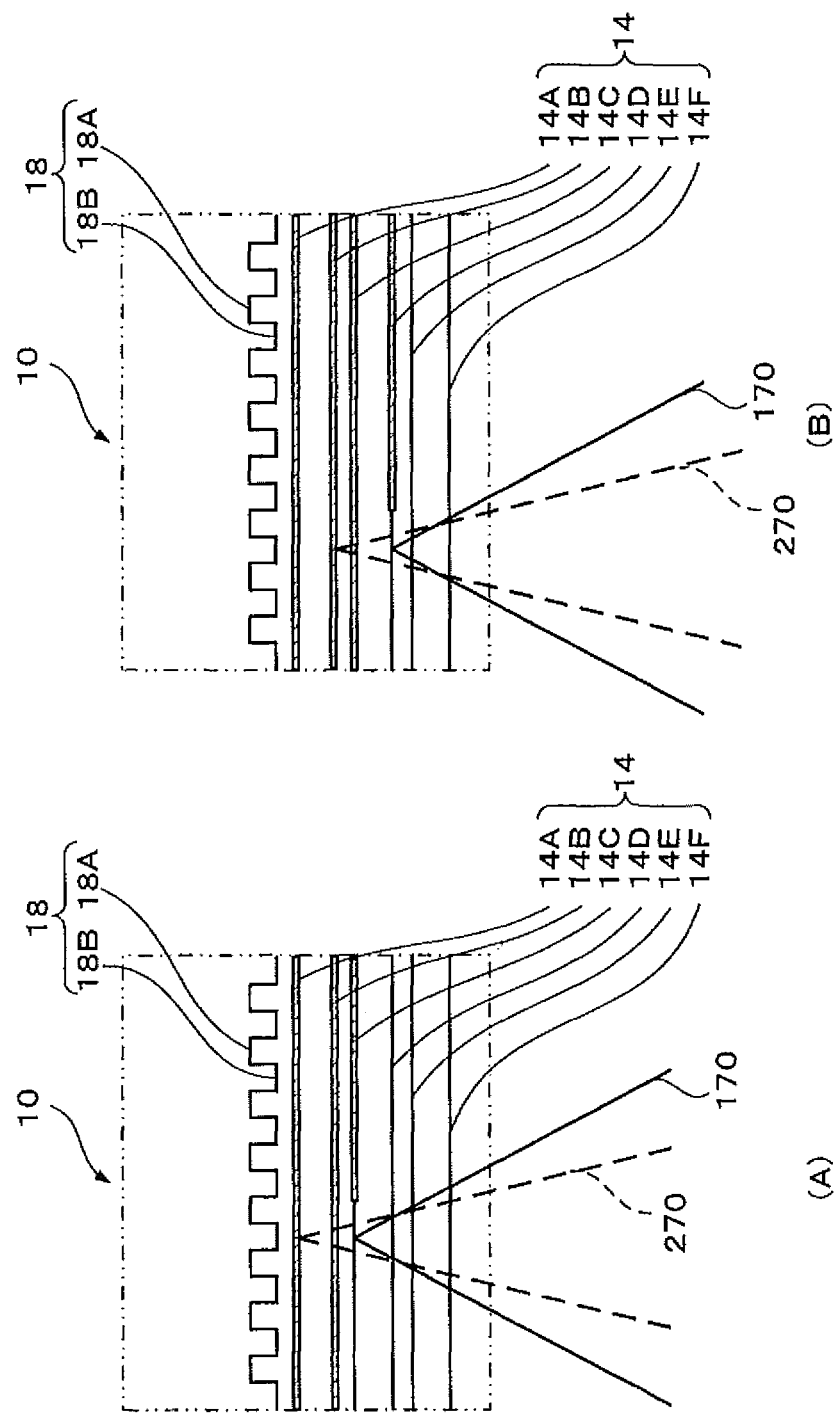
FIG. 7 is an enlarged sectional view illustrating another example of the recording procedure of the optical recording and reading method.

Also, in the optical recording and reading method of the present embodiment, although a case has been limitedly described where the servo layer 18 in which tracking control is performed or the recorded area of an information recording layer is always adjacent to a recording and reading layer of the recording target, the present invention is not limited to this. For example, as shown in FIGS. 7A and 7B, it is possible to insert other recording and reading layers between the servo layer 18 in which tracking control is performed or the recorded area of an information recording layer and a recording and reading layer of the recording target by the beam 170. By this means, it is preferable to maintain a certain distance (i.e. focus distance gap) between the recording and reading beam 170 and the tracking control beam 270, to the extent that the thickness tolerance is not large. As a result, the expanding angle gap of the beams 170 and 270 becomes large, so that, even if the return light from the optical recording medium 10 is mixed, it is possible to separate it by using a slit and aperture easily. Also, as in the present embodiment, in a case where the film thicknesses of the group of intermediate layers 16 including the buffer layer 17 are alternately set, it is preferable to insert one recording and reading layer between the servo layer 18 or a recorded area of an information recording layer and a recording and reading layer of the recording target. As a result, the focus distance gap is regularly 28 µm (equal to the sum of 16 µm and 12 µm), so that it is possible to simply set the focus position of the tracking control beam 270.

It should be noted that, in the present embodiment, although a case has been described where two kinds of interlayer distances (16 µm and 12 µm) are alternately set in the group of recording and reading layers, the present invention is not limited to this, and it is equally possible to combine three or more kinds of inter-layer distances. Naturally, the same film thickness may be set.

It should be noted that, although a case has been described where a recording and reading layer is filmed in advance in an optical recording medium to which the optical recording and reading method of the above-noted embodiment is applied, the present invention is not limited to this. For example, in an optical recording medium, it is equally possible to use all of the positions of future multiple recording and reading layers as an integrated bulk layer having a predetermined thickness. If a beam is applied to this bulk layer, only a focus part of a beam spot has a state change and a recording mark is formed. That is, a multilayer optical recording medium of the present invention is not limited to an optical recording medium in which a recording and reading layer to which a beam is applied is formed in advance, and a case is possible where recording marks are formed as needed in a planar area of the bulk and a plurality of recording and reading layers are provided in a later stage by multilayer formation as an aggregation of these recording marks.

In such a case, the optical recording and reading method of the present invention may include: a servo layer using step of forming recording marks in a partial planer area of the bulk layer and forming a recording and reading layer in a later stage while performing tracking using a servo layer; and a recorded area using step of forming recording marks in other areas of the bulk layer and forming a recording and reading layer in a later stage while performing tracking using a recorded area of the recording and reading layer formed in a later stage in the bulk layer. As a result of this, when information is recorded in the bulk layer for the first time, the servo layer using step performs tracking control using the servo layer in a positive manner. On the other hand, once a recording and reading layer is formed in the bulk layer, the procedure proceeds to the recorded area using step and it is possible to form recording marks in other positions while performing tracking control using a recorded area in the bulk layer.

Further, although the beams 170 and 270 are in a blue wavelength range in the present embodiment, the present invention is not limited to this. Also, for example, it is possible to set a different wavelength from that of the recording and reading beam 170, to the extent that the beam 270 can perform tracking control using a recorded area of the group of recording and reading layers 14. By setting a wavelength gap between the beams 170 and 270, it is possible to separate mixed return lights by, for example, a filter having wavelength selectivity.

Figure 8:
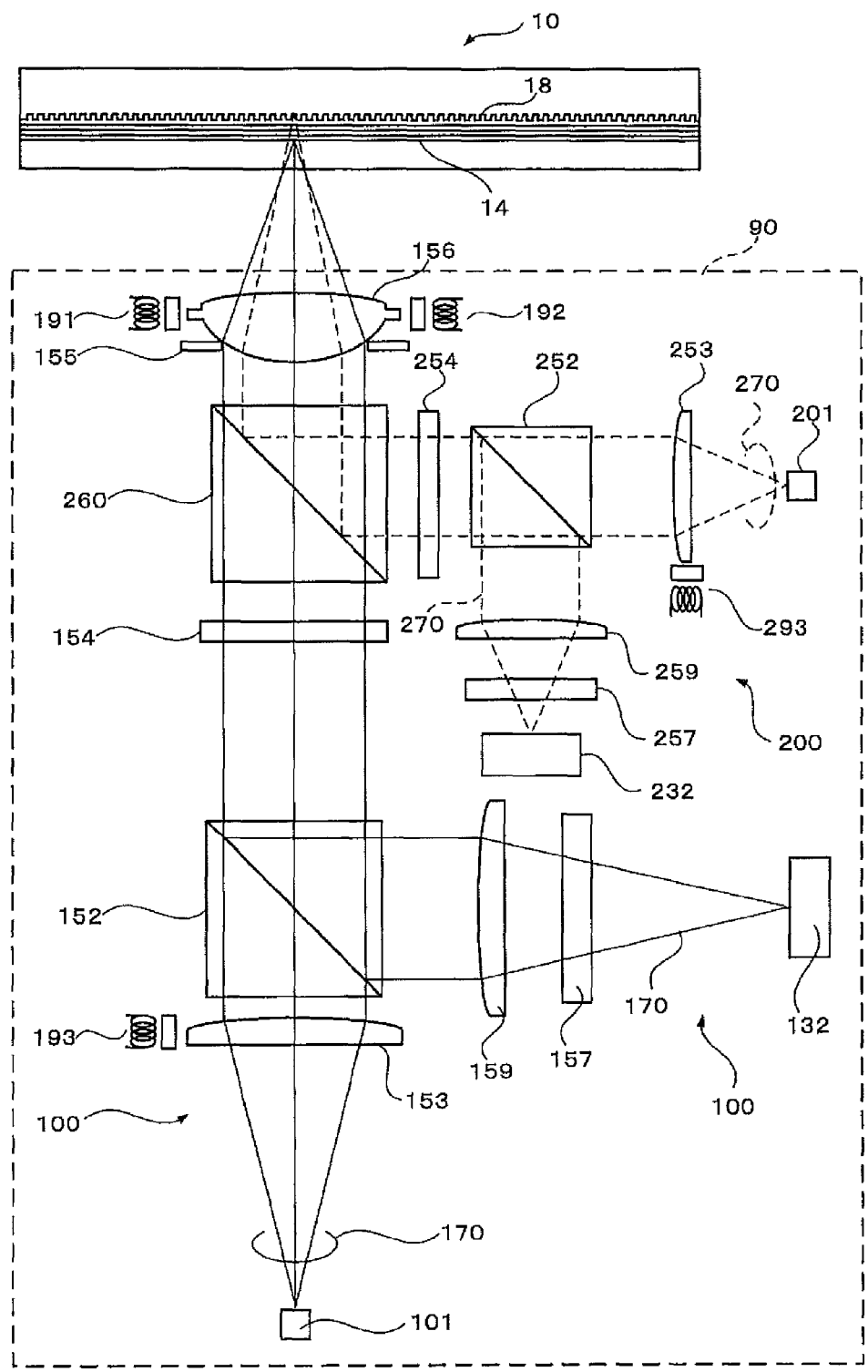
FIG. 8 is a block diagram illustrating an optical recording medium and an internal configuration of an optical pickup which realizes optical recording and reading according to a second embodiment of the present invention.
Figure 9:
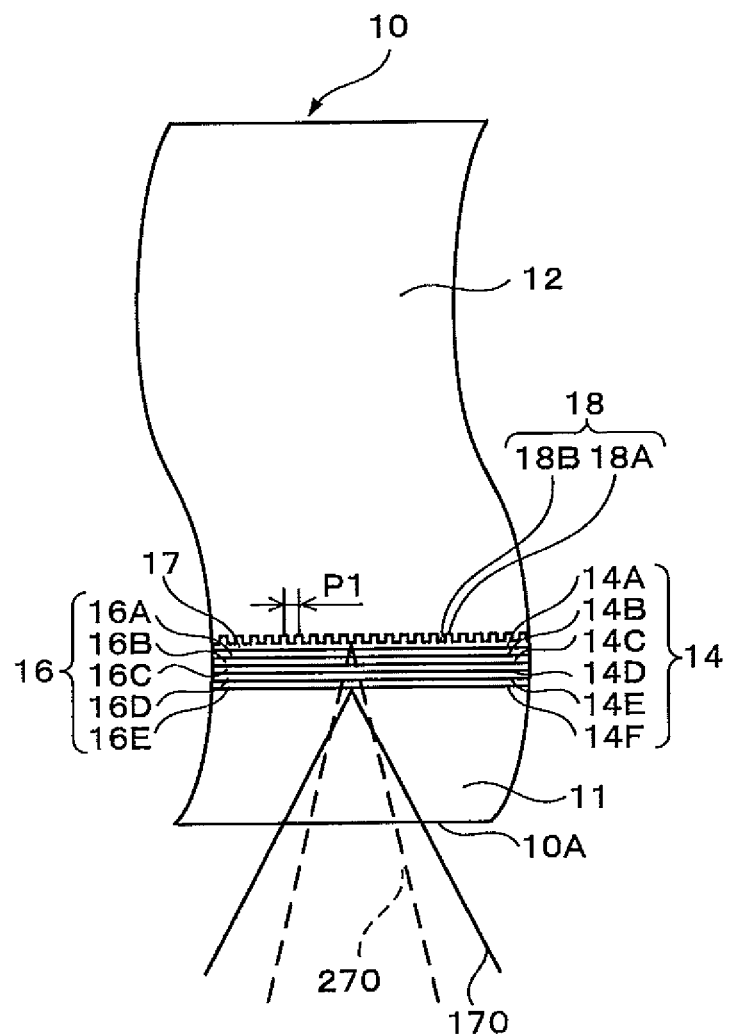
FIG. 9 is a sectional view illustrating a multilayer structure of the optical recording medium.

Subsequently, a configuration of an optical pickup 90 used for recording and reading is illustrated in FIG. 8 regarding a second embodiment of the present invention, and FIG. 9 illustrates a configuration of an optical recording medium 10. Here, a difference from the first embodiment will be mainly described.

A beam 270 which becomes a light source of a tracking optical system 20 in the optical pickup 90 has a red wavelength of 630 to 680 nm (650 nm, here). In the optical pickup 90 in the second embodiment, the wavelength is different between a first optical system 100 and a second optical system 200, and thus, beams 170 and 270 can be separated by a filter having wavelength dependence.

A servo layer 18 of the optical recording medium 10 is composed by forming a reflective layer on a concavo-convex pattern (lands and grooves) for tracking control of a support substrate 12. The recording and reading beam 170 is set such that an amount of reflected light when the recording and reading beam 170 is applied to a servo layer 18 becomes 5 times or less the amount of reflected light when the recording and reading beam 170 is applied to a group of recording and reading layers 14. As a result, when the recording and reading beam 170 is applied to the group of recording and reading layers 14, even if the beam 170 leaks to the servo layer 18 side, an amount of reflected light of this leakage light in the servo layer 18 is attenuated, and an influence of crosstalk can be made extremely small.

Moreover, in the second embodiment, the reflectance of the servo layer 18 when the recording and reading beam 170 is applied to the servo layer 18 is set smaller than the reflectance when the tracking beam 270 is applied to the servo layer 18. That is, the servo layer 18 has wavelength dependence such that the reflectance becomes higher if the red beam 270 having a long wavelength is applied, while the reflectance becomes lower if the blue beam 170 having a short wavelength is applied.

Specifically, the reflectance of the servo layer 18 when the tracking beam 270 is applied to the servo layer 18 is set to 40 to 95%, while the reflectance of the servo layer 18 when the recording and reading beam 170 is applied to the servo layer 18 is set to 60% or less.

As a configuration example of the servo layer 18 having such optical characteristics, a reflecting film (metal film) containing at least any of Ag, Al, Au and Cu as a main component and an auxiliary film laminated adjacently to this reflective film are provided. The reflectance regarding the beam 270 having a long wavelength (red wavelength) can be made high, while the reflectance regarding the beam 170 having a short wavelength (blue wavelength) can be made low by making the refractive indexes and the thicknesses of the reflecting film and the auxiliary film different from each other. The servo layer 18 preferably has a structure of three layers or more by laminating one layer or more of the reflecting film which becomes a metal film and moreover, two layers or more of the auxiliary film. At this time, the reflecting film is laminated on the support substrate 12 side, and the auxiliary film is laminated on top of it. For example, a three-layer structure is possible in which the reflecting film of Ag, the auxiliary film of Si, and the auxiliary film of ZnS—SiO2 are laminated in the order from the support substrate 12 side.

Furthermore, the servo layer 18 preferably has a structure of 5 layers or more by laminating two layers or more of the reflecting film and three layers or more of the auxiliary film. At this time, at least one layer of the auxiliary film is interposed between a first reflecting film and a second reflecting film. For example, a five-layer structure is preferable in which the reflecting film of Ag, the auxiliary film of ZnS—SiO2, the reflecting film of Cu, the auxiliary film of Si, and the auxiliary film of ZnS—SiO2 are laminated in the order from the support substrate 12 side. With this five-layer structure, information can be recorded also in the servo layer 18. In this embodiment, the servo layer 18 having the five-layer structure exemplified above is employed.

According to this servo layer 18, the reflectance of the beam 270 having a long wavelength can be made higher and the reflectance of the beam 170 having a short wavelength can be made lower.

A pitch P1 among lands 18A or grooves 18B adjacent in the servo layer 18 is set to less than 0.74 μm, here. Specifically, the pitch P1 is preferably set within a range of 0.6 to 0.7 μm or more preferably set in the vicinity of 0.64 μm. On the other hand, a track pitch P2 of recording marks is set to a half (½) of the pitch P1 of the lands 18A and the grooves 18B. That is, the track pitch P2 between the recording marks is set to less than 0.37 μm or preferably set within a range of 0.26 to 0.35 μm or more preferably set in the vicinity of 0.32 μm. As a result, the track pitch P2 between the recording marks becomes approximately 0.32 µm, which is compatible with the BD standard.

The pitch P1 (approximately 0.64 µm) among the lands 18A/grooves 18B of the servo layer 18 is the size capable of sufficient tracking with the beam 270 having a relatively long red wavelength range. In this embodiment, tracking is executed by using both the lands 18A and the grooves 18B. As a result, the track pitch P2 of the recording marks becomes approximately 0.32 µm, which is a half of the pitch P1 of the servo layer 18. As described above, by executing tracking control by using the lands 18A and the grooves 18B, respectively, the track pitch P2 of the recording marks of the group of recording and reading layers 14 can be reduced even without reducing the pitch P1 of the servo layer 18.

A buffer layer 17 is formed of a light transmitting acrylic ultraviolet curable resin. The thickness of this buffer layer 17 is preferably set to 10 to 200 µm. If the thickness of this buffer layer 17 is 10 µm or less, the servo layer 18 and the group of recording and reading layers 14 become too close to each other and can give a bad effect to each other. On the other hand, if the thickness of the buffer layer 17 is 200 µm or more, uniformity of the thickness can be easily deteriorated in a process of forming a film of the buffer layer 17. Here, the thickness is set to 30 µm.

As a result, the servo layer 18 of the optical recording medium 10 is located at a distance of 0.140 mm (140 µm) from a light incident surface 10A.

Figure 10:
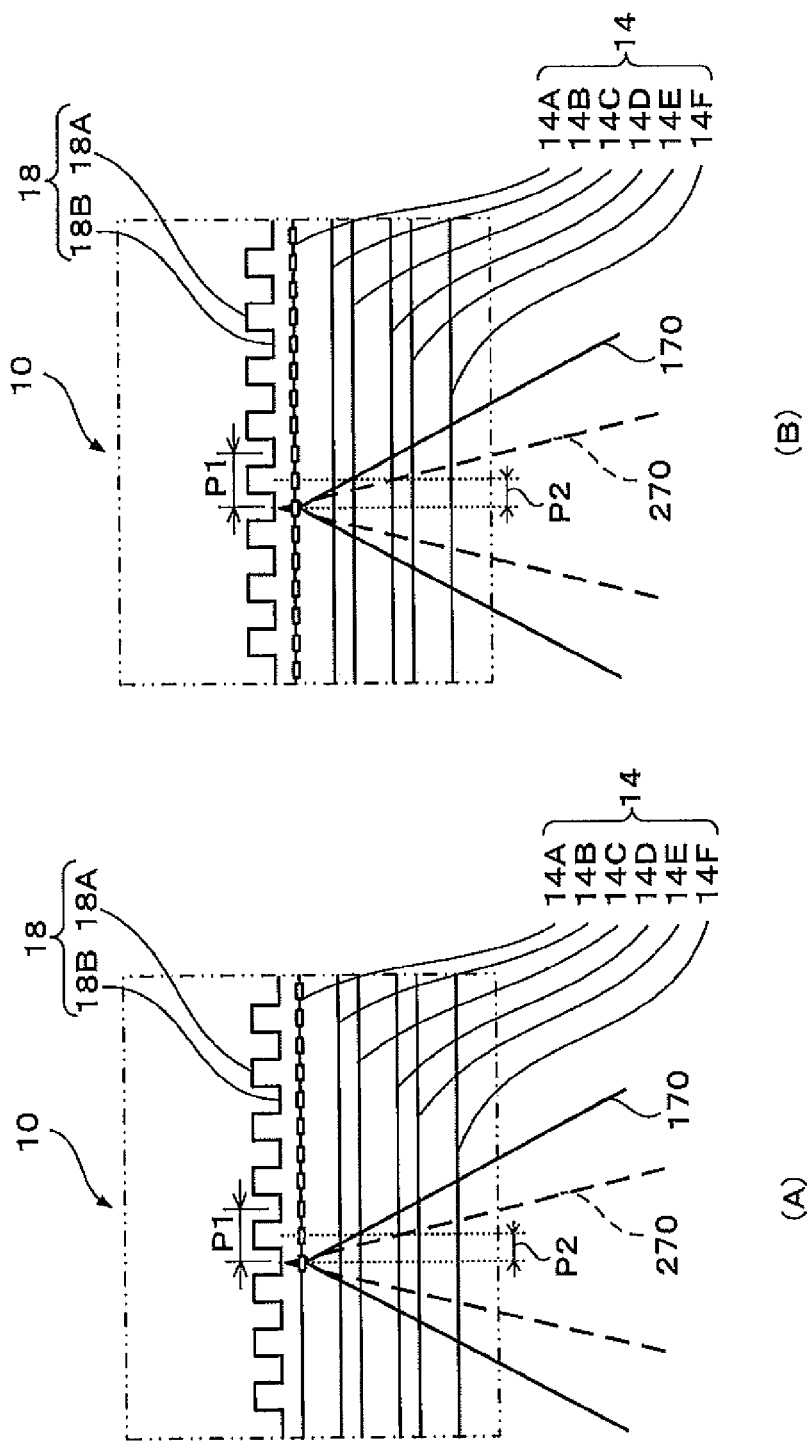
FIG. 10A is an enlarged sectional view illustrating a recording procedure of an optical recording and reading method with respect to the optical recording medium.
FIG. 10B is an enlarged sectional view illustrating a reproducing procedure.

Subsequently, a recording and reading method and its action using the optical recording medium 10 in the second embodiment will be described by using the optical pickup 90 by referring to FIG. 10 and after.

<Recording in Group of Recording and Reading Layers>

For example, if information is to be recorded in a first recording and reading layer 14A adjacent to the servo layer 18, first, the beam 270 in a red wavelength area of a second optical system 200 is applied to the servo layer 18 and tracking is performed. Specifically, as illustrated in FIG. 10(A), a spot of the beam 270 is applied alternately to both the grooves 18B and the lands 18A in the servo layer 18 and tracking is performed. At the same time as this work, the recording and reading beam 170 in a blue wavelength area of a first optical system 100 is applied to the first recording and reading layer 14A.

As a result, the information is recorded in the first recording and reading layer 14A along the grooves 18B or the lands 18A while tracking is performed for the grooves 18B and the lands 18A. At this time, a part of the recording and reading beam 170 applied to the first recording and reading layer 14A is transmitted through this first recording and reading layer 14A and reaches the servo layer 18. However, as already described, the amount of reflected light when the recording and reading beam 170 is applied to the servo layer 18 is set to 5 times or less the amount of reflected light when the recording and reading beam 170 is applied to the group of recording and reading layers 14. Therefore, even if the beam 170 passing through the first recording and reading layer 14A is reflected by the servo layer 18, the light amount of the reflected light is considerably attenuated. As a result, a bad influence on the recording mark formed on the first recording and reading layer 14A can be suppressed. Moreover, the servo layer 18 sufficiently reflects the tracking beam 270 while suppressing reflection of the recording and reading beam 170. Specifically, the reflectance of the tracking beam 270 is maintained at as high as 40 to 95% in the servo layer 18. On the other hand, the reflectance of the recording and reading beam 170 is suppressed to 60% or less. As a result, stable tracking control is realized.

Basic specifications relating to the optical recording medium 10 and information relating to the number of layers of the group of information recording layers 14 are recorded in advance in a recording pit or B CA (burst cutting area) in the servo layer 18 and read out before the tracking control is started all the time. Basic information relating to the optical recording medium includes a rule concerning the position of the servo layer 18, positions of first to sixth recording and reading layers 14A to 14F, and an inter-layer distance of the group of recording and reading layers.

After recording of required information in the first recording and reading layer 14A has been completed, additional information (address information relating to recording, contents information and the like) this time is recorded in the first recording and reading layer 14A and completed. After that, if the recording of information in the first recording and reading layer 14A is to be resumed, first, management information recorded in this first recording and reading layer 14A is reproduced, the position where the previous recording is completed is checked, and recording is continued from that position. As described above, information can be recorded to all the data areas in the first recording and reading layer 14A to the sixth recording and reading layer 14F.

<Reproduction of Group of Recording and Reading Layers>

For example, if information recorded in the first recording and reading layer 14A adjacent to the servo layer 18 is to be reproduced, first, the beam 270 in the red wavelength area of the second optical system 200 is applied to the servo layer 18 and tracking is performed. Specifically, as illustrated in FIG. 10(B), a spot of the beam 270 is applied to the grooves 18B and the lands 18A in the servo layer 18 and tracking is performed. At the same time as this work, the recording and reading beam 170 in the blue wavelength area of the first optical system 100 is applied to the first recording and reading layer 14A.

As a result, the information recorded in the first recording and reading layer 14A is reproduced along the grooves 18B or the lands 18A while tracking is performed for the grooves 18B and the lands 18A. At this time, a part of the recording and reading beam 170 applied to the first recording and reading layer 14A is transmitted through this first recording and reading layer 14A and reaches the servo layer 18. However, as already described, the amount of reflected light when the recording and reading beam 170 is applied to the servo layer 18 is set to 5 times or less the amount of reflected light when the beam 170 is applied to the group of recording and reading layers 14. Therefore, even if the beam 170 passing through the first recording and reading layer 14A is reflected by the servo layer 18, the light amount of the reflected light is considerably attenuated, and thus, crosstalk with a reading signal can be considerably suppressed. Moreover, the servo layer 18 sufficiently reflects the tacking beam 270 while suppressing the reflection of the recording and reading beam 170. Specifically, the reflectance of the tracking beam 270 is maintained at as high as 40 to 95% in the servo layer 18, while the reflectance of the recording and reading beam 170 is suppressed to 60% or less. As a result, even if a part of the recording and reading beam 170 leaks out to the servo layer 18, the quality of a tracking signal is not deteriorated. As described above, the information recorded in the data area of the first recording and reading layer 14A to the sixth recording and reading layer 14F is reproduced.

As described above, according to the optical recording medium 10 of this embodiment, the reflectance of the servo layer 18 when the recording and reading beam 170 is applied to the servo layer 18 is set smaller than the reflectance when the recording and reading beam 170 is applied to the group of recording and reading layers 14. As a result, when the recording and reading beam 170 is applied to the group of recording and reading layers 14, even if a part thereof leaks out to the servo layer 18 on the depth side, the amount of reflected light of the servo layer 18 is made small, and a bad influence on a recording and reading operation can be avoided.

Moreover, in this embodiment, since the amount of reflected light when the recording and reading beam 170 is applied to the servo layer 18 is set to 5 times or less the amount of reflected light when the recording and reading beam 170 is applied to the group of recording and reading layers 14. As a result, even if the recording and reading beam 170 applied to the group of recording and reading layers 14 leaks out to the servo layer 18 on the depth side, most of the beam is absorbed or transmitted by this servo layer 18.

On the other hand, in this optical recording medium 10, the reflectance when the recording and reading beam 170 is transmitted through the group of recording and reading layers 14 and applied to the servo layer 18 is set smaller than the reflectance when the tracking beam 270 is passed through the group of recording and reading layers 14 and applied to the servo layer 18. By employing this servo layer 18, the tracking beam 270 is sufficiently reflected while the reflection of the recording and reading beam 170 is suppressed, and thus, quality deterioration of the tracking signal can be prevented.

Particularly in this embodiment, since the optical characteristics of the servo layer 18 are changed depending on the wavelength as described above, the servo layer has a structure in which a reflecting film (metal film) having a metal material as a main component and an auxiliary film having refractive index and film thickness different from those of this reflecting film are laminated. By configuring as such, reflected light intensity of a specific wavelength (a blue wavelength, here) not required in tracking can be optically reduced.

Moreover, as the result of the configuration of the optical recording medium 10 as above, the inter-layer distance between the group of recording and reading layers 14 and the servo layer 18 can be made small to 10 to 200 μm, and the number of layers of the group of recording and reading layers 14 can be increased.

Figure 11:
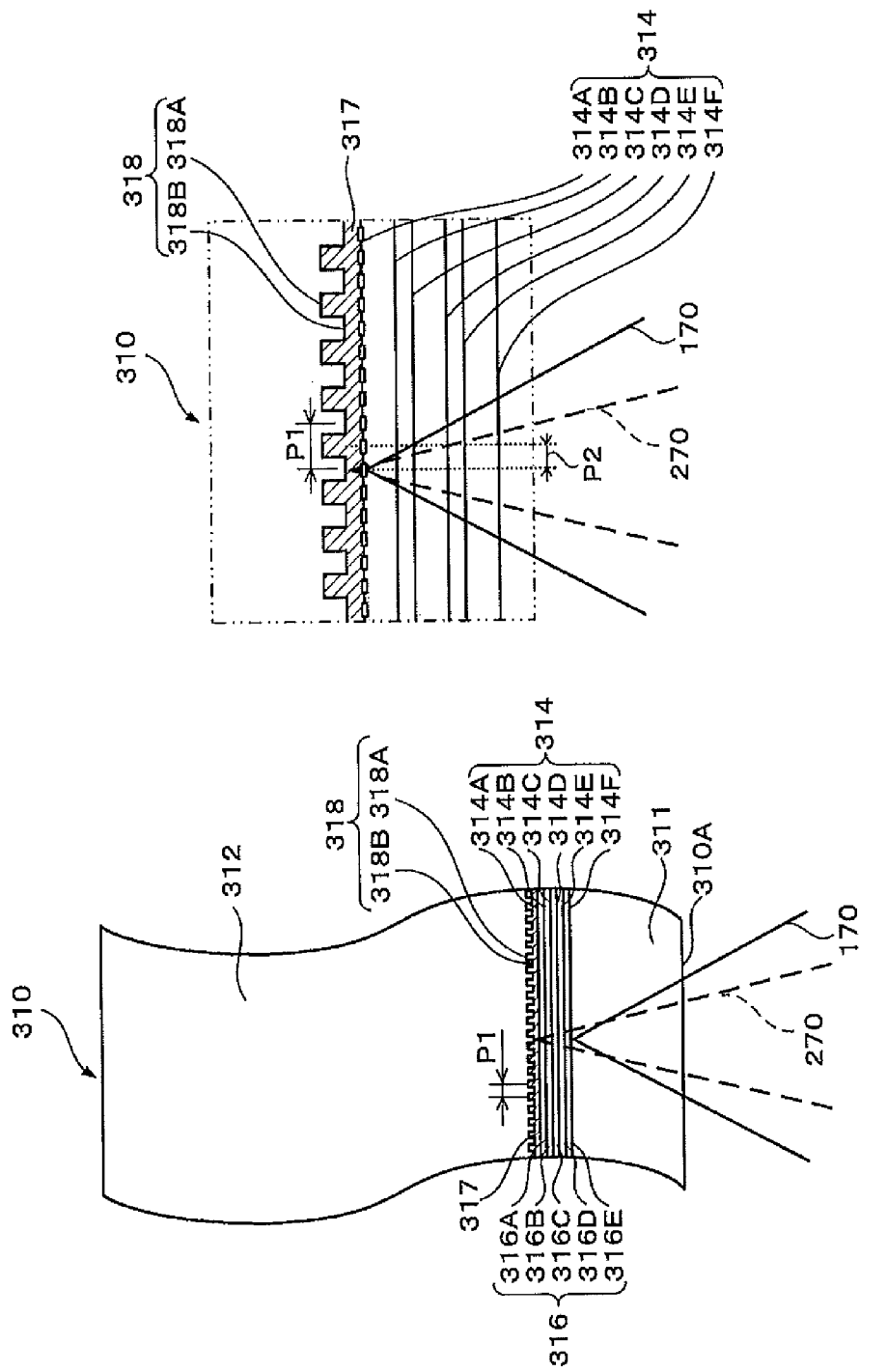
FIG. 11A is a sectional view illustrating a multilayer structure of an optical recording medium according to a third embodiment.
FIG. 11B is an enlarged sectional view illustrating a recording and reading procedure with respect to the optical recording medium.

Subsequently, by referring to FIGS. 11(A) and 11(B), an optical recording medium 310 according to a third embodiment will be described. Regarding this optical recording medium 310, the same or the similar portions as those in the optical recording medium 10 in the second embodiment are given the same last two digits in the reference numerals in the drawings and the description, and description of the individual members are omitted and only differences will be mainly described.

This optical recording medium 310 includes a cover layer 311, a group of recording and reading layers 314 and a group of intermediate layers 316, a buffer layer 317, a servo layer 318, and a support substrate 312 from the side of a light incident surface 310A.

The servo layer 318 includes a single layer of a metal film containing at least any of Ag, Al, Au, and Cu as a main component. Therefore, an auxiliary film is not provided.

The buffer layer 317 is provided between the servo layer 318 and the group of recording and reading layers 314 and is formed of a material obtained by kneading a dye or uniformly dissolving it in a light transmitting resin. Specifically, the buffer layer 317 employs a material having lower absorbance of a first wavelength (650 nm, here) of the tracking beam 170 and higher absorbance of a second wavelength (405 nm, here) of the recording and reading beam 270 and functions as a filter layer having wavelength dependence. Here, a material in which a general dye having a chromophore and an auxochrome which become yellow as azo, diazo, and azomethine is dispersed in or bonded to a transparent resin is used.

According to this optical recording medium 310, even if the recording and reading beam 170 applied to the group of recording and reading layers 314 leaks out to the servo layer 318 side, this leakage light is absorbed by the buffer layer 317 before it reaches the servo layer 318. Moreover, even if this leakage light is reflected by the servo layer 318, the reflected light is absorbed by the buffer layer 317 again.

Moreover, this optical recording medium 310 is set such that the reflectance when the recording and reading beam 170 is applied is smaller than the reflectance when the tracking beam 270 is applied to the servo layer 318. That is because the recording and reading beam 170 is absorbed by the buffer layer 317 before reaching the servo layer 318.

As a result, with this optical recording medium 310, the quality of both the reading signal and tracking signal can be improved. Moreover, with this optical recording medium 310, the buffer layer 317 is arranged on the side deeper than the group of recording and reading layers 314. As a result, external light such as ultraviolet rays causing the dye material bleached is absorbed by the group of recording and reading layers 314 on the front side and does not reach the buffer layer 317 easily. Therefore, long-term stability of the buffer layer 317 is ensured, and temporal deterioration of the optical recording medium 310 can be suppressed. Particularly if an organic dye is to be employed, an influence of the ultraviolet rays is large, and thus, the structure of this optical recording medium 310 is preferable.

Figure 12:
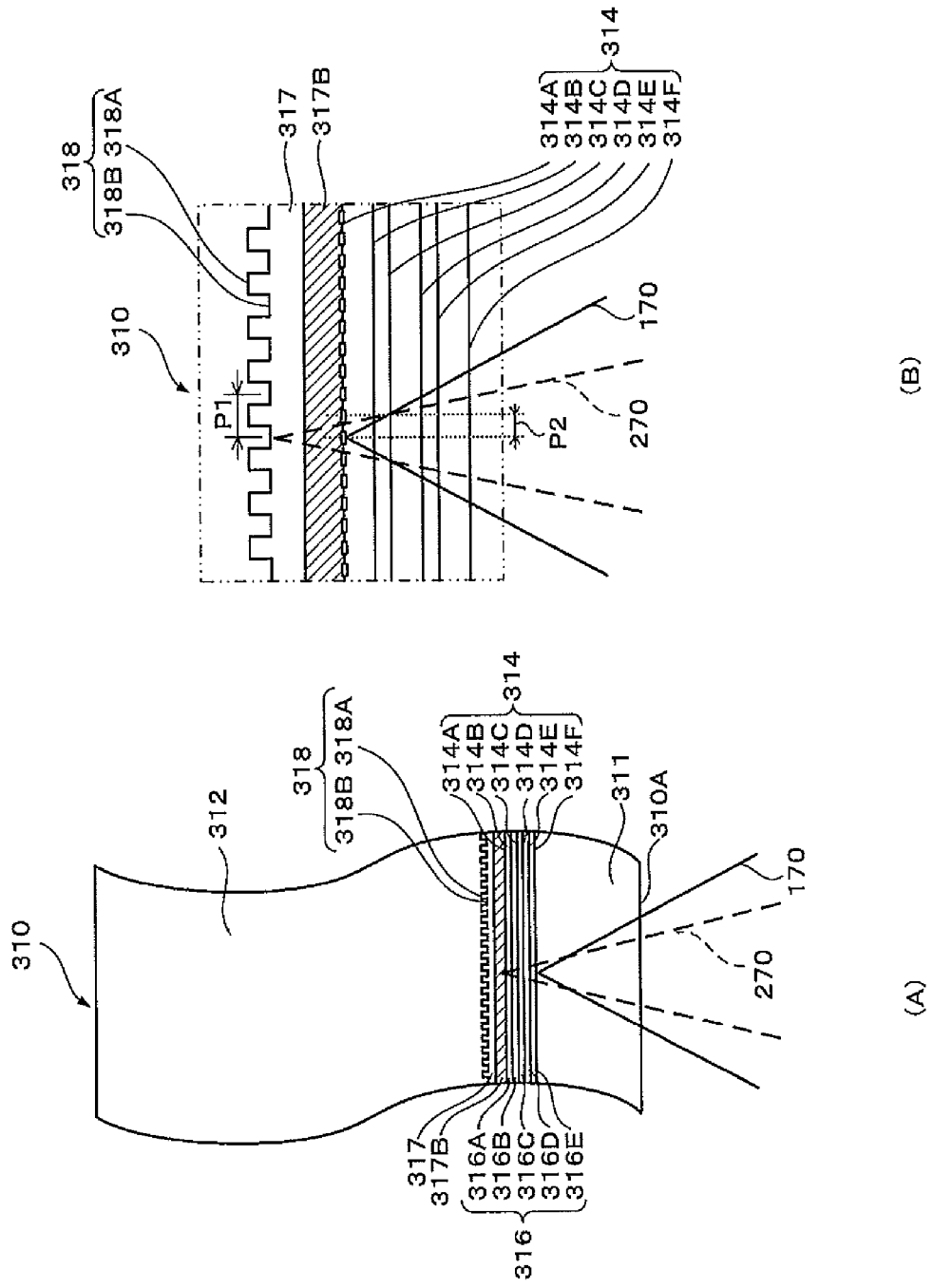
FIG. 12A is a sectional view illustrating another example of the multilayer structure of the optical recording medium according to the third embodiment.
FIG. 12B is an enlarged sectional view illustrating the recording and reading procedure with respect to the optical recording medium.

In this embodiment, the example in which the buffer layer 317 uses a material having such wavelength dependence that the absorptance or transmittance is different depending on the wavelength band is exemplified, but as illustrated in FIGS. 12(A) and 12(B), for example, a filter layer 317B may be arranged separately from the buffer layer 317, and the wavelength dependence may be added to the filter layer 317B by kneading a dye in a light transmitting resin of this filter layer 317B.

Figure 13:
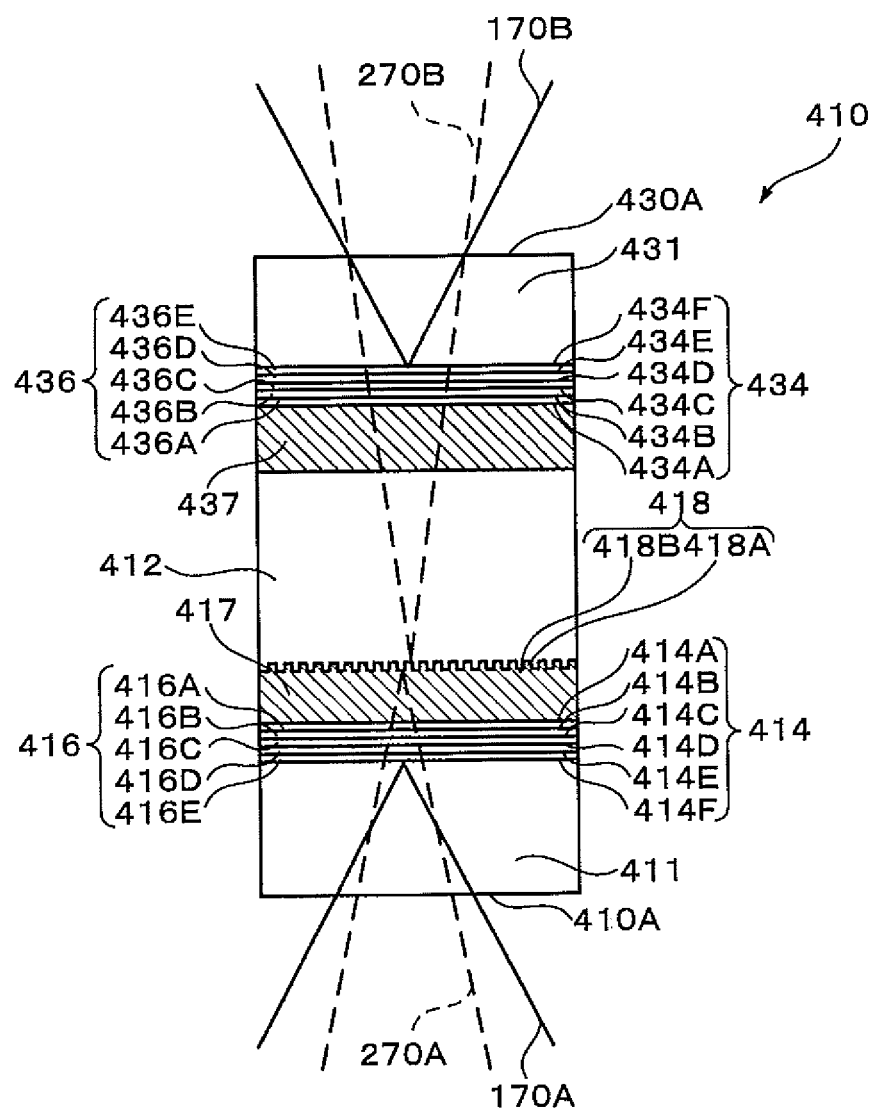
FIG. 13 is a sectional view illustrating a multilayer structure of an optical recording medium according to a fourth embodiment.

Next, an optical recording medium 410 according to a fourth embodiment will now be described with reference to FIG. 13. Concerning the optical recording medium 410, parts similar or identical to those of the optical recording medium 10 described in the second embodiment will be designated with reference numerals having the same last two digits in the following drawings and description, and thereby, a description of each member will be omitted and different respects will be mainly described.

The optical recording medium 410 includes, starting with a first surface 410A, a first cover layer 411, a first group of recording and reading layers 414 and first group of intermediate layers 416, a first buffer layer 417, a servo layer 418, a support substrate 412, a second buffer layer 437, a second group of recording and reading layers 434 and second group of intermediate layers 436, a second cover layer 431, and a second surface 430A in this order. That is, the optical recording medium 410 is different from the optical recording medium 10 of the first embodiment in that the optical recording medium 410 includes the second buffer layer 437, the second group of recording and reading layers 434 and second group of intermediate layers 436, and the second cover layer 431 also at the second surface 430A side with respect to the support substrate 412.

The support substrate 412 has a thickness set at 900 μm, and at the first surface 410A, lands 418A and grooves 418B are spirally formed from an area close to the center to an outer edge.

The servo layer 418 includes a single layer of metal film mainly composed of at least one of Ag, Al, Au, and Cu. Thus, the servo layer 418 does not include an auxiliary film. A pitch P1 between the lands 418A or between the grooves 418B of the servo layer 418 is set at around 0.64 μm. On the other hand, a track pitch P2 between recording marks is set at a half (½) of the pitch P1 between the lands 418A or between the grooves 418B. Specifically, the track pitch P2 between the recording marks is set at around 0.32 μm. As a result, the track pitch P2 between the recording marks is around 0.32 μm, which is compatible with a BD standard.

In the present embodiment, tracking is performed by using both the land 418A and the groove 418B. As a result, the track pitch P2 between the recording marks is around 0.32 μm, which is a half of the pitch P1 of the servo layer 418.

The first buffer layer 417 has a film thickness set at 30 to 40 μm and is composed of a material obtained by dispersing or combining dye into or with light transmitting resin through mixing or homogeneous dissolving. Specifically, for the first buffer layer 417, a material is adopted in which the absorbance of a first wavelength (here, 650 nm) to be a tracking beam is low and the absorbance of a second wavelength (here, 405 nm) to be a recording and reading beam is high. Herein, an adopted material is one obtained by dispersing or combining common dye having chromophores and auxochromes that give yellow such as azo, diazo, and azomethine, into or with transparent resin.

The first cover layer 411 is composed of optically transparent acrylic ultraviolet curable resin and has a film thickness set at 40 μm.

The second buffer layer 437 has a film thickness set at 20 to 40 μm and is composed of a material obtained by mixing or homogeneously dissolving dye into or with light transmitting resin. Specifically, for the second buffer layer 437, a material is adopted in which the absorbance of a first wavelength (here, 650 nm) to be a tracking beam is low and the absorbance of a second wavelength (here, 405 nm) to be a recording and reading beam is high. Herein, an adopted material is one obtained by dispersing or combining common dye having chromophores and auxochromes that give yellow such as azo, diazo, and azomethine, into or with transparent resin.

The second group of recording and reading layers 434 (L0 to L5 recording and reading layers 434A to 434F) and the second group of intermediate layers 436 stacked at the second surface 430A side of the second buffer layer 437 have substantially the same structure as those of the first group of recording and reading layers 414 and the second group of intermediate layers 416.

The second cover layer 431 is composed of optically transparent acrylic ultraviolet curable resin and has a film thickness set at 40 μm.

As a result of such structure, a boundary (the servo layer 418) between the support substrate 412 and the first buffer layer 417 in the optical recording medium 410 is located at a distance of about 150 μm from the first surface 410A. An L0 recording and reading layer 414A farthest from the first surface 410A in the first group of recording and reading layers 414 is located at a distance of 112 μm from the first surface 410A, an L1 recording and reading layer 414B is located at a distance of 96 μm from the first surface 410A, an L2 recording and reading layer 414C is located at a distance of 84 μm from the first surface 410A, an L3 recording and reading layer 414D is located at a distance of 68 μm from the first surface 410A, an L4 recording and reading layer 414E is located at a distance of 56 μm from the first surface 410A, and an L5 recording and reading layer 414F closest to the first surface 410A is located at a distance of 40 μm from the first surface 410A. Also, a total thickness of the first group of recording and reading layers 414 (a distance between the L0 recording and reading layer 414A to the L5 recording and reading layer 414F) is 72 μm.

Also, the L0 recording and reading layer 434A farthest from the second surface 430A in the second group of recording and reading layers 434 is located at a distance of 112 μm from the second surface 430A, the L1 recording and reading layer 434B is located at a distance of 96 μm from the second surface 430A, the L2 recording and reading layer 434C is located at a distance of 84 μm from the second surface 430A, the L3 recording and reading layer 434D is located at a distance of 68 nm from the second surface 430A, the L4 recording and reading layer 434E is located at a distance of 56 μm from the second surface 430A, and the L5 recording and reading layer 434F closest to the second surface 430A is located at a distance of 40 μm from the second surface 430A. Also, a total thickness of the second group of recording and reading layers 434 (a distance between the L0 recording and reading layer 434A to the L5 recording and reading layer 434F) is 72 μm.

The optical recording medium 410 is symmetrical in the thickness direction, except for the servo layer 418. As a result, because internal stress generated when the optical recording medium 410 is manufactured is symmetrical in the thickness direction, warpage and deformation can be reduced. In particular, even if a thickness of the support substrate 412 is reduced to 600 μm or less, e.g., 100 μm, amounts of warpage and deformation of the optical recording medium 410 can be lowered.

Figure 14:
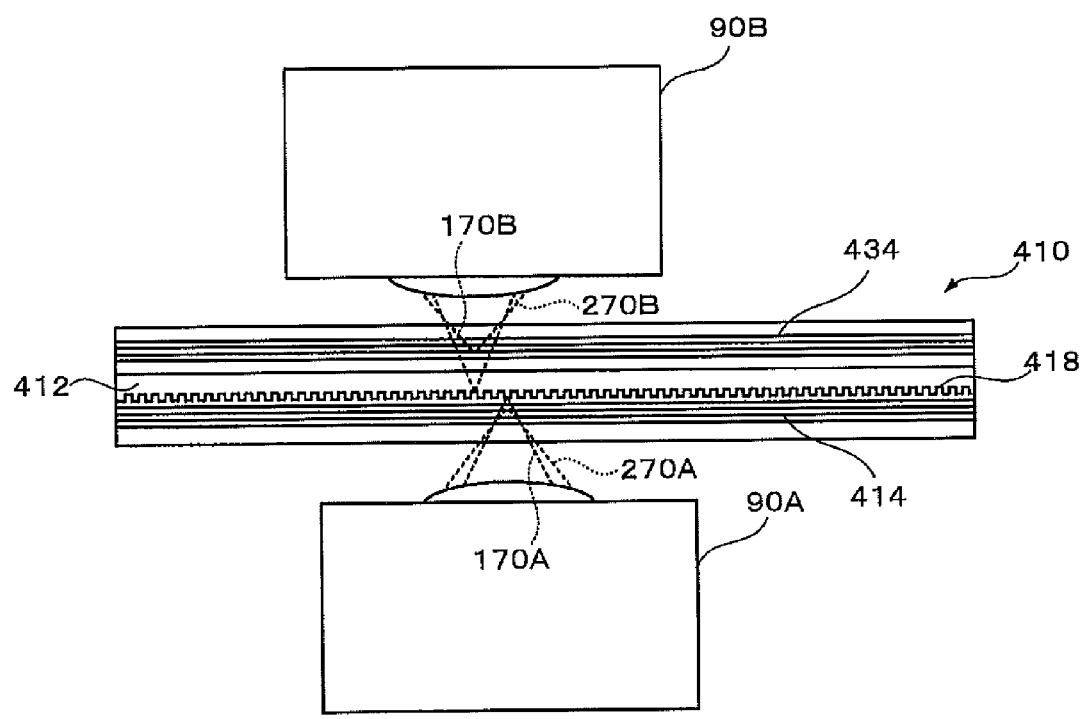
FIG. 14 is a diagram illustrating an overall configuration of an optical pickup that provides optical recording and reading according to the fourth embodiment.

FIG. 14 illustrates configurations of first and second optical pickups 90A and 90B used for the recording and reading of the optical recording medium 410 according to the fourth embodiment. The first optical pickup 90A applies a beam to the first surface 410A, which is one side of the optical recording medium 410. The second optical pickup 90B applies a beam to the second surface 430A, which is the other side of the optical recording medium 410. It should be noted that internal configurations of the first and second optical pickups 90A and 90B are substantially the same as that of the optical pickup 90 illustrated in the first embodiment, so that in the following drawings and description, A is added to each end of reference numerals at the side of the first optical pickup 90A, and B is added to each end of reference numerals at the side of the second optical pickup 90B. Thereby, an illustration and a description thereof will be omitted.

The first optical pickup 90A includes a recording and reading optical system 100A and a tracking optical system 200A. The recording and reading optical system 100A is an optical system that applies a recording and reading beam 170A to the first group of recording and reading layers 414 of the optical recording medium 410 to perform recording and reading. The tracking optical system 200A is an optical system that applies a tracking beam 270A to the servo layer 418 to perform tracking control when the recording and reading optical system 100A is used to record information on the first group of recording and reading layers 414.

The second optical pickup 90B includes a recording and reading optical system 100B and a tracking optical system 200B. The recording and reading optical system 100B is an optical system that applies a recording and reading beam 170B to the second group of recording and reading layers 434 of the optical recording medium 410 to perform recording and reading. The tracking optical system 200B is an optical system that applies a tracking beam 270B to the servo layer 418 to perform tracking control when the recording and reading optical system 100B is used to record information on the second group of recording and reading layers 434.

Next, a method for recording and reading information on the optical recording medium 410 will be described with reference to the first and second optical pickups 90A and 90B.

<Recording/Reading on a First Group of Recording and Reading Layers>

For example, if recording and reading of information is performed on the L0 recording and reading layer 414A of the first group of recording and reading layers 414, first, the tracking beam 270A in a red wavelength range from the first optical pickup 90A is applied to the servo layer 18 to perform tracking. Specifically, as illustrated in FIG. 13, a spot of the tracking beam 270A is applied to the groove 418B and the land 418A in the servo layer 418 to perform tracking. Simultaneously therewith, the recording and reading beam 170A in a blue wavelength range from the first optical pickup 90A is applied to the L0 recording and reading layer 414A, and thereby recording or reading is performed on the L0 recording and reading layer 414A.

At this time, even if the recording and reading beam 170A applied to the first group of recording and reading layers 414 leaks to the side of the servo layer 418, the beam is absorbed by the first buffer layer 417 before the leakage light reaches the servo layer 418. Also, even if the leakage light is reflected by the servo layer 418, the reflected light is absorbed by the first buffer layer 417 again. Also, the first buffer layer 417 actively transmits the tracking beam 270A in the red wavelength to increase an amount of light of tracking signals. As a result, stable tracking control is provided.

<Recording/Reading on a Second Group of Recording and Reading Layers>

If information is recorded on the L0 recording and reading layer 434A of the second group of recording and reading layers 434, first, the tracking beam 270B in the red wavelength range from the second optical pickup 90B is applied to the servo layer 418 through the support substrate 412 to perform tracking. Specifically, as illustrated in FIG. 13, a spot of the tracking beam 270B is applied to the land 18A and the groove 418B in the servo layer 418 to perform tracking. Simultaneously therewith, the recording and reading beam 170B in a blue wavelength range from the second optical pickup 90B is applied to the L0 recording and reading layer 434A, and thereby recording or reading is performed on the L0 recording and reading layer 434A.

At this time, even if the recording and reading beam 170B applied to the second group of recording and reading layers 434 leaks to the side of the servo layer 418, the beam is absorbed by the second buffer layer 437 before the leakage light reaches the servo layer 418. Also, even if the leakage light is reflected by the servo layer 418, the reflected light is absorbed by the second buffer layer 437 again. Also, the second buffer layer 437 actively transmits the tracking beam 270B in the red wavelength to increase an amount of light of tracking signals. As a result, stable tracking control is provided.

It should be noted that simultaneous recording or reading may also be performed on the first group of recording and reading layers 414 and the second group of recording and reading layers 434. This doubles a transfer rate of recording or reading.

As hereinbefore discussed, according to the optical recording medium 410 of the fourth embodiment, the servo layer 418 is formed on one surface of the support substrate 412, and the first group of recording and reading layers 414 and the second group of recording and reading layers 434 are disposed on both surfaces of the support substrate 412. As a result, because internal stress generated when the first and second groups of recording and reading layers 414 and 434 are formed is dispersed into both sides of the support substrate 412, warpage and deformation of the optical recording medium 410 can be prevented. Such dispersion of internal stress enables preventing warpage of the optical recording medium 410 even if a thickness of the support substrate 12 is set within the range of 10 to 1000 µm, and preferably, within the range of 10 to 600 µm.

At this time, an attempt to form concavo-convex patterns for tracking on both sides of the support substrate 412 complicates a process for manufacturing the support substrate 412, so that the accuracy of the support substrate 412 tends to be deteriorated. For this reason, in the present embodiment, the accuracy is improved by forming concavo-convex patterns for tracking on one surface of the support substrate 412 to simplify the manufacture of the support substrate 412. Also, because the servo layer 418 is shared by the first and second groups of recording and reading layers 414 and 434, which sandwich the servo layer 418, concavo-convex patterns for tracking are not needed to be formed on both the recording and reading layers of the first and second groups of recording and reading layers 414 and 434. As a result, the geometric accuracy of the optical recording medium 410 can be more improved. Since the first group of recording and reading layers 414 and the second group of recording and reading layers 434 are disposed at both sides of the support substrate 412, a recording capacity may also be increased.

Further, in the optical recording medium 410, the reflectance of the servo layer 418 to the tracking beams 270A and 270B in the red wavelength is set to be greater than that to the recording and reading beams 170A and 170B. In order to embody this, a material used for the first and second buffer layers 417 and 437 has a larger amount of absorbed light with the shortness of a beam wavelength. Then, even if the recording and reading beams 170A and 170B in the blue wavelength are incident on the side of the servo layer 18, the incident beams are absorbed by the first and second buffer layers 417 and 437, so that an amount of leakage light that reaches the servo layer 418 and an amount of reflected light from the servo layer 418 can be reduced. On the other hand, since the tracking beams 270A and 270B in the red wavelength can be actively transmitted through the first and second buffer layers 417 and 437, an amount of reflected light from the servo layer 418 can be increased. As a result, crosstalk between the recording and reading beams 170A, 170B and the tracking beams 270A, 270B is reduced, the quality of reading signals is improved, as well as stable tracking control is provided.

Also, as shown herein, lowered reflectance of the servo layer 418 to the recording and reading beams 170A and 170B results in possible reduced thicknesses of the first and second buffer layers 417 and 437. In the present embodiment, specifically, the thicknesses may be reduced to preferably 200 µm or less, desirably 100 µm or less, and more desirably 50 µm or less. If the thicknesses of the first and second buffer layers 417 and 437 may be reduced in this manner, a film thickness error occurring when the first and second buffer layers 417 and 437 are deposited may be small accordingly. Additionally, since the support substrate 412 may be thicker, warpage generated while the optical recording medium 410 is being manufactured can be more reduced.

Further, in the optical recording medium 410, thicknesses of the first buffer layer 417 and the second buffer layer 437 are set to be substantially the same. As a result, warpage in the support substrate 412 generated while the first and second buffer layers 417 and 437 are being formed can be prevented. That is, the support substrate 412 may be thinner or formed of a low-rigidity material, and the layer number of the first group of recording and reading layers 414 and the second group of recording and reading layers 434 may be larger accordingly.

Also, the first group of recording and reading layers 414 and the second group of recording and reading layers 434 of the optical recording medium 410 are stacked symmetrically with respect to the center of the support substrate 412 in the thickness direction. Therefore, internal stress generated in the first and second groups of recording and reading layers 414 and 434 is also symmetrical, so that warpage of the optical recording medium 410 can be prevented.

When the optical recording medium 410 of the fourth embodiment is manufactured, it is preferable to simultaneously form, at both sides, the first buffer layer 417 and the second buffer layer 437, the first group of recording and reading layers 414 and the second group of recording and reading layers 434, and the first group of intermediate layers 416 and the second group of intermediate layers 436. As a result, because internal stress generated at the time of ultraviolet curing acts evenly on both sides of the support substrate 412, warpage of the optical recording medium 410 can be more reduced.

In the fourth embodiment, the first and second buffer layers 417 and 437 have characteristics that light absorptivities are different between the red and blue wavelengths, resulting in different reflectances of the servo layer 418 between the tracking beam and the recording and reading beam, but the present invention is not limited thereto. For example, a reflecting film itself formed on the servo layer 418 may have wavelength dependence that reflectance is dependent on a wavelength. Also, in addition to the first and second buffer layers 417 and 437, a filter layer having wavelength dependence of optical transmittance and absorptance may be formed. Further, a substrate material may have wavelength dependence.

For the purpose of simply checking the characteristics of the optical recording medium 10 of the first embodiment, this optical recording medium was actually fabricated and evaluations were made using an optical disc industry-standard optical disc measuring device ETA-optic (made by Steag ETA-Optik GmbH in Germany) having functions of a commonly-used spectrometer. Specifically, measurements were made of the reflectance of the servo layer of this optical recording medium near a 405 nm wavelength of a recording and reading laser diode and near a 650 nm wavelength of a tracking laser diode. As a result, reflectance at a blue wavelength (405 nm) was 9% and reflectance at a red wavelength (650 nm) was 52%. Thus, it was confirmed that the reflectance of the servo layer was lower when light having the wavelength of a recording and reading beam was applied to the servo layer than when light having the wavelength of a tracking beam was applied to the servo layer.

In addition, a disc for calculation in which respective metal films and auxiliary films of the servo layer were not formed (transparent servo layer) was fabricated separately, and reflectance evaluations were made in the same way, in order to examine the reflectance of this servo layer in more detail. The reflectance characteristic of the servo layer's own can be analyzed by detecting a difference in reflectance between this disc for calculation and the abovementioned regular optical recording medium. Reflectance measurement using this disc for calculation showed that the reflectance was 14% for the blue wavelength (405 nm) and 32% for the red wavelength (650 nm). Yet additionally, calculation of an optical difference (this is not a simple subtraction but means an optical difference on the assumption of various conditions) between the regular optical recording medium and the disc for calculation showed that a reflectance component obtained from the servo layer itself was 1% or smaller for the blue wavelength and approximately 20% for the red wavelength. That is, it was confirmed that reflectance for the wavelength of the tracking beam was significantly lower than reflectance for the wavelength of the recording and reading beam with regard to reflection from the servo layer in an actual optical recording medium.

Figure 15:
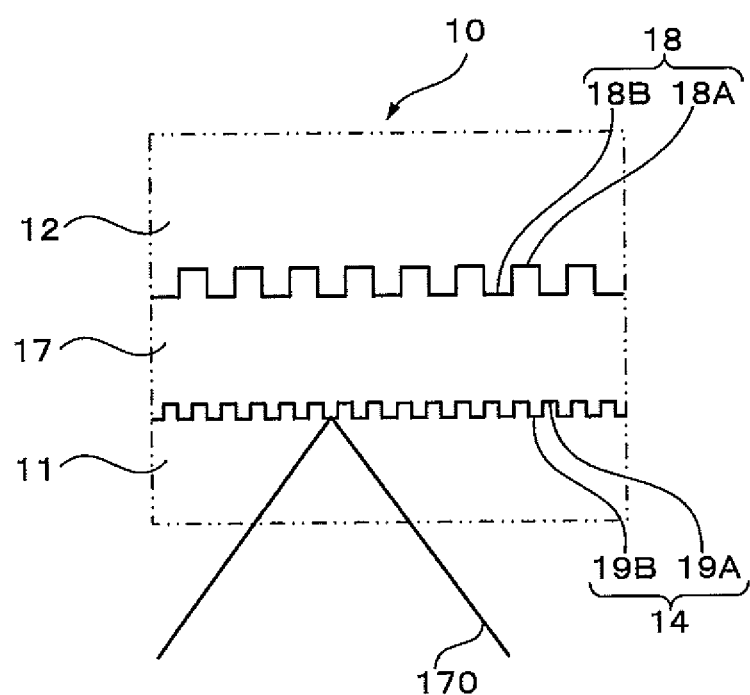
FIG. 15 is a sectional view illustrating a partially enlarged view of the multilayer structure of an optical recording medium according to a practical example.

Next, there were fabricated samples, as optical recording mediums according to Practical Examples 1 and 2, in which the group of recording and reading layers 14 of the optical recording medium 10 shown in the first embodiment was decreased in the number of layers to a single layer, in order to make further verifications under conditions close to actual signal processing characteristics. That is, these optical recording mediums 10 were configured to include a cover layer 11, a recording and reading layer 14, a buffer layer 17, a servo layer 18, and a support substrate 12, as illustrated in FIG. 15.

Note that a servo layer 18 of Practical Example 1 employed a 5-layer structural film in which an Ag reflecting film, a ZnS—SiO$_2$ auxiliary film, a Cu reflecting film, an Si reflecting film, and a ZnS—SiO$_2$ auxiliary film were stacked. The overall film thickness of the servo layer was set to 119 nm. Note that the total thickness of the Ag reflecting film and the Cu reflecting film, among the abovementioned films, was set to 91 nm. In addition, in Practical Example 1, the thickness of the buffer layer 17 was set to 30 μm. In Practical Example 2, the thickness of other auxiliary films was changed, while the total thickness of the Ag reflecting film and the Cu reflecting film of the servo layer 18 was also set to 91 nm In addition, the thickness of the buffer layer 17 was also changed to 40 μm.

In addition, there was fabricated a sample, as an optical recording medium according to Practical Example 3, in which the group of recording and reading layers 14 of the optical recording medium 310 shown in the second embodiment was decreased in the number of layers to a single layer. A servo layer 18 of this Practical Example 3 employed an 80 nm-thick single-layer Ag alloy metal film. For a buffer layer 17, there was used a material prepared by mixing a commonly-known dye having yellow chromophore and auxochrome, such as an azo skeleton, with the abovementioned transparent acrylic resin material. This material was adapted to be low in absorbance for the first wavelength (650 nm here) of the tracking beam 170, and high in absorbance for the second wavelength (405 nm here) of the recording and reading beam 270.

Note that in all of Practical Examples 1 to 3, the recording and reading layer 14 was formed using Bi—Ge—O as the material thereof. In addition, lands 19A and grooves 19B for signal quality evaluation were purposely formed on the recording and reading layer 14, in order to evaluate reading signals of the recording and reading layer 14. Accordingly, there was adopted a method of indirectly evaluating the quality of a reading signal by evaluating the quality of a tracking signal using these lands 19A and grooves 19B.

On the other hand, there were fabricated optical recording mediums, as those of Comparative Examples 1 to 3, in which a light absorption function was not added to the buffer layer 17, and a metallic single-layer film was employed for the servo layer 18. The servo layer 18 of Comparative Example 1 was formed of an 80 nm-thick Ag alloy metal film; the servo layer 18 of Comparative Example 2 was formed of a 20 nm-thick Ag alloy metal film; and the servo layer 18 of Comparative Example 3 was formed of 10 nm-thick Ag alloy metal film.

As a method of evaluating respective optical recording mediums, a recording and reading beam 170 having a blue wavelength was applied to the recording and reading layer 14, reflected light containing a tracking signal of lands 19A or grooves 19B was detected by an optical detector 132 as voltage variation, and a determination was made on whether or not tracking control was possible and on the amount of noise in the tracking signal. If the lands 19A or the grooves 19B can be tracked using the tracking signal contained in the reflected light of the recording and reading layer 14, the quality of the reading signal of the recording and reading layer 14 can be estimated to be satisfactory. Likewise, if the amount of noise contained in this tracking signal is small, the quality of the reading signal can also be estimated to be satisfactory. Note that part of the recording and reading beam 170 having a blue wavelength applied to the recording and reading layer 14 leaks out to the servo layer 18 side. If this leakage light strongly reflects on the servo layer 18, the amount of noise contained in the tracking signal increases.

For reference, the amount of reflected light when the recording and reading beam 170 was applied to the recording and reading layer 14 and the amount of reflected light when this recording and reading beam 170 was directly applied to the servo layer 18 were examined, and a ratio between the two amounts was evaluated. In addition, the recording and reading beam 170 having a blue wavelength (405 nm) and the tracking beam 270 having a red wavelength (650 nm) were applied to the servo layer 18 to examine the reflectance of each beam, and the reflectance was evaluated at three levels, i.e., "high," "medium," and "low." Note that an optical disc tester ODU 1000 which was an optical disc industry-standard tester made by Pulstec Industrial Co., Ltd. was used as evaluation equipment.

FIG. 15 shows the results of evaluations made as described above. In Practical Example 1, the amount of reflected light when the recording and reading beam 170 was applied to the servo layer 18 was 74.0 mV, and the amount of reflected light when the recording and reading beam 170 was applied to the recording and reading layer 14 was 84.5 mV. Thus, the ratio of the amount of reflected light of the servo layer 18 to the amount of reflected light of the recording and reading layer 14 was 0.9. In addition, tracking using this reflected light (tracking signal) was satisfactory, and the amount of noise contained in this tracking signal was small. Note that reflectance when the recording and reading beam 170 having a blue wavelength (405 nm) was applied to the servo layer 18 was low, and reflectance when the tracking beam 270 having a red wavelength (650 nm) was applied to the servo layer 18 was high.

In Practical Example 2, the amount of reflected light when the recording and reading beam 170 was applied to the servo layer 18 was 112.0 mV, and the amount of reflected light when the recording and reading beam 170 was applied to the recording and reading layer 14 was 160.0 mV. Thus, the ratio of the amount of reflected light of the servo layer 18 to the amount of reflected light of the recording and reading layer 14 was 0.7. In addition, tracking using this reflected light (tracking signal) was satisfactory, and the amount of noise contained in this tracking signal was extremely small. Note that reflectance when the recording and reading beam 170 having a blue wavelength (405 nm) was applied to the servo layer 18 was low, and reflectance when the tracking beam 270 having a red wavelength (650 nm) was applied to the servo layer 18 was high.

In Practical Example 3, the amount of reflected light when the recording and reading beam 170 was applied to the servo layer 18 was 740.0 mV, and the amount of reflected light when the recording and reading beam 170 was applied to the recording and reading layer 14 was 160.5 mV. Thus, the ratio of the amount of reflected light of the servo layer 18 to the amount of reflected light of the recording and reading layer 14 was 4.5. In addition, tracking using this reflected light (tracking signal) was satisfactory, and the amount of noise contained in this tracking signal was small. Note that reflectance when the recording and reading beam 170 having a blue wavelength (405 nm) was applied to the servo layer 18 was low, and reflectance when the tracking beam 270 having a red wavelength (650 nm) was applied to the servo layer 18 was high. From this Practical Example 3, it is understood that signal quality can be maintained satisfactorily if the ratio of the amount of reflected light of the servo layer 18 to the amount of reflected light of the recording and reading layer 14 is no higher than 5. In addition, from Practical Examples 1 and 2, it is understood that signal quality can be maintained extremely satisfactorily if this ratio is no higher than 1.

In Comparative Example 2, the amount of reflected light when the recording and reading beam 170 was applied to the servo layer 18 was 5000.0 mV, and the amount of reflected light when the recording and reading beam 170 was applied to the recording and reading layer 14 was 216.0 mV. Thus, the ratio of the amount of reflected light of the servo layer 18 to the amount of reflected light of the recording and reading layer 14 was 23.1. In addition, tracking using this reflected light (tracking signal) was poor, and the amount of noise contained in this tracking signal was extremely large. Note that reflectance when the recording and reading beam 170 having a blue wavelength (405 nm) was applied to the servo layer 18 was high, and reflectance when the tracking beam 270 having a red wavelength (650 nm) was applied to the servo layer 18 was also high.

In Comparative Example 2, the amount of reflected light when the recording and reading beam 170 was applied to the servo layer 18 was 1615.0 mV, and the amount of reflected light when the recording and reading beam 170 was applied to the recording and reading layer 14 was 216.0 mV. Thus, the ratio of the amount of reflected light of the servo layer 18 to the amount of reflected light of the recording and reading layer 14 was 19.7. In addition, tracking using this reflected light (tracking signal) was poor, and the amount of noise contained in this tracking signal was extremely large. Note that reflectance when the recording and reading beam 170 having a blue wavelength (405 nm) was applied to the servo layer 18 was medium, and reflectance when the tracking beam 270 having a red wavelength (650 nm) was applied to the servo layer 18 was also medium.

In Comparative Example 3, the amount of reflected light when the recording and reading beam 170 was applied to the servo layer 18 was 930.0 mV, and the amount of reflected light when the recording and reading beam 170 was applied to the recording and reading layer 14 was 174.5 mV. Thus, the ratio of the amount of reflected light of the servo layer 18 to the amount of reflected light of the recording and reading layer 14 was 5.3. In addition, tracking using this reflected light (tracking signal) was possible, but the amount of noise contained in this tracking signal was extremely large. Note that reflectance when the recording and reading beam 170 having a blue wavelength (405 nm) was applied to the servo layer 18 was extremely low, and reflectance when the tracking beam 270 having a red wavelength (650 nm) was applied to the servo layer 18 was also low. That is, from comparison between Practical Example 3 and Comparative Example 3, it is understood that signal quality degrades, as in Comparative Example 3, if the ratio of the amount of reflected light of the servo layer 18 to the amount of reflected light of the recording and reading layer 14 exceeds 5. It is also understood that signal quality is satisfactory, as in Practical Example 3, if the ratio is no higher than 5.

Figure 17:
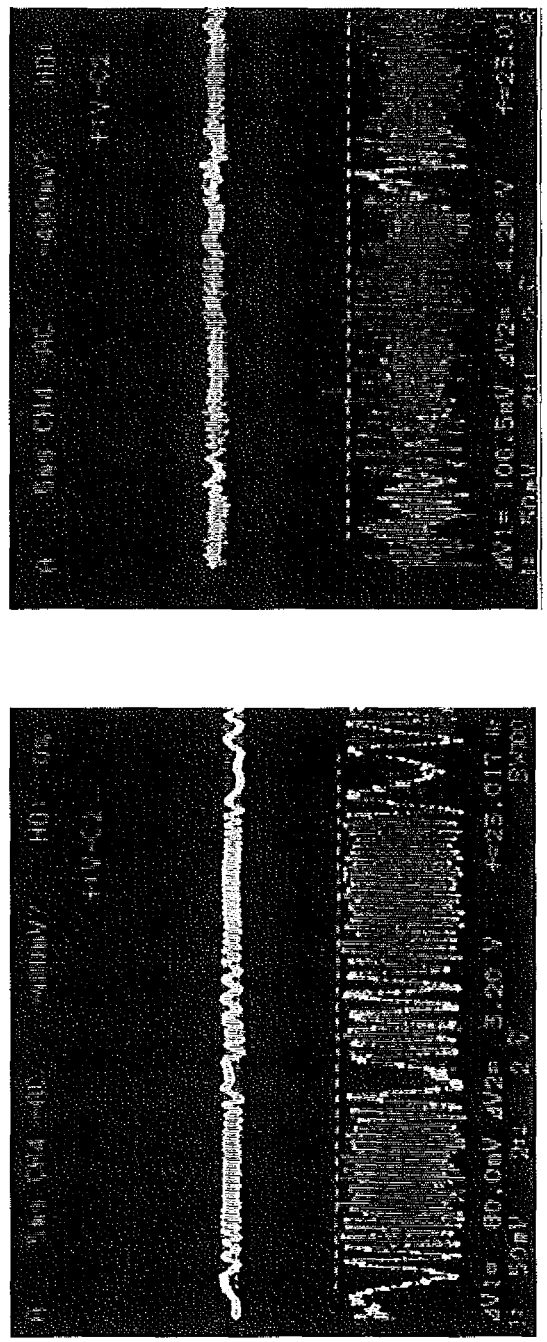
FIG. 17 is a photographic view showing output waveforms of reading signals in a practical example and a comparative example.
Figure 18:
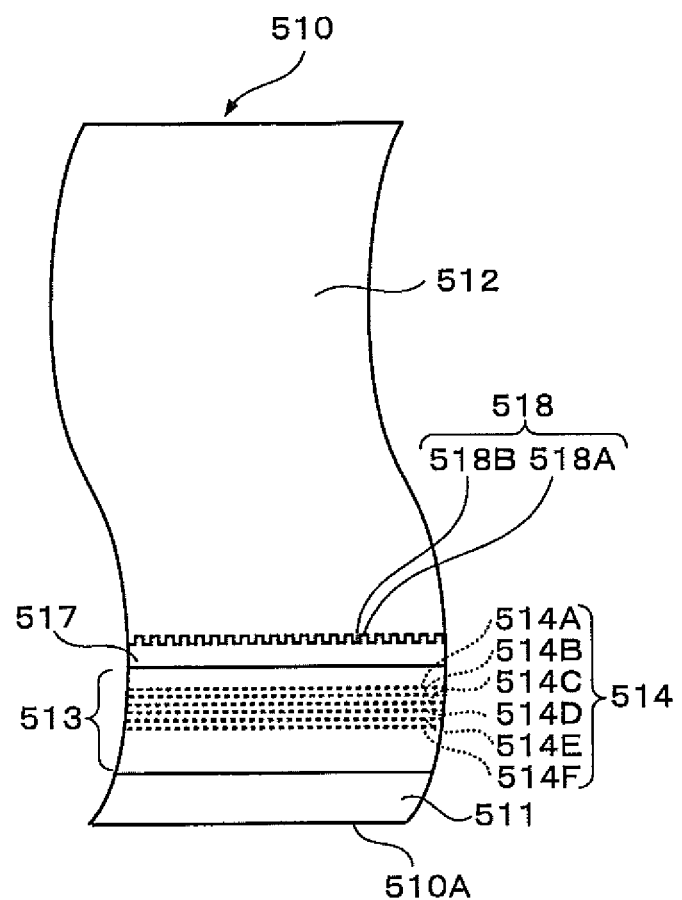
FIG. 18 is a sectional view illustrating another configuration example of the optical recording medium according to the second embodiment of the present invention.

Note that a signal waveform shown in the lower section of an on-screen output image in FIG. 17A is the tracking signal in Practical Example 1. It is understood from the image that the tracking signal contains only a small noise component and is extremely superior in signal quality. On the other hand, a signal waveform shown in the lower section of an on-screen output image in FIG. 17B is the tracking signal in Comparative Example 1. It is understood from the image that the tracking signal contains a large noise component and is inferior in signal quality.

In the present embodiment, cases have been shown in which the wavelength of a tracking beam is in a red band, and the wavelength of a recording and reading beam is in a blue band. The present invention is not limited to these beams, however, beams having other wavelength ranges may be adopted.

In the embodiments described heretofore, there have been shown only those cases in which recording films are formed previously as the respective recording and reading layers. The present invention is not limited to these cases, however. For example, like the optical recording medium 510 illustrated in FIG. 11, the entire area of a location which can be a future group of recording and reading layers may be formed into the bulk layer 513 having a predetermined thickness. Applying a recording beam 170 to this bulk layer 513 causes only the focused part of a beam spot to undergo a state change, thus forming recording marks. That is, the optical recording medium in the present invention is not limited to one in which recording and reading layers to be irradiated with a beam are previously formed.

The present invention also includes a case in which recording marks are formed in a planar area as necessary, and the group of recording and reading layers 514 is multilayer-structured, in an ex-post manner, as a set of these recording marks. By adopting the structure of the bulk layer 513 in the optical recording medium 510, it is possible to freely set the position of the recording and reading layers, as long as the position falls within the range of the bulk layer 513. The same bulk structure can also be adopted in the optical recording medium 410 shown in the third embodiment.

Next, a fifth embodiment of the present invention will be described with reference to the accompanying drawings.

Figure 19:
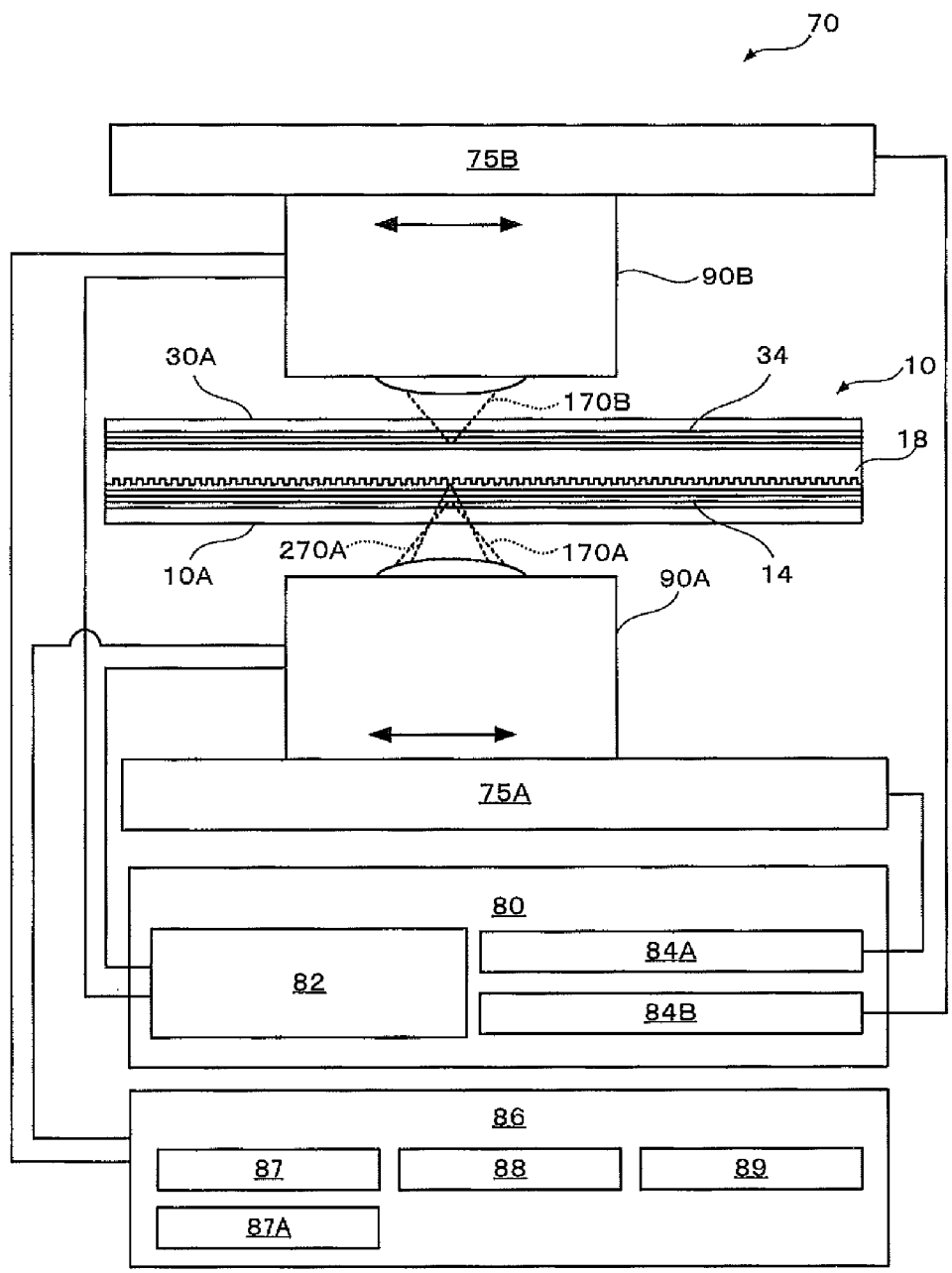
FIG. 19 is a block diagram illustrating an overall configuration of an optical recording and reading apparatus and an optical recording medium for realizing an optical recording and reading method according to a fifth embodiment of the present invention.

FIG. 19 illustrates an optical recording medium 10 to which an optical recording and reading method according to the fifth embodiment of the present invention is applied, and the internal configuration of an optical recording and reading apparatus 70 for realizing this optical recording and reading method. This optical recording and reading apparatus 70 is provided with first and second optical pickups 90A and 90B; first and second linear motion mechanisms 75A and 75B for moving these first and second optical pickups 90A and 90B in a tracking direction; a tracking control device 80 for controlling these first and second linear motion mechanisms 75A and 75B; and an output control device 86 for controlling the output power of respective beams of these first and second optical pickups 90A and 90B.

The first and second linear motion mechanisms 75A and 75B are so-called liner motors, on which the first and second optical pickups 90A and 90B are mounted. As a result, the first optical pickup 90A is moved in a radial direction of the optical recording medium 10 by the first linear motion mechanism 75A. Likewise, the second optical pickup 90B is moved in a radial direction of the optical recording medium 10 by the second linear motion mechanism 75B.

The first optical pickup 90A emits a beam from the first surface 10A side of the optical recording medium 10. The second optical pickup 90B emits a beam from the second surface 30A side of the optical recording medium 10. Note that the first optical pickup 90A and the second optical pickup 90B are disposed in a state of being displaced from each other by a predetermined angular difference in the circumferential direction of the optical recording medium 10, though this is not illustrated in particular. Such a way of disposal makes it possible to prevent beams of the respective pickups from interfering with each other. This angular difference is preferably adjusted to, for example, no larger than 20 degrees.

The internal configurations of the first and second optical pickups 90A and 90B are substantially the same in some parts but different in other parts. Accordingly, for components and members common to the respective pickups, each reference numeral in figures or text is suffixed with A in the case of the first optical pickup 90A and is suffixed with B in the case of the second optical pickup 90B. Thus, the components and materials are the same in reference number except the suffixes. Here, the internal configuration of the first optical pickup 90A will be described in detail, whereas the second optical pickup 90B will be described with a focus on differences thereof from the first optical pickup 90A.

Figure 20:
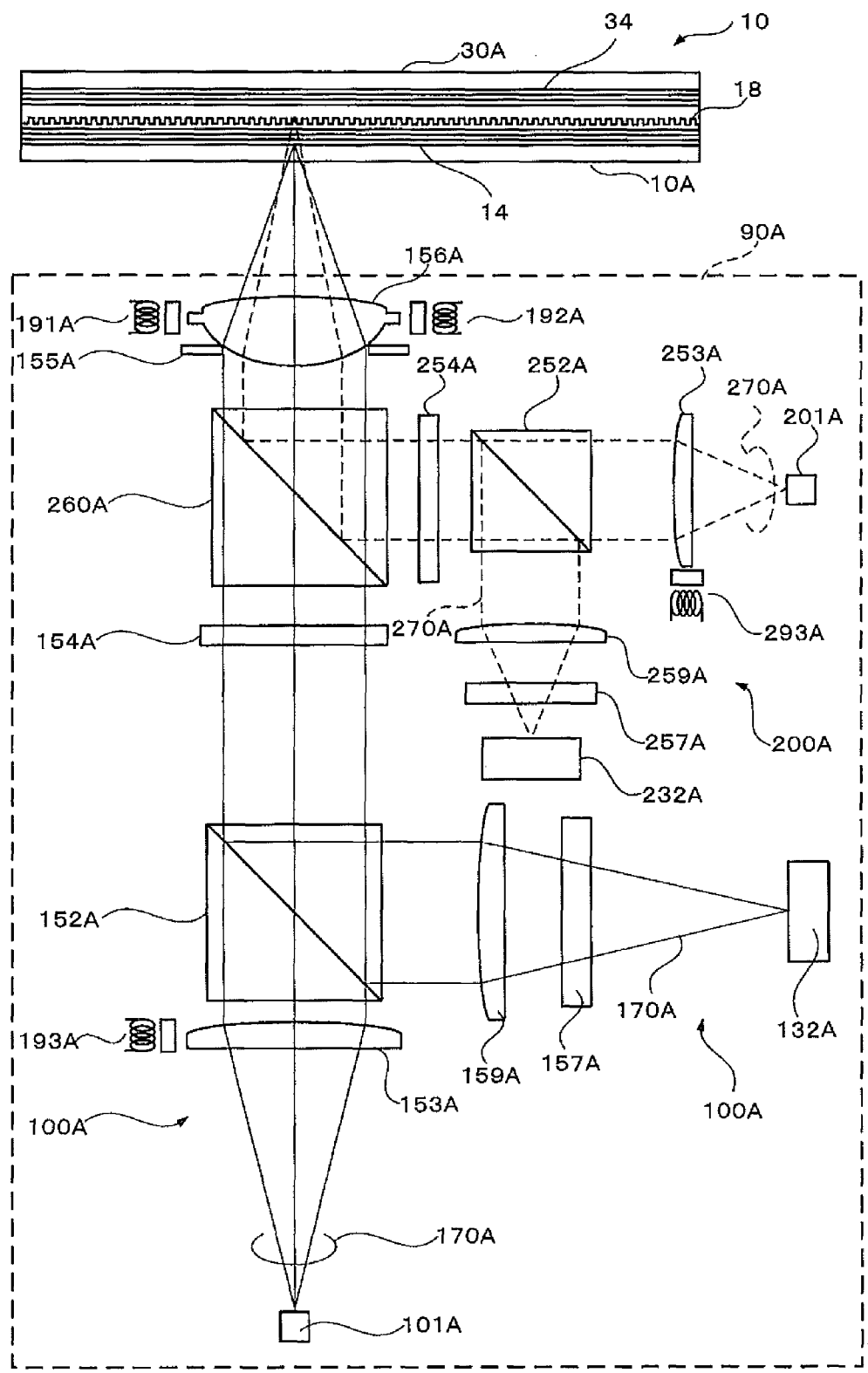
FIG. 20 is a block diagram illustrating an internal configuration example of a first optical pickup of the optical recording and reading apparatus.

As illustrated in FIG. 20, the first optical pickup 90A is provided with a recording and reading optical system 100A and a tracking optical system 200A. The recording and reading optical system 100A serves as an optical system for performing recording and reading on a first group of recording and reading layers 14 of the optical recording medium 10. The tracking optical system 200A serves as an optical system for performing tracking control using a servo layer 18 when information is recorded on the first group of recording and reading layers 14 by using the recording and reading optical system 100A.

A divergent recording and reading beam 170A emitted from a light source 101A of the recording and reading optical system 100A transmits through a collimating lens 153A provided with spherical aberration correcting means 193A, and enters a polarizing beam splitter 152A. Note that the beam 170A has a blue wavelength of 380 to 450 nm (405 nm here). The beam 170A having entered the polarizing beam splitter 152A transmits through this polarizing beam splitter 152A, and is converted to circularly polarized light as the result of further transmitting through a quarter-wave plate 154A. Thereafter, the beam 170A enters a beam splitter 260A of the tracking optical system 200A. This beam splitter 260A is set so as to be large in transmittance and small in reflectance. Specifically, the beam splitter 260A is set so that a ratio of transmittance to reflectance is 10 or higher. Accordingly, the beam 170A transmits through the beam splitter 260A and is converted to a convergent beam by an objective lens 156A. This beam 170A is condensed onto either the first group of recording and reading layers 14 or the servo layer 18 formed within the optical recording medium 10 serving as an object of recording and reading.

The opening of the objective lens 156A is restricted by an aperture 155A, so that a numerical aperture NA is 0.70 to 0.90 (0.85 here). For example, the beam 170A reflected on the first group of recording and reading layers 14 transmits through the objective lens 156A, the beam splitter 260A and the quarter-wave plate 154A, and is converted to linearly polarized light different by 90 degrees in phase from the beam 170A on an outward path. Thereafter, the beam 170A is reflected by the polarizing beam splitter 152A.

The beam 170A reflected by the polarizing beam splitter 152A transmits through a condenser lens 159A, and is converted to converging light. Then, the beam 170A goes through a cylindrical lens 157A and enters an optical detector 132A. Astigmatism is imparted to the beam 170A when the beam transmits through the cylindrical lens 157A.

The optical detector 132A includes unillustrated four light-receiving units, each of which outputs a current signal corresponding to the amount of light received. From these current signals, there are generated a focus error (hereinafter abbreviated as FE) signal based on an astigmatic method, a tracking error (hereinafter referred to as TE) signal based on a push-pull method arising only at the time of reproduction (a TE signal based on a DPD (differential phase detection) method in some cases), a reading signal of information recorded on the optical recording medium 10, and the like. The FE signal and the TE signal are amplified to desired levels and phase-compensated, and then fed back to actuators 191A and 192A. These actuators 191A and 192A perform tilt control, tracking control, focus control, and the like on the objective lens 156A. Note that the tracking error signal generated by the recording and reading optical system 100A is used only at the time of reproduction.

A divergent tracking control beam 270A emitted from a light source 201A of the tracking optical system 200A and having a red wavelength of 630 to 680 nm (650 nm here) transmits through a collimating lens 253A provided with spherical aberration correcting means 293A, and enters a polarizing beam splitter 252A. The beam 270A having entered the polarizing beam splitter 252A transmits through the polarizing beam splitter 252A, and is converted to circularly polarized light as the result of further transmitting through the quarter-wave plate 254A. Thereafter, the beam 270A is reflected by a beam splitter 260A. This beam 270A is further converted to a converging beam by the objective lens 156A, and condensed onto the servo layer 18 formed within the optical recording medium 10. The beam 270A reflected by the servo layer 18 transmits through the objective lens 156A, and is reflected by the beam splitter 260A. The beam 270A is then converted at the quarter-wave plate 254A to linearly polarized light different by 90 degrees in phase from the beam 270A on an outward path. Thereafter, the beam 270A is further reflected by the polarizing beam splitter 252A. The beam 270A reflected by the polarizing beam splitter 252A transmits through the condenser lens 259A, and is converted to converging light. Then, the beam 270A goes through the cylindrical lens 257A and enters the optical detector 232A. Astigmatism is imparted to the beam 270A when the beam transmits through the cylindrical lens 257A.

The optical detector 232A includes unillustrated four light-receiving units, each of which outputs a current signal corresponding to the amount of light received. From these current signals, there is generated a tracking error (TE) signal based on a push-pull method (a tracking error (TE) signal based on a DPD (differential phase detection) method in some cases). Note that if information is also recorded on the servo layer 18, a reading signal may be generated from this current signal. A focus error (FE) signal need not be generated on this optical detector 232A side, but may be generated as a matter of course.

Note that as described already, the beam splitter 260A is set so as to be large in transmittance and small in reflectance. Accordingly, part of return light emitted from the light source 101A of the recording and reading optical system 100A and reflected on one of the first group of recording and reading layers 14 reflects on the beam splitter 260A, and advances to the tracking optical system 200A side. Conversely, most part of return light emitted from the light source 201A of the tracking optical system 200A and reflected on the servo layer 18 may transmit through the beam splitter 260A, and advance to the recording and reading optical system 100A side. The recording and reading optical system 100A and the tracking optical system 200A have focal positions different from each other within the optical recording medium 10 even in a case where return light of the recording and reading optical system 100A and return light of the tracking optical system 200A mix with each other. Consequently, the beam 170A and the beam 270A differ in spread angle. For this reason, effects due to mixing are eliminated by extracting only one of the beams 170A and 270A by using a slit or an aperture having a given shape not illustrated in particular, and then inputting the beam to the respective optical detectors 132A and 232A. As a matter of course, the beams 170A and 270A may be separated from each other by using a filter having wavelength selectivity.

If among other things, a difference between the focal position of the beam 170A within the optical recording medium 10 in the recording and reading optical system 100A and the focal position of the beam 270A within the optical recording medium 10 in the tracking optical system 200A is allowed to always fall within a given range, the abovementioned slit or aperture can be shaped into a simple structure. Consequently, beams can be separated from each other more simply and conveniently. It can be said that in order to stabilize a difference between focal lengths, the focal position of the recording and reading beam 170A and the focal position of the beam 270A for servo are preferably closer to each other. This is because errors become smaller.

Figure 21:
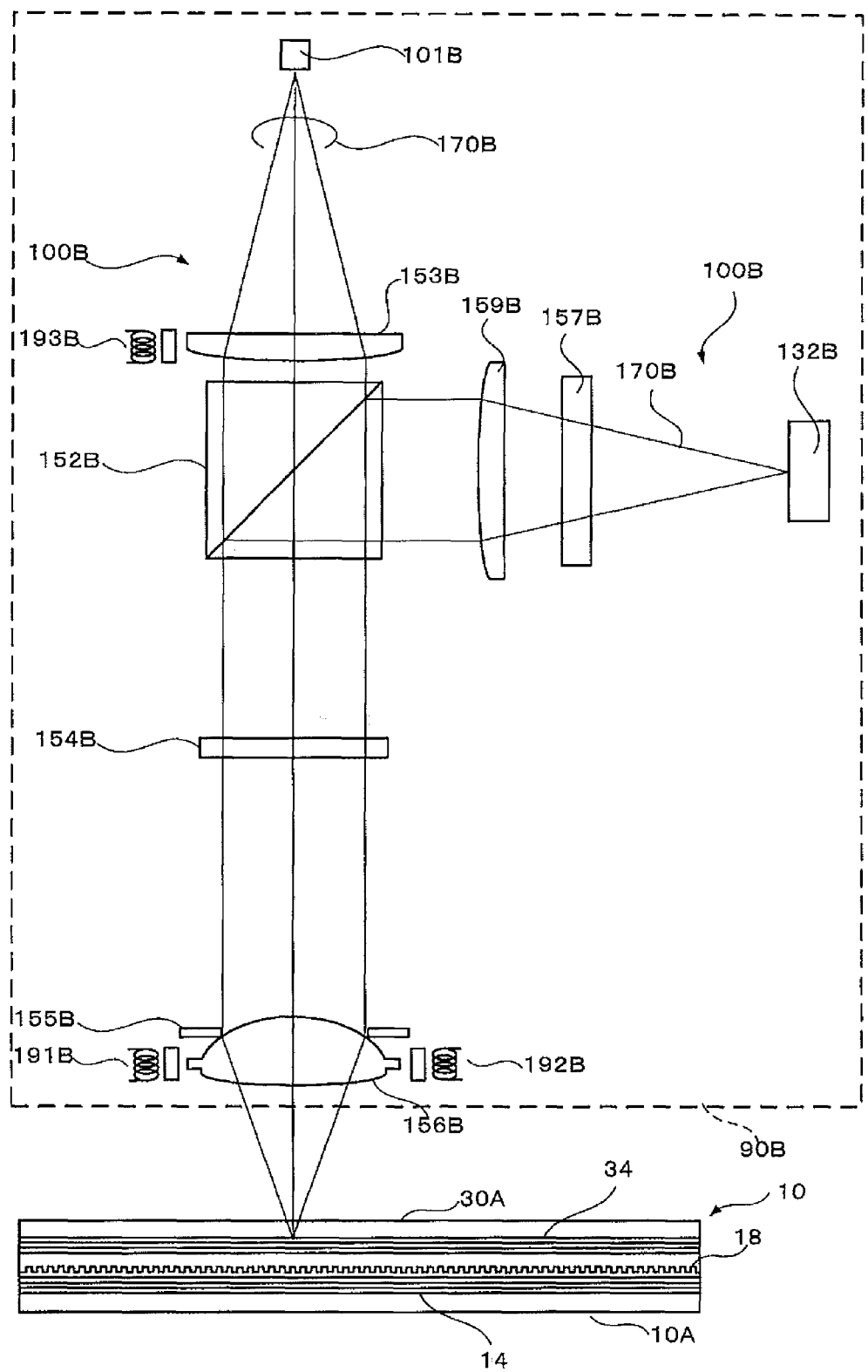
FIG. 21 is a block diagram illustrating an internal configuration example of a second optical pickup of the optical recording and reading apparatus.

As illustrated in FIG. 21, the second optical pickup 90B is provided with a recording and reading optical system 100B, but is not provided with a tracking optical system. The recording and reading optical system 100B serves as an optical system for performing recording/reading on a second group of recording and reading layers 34 of the optical recording medium 10. Note that this recording and reading optical system 100B is substantially the same in configuration as the recording and reading optical system 100A of the first optical pickup 90A.

A tracking error (TE) signal obtained by irradiating the servo layer 18 with light from the tracking optical system 200A of the first optical pickup 90A is used when information is recorded on the second group of recording and reading layers 34 by the recording and reading optical system 100B of the second optical pickup 90B. Specifically, the actuators 191B and 192B perform tilt control, tracking control, focus control, and the like on the objective lens 156B by using this tracking error signal.

Referring back to FIG. 19, the tracking control device 80 is provided with an access controller 82, a first driver 84A, and a second driver 84B. The access controller 82 controls the actuators 191A, 191B, 192A and 192B of the first and second optical pickups 90A and 90B. In addition, the access controller 82 controls the first linear motion mechanism 75A and the second linear motion mechanism 75B by using the first driver 84A and the second driver 84B, so as to move the mechanisms to a targeted tracking position.

Specifically, the access controller 82 controls the first and second optical pickups 90A and 90B in the following manner.

(1) Control at the Time of Recording

The access controller 82 receives a tracking number representing a recording target from a recording and reading control device not illustrated in particular. Then, the access controller 82 applies a tracking beam 270A of the first optical pickup 90A to lands/grooves of the servo layer 18 corresponding to this tracking number. This is realized as the result that the access controller 82 feedback-controls the actuators 191A and 192A and the first linear motion mechanism 75A upon receipt of the tracking error (TE) signal provided by the beam 270A of the tracking optical system 200A. Under this condition, the first optical pickup 90A applies the recording and reading beam 170A to the first group of recording and reading layers 14 to record information.

At the same time, the access controller 82 controls the actuators 191A and 192A and the second linear motion mechanism 75B by using the abovementioned tracking error (TE) signal of the first optical pickup 90A. That is, the actuators 191A, 191B, 192A and 192B, the first linear motion mechanism 75A and the second linear motion mechanism 75B take completely the same action in a tracking direction. Under this condition, the second optical pickup 90B applies the recording and reading beam 170B to the second group of recording and reading layers 34 to record information. As a result, in the present embodiment, the first and second optical pickups 90A and 90B are simultaneously tracking-controlled, while using the common servo layer 18, to simultaneously record information on the first and second groups of recording and reading layers 14 and 34.

(2) Control at the Time of Reproduction

Reproduction of the first group of recording and reading layers 14 is performed by applying the beam 170A of the recording and reading optical system 100A of the first optical pickup 90A to the first group of recording and reading layers 14. Tracking control at this time is realized as the result that the access controller 82 feedback-controls the actuators 191A and 192A and the first linear motion mechanism 75A by directly using the tracking error (TE) signal of the recording and reading beam 170A, rather than using the tracking beam 270A.

Reproduction of the second group of recording and reading layers 34 is performed by applying the beam 170B of the recording and reading optical system 100B of the second optical pickup 90B to the second group of recording and reading layers 34. Tracking control at this time is realized as the result that the access controller 82 feedback-controls the actuators 191B and 192B and the second linear motion mechanism 75B by directly using the tracking error (TE) signal of the recording and reading beam 170B of the second optical pickup 90B. That is, in the present embodiment, the first and second optical pickups 90A and 90B are tracking-controlled separately from each other to simultaneously reproduce information recorded on the first and second groups of recording and reading layers 14 and 34.

The output control device 86 is provided with trial writing means 87, quality evaluating means 88, and recording power adjusting means 89.

The trial writing means 87 performs trial writing of test data on a trial writing area of each recording and reading layer of the optical recording medium 10 before writing actual information in a user data area. Specifically, first, a power setting pattern composed of simple data which are repetitions of random data or specific data is used to write this power setting pattern, while varying laser power stepwise. Thereafter, this power setting pattern is reproduced to select the optimum recording power by utilizing the result of determination on signal quality by the quality evaluating means 88. The selected recording power is transferred to the recording power adjusting means 89 to reflect in actual output. In addition, this trial writing means 87 is provided with memory means 87A, so as to store data on the selected optimum recording power in the memory means 87A.

The quality evaluating means 88 receives reproduced data on recording marks written on trial in the trial writing area (OPC area) of the first or second group of recording and reading layers 14 or 34. Using this data, the quality evaluating means 88 detects an error rate and a SAM (Sequenced Amplitude Margin) value, and transfers the error rate and the SAM value to the trial writing means 87. Accordingly, the trial writing means 87 determines the quality of the reproduced data, based on whether or not these data items satisfy given criteria, whether or not any uncorrectable errors are present, or the like, by using the error rate and the SAM value obtained from the quality evaluating means 88. Thus, the trial writing means 87 selects recording power at which the quality is optimum. For example, the trial writing means 87 selects the optimum recording power at which the error rate or the SAM value is minimum. Note that the error rate and the SAM value are cited here, by way of example, as reference values. The present invention is not limited to this method, but other methods may be used to determine signal quality.

In response to an instruction from the trial writing means 87, the recording power adjusting means 89 controls the recording power of the light source 101A of the first optical pickup 90A, and the recording power of the light source 101B of the second optical pickup 90B. Specifically, the recording power adjusting means 89 sets recording power Pw, erasing power Pe, and bias power Pb in the respective light sources 101A and 101B.

Figure 22:
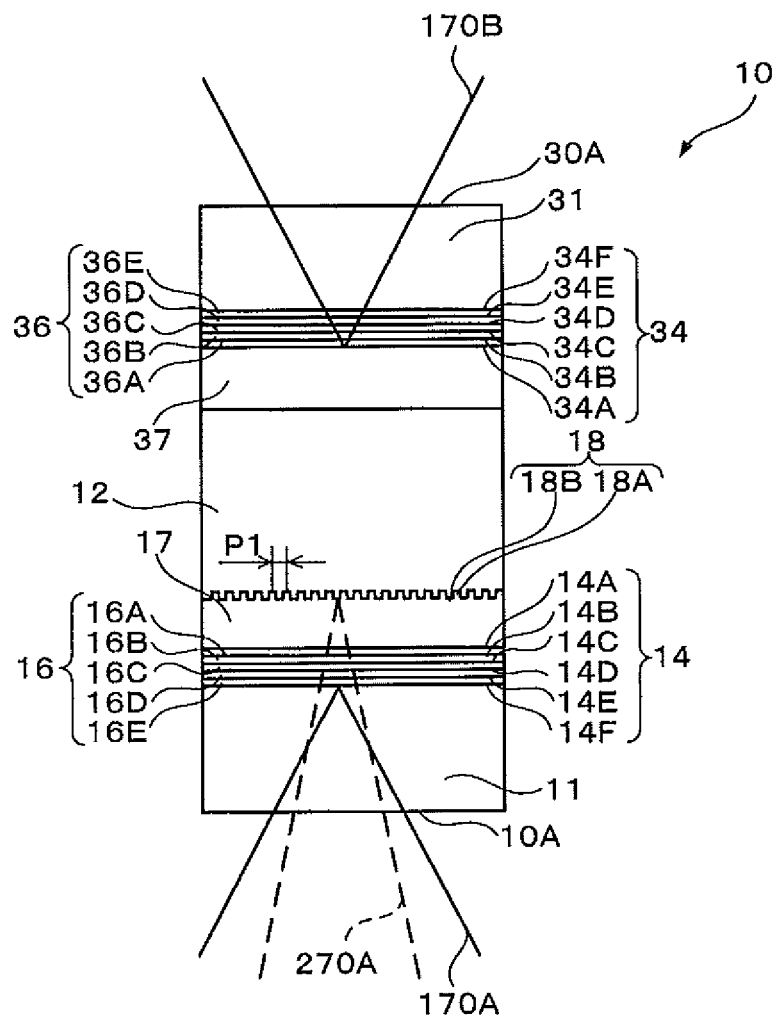
FIG. 22 is a sectional view illustrating a multilayer structure of the optical recording medium.

FIG. 22 illustrates an enlarged view of a cross-sectional structure of the optical recording medium 10 according to the present embodiment.

The optical recording medium 10 has a discoid shape, approximately 120 mm in outer diameter and approximately 1.2 mm in thickness. This optical recording medium 10 is provided with, in order from the first surface 10A side, a first cover layer 11, a first group of recording and reading layers 14, a first group of intermediate layers 16, a first buffer layer 17, a servo layer 18, a support substrate 12, a second buffer layer 37, a second group of recording and reading layers 34, a second group of intermediate layers 36, a second cover layer 31, and a second surface 30A.

The first group of recording and reading layers 14 is composed of L0 to L5 recording and reading layers 14A to 14F here, each of which has an information-recordable structure. These L0 to L5 recording and reading layers 14A to 14F have a planar structure having no concavo-convex pattern and grooves for tracking control. When a high-energy beam 170 is applied from the recording and reading optical system 100 to the L0 to L5 recording and reading layers 14A to 14F, recording marks are formed on these layers. Note that types of this first group of recording and reading layers 14 include write-once recording and reading layers on which information is recordable but not rewritable, and rewritable recording and reading layers on which information is rewritable.

The support substrate 12 is a discoid-shaped substrate having a thickness of 10 μm to 1200 μm, preferably within the range of 10 μm to 700 μm, and more preferably within the range of 10 μm to 600 μm, or within the range of 100 μm to 700 μm, in order to ensure a thickness (approximately 1.2 mm) required of optical recording mediums. Specifically, in the present embodiment, the thickness of the support substrate 12 is set to 500 μm and the diameter thereof is set to 120 mm. On the first surface 10A side of the support substrate 12, lands 18A and grooves 18B are spirally formed from the vicinity of the central part of the support substrate 12 toward the outer edge thereof. These lands 18A and grooves 18B serve as a concavo-convex pattern (grooves) for tracking control. The concavo-convex pattern of this support substrate 12 will serve as a future servo layer 18.

The servo layer 18 formed on the support substrate 12 is composed of the concavo-convex pattern (grooves and lands) for tracking control formed on a surface of the support substrate 12, and a reflective layer film-formed on the concavo-convex pattern. In the present embodiment in particular, a metal film of Al, Ag or the like is formed as the reflective layer, so as to function as a simple light-reflecting film. This servo layer 18 is designed so as to have a transmittance of 10% or lower when a tracking beam 270A of the first optical pickup 90A is applied to the servo layer 18. As a result, the beam 270A is prevented from leaking to the opposite side and turning into a noise component on the second optical pickup 90B side. Note that in a case where a recording film which is information-recordable in addition to being reflective is provided, the recording film may have a film configuration substantially the same as that of later-described recording and reading layers 14A to 14F.

A pitch P1 between lands 18A or grooves 18B adjacent to each in the servo layer 18 is set to smaller than 0.74 μm here. Specifically, the pitch P1 is preferably set to within the range of 0.6 μm to 0.7 μm, and is more preferably set to around 0.64 μm. On the other hand, a track pitch P2 of recording marks is set to a half (½) of the pitch P1 between the lands 18A or between the grooves 18B. That is, the track pitch P2 between recording marks is set to smaller than 0.37 μm, preferably within the range of 0.26 μm to 0.35 μm, and more preferably near 0.32 μm. As a result, the track pitch P2 between recording marks is around 0.32 μm compatible with the BD standard.

The pitch P1 (around 0.64 μm) between lands 18A/grooves 18B of the servo layer 18 is sized so as to enable sufficient tracking with a beam 270A in a domain of comparatively long red wavelengths. In the present embodiment, tracking is performed using both lands 18A and grooves 18B. As a result, the track pitch P2 of recording marks is around 0.32 μm, half the pitch P1 of the servo layer 18. As described above, tracking control using both lands 18A and grooves 18B allows the track pitch P2 of recording marks in the group of recording and reading layers 14 to be reduced without having to reduce the pitch P2 of the servo layer 18.

The first buffer layer 17 is formed of optically-transparent acrylic ultraviolet curable resin, and is set to a film thickness of 238 μm. For this first buffer layer 17, there is selected a material whose amount of absorbed light becomes larger with a decrease in beam wavelength. This way of layer formation increases the amount of absorbed light of the beam 170A having a blue wavelength and decreases the amount of absorbed light of the beam 270A having a red wavelength. As a result, the first buffer layer 17 can suppress the amount of light produced when the beam 170A having a blue wavelength reaches the servo layer 18 and reflects on it. Thus, signal noise at the time of reproduction can be reduced. On the other hand, the first buffer layer 17 allows the beam 270A having a red wavelength to actively transmit therethrough, thereby increasing the amount of light of a tracking signal.

Each layer of the first group of recording and reading layers 14 (L0 to L5 recording and reading layers 14A to 14F) stacked on the first surface 10A side of the first buffer layer 17 has a three-layer structure in which dielectric films are stacked on both outer sides of a write-once recording film (not illustrated). Note that the optical reflectance, absorptance, transmittance, and the like of these L0 to L5 recording and reading layers 14A to 14F are optimized with respect to the beam 170A in a blue wavelength range (short wavelengths) of the first optical pickup 90A in the recording and reading optical system 100A.

The first group of intermediate layers 16 include, in order from the side thereof farthest from the first surface 10A, L0 to L4 intermediate layers 16A to 16E, which are stacked among the L0 to L5 recording and reading layers 14A to 14F. The respective intermediate layers 16A to 16E are formed of acrylic or epoxy ultraviolet curable resin. The film thicknesses of these L0 to L4 intermediate layers 16A to 16E are preferably set to 20 μm or less, in order to increase the number of layers. Accordingly, the L0 intermediate layer 16A is 16 μm-thick, the L1 intermediate layer 16B is 12 μm-thick, the L2 intermediate layer 16C is 16 μm-thick, the L3 intermediate layer 16D is 12 μm-thick, and the L4 intermediate layer 16E is 16 μm-thick. That is, intermediate layers of two types of film thicknesses (16 μm and 12 μm) are stacked in an alternate manner. As a result, there are alternately set a first distance (16 μm) and a second distance (12 μm) different from this first distance, in order from the light incident surface side, as the inter-layer distances of the L0 to L5 recording and reading layers 14A to 14F. In addition, a difference between the first distance and the second distance is set to 4 μm. This way of layer configuration reduces inter-layer crosstalk. As a matter of course, all layers of the first group of intermediate layers 16 may be set to the same film thickness.

Like the first group of intermediate layers 16, the first cover layer 11 is formed of optically-transparent acrylic ultraviolet curable resin, and is set to a film thickness of 40 μm.

The second buffer layer 37 formed on the second surface 30A side of the support substrate 12 is formed of optically-transparent acrylic ultraviolet curable resin, and is set to a film thickness of 238 μm.

Each layer of the second group of recording and reading layers 34 (L0 to L5 recording and reading layers 34A to 34F) stacked on the second surface 30A side of the second buffer layer 37 has a three-layer structure in which dielectric films are stacked on both outer sides of a write-once recording film (not illustrated). Note that the optical reflectance, absorptance, transmittance, and the like of these L0 to L5 recording and reading layers 34A to 34F are optimized with respect to the beam 170B in a blue wavelength range (short wavelengths) of the second optical pickup 90B in the recording and reading optical system 100B.

The second group of intermediate layers 36 include, in order from the side thereof farthest from the second surface 30A, L0 to L4 intermediate layers 36A to 36E, which are stacked among the L0 to L5 recording and reading layers 34A to 34F. The respective intermediate layers 36A to 36E are formed of acrylic or epoxy ultraviolet curable resin. The film thicknesses of these L0 to L4 intermediate layers 36A to 36E are preferably set to 20 μm or less, in order to increase the number of layers. Accordingly, the L0 intermediate layer 36A is 16 μm-thick, the L1 intermediate layer 36B is 12 μm-thick, the L2 intermediate layer 36C is 16 μm-thick, the L3 intermediate layer 36D is 12 μm-thick, and the L4 intermediate layer 36E is 16 μm-thick. That is, intermediate layers of two types of film thicknesses (16 μm and 12 μm) are stacked in an alternate manner. As a result, there are alternately set a first distance (16 μm) and a second distance (12 μm) different from this first distance, in order from the second surface 30A side, as the inter-layer distances of the L0 to L5 recording and reading layers 34A to 34F. In addition, a difference between the first distance and the second distance is set to 4 μm. This way of layer configuration reduces inter-layer crosstalk. As a matter of course, all layers of the second group of intermediate layers 36 may be set to the same film thickness.

Note that the materials and the like of the second group of recording and reading layers 34 and the second group of intermediate layers 36 are respectively the same as those of the first group of recording and reading layers 14 and the first group of intermediate layers 16, and therefore, will not be described again.

Like the second group of intermediate layers 36, the second cover layer 31 is formed of optically-transparent acrylic ultraviolet curable resin, and is set to a film thickness of 40 µm.

As the result of the optical recording medium 10 being configured as described above, an interfacial boundary (servo layer 18) between the support substrate 12 and the first buffer layer 17 of the optical recording medium 10 is positioned at a distance of 350 µm from the first surface 10A. In addition, the L0 recording and reading layer 14A, among the first group of recording and reading layers 14, farthest from the first surface 10A is positioned at a distance of 112 µm from the first surface 10A; the L1 recording and reading layer 14B is positioned at a distance of 96 µm from the first surface 10A; the L2 recording and reading layer 14C is positioned at a distance of 84 µm from the first surface 10A; the L3 recording and reading layer 14D is positioned at a distance of 68 µm from the first surface 10A; and the L4 recording and reading layer 14E is positioned at a distance of 56 µm from the first surface 10A. Yet additionally, the L5 recording and reading layer 14F closest to the first surface 10A is positioned at a distance of 40 µm from the first surface 10A. Still additionally, the overall thickness (distance between the L0 recording and reading layers 14A and the L5 recording and reading layer 14F) of the first group of recording and reading layers 14 is 72 µm.

In addition, the L0 recording and reading layer 34A, among the second group of recording and reading layers 34, farthest from the second surface 30A is positioned at a distance of 112 µm from the second surface 30A; the L1 recording and reading layer 34B is positioned at a distance of 96 µm from the second surface 30A; the L2 recording and reading layer 34C is positioned at a distance of 84 µm from the second surface 30A; the L3 recording and reading layer 34D is positioned at a distance of 68 µm from the second surface 30A; and the L4 recording and reading layer 34E is positioned at a distance of 56 µm from the second surface 30A. Yet additionally, the L5 recording and reading layer 34F closest to the second surface 30A is positioned at a distance of 40 µm from the second surface 30A. Still additionally, the overall thickness (distance between the L0 recording and reading layers 34A and the L5 recording and reading layer 34F) of the second group of recording and reading layers 34 is 72 µm.

That is, this optical recording medium 10 has a structure symmetrized in the thickness direction thereof, except that the servo layer 18 is arranged asymmetrically. As a result, warpage and deformation can be reduced since internal stress arises symmetrically in the thickness direction at the time of manufacturing the optical recording medium 10. Even if the support substrate 12 is thinned, in particular, to less than 700 µm, 100 µm here, it is possible to suppress the amounts of warpage and deformation in the optical recording medium 10.

A method for producing the optical recording medium 10 according to the fifth embodiment of the present invention will next be described.

Figure 23A:
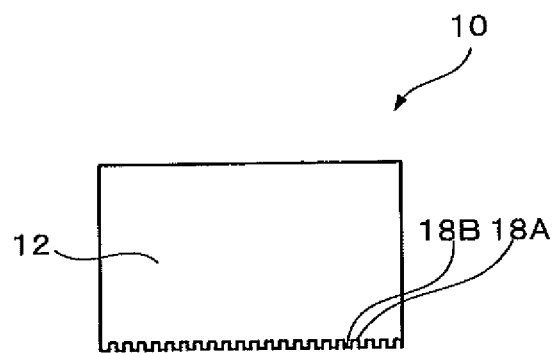
FIG. 23A is a sectional view illustrating a procedure for producing the optical recording medium.

As shown in FIG. 23A, a support substrate 12 having a groove and a land formed only in its one surface is made by injection molding of a polycarbonate resin using a metallic stamper. Basic information, such as address information about the first recording and reading layer group 14 and the second recording and reading layer group 34, recording conditions including recording and reading powers and the positions of or the interlayer distance between the recording and reading layers, to be held in advance at the time of production of the medium, is preformatted on the support substrate 12 by using a mold for injection molding. More specifically, the basic information is preformatted by using wobble of the land 18A or the groove 18B. Making of the support substrate 12 is not limited to injection molding. The support substrate 12 may alternatively be made by a 2P method or any other method.

Thereafter, the servo layer 18 is formed on the surface of the support substrate 12 in which the groove and land are provided. As the servo layer 18, film (film of a metal such as Al or Ag) reflective to the light source in the tracking optical system 200A is formed by sputtering, for example.

Figure 23B:
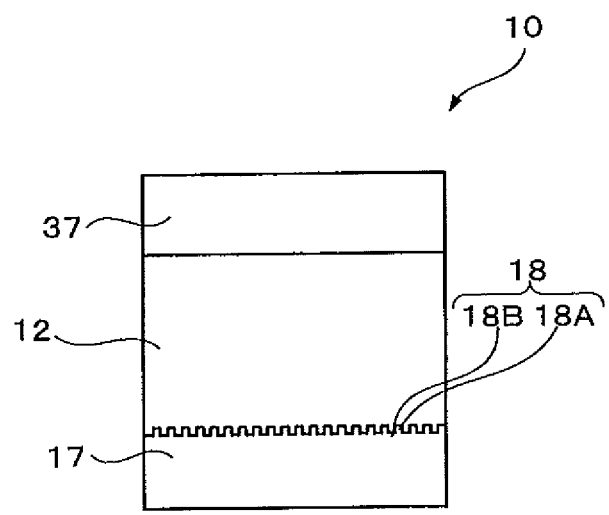
FIG. 23B is a sectional view illustrating the procedure for producing the optical recording medium.

Next, as shown in FIG. 23B, the first buffer layer 17 and the second buffer layer 37 are simultaneously formed on the two surfaces of the support substrate 12 on which the servo layer 18 is formed. For example, films of a viscosity-adjusted acrylic or epoxy ultraviolet curable resin are formed on the two surfaces of the support substrate 12 by spin coating or the like, and ultraviolet rays are applied to the films to form the first and second buffer layers 17 and 37. Light-transmissive sheets formed of a light transmitting resin may be provided in place of the ultraviolet curable resin and attached to the two surfaces of the support substrate 12 by using a bonding agent or an adhesive to form the first and second buffer layers 17 and 37. The first and second buffer layers 17 and 37 may alternatively be formed by spraying, a DIP method or any other method on the two surfaces of the support substrate 12.

Figure 23C:
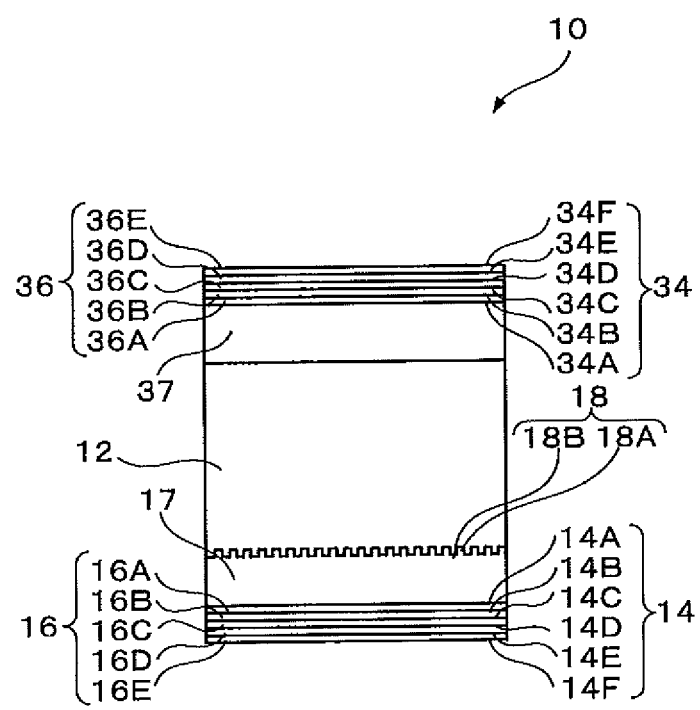
FIG. 23C is a sectional view illustrating the procedure for producing the optical recording medium.

Next, as shown in FIG. 23C, the L0 recording and reading layer 14A in the first recording and reading layer group 14 and the L0 recording and reading layer 34A in the second recording and reading layer group 34 are simultaneously formed on the first buffer layer 17 and the second buffer layer 37, respectively. More specifically, dielectric film, write-once recording film and dielectric film are formed in this order by using vapor-phase epitaxy. It is preferable to use sputtering in particular. Thereafter, the L0 intermediate layer 16A in the first intermediate layer group 16 is formed on the L0 recording and reading layer 14A in the first recording and reading layer group 14, and the L0 intermediate layer 36A in the second intermediate layer group 36 is formed on the L0 recording and reading layer 34A in the second recording and reading layer group 34. These layers are also formed simultaneously with each other. To form the L0 intermediate layers 16A and 36A, films of a viscosity-adjusted ultraviolet curable resin, for example, are formed by spin coating or the like, and ultraviolet rays are thereafter applied to the films so that the films are set. This procedure is repeated to alternately form the first recording and reading layer group 14 and the first intermediate layer group 16 on the first buffer layer 17 side and the second recording and reading layer group 34 and the second intermediate layer group 36 on the second buffer layer 37 side.

Figure 23D:
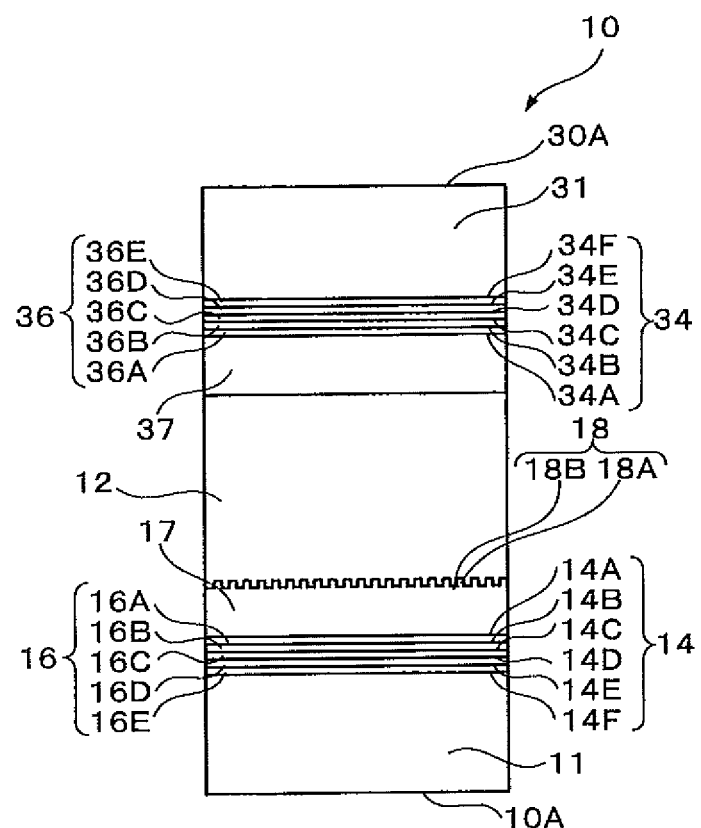
FIG. 23D is a sectional view illustrating the procedure for producing the optical recording medium.

After the completion of forming of the L5 recording and reading layer 14F in the first recording and reading layer group 14 and forming of the L5 recording and reading layer 34F in the first recording and reading layer group 34, the first and second cover layers 11 and 31 are simultaneously formed on these layers, as shown in FIG. 23D, thereby completing the optical recording medium 10. To form the first and second cover layers 11 and 31, films of a viscosity-adjusted acrylic or epoxy ultraviolet curable resin, for example, are formed by spin coating or the like, and ultraviolet rays are applied to the films so that the films are set. While a producing method according to the present embodiment has been described, the present invention is not limited to the above-described producing method. Any other producing method may alternatively be adopted according to the present embodiment.

An optical recording and reading method for recording information on the optical recording medium 10 and reproducing information from the optical recording medium 10 by using the optical recording and reading apparatus 70 in the fifth embodiment of the present invention will next be described. According to the optical recording and reading method in the present embodiment, information is simultaneously recorded in one pair of recording and reading layers consisting of one of the first recording and reading layers 14 and one of the second recording and reading layers 34 whose ordinal positions in the groups of layers from the first surface 10A side and from the optical recording medium 10 thickness-direction-center side, respectively, coincide with each other.

The present embodiment will be described by way of example with respect to a case where information is recorded in one after another of a total of four pairs of recording and reading layers in the first to fourth recording patterns. In the first recording pattern, information is simultaneously recorded in the L5 recording and reading layer 14F in the first ordinal position from the first surface 10A side in the first recording and reading layers 14 and on the L0 recording and reading layer 34A in the first ordinal position from the optical recording medium 10 thickness-direction-center side in the second recording and reading layers 34. In the second recording pattern, information is simultaneously recorded in the L3 recording and reading layer 14D in the third ordinal position from the first surface 10A side in the first recording and reading layers 14 and on the L2 recording and reading layer 34C in the third ordinal position from the optical recording medium 10 thickness-direction-center side in the second recording and reading layers 34. In the third recording pattern, information is simultaneously recorded in the L2 recording and reading layer 14C in the fourth ordinal position from the first surface 10A side in the first recording and reading layers 14 and on the L3 recording and reading layer 34D in the fourth ordinal position from the optical recording medium 10 thickness-direction-center side in the second recording and reading layers 34. In the fourth recording pattern, information is simultaneously recorded in the L0 recording and reading layer 14A in the sixth ordinal position from the first surface 10A side in the first recording and reading layers 14 and on the L5 recording and reading layer 34F in the sixth ordinal position from the optical recording medium 10 thickness-direction-center side in the second recording and reading layers 34.

<First Recording Pattern/Simultaneous Recording in the L5 Recording and Reading Layer 14F and the L0 Recording and Reading Layer 34A>

<OPC Control>

Figure 24:
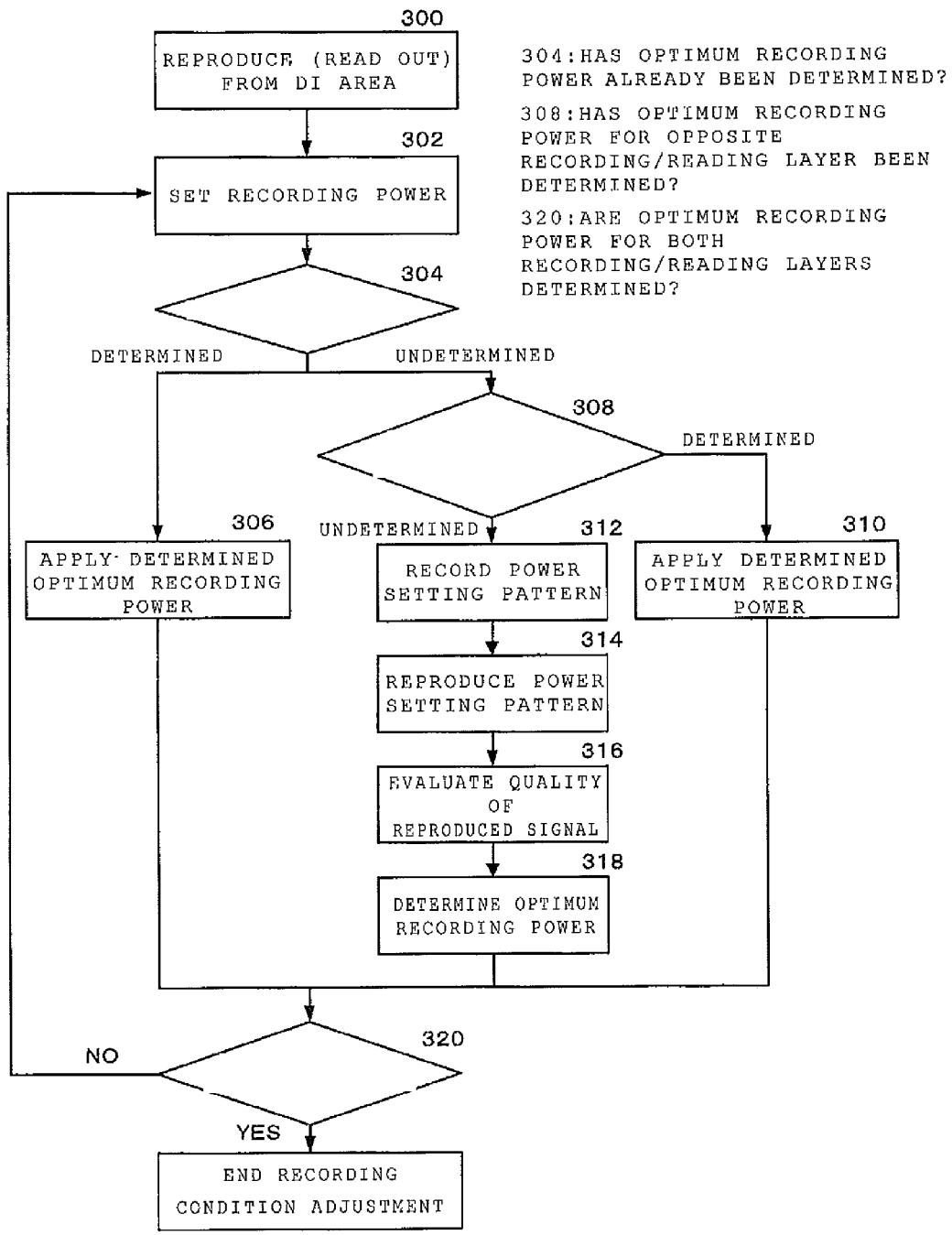
FIG. 24 is a flowchart illustrating a procedure for setting recording power by the optical recording and reading apparatus.

Before recording information on the optical recording medium 10, the recording power of the optical recording and reading apparatus 70 is set along the flowchart of FIG. 24.

First, in step 300, reproducing from a DI (disc information) area in the optical recording medium 10 is performed by the output control means 86 to read basic characteristics information about the optical recording medium 10. In the DI area, recommended recording power $P_K$ of the laser beam is recorded as well as the kind of the medium (a write-once type or a rewritable type), a recording speed (1×, 2×, or the like), a recording strategy, the position of the servo layer 18, and the positions of and the interlayer distance between the recording and reading layers. Accordingly, this recommended recording power $P_K$ is set as an initial recording condition (step 302). In the present embodiment, this DI area is formed in the servo layer 18. Accordingly, these information items are read out from the servo layer 18 by means of the beam 270A in the red wavelength range of the first optical pickup 90A.

Next, in step 304, the output control device 86 determines, by referring to the memory means 87A, whether or not the optimum recording power of the first optical pickup 90A for recording in the L5 recording and reading layer 14F has already been determined by OPC. If the optimum recording power has already been determined, the output control device 86 proceeds to step 306 to apply the determined optimum recording power to recording at the present time as well. With respect to the first recording pattern, the optimum recording power is undetermined If the optimum recording power of the first optical pickup 90A with respect to the L5 recording and reading layer 14F is undetermined, the output control device 86 proceeds to step 308 to determine, by referring to the memory means 87A, whether or not the optimum recording power of the second optical pickup 90B for recording in the L5 recording and reading layer 34F having the same ordinal position from the thickness-direction-center side in the group of layers as that of the L5 recording and reading layer 14F (i.e., the recording and reading layer at the counter position in symmetry about the center) has already been determined by OPC. If the optimum recording power for the L5 recording and reading layer 34F has already been determined, the output control device 86 proceeds to step 310 to apply the determined optimum recording power as the optimum recording power of the first optical pickup 90A with respect to the L5 recording and reading layer 14F in the first recording and reading layer group 14.

If the optimum recording power for the L5 recording and reading layer 34F is also undetermined in step 308, the output control device 86 proceeds to step 312 to record a power setting pattern (a random pattern in this process) on the trial writing area X in the L5 recording and reading layer 14F (see FIG. 25A). Since the optimum recording power for the L5 recording and reading layer 34F is also undetermined with respect to the first recording pattern, a transition to a trial writing operation in step 312 is made.

Figure 26:
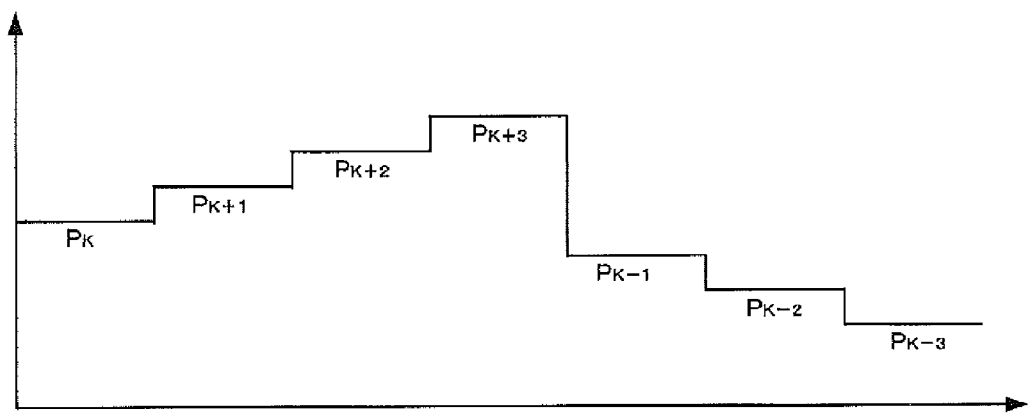
FIG. 26 is a graph illustrating changes in recording power when OPC is performed by the optical recording and reading apparatus.

In this case, as shown in FIG. 26, an operation to write each of recording powers to a power setting pattern with respect to recording power for actual recording is executed by making changes in a number of steps ($P_{K+1}$, $P_{K+2}$, $P_{K+3}$, $P_{K-1}$, $P_{K-2}$, $P_{K-3}$) in two directions to higher and lower levels with reference to the recommended recording power $P_K$. A concrete method for recording the power setting pattern on the trial writing area X in the L5 recording and reading layer 14F will be described in detail with respect to a first recording and reading operation described later in detail. Therefore a description of the method is omitted here.

Thereafter, in step 314, the recorded power setting pattern is reproduced by using a PRML processing device not particularly illustrated. In step 316, the quality of the reading signal is evaluated by the quality evaluating means 88 using the error rate or the SAM value in the PRML processing device. The result of this evaluation is transmitted to the trial writing means 87. In step 318, the trial writing means 87 selects the recording power at which recording is performed with the highest quality, determines the recording power Pw of the light source 101A of the first optical pickup 90A, the erasing power Pe and the bias power Pb with reference to the determined power, and designates these powers for the recording power adjusting means 89. By the above-described steps, setting of the optimum recording power for the L5 recording and reading layer 14F is completed. The optimum recording power for the L5 recording and reading layer 14F determined by this procedure is stored in the memory means 87A.

After determination in step 320, the process returns to the above-described step 302 and the optimum recording power of the second optical pickup 90B for recording in the L0 recording and reading layer 34A is set along the same procedure as that described above. More specifically, in step 304, the output control device 86 determines, by referring to the memory means 87A, whether or not the optimum recording power of the second optical pickup 90B for recording in the L0 recording and reading layer 34A has already been determined by OPC. If the optimum recording power has already been determined, the output control device 86 proceeds to step 306 to apply the determined optimum recording power to recording at the present time as well. With respect to the first recording pattern, the optimum recording power is undetermined.

If the optimum recording power of the second optical pickup 90B with respect to the L0 recording and reading layer 34A is undetermined, the output control device 86 proceeds to step 308 to determine, by referring to the memory means 87A, whether or not the optimum recording power of the first optical pickup 90A for recording in the L0 recording and reading layer 14A having the same ordinal position from the thickness-direction-center side in the group of layers as that of the L0 recording and reading layer 34A has already been determined by OPC. If the optimum recording power for the L0 recording and reading layer 14A has already been determined, the output control device 86 proceeds to step 310 to apply the determined optimum recording power as the optimum recording power of the second optical pickup 90B with respect to the L0 recording and reading layer 34A in the second recording and reading layer group 34.

If the optimum recording power of the first optical pickup 90A for recording in the L0 recording and reading layer 14A is also undetermined in step 308, the output control device 86 proceeds to step 312 to record the power setting pattern (a random pattern in this process) on the trial writing area X in the L0 recording and reading layer 34A. Since the optimum recording power of the first optical pickup 90A for recording in the L0 recording and reading layer 14A is also undetermined with respect to the first recording pattern, a transition to the trial writing operation in step 312 is made (see FIG. 25A).

Thereafter, in step 314, the recorded power setting pattern is reproduced by using the PRML processing device not particularly illustrated. In step 316, the quality of the reading signal is evaluated by the quality evaluating means 88. In step 318, the optimum recording power of the light source 101B of the second optical pickup 90B with respect to the L0 recording and reading layer 34A is determined The optimum recording power for the L0 recording and reading layer 34A determined by the above-described steps is stored in the memory means 87A.

<Simultaneous Recording of Information in the L5 Recording and Reading Layer 14F and the L0 Recording and Reading Layer 34A>

As already described, in the present embodiment, information is simultaneously recorded in one pair of recording and reading layers consisting of one of the first recording and reading layers 14 and one of the second recording and reading layers 34 whose ordinal positions in the groups of layers from the first surface 10A side and from the optical recording medium 10 thickness-direction-center side, respectively, coincide with each other. More specifically, as a first recording and reading operation, for recording information in the L5 recording and reading layer 14F in the first recording and reading layer group 14, tracking is first performed by applying to the servo layer 18 the beam 270A in the red wavelength range from the tracking optical system 200A of the first optical pickup 90A. To be more specific, tracking is performed by applying a spot of the beam 270A to the groove 18B and the land 18A in the servo layer 18. Simultaneously with tracking, the recording beam 170A in the blue wavelength range from the recording and reading optical system 100A of the first optical pickup 90A is applied to the L5 recording and reading layer 14F.

Thus, while the groove 18B and the land 18A are being tracked, information is recorded in the L5 recording and reading layer 14F along the groove 18B and the land 18A. As a result, the track pitch P2 between the recording marks formed in the L5 recording and reading layer 14F is half the pitch P1 between the grooves 18B.

As a second recording and reading operation, at the time of recording of information in the L0 recording and reading layer 34A in the second recording and reading layer group 34, tracking control of the second optical pickup 90B is performed by using the tracking error signal from the tracking optical system 200A of the first optical pickup 90A. As a result, the first optical pickup 90A and the second optical pickup 90B always exist at the same position with respect to the tracking direction. Simultaneously with tracking, the recording beam 170B in the blue wavelength range from the recording and reading optical system 100B of the second optical pickup 90B is applied to the L0 recording and reading layer 34A. As a result, information is recorded in the L0 recording and reading layer 34A. The track pitch P2 between the recording marks formed in the L0 recording and reading layer 34A is also a half of the pitch P1 between the grooves of the servo layer 18.

The above-described first and second recording and reading operations are concurrently advanced to realize simultaneous recording of information in the first and second recording and reading layer groups 14 and 34. The recording power Pw, the erasing power Pe and the bias power Pb at the time of performing this simultaneous recording are set by the above-described OPC operation.

After the completion of necessary information in the L0 recording and reading layer 14A in the first recording and reading layer group 14 and the L0 recording and reading layer 34A in the second recording and reading layer group 34, additional information to be recorded at the present time (e.g., address information about recording and content information) is simultaneously recorded in management areas secured in advance in portions of the L0 recording and reading layers 14A and 34A.

<Second Recording Pattern/Simultaneous Recording in the L3 Recording and Reading Layer 14D and the L2 Recording and Reading Layer 34C>

<OPC Control>

The recording power of the optical recording and reading apparatus 70 is set along the flowchart of FIG. 24.

First, in step 300, reproducing from the DI (disc information) area in the optical recording medium 10 is performed by the output control means 86 to read the basic characteristics information about the optical recording medium 10, and the recommended recording power $P_K$ in this information is set as an initial recording condition (step 302).

Next, in step 304, the output control device 86 determines, by referring to the memory means 87A, whether or not optimum recording power of the first optical pickup 90A for recording in the L3 recording and reading layer 14D has already been determined by OPC. If the optimum recording power has already been determined, the output control device 86 proceeds to step 306 to apply the determined optimum recording power to recording at the present time as well. With respect to the second recording pattern, the optimum recording power is undetermined If the optimum recording power of the first optical pickup 90A with respect to the L3 recording and reading layer 14D is undetermined, the output control device 86 proceeds to step 308 to determine, by referring to the memory means 87A, whether or not the optimum recording power of the second optical pickup 90B for recording in the L3 recording and reading layer 34D having the same ordinal position from the thickness-direction-center side in the group of layers as that of the L3 recording and reading layer 14D (i.e., the recording and reading layer at the counter position in symmetry about the center) has already been determined by OPC. If the optimum recording power for the L3 recording and reading layer 34D has already been determined, the output control device 86 proceeds to step 310 to apply the determined optimum recording power as the optimum recording power of the first optical pickup 90A with respect to the L3 recording and reading layer 14D in the first recording and reading layer group 14.

If the optimum recording power for the L3 recording and reading layer 34D is also undetermined in step 308, the output control device 86 proceeds to step 312 to record a power setting pattern (a random pattern in this process) on the trial writing area X in the L3 recording and reading layer 14D (see FIG. 25A). Since the optimum recording power for the L3 recording and reading layer 34D is also undetermined with respect to the second recording pattern, a transition to a trial writing operation in step 312 is made.

Thereafter, in step 314, the recorded power setting pattern is reproduced. In step 316, the quality of the reading signal is evaluated by the quality evaluating means 88. In step 318, the trial writing means 87 determines the optimum recording power of the first optical pickup 90A. The optimum recording power for the L3 recording and reading layer 14D determined by this procedure is stored in the memory means 87A.

Next, the process returns to the above-described step 302 and the optimum recording power of the second optical pickup 90B for recording in the L2 recording and reading layer 34C is set along the same procedure as that described above. More specifically, in step 304, the output control device 86 determines, by referring to the memory means 87A, whether or not the optimum recording power of the second optical pickup 90B for recording in the L2 recording and reading layer 34C has already been determined by OPC. If the optimum recording power has already been determined, the output control device 86 proceeds to step 306 to apply the determined optimum recording power to recording at the present time as well. With respect to the second recording pattern, the optimum recording power is undetermined If the optimum recording power of the second optical pickup 90B with respect to the L2 recording and reading layer 34C is undetermined, the output control device 86 proceeds to step 308 to determine, by referring to the memory means 87A, whether or not the optimum recording power of the first optical pickup 90A for recording in the L2 recording and reading layer 14C having the same ordinal position from the thickness direction center side in the group of layers as that of the L2 recording and reading layer 34C has already been determined by OPC. If the optimum recording power for the L2 recording and reading layer 14C has already been determined, the output control device 86 proceeds to step 310 to apply the determined optimum recording power as the optimum recording power of the second optical pickup 90B with respect to the L2 recording and reading layer 34C in the second recording and reading layer group 34.

If the optimum recording power for recording in the L2 recording and reading layer 14C is also undetermined in step 308, the output control device 86 proceeds to step 312 to record a power setting pattern (a random pattern in this process) on the trial writing area X in the L2 recording and reading layer 34C. Since the optimum recording power for recording in the L2 recording and reading layer 14C is also undetermined with respect to the second recording pattern, a transition to the trial writing operation in step 312 is made (see FIG. 25B).

Thereafter, in step 314, the recorded power setting pattern is reproduced by using the PRML processing device not particularly illustrated. In step 316, the quality of the reading signal is evaluated by the quality evaluating means 88. In step 318, the optimum recording power of the light source 101B of the second optical pickup 90B with respect to the L2 recording and reading layer 34C is determined. The optimum recording power for the L2 recording and reading layer 34C determined by the above-described steps is stored in the memory means 87A.

<Simultaneous Recording of Information in the L3 Recording and Reading Layer 14D and the L2 Recording and Reading Layer 34C>

An operation to record information is performed as a first recording and reading operation by applying to the L3 recording and reading layer 14D the recording beam 170A in the blue wavelength range from the recording and reading optical system 100A of the first optical pickup 90A while performing tracking by applying to the servo layer 18 the beam 270A in the red wavelength range from the tracking optical system 200A of the first optical pickup 90A.

An operation to record information is performed as a second recording and reading operation by applying to the L2 recording and reading layer 34C the recording beam 170B in the blue wavelength range from the recording and reading optical system 100B of the second optical pickup 90B while performing tracking control of the second optical pickup 90B by using the tracking error signal from the tracking optical system 200A of the first optical pickup 90A.

Figure 27:
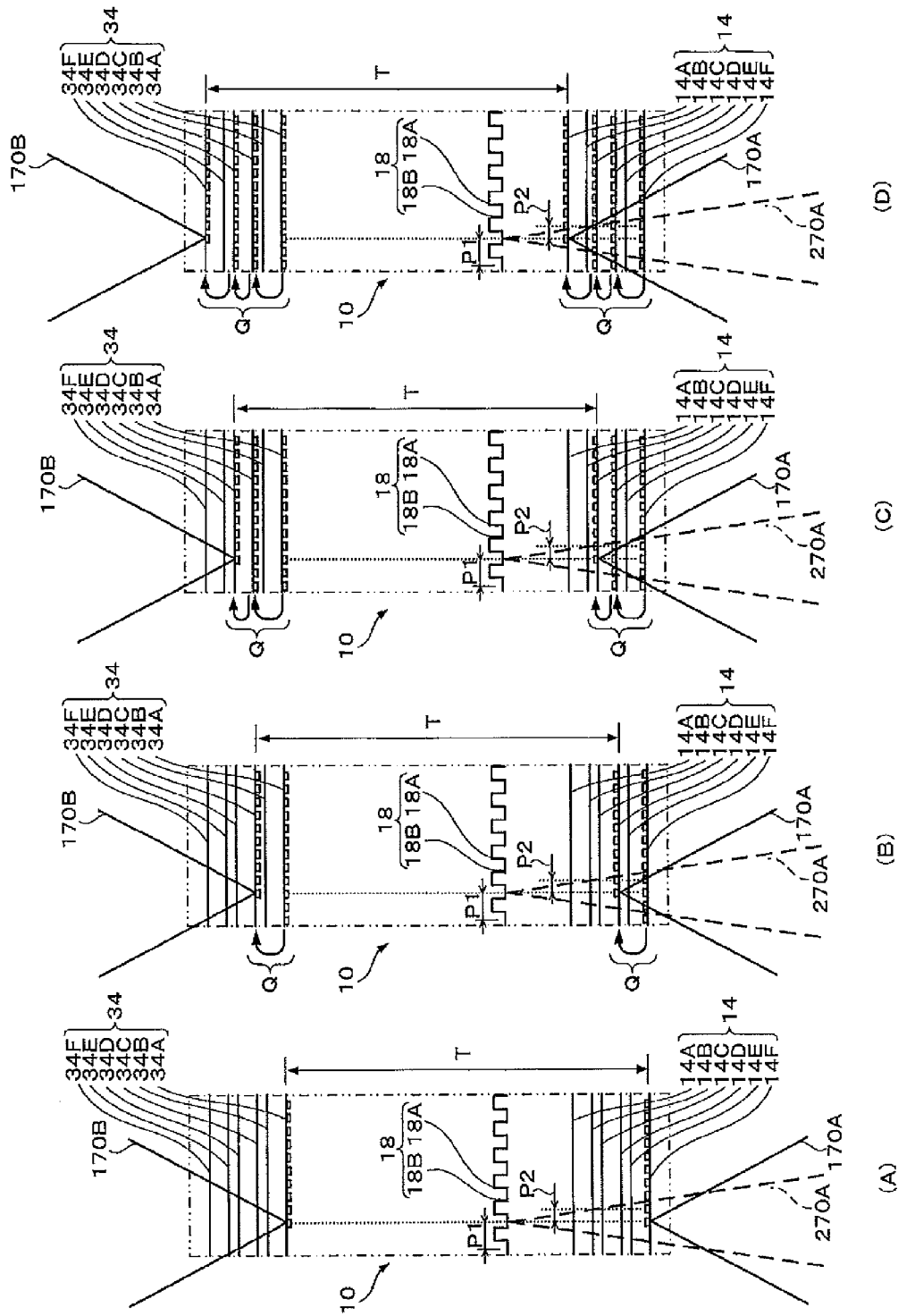
FIGS. 27A to 27D are enlarged sectional views illustrating a procedure for recording on the optical recording medium according to the optical recording and reading method.

The above-described first and second recording and reading operations are concurrently advanced to realize simultaneous recording of information in the first and second recording and reading layer groups 14 and 34 (see FIG. 27B). The recording power Pw, the erasing power Pe and the bias power Pb at the time of performing this simultaneous recording are set by the above-described OPC operation.

<Third Recording Pattern/Simultaneous Recording in the L2 Recording and Reading Layer 14C and the L3 Recording and Reading Layer 34D>

<OPC Control>

The recording power of the optical recording and reading apparatus 70 is set along the flowchart of FIG. 24.

First, in step 300, reproducing from the DI (disc information) area in the optical recording medium 10 is performed by the output control means 86 to read the basic characteristics information about the optical recording medium 10, and the recommended recording power $P_K$ in this information is set as an initial recording condition (step 302).

Next, in step 304, the output control device 86 determines, by referring to the memory means 87A, whether or not the optimum recording power of the first optical pickup 90A for recording in the L2 recording and reading layer 14C has already been determined by OPC. If the optimum recording power has already been determined, the output control device 86 proceeds to step 306 to apply the determined optimum recording power to recording at the present time as well. With respect to the third recording pattern, the optimum recording power is undetermined If the optimum recording power of the first optical pickup 90A with respect to the L2 recording and reading layer 14C is undetermined, the output control device 86 proceeds to step 308 to determine, by referring to the memory means 87A, whether or not the optimum recording power of the second optical pickup 90B for recording in the L2 recording and reading layer 34C having the same ordinal position from the thickness direction center side in the group of layers as that of the L2 recording and reading layer 14C (i.e., the recording and reading layer at the counter position in symmetry about the center) has already been determined by OPC. If the optimum recording power for the L2 recording and reading layer 34C has already been determined, the output control device 86 proceeds to step 310 to apply the determined optimum recording power as the optimum recording power of the first optical pickup 90A with respect to the L2 recording and reading layer 14C in the first recording and reading layer group 14.

In the present embodiment, the optimum recording power of the second optical pickup 90B for recording in the L2 recording and reading layer 34C is already stored in the memory means 87A in the second recording pattern. In step 310, therefore, this optimum recording power can be used as the optimum recording power of the first optical pickup 90A with respect to the L2 recording and reading layer 14C. As a result, the trial writing operation from step 312 to step 318 is omitted (see FIG. 25C).

The optimum recording power for the L2 recording and reading layer 14C determined by the above-described steps is stored in the memory means 87A.

Next, the process returns to step 302 and the optimum recording power of the second optical pickup 90B for recording in the L3 recording and reading layer 34D is set along the same procedure as that described above. More specifically, in step 304, the output control device 86 determines, by referring to the memory means 87A, whether or not the optimum recording power of the second optical pickup 90B for recording in the L3 recording and reading layer 34D has already been determined by OPC. If the optimum recording power has already been determined, the output control device 86 proceeds to step 306 to apply the determined optimum recording power to recording at the present time as well. With respect to the third recording pattern, the optimum recording power is undetermined If the optimum recording power of the second optical pickup 90B with respect to the L3 recording and reading layer 34D is undetermined, the output control device 86 proceeds to step 308 to determine, by referring to the memory means 87A, whether or not the optimum recording power of the first optical pickup 90A for recording in the L3 recording and reading layer 14D having the same ordinal position from the thickness-direction-center side in the group of layers as that of the L3 recording and reading layer 34D has already been determined by OPC. If the optimum recording power for the L3 recording and reading layer 14D has already been determined, the output control device 86 proceeds to step 310 to apply the determined optimum recording power as the optimum recording power of the second optical pickup 90B with respect to the L3 recording and reading layer 34D in the second recording and reading layer group 34.

In the present embodiment, the optimum recording power of the first optical pickup 90A for recording in the L3 recording and reading layer 14D is already stored in the memory means 87A in the second recording pattern. In step 310, therefore, this optimum recording power can be used as the optimum recording power of the second optical pickup 90B with respect to the L3 recording and reading layer 34D. As a result, the trial writing operation from step 312 to step 318 is omitted (see FIG. 25C).

The optimum recording power for the L3 recording and reading layer 34D determined by the above-described steps is stored in the memory means 87A.

<Simultaneous Recording of Information in the L2 Recording and Reading Layer 14C and the L3 Recording and Reading Layer 34D>

An operation to record information is performed as a first recording and reading operation by applying to the L2 recording and reading layer 14C the recording beam 170A in the blue wavelength range from the recording and reading optical system 100A of the first optical pickup 90A while performing tracking by applying to the servo layer 18 the beam 270A in the red wavelength range from the tracking optical system 200A of the first optical pickup 90A.

An operation to record information is performed as a second recording and reading operation by applying to the L3 recording and reading layer 34D the recording beam 170B in the blue wavelength range from the recording and reading optical system 100B of the second optical pickup 90B while performing tracking control of the second optical pickup 90B by using the tracking error signal from the tracking optical system 200A of the first optical pickup 90A.

The above-described first and second recording and reading operations are concurrently advanced to realize simultaneous recording of information in the first and second recording and reading layer groups 14 and 34 (see FIG. 27C). The recording power Pw, the erasing power Pe and the bias power Pb at the time of performing this simultaneous recording are set by the above-described OPC operation.

<Fourth Recording Pattern/Simultaneous Recording in the L0 Recording and Reading Layer 14A and the L5 Recording and Reading Layer 34F>

<OPC Control>

The recording power of the optical recording and reading apparatus 70 is set along the flowchart of FIG. 24.

First, in step 300, reproducing from the DI (disc information) area in the optical recording medium 10 is performed by the output control means 86 to read the basic characteristics information about the optical recording medium 10, and the recommended recording power $P_K$ in this information is set as an initial recording condition (step 302).

Next, in step 304, the output control device 86 determines, by referring to the memory means 87A, whether or not the optimum recording power of the first optical pickup 90A for recording in the L0 recording and reading layer 14A has already been determined by OPC. If the optimum recording power has already been determined, the output control device 86 proceeds to step 306 to apply the determined optimum recording power to recording at the present time as well. With respect to the fourth recording pattern, the optimum recording power is undetermined.

If the optimum recording power of the first optical pickup 90A with respect to the L0 recording and reading layer 14A is undetermined, the output control device 86 proceeds to step 308 to determine, by referring to the memory means 87A, whether or not the optimum recording power of the second optical pickup 90B for recording in the L0 recording and reading layer 34A having the same ordinal position from the thickness-direction-center side in the group of layers as that of the L0 recording and reading layer 14A (i.e., the recording and reading layer at the counter position in symmetry about the center) has already been determined by OPC. If the optimum recording power for the L0 recording and reading layer 34A has already been determined, the output control device 86 proceeds to step 310 to apply the determined optimum recording power as the optimum recording power of the first optical pickup 90A with respect to the L0 recording and reading layer 14A in the first recording and reading layer group 14.

In the present embodiment, the optimum recording power of the second optical pickup 90B for recording in the L0 recording and reading layer 34A is already stored in the memory means 87A in the first recording pattern. In step 310, therefore, this optimum recording power can be used as the optimum recording power of the first optical pickup 90A with respect to the L0 recording and reading layer 14A. As a result, the trial writing operation from step 312 to step 318 is omitted (see FIG. 25D).

The optimum recording power for the L0 recording and reading layer 14A determined by the above-described steps is stored in the memory means 87A.

Next, the process returns to step 302 and the optimum recording power of the second optical pickup 90B for recording in the L5 recording and reading layer 34F is set along the same procedure as that described above. More specifically, in step 304, the output control device 86 determines, by referring to the memory means 87A, whether or not the optimum recording power of the second optical pickup 90B for recording in the L5 recording and reading layer 34F has already been determined by OPC. If the optimum recording power has already been determined, the output control device 86 proceeds to step 306 to apply the determined optimum recording power to recording at the present time as well. With respect to the fourth recording pattern, the optimum recording power is undetermined If the optimum recording power of the second optical pickup 90B with respect to the L5 recording and reading layer 34F is undetermined, the output control device 86 proceeds to step 308 to determine, by referring to the memory means 87A, whether or not the optimum recording power of the first optical pickup 90A for recording in the L5 recording and reading layer 14F having the same ordinal position from the thickness-direction-center side in the group of layers as that of the L5 recording and reading layer 34F has already been determined by OPC. If the optimum recording power for the L5 recording and reading layer 14F has already been determined, the output control device 86 proceeds to step 310 to apply the determined optimum recording power as the optimum recording power of the second optical pickup 90B with respect to the L5 recording and reading layer 34F in the second recording and reading layer group 34.

In the present embodiment, the optimum recording power of the first optical pickup 90A for recording in the L5 recording and reading layer 14F is already stored in the memory means 87A in the first recording pattern. In step 310, therefore, this optimum recording power can be used as the optimum recording power of the second optical pickup 90B with respect to the L5 recording and reading layer 34F. As a result, the trial writing operation from step 312 to step 318 is omitted (see FIG. 25D).

The optimum recording power for the L5 recording and reading layer 34F determined by the above-described steps is stored in the memory means 87A.

<Simultaneous Recording of Information in the L0 Recording and Reading Layer 14A and the L5 Recording and Reading Layer 34F>

An operation to record information is performed as a first recording and reading operation by applying to the L0 recording and reading layer 14A the recording beam 170A in the blue wavelength range from the recording and reading optical system 100A of the first optical pickup 90A while performing tracking by applying to the servo layer 18 the beam 270A in the red wavelength range from the tracking optical system 200A of the first optical pickup 90A.

An operation to record information is performed as a second recording and reading operation by applying to the L5 recording and reading layer 34F the recording beam 170B in the blue wavelength range from the recording and reading optical system 100B of the second optical pickup 90B while performing tracking control of the second optical pickup 90B by using the tracking error signal from the tracking optical system 200A of the first optical pickup 90A.

The above-described first and second recording and reading operations are concurrently advanced to realize simultaneous recording of information in the first and second recording and reading layer groups 14 and 34 (see FIG. 27D). The recording power Pw, the erasing power Pe and the bias power Pb at the time of performing this simultaneous recording are set by the above-described OPC operation.

While a case where management areas are secured in the L0 recording and reading layers 14A and 34A has been described by way of example, the other recording and reading layers area also available. In a case where the servo layer 18 has a recording film, it is preferable that a management area be secured in the servo layer 18, and that additional information be recorded in the management area. For this recording, the beam 270A, with which tracking control is performed, may be used. Gathering management information in the servo layer 18 enables simultaneously grasping the management information about the first recording and reading layer group 14 and the second recording and reading layer group 34.

A case where OPC control is performed each time one pair of recording and reading layers are selected in the process from the first recording pattern to the fourth recording pattern has been described by way of example. However, the present invention is not limited to this. For example, the optimum recording powers for the four pairs of recording and reading layers as recording/reading targets may be determined and stored in the memory means 87A by executing in advance the OPC control described with respect to the first to fourth recording patterns, and only the recording operation described with respect to the first to fourth recording patterns may thereafter be continuously performed. This procedure is also preferable. Processing in this way enables maintaining the continuity of the transfer rate at the time of recording information over a plurality of recording and reading layers.

<Simultaneous Reproducing of Information from First and Second Recording and Reading Layer Groups>

Figure 28:
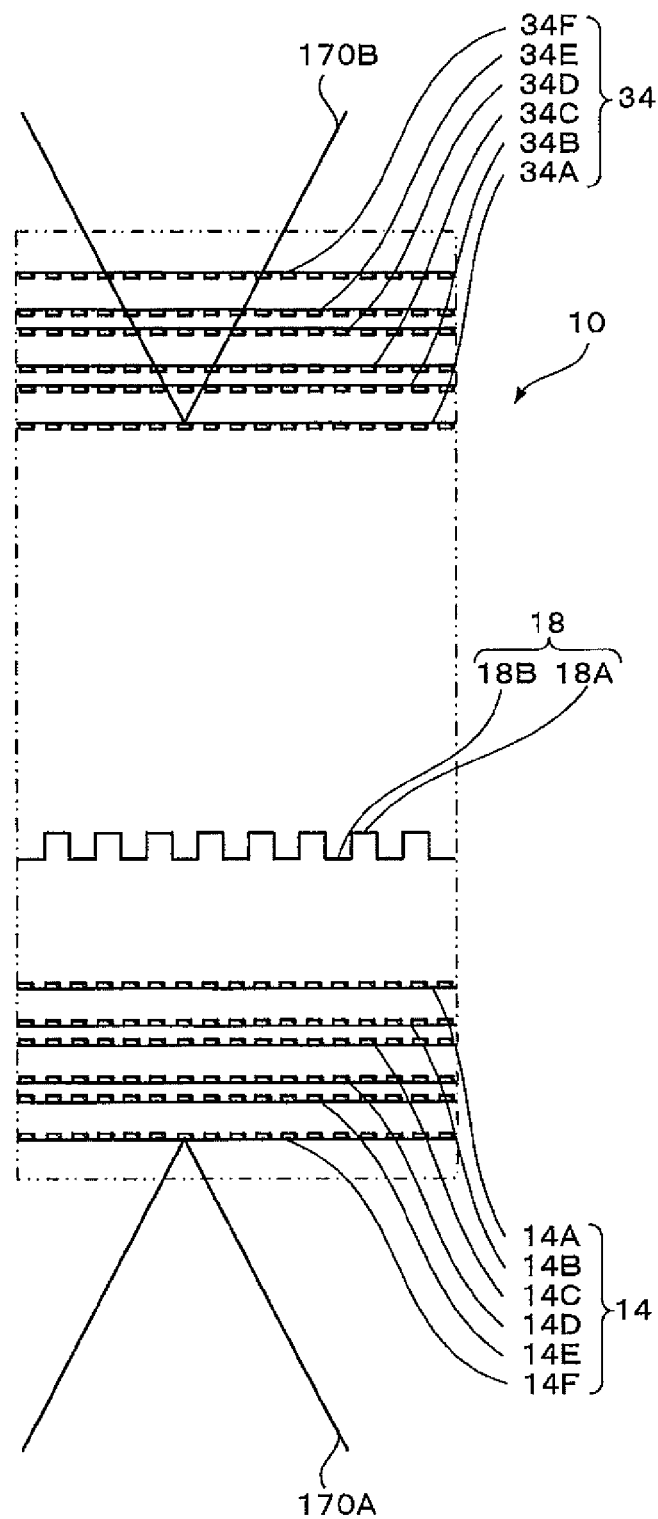
FIG. 28 is an enlarged sectional view illustrating a procedure for reproducing from the optical recording medium according to the optical recording and reading method.

In the present embodiment, information simultaneously recorded in the first and second recording and reading layer groups 14 and 34 is simultaneously reproduced. For example, as shown in FIG. 28, when the information in the L5 recording and reading layer 14F in the first recording and reading layer group 14 is reproduced, a first reproducing operation is performed by applying to the L5 recording and reading layer 14F the beam 170A from the recording and reading optical system 100A of the first optical pickup 90A and by performing tracking control and focus control.

Also, when the information in the L0 recording and reading layer 34A in the second recording and reading layer group 34 is reproduced, a second reproducing operation is performed by applying to the L0 recording and reading layer 34A the beam 170B from the recording and reading optical system 100B of the second optical pickup 90B and by performing tracking control and focus control. These first and second recording and reading operations are concurrently advanced to realize simultaneous reproducing of information from the first and second recording and reading layer groups 14 and 34. While tracking control is performed by using the servo layer 18 at the time of recording, the first and second optical pickups 90A and 90B are respectively controlled independently in tracking by using the respective recording and reading optical systems 100A and 100B.

According to the optical recording and reading method in the fifth embodiment, the first recording and reading operation using the first optical pickup 90A and the second recording and reading operation using the second optical pickup 90B are simultaneously executed to simultaneously record information in the first and second recording and reading layer groups 14 and 34 or simultaneously reproduce information from the first and second recording and reading layer groups 14 and 34. As a result, a leap upward in transfer rate at the time or recording or reading is realized.

In the present embodiment in particular, information is simultaneously recorded in one pair of recording and reading layers consisting of one of the first recording and reading layers 14 and one of the second recording and reading layers 34 whose ordinal positions in the groups of layers from the first surface 10A side and from the optical recording medium 10 thickness-direction-center side, respectively, coincide with each other. This may be generalized to conceive selecting one pair of recording and reading layers on which simultaneous recording is to be performed such that if each of the numbers of layers in the first and second recording and reading layer groups 14 and 34 is set to S (S: a natural number equal to or larger than 2), the sum (X+Y) of the ordinal position from the thickness-direction center of the recording and reading layer as a recording target in the first recording and reading layer group 14 (the X-th position in this description) and the ordinal position from the thickness-direction center of the recording and reading layer as a recording target in the second recording and reading layer group 34 (the Y-th position in this description) is invariably (S+1). For example, in the present embodiment, selection may be made so that the sum of the ordinal position from the thickness-direction center of the recording and reading layer as a recording target in the first recording and reading layer group 14 (e.g., the second position: the position of the L1 recording and reading layer 14B) and the ordinal position from the thickness-direction center of the recording and reading layer as a recording target in the second recording and reading layer group 34 (e.g., the fifth position: the position of the L4 recording and reading layer 34E) is invariably 7.

In this way, the interfocal distance T (see FIG. 27) between the focal point of the recording and reading beam 170A on the first optical pickup 90A side and the focal point of the recording and reading beam 170B on the second optical pickup 90B side can be made constant or comparatively stable. More specifically, in the present embodiment, the focal point of the beam 170A is moved from the first surface 10A side toward the center side, as indicated by arrows Q in FIG. 27, while the focal point of the beam 170B is moved from the center side to the second surface 30A side, as indicated by arrows Q in FIG. 27. As a result, the interfocal distance T between the pair of beams 170A and 170B is always constant and the number of intermediate layers 16 and 36 existing between the focal points is also constant. Thus, limiting the amount of change in interfocal distance T due to errors in film forming of the intermediate layer groups 16 and 36 within a certain range is enabled. This contributes to reducing focus errors or the like. In particular, even when the beams 170A and 170B jump to the next recording and reading layers, the probability of jumping to a wrong one of the recording and reading layers can be reduced if the focal points of the beams 170A and 170B are simultaneously moved while the interfocal distance T is fixed.

The present embodiment has been described with respect to a case where recording on the first recording and reading layer group 14 progresses from the first surface 10A side toward the center side and recording on the second recording and reading layer group 34 progresses from the center side toward the second surface 30A side. However, the present invention is not limited to this. Recording may be performed by randomly selecting from the pairs of recording and reading layers may be randomly made as long as recording is performed on each pair of recording and reading layers consisting of one of the first recording and reading layers 14 and one of the second recording and reading layers 34 whose ordinal positions in the groups of layers from the first surface 10A side and from the optical recording medium 10 thickness-direction-center side, respectively, coincide with each other.

Further, in the present embodiment, the operation to record information, as the first recording and reading operation, is performed by applying the recording and reading beam 170A from the first optical pickup 90A to the first recording and reading layer group 14 while performing tracking control by applying the tracking beam 270A to the servo layer 18. On the other hand, in the second recording and reading operation, the second optical pickup 90B is controlled in tracking with respect to the second recording and reading layer group 34 by using the beam 270A and the servo layer 18 used in the first recording and reading operation, and the recording and reading beam 170B from the second optical pickup 90B is applied to record information. Therefore, the second optical pickup 90B in the optical recording and reading apparatus 70 can be provided without a tracking optical system, thus enabling simplification of the structure.

In the OPC control in the present embodiment, as described with reference to the flowchart of FIG. 24, if the optimum recording power of the recording and reading beam 170A for recording in the recording and reading layer in the n-th position from the optical recording medium 10 thickness-direction-center side in the first recording and reading layer group 14 is undetermined, determination is made by referring to the memory means 87A as to whether or not the optimum recording power of the recording and reading beam 107B for recording in the recording and reading layer in the n-th position from the center side in the second recording and reading layer group 34 has already been determined by OPC control and, if this optimum recording power has already been determined, this optimum recording power is determined as the optimum recording power of the first recording and reading beam 170A. Only if the optimum recording power of the recording and reading beam 170B with respect to the second recording and reading layer group 34 is undetermined, trial writing to the trial writing area in the n-th recording and reading layer in the first recording and reading layer group 14 is performed with the recording and reading beam 170A to determine the optimum recording power of the recording and reading beam 170A.

Similarly, if the optimum recording power of the recording and reading beam 170B for recording in the recording and reading layer in the m-th position from the optical recording medium 10 thickness-direction-center side in the second recording and reading layer group 34 is undetermined, determination is made by referring to the memory means 87A as to whether or not the optimum recording power of the recording and reading beam 107A for recording in the recording and reading layer in the m-th position from the center side in the first recording and reading layer group 14 has already been determined by OPC control and, if this optimum recording power has already been determined, this optimum recording power is determined as the optimum recording power of the second recording and reading beam 170B. Only if the optimum recording power of the recording and reading beam 170A with respect to the first recording and reading layer group 14 is undetermined, trial writing to the trial writing area in the m-th recording and reading layer in the second recording and reading layer group 34 is performed with the recording and reading beam 170B to determine the optimum recording power of the recording and reading beam 170B.

In the optical recording medium 10, the pair of recording and reading layers having the same ordinal positions from the thickness-direction center (the n-th position, the m-th position) in the groups of layers have recording characteristics approximate to each other because their distances from the first and second surfaces 10A and 30A and the beam paths thereto are in a symmetrical relationship with each other. Therefore, if the optimum recording power for one of the pair of recording and reading layers having the same ordinal positions from the thickness-direction center (the n-th position, the m-th position) in the groups of layers is already determined when the optimum recording powers with respect to the recording and reading layers in the first and second recording and reading layer groups 14 and 34 are individually set, the determined optimum recording power is used as the optimum recording power for the other recording and reading layer. The need for the trial writing is correspondingly reduced, thus largely reducing the OPC time.

Figure 25:
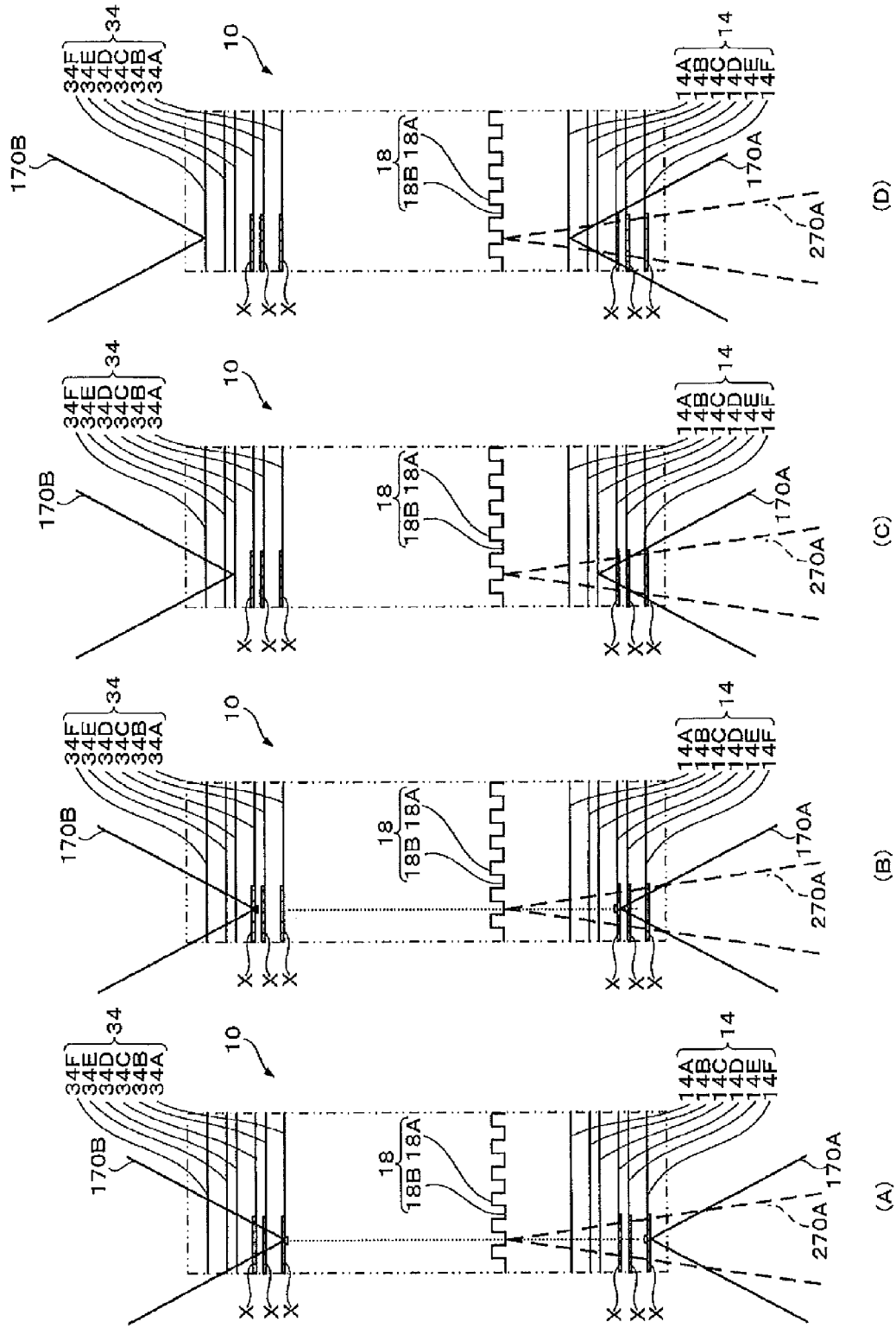
FIGS. 25A to 25D are enlarged sectional views illustrating a procedure for execution of OPC on the optical recording medium according to the optical recording and reading method.

As shown in FIG. 25 in particular, with the progress of recording from the first recording pattern to the fourth recording pattern, the number of kinds of optimum recording power stored in the memory means 87A is increased and, therefore, the need to perform trial writing to the trial writing area X for OPC is reduced, thereby further reducing the OPC time.

Thus, OPC control in the present embodiment is capable of reducing the trial writing area X needed in the first and second recording and reading layer groups 14 and 34 to a half. Accordingly, the size of the trial writing area X can be reduced in comparison with the case where the trial writing areas X are formed in all the recording and reading layers. This effect contributes to an increase in user data area in the first and second recording and reading layer groups 14 and 34.

Further, according to this optical recording and reading method, information can be recorded in the first and second recording and reading layer groups 14 and 34 by using the two independent recording and reading beams 170A and 170B. Therefore, the ranges of movement of the focal points of the recording and reading beams 170A and 170B from the first and second optical pickups 90A and 90B can be separately set in the thickness direction. As a result, a state advantageous against a comatic aberration under a tilt condition, for example, can be established even when the number of recording and reading layers is increased.

Specifically, according to the optical recording and reading method, the recording and reading beam 170A from the first optical pickup 90A used in the first recording and reading operation is caused to enter the optical recording medium 10 through the first surface 10A of the same, while the recording and reading beam 170B from the second optical pickup 90B used in the second recording and reading operation is caused to enter the optical recording medium 10 through the second surface 30A of the same. For example, recording is performed on the first recording and reading layers 14 disposed on one side with respect to the center in the thickness direction of the optical recording medium 10 with the first optical pickup 90A for performing the first recording and reading operation, while recording is performed on the second recording and reading layers 34 disposed on the other side with respect to the center in the thickness direction of the optical recording medium 10 with the second optical pickup 90B for performing the second recording and reading operation. As a result, as in the optical recording medium 10, the first recording and reading layers 14 can be brought closer to the first surface 10A and the second recording and reading layers 34 can be brought closer to the second surface 30A. Therefore, this recording and reading method is advantageous against a comatic aberration under a tilt condition, for example, while the number of recording and reading layers is increased.

In the optical recording medium 10 used in the present embodiment, the first recording and reading layer group 14 and the second recording and reading layer group 34 are disposed in such positions as to be in a symmetrical relationship with each other with respect to the center in the thickness direction of the optical recording medium 10. Therefore, optical designing of the first and second optical pickups 90A and 90B, recognition of the positions of the recording and reading layers, focus control, etc. of the optical recording and reading apparatus 70, can be performed in common ways, so that an increase in recording and reading speed can be achieved. Also, in the optical recording medium 10, internal stresses produced in the first and second recording and reading layer groups 14 and 34 are also in a symmetrical relationship in the thickness direction. This contributes to limiting of warpage of the optical recording medium 10. Even in the L5 recording and reading layers 14F and 34F remotest from the servo layer 18, therefore, deviations in the radial direction cannot be easily caused in forming of recording marks. As a result, in the trial writing area X, an error range to be considered in advance can be set smaller.

Further, according to this optical recording and reading method, the recording and reading beam 170A from the first optical pickup 90A and the recording and reading beam 170B from the second optical pickup 90B are placed at different positions in the circumferential direction on the optical recording medium 10. Even if lights in the beams 170A and 170B pass through the surfaces at the opposite sides, a bad influence of the leakage light on the reproduced waveforms can be avoided. If a large amount of light in the tracking beam 270 applied to the servo layer 18 passes through the servo layer 18, a bad influence can be easily produced on the second optical pickup 90B side. In the optical recording medium 10, therefore, the transmittance of the servo layer 18 to the beam 270A may be set to 10% or less to limit the bad influence of the beam 270A on the second optical pickup 90B side.

In the optical recording medium 10 to which the optical recording and reading method in the present embodiment is applied, the servo layer 18 is formed only on one surface of the support substrate 12, and the first recording and reading layer group 14 and the second recording and reading layer group 34 are disposed on the two surfaces of the support substrate 12. Therefore, the internal stresses caused when the first and second recording and reading layer groups 14 and 34 are formed are dispersed on the opposite sides of the support substrate 12. As a result, warpage and deformation of the optical recording medium 10 can be limited. Dispersing internal stresses in this way enables limiting of warpage of the optical recording medium 10 even when the thickness of the support substrate 12 is set within the range from 100 to 1000 μm.

An attempt to form a concavo-convex pattern for tracking on the opposite sides of the support substrate 12 entails complicating the process of forming the support substrate 12 and increasing the probability of the accuracy of the support substrate 12 being reduced. In the present embodiment, therefore, a concavo-convex pattern for tracking are formed on one side of the support substrate 12 and the production of the support substrate 12 is simplified, thereby improving the accuracy. Even if such a construction using a single servo layer 18 is adopted, sufficiently high accuracy of recording with the optical recording and reading apparatus 70 can be maintained because tracking control of the first and second optical pickups 90A and 90B disposed on the opposite sides is performed by using one beam 270A.

Further, in the optical recording medium 10, the thicknesses of the first buffer layer 17 and the second buffer layer 37 are set substantially equal to each other. As a result, warpage of the support substrate 12 in the process of forming the first and second buffer layers 17 and 37 can be limited. This means that the support substrate 12 can be reduced in thickness or formed of a material of lower rigidity. The space in the thickness direction in which recording and reading layers are formed can be increased by an amount corresponding to the reduction in thickness of the support substrate 12.

In the present embodiment in particular, the first buffer layer 17 and the second buffer layer 37, the first recording and reading layer group 14 and the second recording and reading layer group 34, and the first intermediate layer group 16 and the second intermediate layer group 36 are simultaneously formed on the opposite surfaces when the optical recording medium 10 is made. As a result, internal stresses caused at the time of ultraviolet curing act uniformly on the opposite sides of the support substrate 12, so that warpage of the optical recording medium 10 can be further reduced.

Further, in the optical recording medium 10, the reflectance of the servo layer 18 when the beam 270A with red wavelengths for tracking is applied is set higher than that when the recording and reading beam 170A is experimentally applied to the servo layer 18. More specifically, to realize this, a material that absorbs a larger amount of light if the wavelength of the beam is shorter is selected with respect to the first buffer layer 17. In this way, the amount of light reaching the servo layer 18 (the amount of reflected light from the servo layer 18) can be limited, because even when light in the recording and reading beam 170A in the blue wavelength range is incident on the servo layer 18, it can be easily absorbed by the first buffer layer 17. On the other hand, the tracking beam 270A from the first optical pickup 90A can positively pass through the first buffer layer 17. Therefore the amount of light reaching the servo layer 18 (the amount of reflected light from the servo layer 18) can be increased. As a result, the quality of the reading signal can be improved and stable tracking control can be realized.

In the present embodiment, characteristics of different optical absorptivities to a red wavelength and a blue wavelength are imparted in the first buffer layer 17, so that the servo layer 18 has different reflectances to the tracking beam and the recording and reading beam. However, the present invention is not limited to this. For example, reflecting film itself, formed in the servo layer 18, may be given wavelength selectivity such as to have different reflectances with respect to wavelengths. A filter layer having wavelength selectivity through optical transmittance or absorptance may alternatively be formed in addition to the first buffer layer 17.

In a case where a plurality of servo layers are formed in an optical recording medium as in the conventional arrangement, rules as to which servo layer is used and on which recording and reading layer recording is performed, for example, are complicated and a disorder can occur in recording and reading control. Recording/reading control can be simplified if only the tracking beam 270A from the first optical pickup 90A is applied to one servo layer 18, as in the present embodiment, and if recording is performed on all the layers in the first and second recording and reading layer groups 14 and 34 by using a tracking error signal from the first optical pickup 90A. As a result, the occurrence of recording and reading errors can also be reduced.

Figure 29:
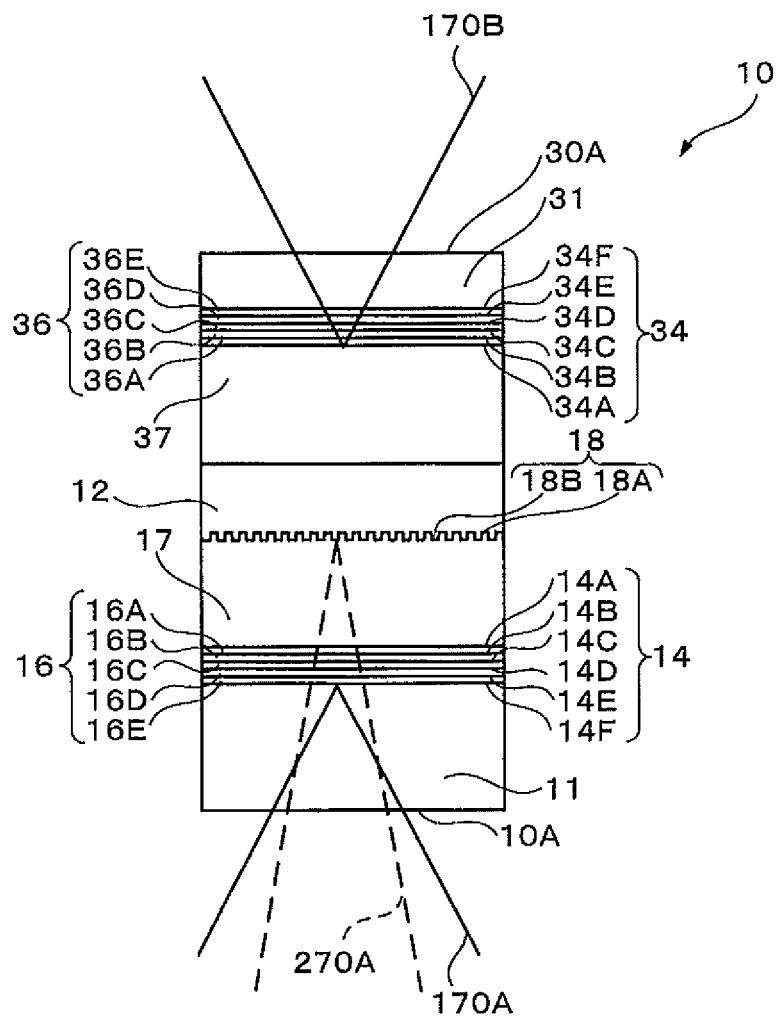
FIG. 29 is a sectional view illustrating another example of the multilayer structure of the optical recording medium to which the optical recording and reading method is applied.

A case where the thicknesses of the first cover layer 11 and the second cover layer 31 in the optical recording medium 10 in the above-described embodiment are set equal to each other has been described by way of example. However, the present invention is not limited to this. For example, it is also preferable that the first cover layer 11 and the second cover layer 31 have different thicknesses, as in an optical recording medium 10 shown in FIG. 29. More specifically, the thickness of the first cover layer 11 is set larger than that of the second cover layer 31 by an amount corresponding to the thickness of the support substrate 12. By this setting, the servo layer 18 is set at the center in the thickness direction of the optical recording medium 10. When this optical recording medium 10 is made, it is preferable that the first cover layer 11 and the second cover layer 31 differing in thickness be formed. Even if these layers are not stacked simultaneously with each other, a certain degree of rigidity is already secured by the support substrate 12, the first and second buffer layers 17 and 37, the first recording and reading layer group 14, the first intermediate layer group 16, the second recording and reading layer group 34 and the second intermediate layer group 36, thereby sufficiently limiting warpage and deformation of the optical recording medium 10.

Figure 30:
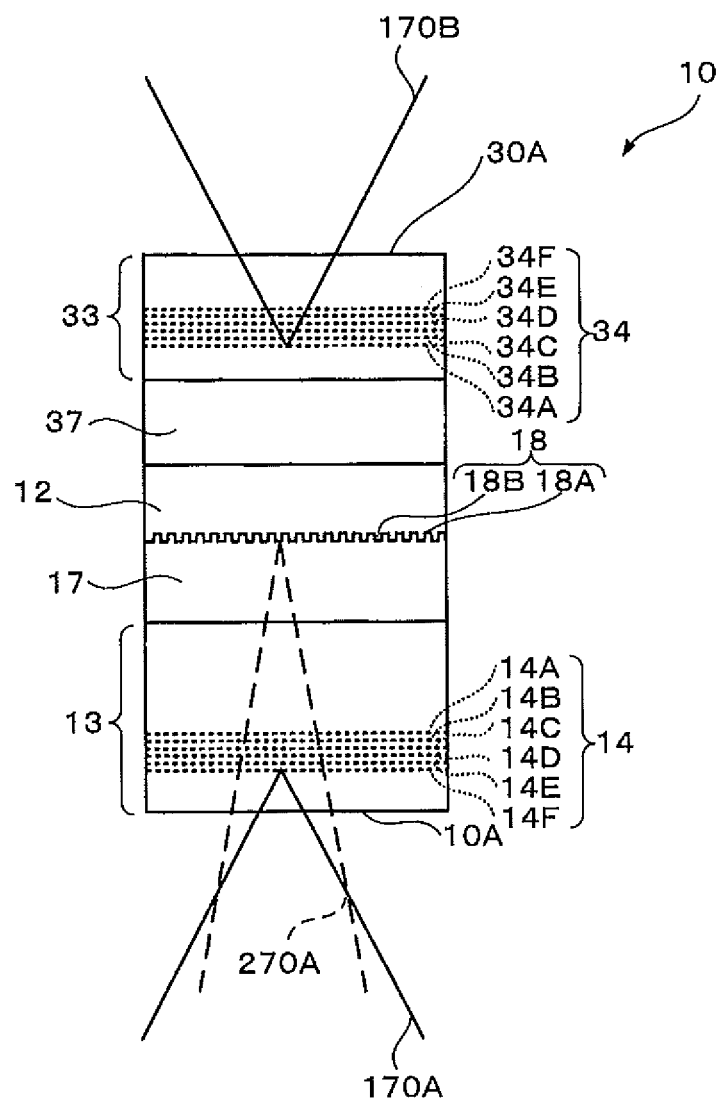
FIG. 30 is a sectional view illustrating still another example of the multilayer structure of the optical recording medium to which the optical recording and reading method is applied.

Further, the embodiment has been described only with respect to a case where recording film is formed in advance as each recording and reading layer in the first and second recording and reading groups 14 and 34. However, the present invention is not limited to this. For example, the whole of regions that can be formed as the first and second recording and reading layer groups afterwards can be formed as first and second bulk layers 13 and 33 having a predetermined thickness, as in an optical recording medium 10 shown in FIG. 30. When the recording beams 170A and 170B are applied to the first and second bulk layers 13 and 33, state changes are caused only in the portions to which the focal points of the beam spots are applied, thereby forming recording marks. That is, the optical recording medium according to the present invention is not limited to ones in which recording and reading layers to which a beam is applied are formed in advance. The optical recording medium according to the present invention includes one in which recording marks are formed in a planar region as occasion arises to form first and second recording and reading layer groups 14 and 34 in multilayer form as sets of the recording marks after the medium is produced. Use of the structure of the bulk layers 13 and 33 in the optical recording medium 10 enables freely setting the positions of recording and reading layers within the regions of the bulk layers 13 and 33. For example, even if the thicknesses and the locations of the first and second bulk layers 13 and 33 are different from each other, the distances between the first and second recording and reading layer groups 14 and 34 and the first and second surfaces 10A and 30A can be set equal to each other. While a structure formed without cover layers when the first and second bulk layers 13 and 33 are used has been described, the buffer layers may also be removed.

Figure 31:
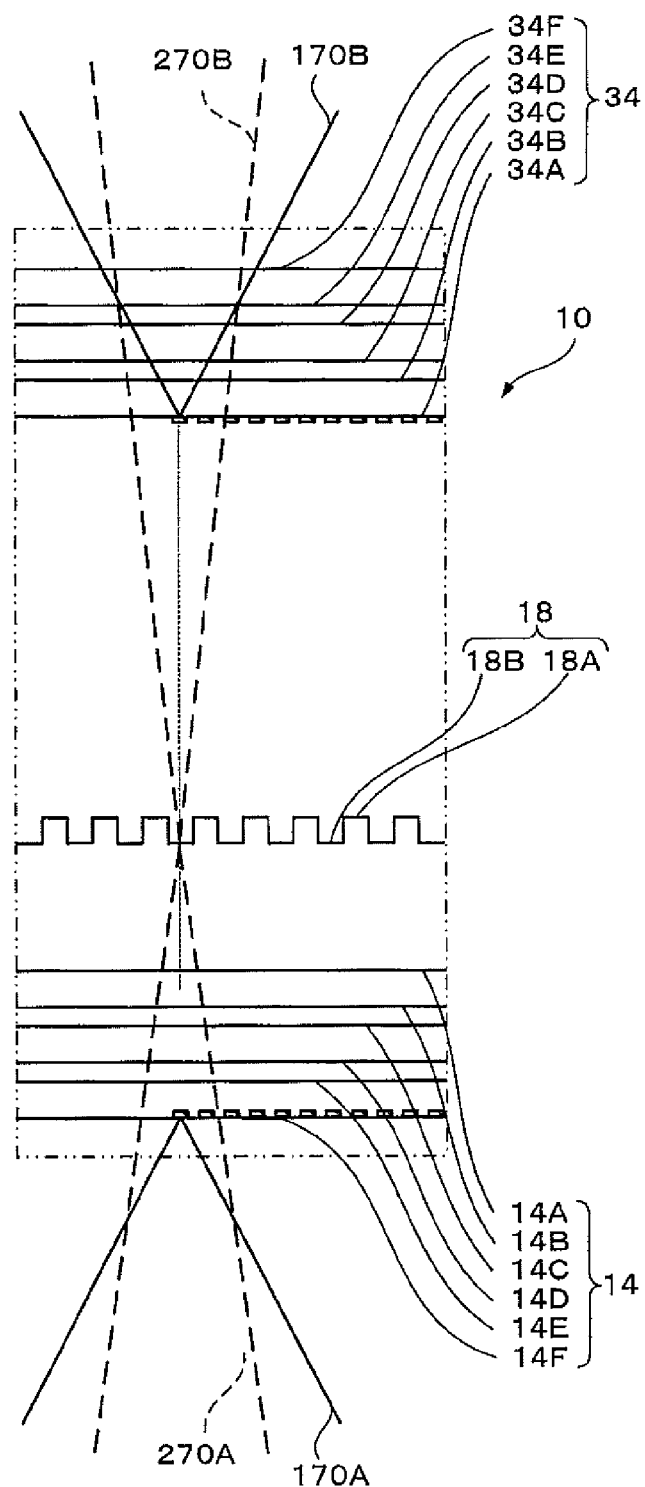
FIG. 31 is a sectional view illustrating a further example of the multilayer structure of the optical recording medium to which the optical recording and reading method is applied.

The present embodiment has been described by way of example with respect to a case where information is recorded by applying the recording and reading beams 170A and 170B to the first and second recording and reading layer groups 14 and 34 while tracking control is being performed by applying the tracking beam 270A from the first optical pickup 90A to the servo layer 18. However, the present invention is not limited to this. For example, an arrangement can also be adopted in which, as shown in FIG. 31, a tracking beam 270B is also provided in the second optical pickup 90B and the first and second optical pickups 90A and 90B are independently controlled in tracking by applying the tracking beams 270A and 270B from opposite sides to the servo layer 18. With this arrangement, simultaneously performing recording in different places in the first and second recording and reading layer groups 14 and 34 is also enabled.

The present embodiment has been described with respect to a case where no concavo-convex pattern for tracking control are formed in the first and second recording and reading layers 14 and 34. However, the present invention is not limited to this. A concavo-convex pattern for tracking may be formed in each of the first and second recording and reading layers 14 and 34.

The present embodiment has been described by way of example with respect to a case where the output control device 86 performs OPC control on the trial writing area to select the optimum recording power and performs control by directly transmitting this recording power to the recording power adjusting means 89. However, the present invention is not limited to this. For example, it is also preferable to correct by addition or multiplication the optimum recording power obtained by OPC control and to transmit the corrected optimum recording power to the recording power adjusting means 89. More specifically, it is preferable to make determination, at the time of determining the recording power for a particular one of the recording and reading layers, as to whether or not information is recorded in another of the recording and reading layers existing closer to the light incident surface side relative to the particular recording and reading layer, and to correct the recording power for the particular recording and reading layer based on this determination. For example, if the transmittance to the recording beam is reduced by recording information in the recording and reading layer on the light incident surface side of the particular recording and reading layer, it is preferable to make a correction such that the optimum recording power at the time of recording information in the particular recording and reading layer. In this way, the recording quality can be further improved.

The present embodiment has been described by way of example with respect to a case where the optimum recording power selected by OPC control is stored in the memory means 87A. However, it is preferable to store this optimum recording power in the memory means 87A together with individual identification information (medium recognition information) of the optical recording medium 10. In this manner, when the optical recording medium 10 is again mounted in the optical recording and reading apparatus 70 after being temporarily taken out of the optical recording and reading apparatus 70, the output control device 86 can read the individual identification information about the optical recording medium 10 again mounted, refer to the memory means 87A and read the optimum recording power in the past. As a result, the OPC control time at the time of changing the optical recording medium 10 can be further shortened. This optimum recording power can also be stored on the optical recording medium 10 side by being recorded in a management area or the like in some of the recording and reading layers of the optical recording medium 10.

The present embodiment has been described with respect to a case where the wavelength of the tracking beam 270A and the wavelength of the recording and reading beams 170A and 170B are respectively in the red and blue wavelength ranges and different from each other. However, the present invention is not limited to this. Beams with wavelengths in the same wavelength range may be used for tracking and recording and reading.

A sixth embodiment of the present invention will be described below with reference to the accompanying drawings. Note that this sixth embodiment differs from the fifth embodiment only in an optical recording and reading method and uses an optical recording medium 10 and an optical recording and reading apparatus 70 that are the same as those described in the fifth embodiment. Therefore, illustration and explanation of structures of the medium 10 and the apparatus 70 will be omitted by referring to FIGS. 19 to 23 for the fifth embodiment.

With the optical recording and reading method according to the sixth embodiment, information is simultaneously recorded to a pair of recording and reading layers that are in a first recording and reading layer group 14 and a second recording and reading layer group 34, respectively, and whose ordinal positions in the layer groups with respect to a center in a thickness direction of the optical recording medium 10 are the same as each other.

<OPC Control>

Figure 32:
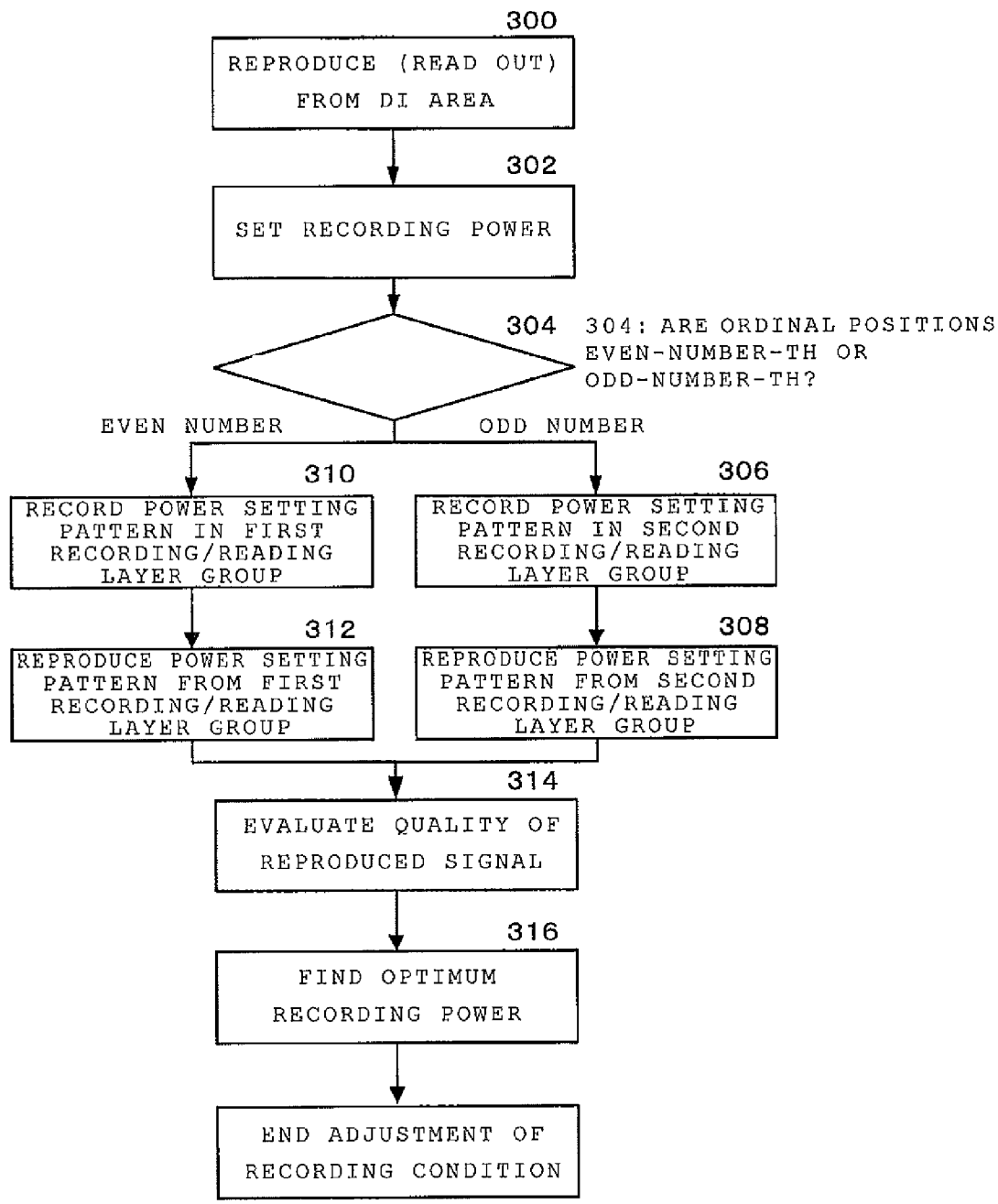
FIG. 32 is a flowchart illustrating a procedure for setting of recording powers by an optical recording and reading apparatus according to a sixth embodiment of the present invention.

When information is recorded to the optical recording medium 10, recording powers of the optical recording and reading apparatus 70 are first set in accordance with a flowchart in FIG. 32.

First, in step 300, an output control device 86 reproduces a DI (disc information) area of the optical recording medium 10, thereby reading basic characteristics information as to the optical recording medium 10. In the DI area, in addition to a type of the medium (a write-once type or a rewritable type), a recording speed (1×, 2×, or the like), a recording strategy, a position of a servo layer 18, positions of recording and reading layers, and inter-layer distances of the recording and reading layers, a recommended recording power $P_K$ of a laser beam is also recorded. Accordingly, the recommended recording power $P_K$ is set as an initial recording condition (step 302). Note that in this embodiment, the ID area is formed on the servo layer 18. Consequently, the information is read from the servo layer 18 with a beam 270A in a red wavelength range of a first optical pickup 90A.

Next, in step 304, it is judged to which recording and reading layers in the first and second recording and reading layer groups 14 and 34 of the optical recording medium 10 information is to be recorded. More specifically, it is judged whether recording and reading layers, which are a pair of recording targets, are layers, whose ordinal positions are the even-number-th when counted from a center side in the thickness direction of the optical recording medium 10, or layers, whose ordinal positions are the odd-number-th when counted from the center side. For instance, when simultaneous recording is to be performed to an L0 recording and reading layer 14A in the first recording and reading layer group 14 and an L0 recording and reading layer 34A in the second recording and reading layer group 34, it is judged that the recording targets are layers whose ordinal positions are the odd-number-th (first position), so the procedure proceeds to step 306. On the other hand, when the simultaneous recording is to be performed to an L1 recording and reading layer 14B in the first recording and reading layer group 14 and an L1 recording and reading layer 34B in the second recording and reading layer group 34, it is judged that the recording targets are layers whose ordinal positions are the even-number-th (second position), so the procedure proceeds to step 310.

Figure 33:
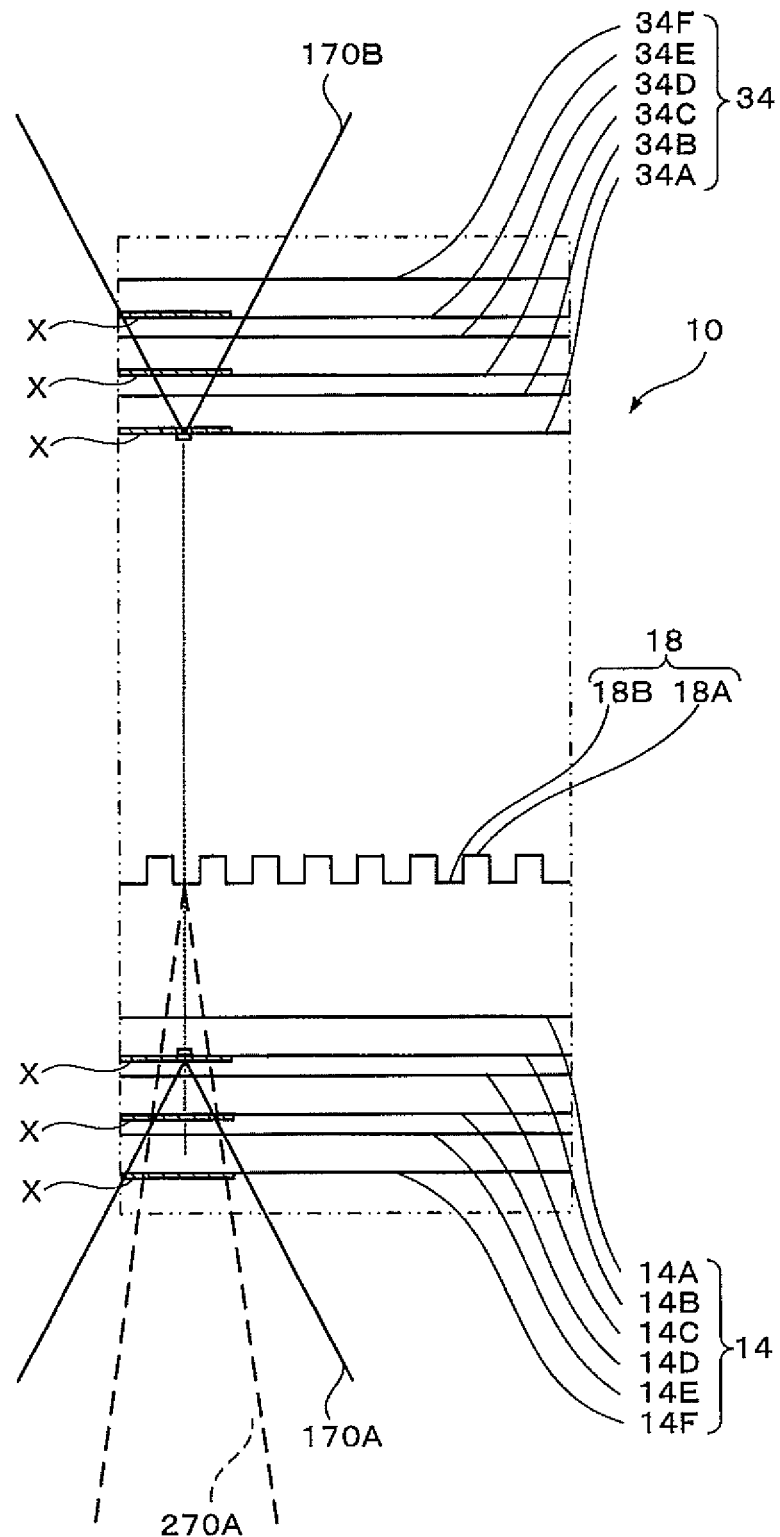
FIG. 33 is an enlarged sectional view illustrating a procedure of execution of OPC with respect to an optical recording medium according to an optical recording and reading method of the sixth embodiment of the present invention.

Here, assuming a case where information is to be simultaneously recorded to the L0 recording and reading layers 14A and 34A whose ordinal positions are the odd-number-th, the procedure proceeds to step 306 where a power setting pattern (random pattern, in this case) is recorded in a trial writing area X of the L0 recording and reading layer 34A in the second recording and reading layer group 34 (see FIG. 33). When doing so, as already described with reference to FIG. 26 in the fifth embodiment, by strengthening and weakening a recording power for actual recording with reference to the recommended recording power $P_K$ in a multi-step manner ($P_{K+1}$, $P_{K+2}$, $P_{K+3}$, $P_{K-1}$, $P_{K-2}$, and $P_{K-3}$), work for writing the power setting pattern is executed for each recording power. Note that a concrete method used to record the power setting pattern in the trial writing area X of the L0 recording and reading layer 34A will be described in detail later in an explanation of a second recording and reading operation, so its explanation will be omitted here.

Following this, in step 308, a not specifically illustrated PRML processing device reproduces the recorded power setting pattern and, in step 314, quality evaluating means 88 evaluates quality of a reading signal using an error rate or SAM value of the reproduced pattern. A result of the evaluation is transmitted to trial writing means 87. In step 316, the trial writing means 87 finds a recording power with which recording having the highest quality was performed, determines recording powers Pw, erasing powers Pe, and bias powers Pb of both of a light source 101A of the first optical pickup 90A and a light source 101B of a second optical pickup 90B with reference to the found recording power, and instructs recording power adjusting means 89 of the determined powers. Through the steps described above, the recording power setting is completed. Note that the recording power adjusting means 89 controls both of the light source 101A of the first optical pickup 90A and the light source 101B of the second optical pickup 90B using the instructed recording powers Pw, erasing powers Pe, and bias powers Pb.

On the other hand, when it is judged in step 304 that the simultaneous recording is to be performed to the L1 recording and reading layers 14B and 34B whose ordinal positions are the even-number-th, the procedure proceeds to step 310 where a power setting pattern (random pattern, in this case) is recorded in a trial writing area X of the L1 recording and reading layer 14B in the first recording and reading layer group 14 (see FIG. 33). Note that a concrete method used to record the power setting pattern in the trial writing area X of the L1 recording and reading layer 14B will be described in detail later in an explanation of a first recording and reading operation, so its explanation will be omitted here.

Then, in step 312, a not specifically illustrated PRML processing device reproduces the recorded power setting pattern. Like in the case of the layers whose ordinal positions are the odd-number-th, in step 314, the quality evaluating means 88 evaluates quality of a reading signal and, in step 316, the trial writing means 87 determines the recording powers Pw, erasing powers Pe, and bias powers Pb of both of the light source 101A of the first optical pickup 90A and the light source 101B of the second optical pickup 90B. In this manner, OPC is completed.

<Simultaneous Recording of Information in First and Second Groups of Recording and Reading Layers>

Figure 34:
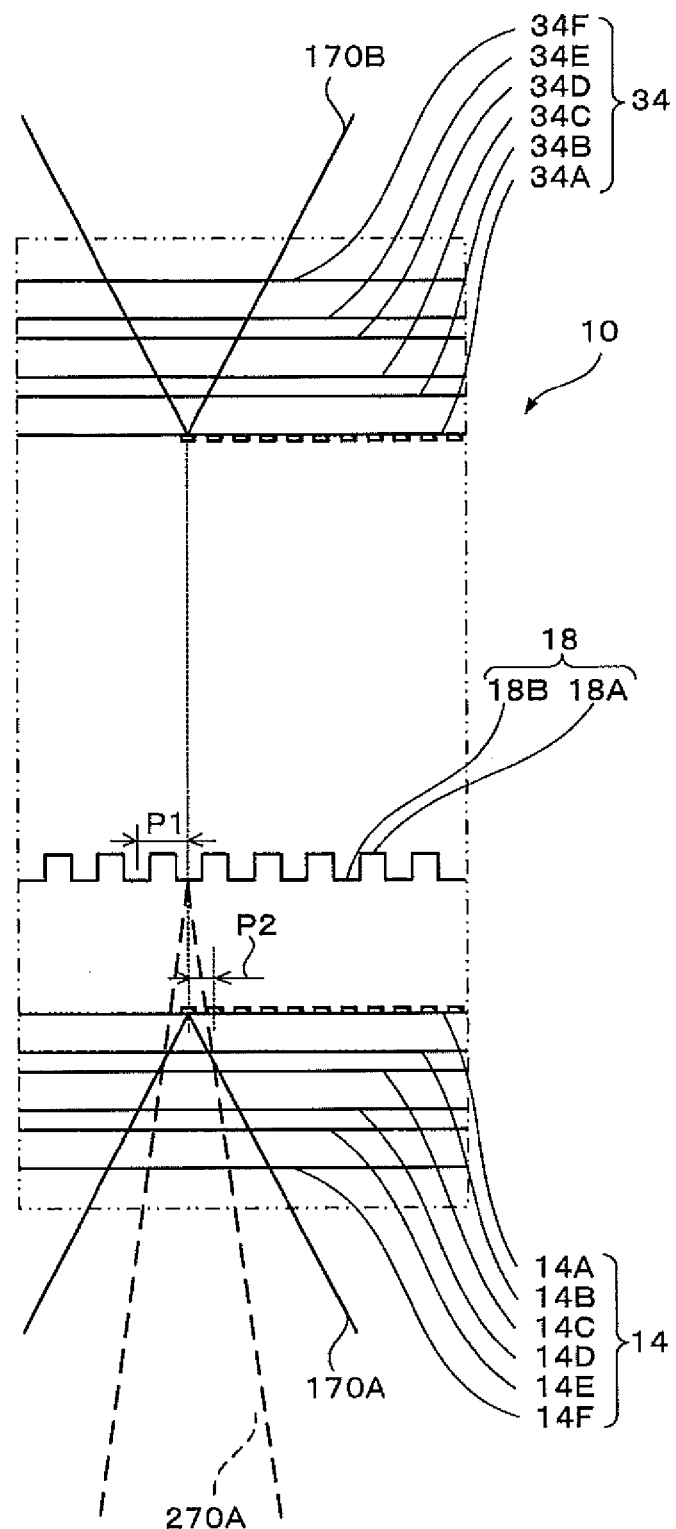
FIG. 34 is an enlarged sectional view illustrating a procedure for recording in the optical recording medium according to the optical recording and reading method.

As already described, in this embodiment, information is simultaneously recorded to or reproduced from recording and reading layers that are in the first recording and reading layer group 14 and the second recording and reading layer group 34, respectively, and whose ordinal positions in the layer groups with respect to the center in the thickness direction of the optical recording medium 10 are the same as each other. More specifically, when recording of information to the L0 recording and reading layer 14A in the first recording and reading layer group 14 is performed as the first recording and reading operation, tracking is first performed by applying the beam 270A in the red wavelength range of a tracking optical system 200A of the first optical pickup 90A to the servo layer 18. More concretely, as shown in FIG. 34, the tracking is performed by applying a spot of the beam 270A to both of grooves 18B and lands 18A of the servo layer 18. Concurrently with the tracking, a recording beam 170A in a blue wavelength range of a recording and reading optical system 100A of the first optical pickup 90A is applied to the L0 recording and reading layer 14A.

As a result, while tracking the grooves 18B and the lands 18A, information is recorded to the L0 recording and reading layer 14A along the grooves 18B and the lands 18A. Consequently, track pitches P2 of recording marks formed on the L0 recording and reading layer 14A become a half of pitches P1 between the grooves 18B.

Also, when recording of information to the L0 recording and reading layer 34A in the second recording and reading layer group 34 is performed as the second recording and reading operation, tracking control of the second optical pickup 90B is performed using a tracking error signal of the tracking optical system 200A of the first optical pickup 90A. As a result, positions of the first optical pickup 90A and the second optical pickup 90B with respect to a tracking direction always coincide with each other. Concurrently with the tracking, a recording beam 170B in the blue wavelength range of a recording and reading optical system 100B of the second optical pickup 90B is applied to the L0 recording and reading layer 34A. As a result, information is recorded to the L0 recording and reading layer 34A. Track pitches P2 of recording marks formed on the L0 recording and reading layer 34A also become a half of the pitches P1 between the grooves of the servo layer 18.

By concurrently carrying out the above-described first recording and reading operation and second recording and reading operation, simultaneous recording of information to the first and second recording and reading layer groups 14 and 34 is achieved.

It should be noted that the recording powers Pw, erasing powers Pe, and bias powers Pb used to perform the simultaneous recording are those set by the OPC control using the L0 recording and reading layer 34A in the second recording and reading layer group 34 in the already described manner.

After recording of necessary information to the L0 recording and reading layer 14A in the first recording and reading layer group 14 and the L0 recording and reading layer 34A in the second recording and reading layer group 34 is completed, additional information as to this recording (address information, content information, and the like concerning the recording) is simultaneously recorded to management areas that are reserved in advance in parts of the L0 recording and reading layers 14A and 34A.

Following this, when the information recording to the L0 recording and reading layers 14A and 34A is resumed, the management areas of the L0 recording and reading layers 14A and 34A are first reproduced to confirm positions, at which the recording was previously ended, and the recording is continued from the positions. In this manner, until information recording to the entire data areas of the L0 recording and reading layers 14A and 34A is completed, the recording work is simultaneously continued.

Figure 35:
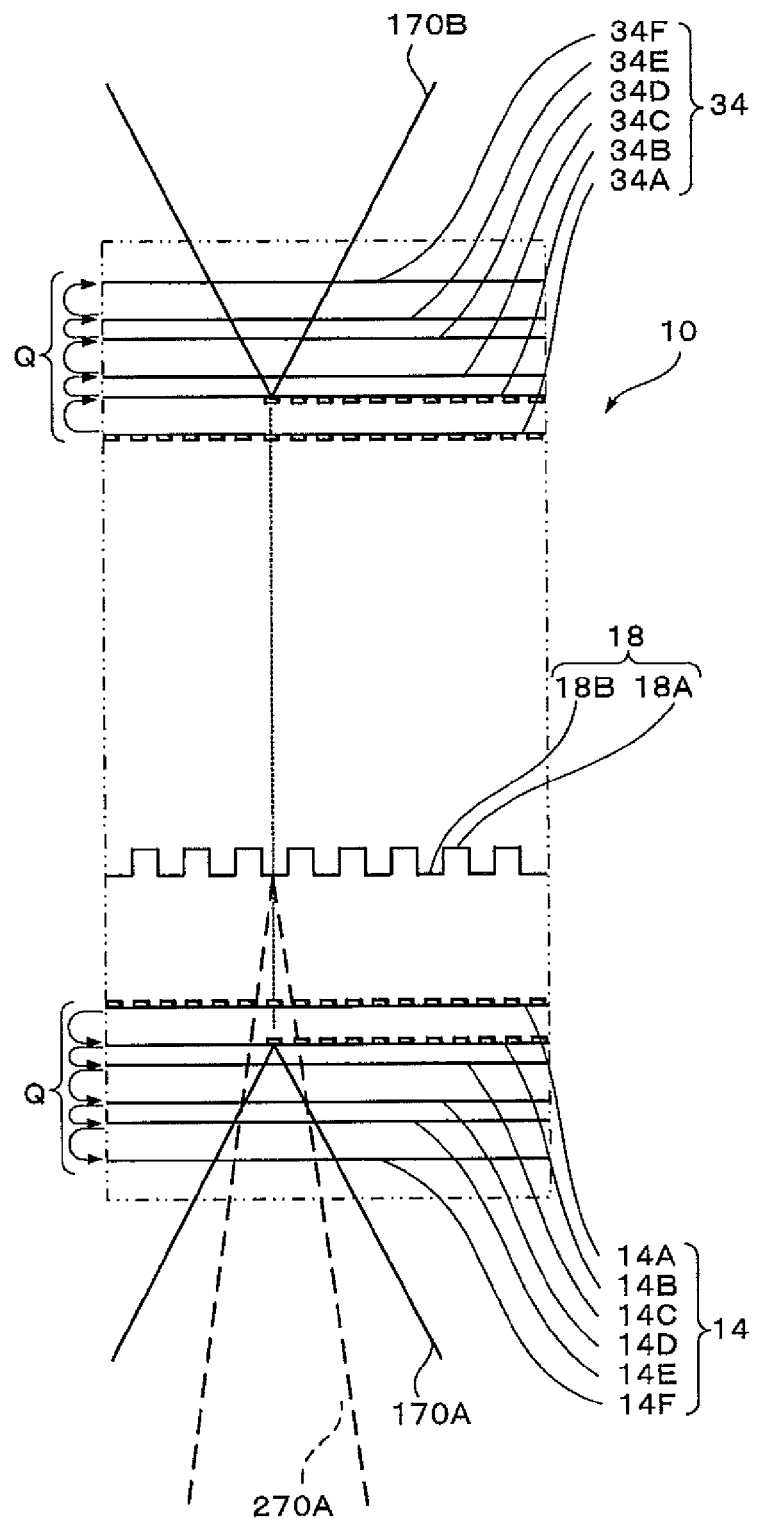
FIG. 35 is an enlarged sectional view illustrating a procedure for recording in the optical recording medium according to the optical recording and reading method.

When the recording to the data areas of the L0 recording and reading layers 14A and 34A is finished, as shown in FIG. 35, recording to data areas of L1 recording and reading layers 14B and 34B adjacent to the L0 recording and reading layers 14A and 34A is started. When doing so, the OPC control is performed using the L1 recording and reading layer 14B in the first recording and reading layer group 14 in the already described manner, thereby setting the recording powers Pw, erasing powers Pe, and bias powers Pb of both of the beams 170A and 170B used to perform the simultaneous recording.

After recording of necessary information to the L1 recording and reading layer 14B is completed, additional information as to this recording (address information, content information, and the like concerning the recording) is recorded in the management area of the L0 recording and reading layer 14A described above. By repeating the recording operation, information is simultaneously recorded to each pair of recording and reading layers that are in the first and second recording and reading layer groups 14 and 34, respectively, and whose ordinal positions in the layer groups with respect to the center side in the thickness direction of the optical recording medium 10 are the same as each other. Note that in this embodiment, a case has been described in which information is recorded by sequentially changing the recording targets from innermost recording and reading layers to outermost recording and reading layers with respect to the thickness direction of the optical recording medium 10 as indicated by arrows Q in FIG. 35, but the recording may be performed in an opposite direction by sequentially changing the recording targets from the outermost recording and reading layers to the innermost recording and reading layers. Also, the recording may be performed by randomly selecting the ordinal positions of the recording and reading layers that are the recording targets.

It should be noted that in this embodiment, a case where the management areas are reserved on the L0 recording and reading layers 14A and 34A has been described as an example but other recording and reading layers may be used instead. Also, when the servo layer 18 includes a recording film, it is preferable that a management area is reserved on the servo layer 18 and additional information is recorded in the area. It is sufficient that this recording is performed using the beam 270A for the tracking control. By collectively recording management information on the servo layer 18, it also becomes possible to simultaneously grasp management information as to both of the first recording and reading layer group 14 and the second recording and reading layer group 34.

Also, no specific example has been described in this embodiment but when information is continuously recorded across the L0 recording and reading layers 14A and 34A and the L1 recording and reading layers 14B and 34B, it is preferable that the OPC control is performed in advance for both of the L0 recording and reading layer 34A, whose ordinal position is the odd-number-th, and the L1 recording and reading layer 14B, whose ordinal position is the even-number-th, and each recording power is set in a memory. By doing so, it becomes possible to maintain continuity of an information transfer rate.

<Simultaneous Reproducing of Information from First and Second Groups of Recording and Reading Layers>

Figure 36:
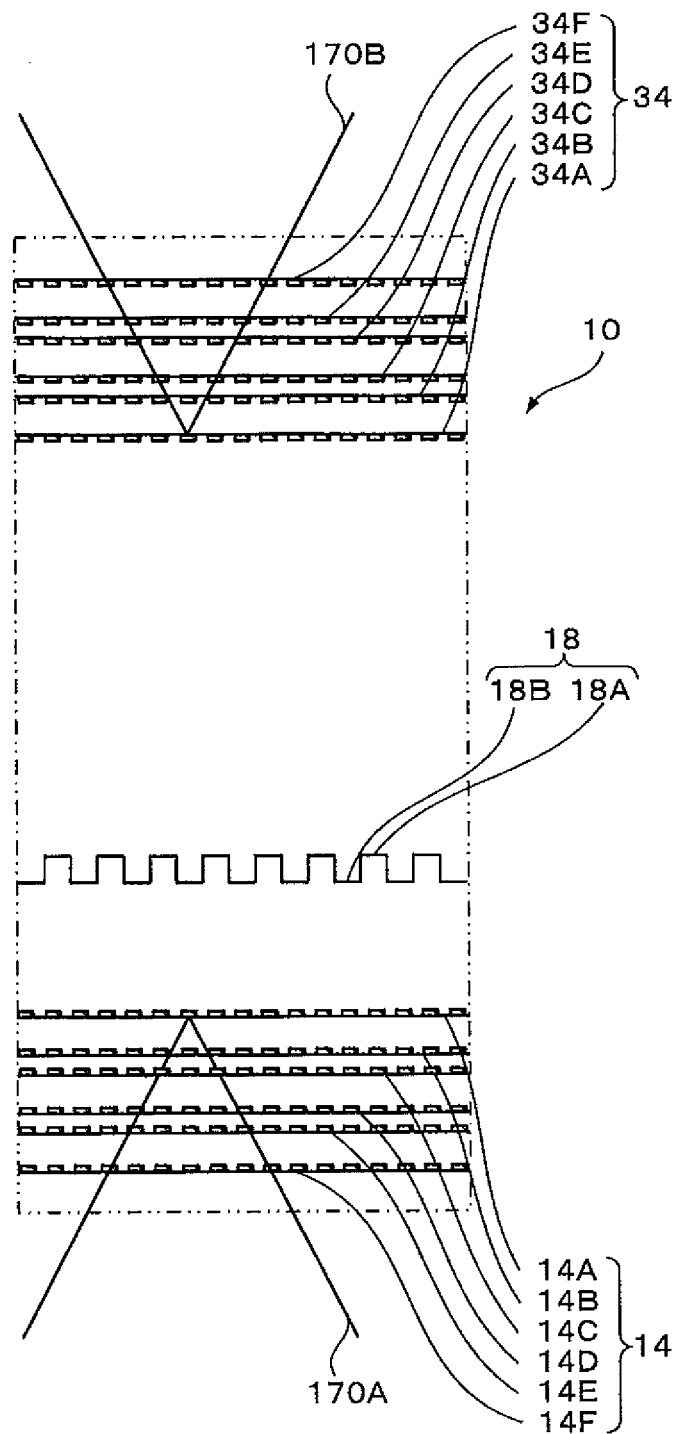
FIG. 36 is an enlarged sectional view illustrating a procedure of reproduction from the optical recording medium according to the optical recording and reading method.

In this embodiment, information simultaneously recorded to the first recording and reading layer group 14 and the second recording and reading layer group 34 is simultaneously reproduced. For instance, as shown in FIG. 36, when reproducing of information from the L0 recording and reading layer 14A in the first recording and reading layer group 14 is performed as a first reproducing operation, the beam 170A of the recording and reading optical system 100A of the first optical pickup 90A is applied to the L0 recording and reading layer 14A, thereby performing the reproducing while performing tracking control and focus control.

Also, when reproducing of information from the L0 recording and reading layer 34A in the second recording and reading layer group 34 is performed as a second reproducing operation, the beam 170B of the recording and reading optical system 100B of the second optical pickup 90B is applied to the L0 recording and reading layer 34A, thereby performing the reproducing while performing tracking control and focus control. By concurrently carrying out the first reproducing operation and the second reproducing operation, simultaneous reproducing of information from the first and second recording and reading layer groups 14 and 34 is achieved. Note that, at the time of recording, tracking control is performed using the servo layer 18 but, on the occasion of simultaneous reproducing, the first and second optical pickups 90A and 90B are tracking-controlled independently of each other using the recording and reading optical systems 100A and 100B, respectively.

With the above-described optical recording and reading method according to the sixth embodiment, by simultaneously executing the first recording and reading operation using the first optical pickup 90A and the second recording and reading operation using the second optical pickup 90B, information is simultaneously recorded to or reproduced from the first and second recording and reading layer groups 14 and 34. As a result, it becomes possible to dramatically enhance a transfer rate at the time of recording or reading.

In particular, with the optical recording and reading method in this embodiment, the first recording and reading layer group 14 and the second recording and reading layer group 34 each include a plurality of recording and reading layers, with the number of the recording and reading layers in the first recording and reading layer group 14 and that in the second recording and reading layer group 34 being set the same as each other, and information is simultaneously recorded to or reproduced from a pair of recording and reading layers whose ordinal positions with respect to the center in the thickness direction of the optical recording medium 10 are the same as each other. By doing so, distances of recording and reading layers, which are a pair of recording and reading targets, from surfaces 10A and 30A of the optical recording medium 10 become closely analogous to each other and optical paths of the beams assume a symmetric state. As a result, for instance, it becomes possible to use a control signal (more specifically, control information concerning tilting, surface runout, and the like of the optical recording medium 10) obtained at the first optical pickup 90A as a control signal for the second optical pickup 90B as it is by reversing a polarity of the information. Consequently, it also becomes possible to omit, from the second optical pickup 90B, a special photodiode mechanism and the like for obtaining the control signal.

Also, in this embodiment, at the time of changing the recording and reading targets to other recording and reading layers, it is sufficient that focuses of the beams 170A and 170B of the first and second optical pickups 90A and 90B are moved symmetrically with reference to the center of the optical recording medium 10. Such control of the beam focuses enables smooth changing to another pair of recording and reading layers whose ordinal positions with respect to the center in the thickness direction of the optical recording medium 10 are the same as each other. As a result, it becomes possible to simplify control of inter-layer jump.

Further, information is simultaneously recorded to a pair of recording and reading layers whose ordinal positions in the first and second recording and reading layer groups 14 and 34 with respect to the center in the thickness direction of the optical recording medium 10 are the same as each other, so recording characteristics to the pair of the recording and reading layers become closely analogous to each other. Accordingly, in this embodiment, when information is simultaneously recorded to a pair of recording and reading layers, the OPC is performed using only one of the recording and reading layers. Consequently, it becomes possible to, as compared with a case where the OPC is performed for both of the first and second recording and reading layer groups 14 and 34, halve a time taken by the OPC.

Still further, in this embodiment, as shown in FIG. 33, when recording is performed to recording and reading layers whose ordinal positions in the first and second recording and reading layer groups 14 and 34 are the even-number-th when counted from the center side of the optical recording medium 10, the OPC is performed using the first recording and reading layer group 14 and when recording is performed to recording and reading layers whose ordinal positions in the first and second recording and reading layer groups 14 and 34 are the odd-number-th when counted from the center side, the OPC is performed using the second recording and reading layer group 34. As a result, the trial writing areas X in the first recording and reading layer group 14 are formed only on recording and reading layers, whose ordinal positions are the even-number-th, and the trial writing areas X in the second recording and reading layer group 34 are formed only on recording and reading layers whose ordinal positions are the odd-number-th. Accordingly, there occurs no overlapping of the trial writing areas X between adjacent recording and reading layers, so occurrence of noise at the time of the OPC is suppressed, which makes it possible to, even when the inter-layer distances of the recording and reading layers are reduced, enhance accuracy of the OPC. Also, the trial writing areas X are not adjacent to each other, so even when there occurs overlapping in a layered direction of random data recorded in the OPC, accuracy of the OPC is hard to deteriorate, which makes it possible to decrease the trial writing areas X. As a result, it becomes possible to increase user data areas of the first and second recording and reading layer groups 14 and 34.

Now, a seventh embodiment of the present invention will be described with reference to the accompanying drawings. In the seventh embodiment, except an optical recording and reading method, the same optical recording medium 10 and optical recording and reading apparatus 70 as those in the fifth embodiment are used. Thus, showing and descriptions of these structures will be fully omitted by referring to FIGS. 19 to 23 of the fifth embodiment.

<Simultaneous Recording of Information in First and Second Groups of Recording and Reading Layers>

Figure 37:
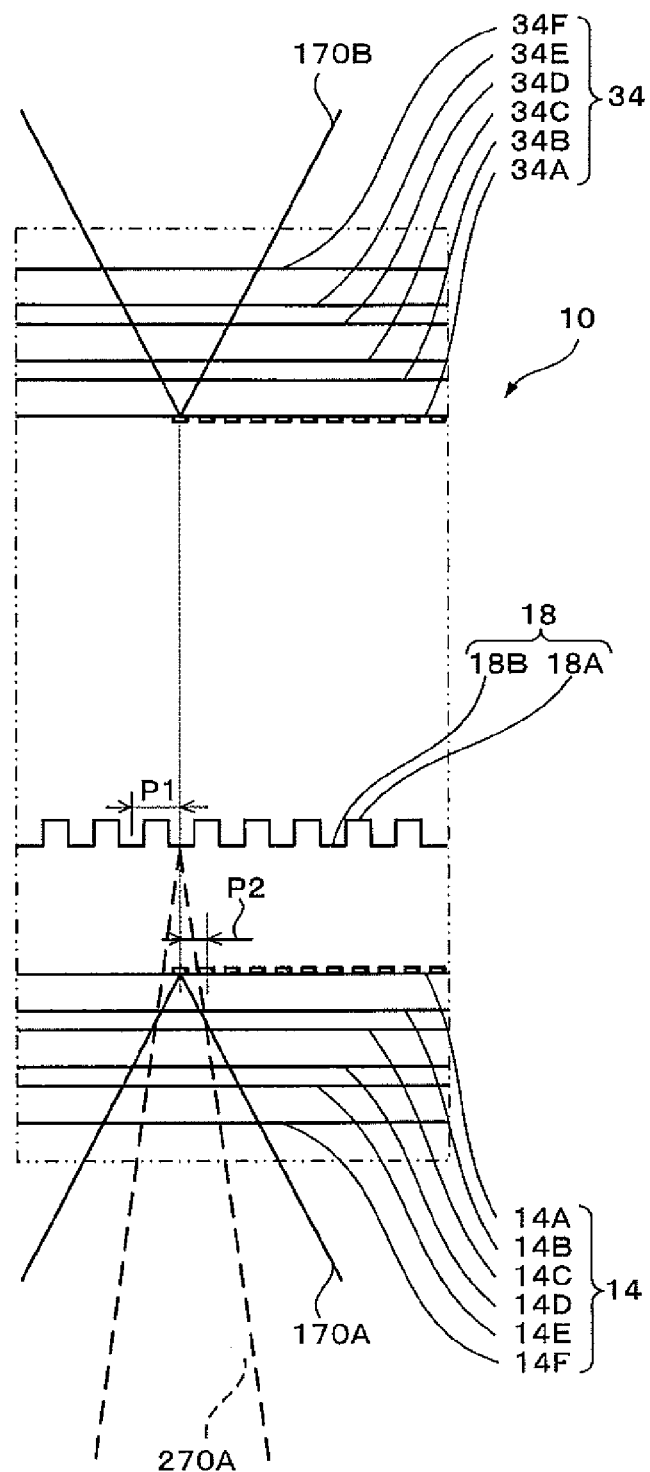
FIG. 37 is an enlarged sectional view illustrating a procedure of recording on an optical recording medium according to an optical recording and reading method of a seventh embodiment of the present invention.

In the seventh embodiment, information is simultaneously recorded on a first group of recording and reading layers 14 and a second group of recording and reading layers 34. Specifically, as a first recording operation, in order to record information on an L0 recording and reading layer 14A of the first group of recording and reading layers 14, a beam 270A in a red wavelength range from a tracking optical system 200A of a first optical pickup 90A is first applied to a servo layer 18 to perform tracking. Specifically, as shown in FIG. 37, a spot of the beam 270A is applied to a groove 18B and a land 18A in the servo layer 18 to perform tracking. Simultaneously with the tracking, a recording beam 170A in a blue wavelength range from a recording and reading optical system 100A of the first optical pickup 90A is applied to the L0 recording and reading layer 14A.

Thus, with both the groove 18B and the land 18A being tracked, information is recorded on the L0 recording and reading layer 14A along the groove 18B and the land 18A. Thus, a track pitch P2 of a recording mark formed on the L0 recording and reading layer 14A is a half of a pitch P1 between the grooves 18B or between the lands 18A.

As a second recording operation, when information is recorded on an L0 recording and reading layer 34A of the second group of recording and reading layers 34, tracking control of a second optical pickup 90B is performed using a tracking error signal from the tracking optical system 200A of the first optical pickup 90A. Thus, the first optical pickup 90A and the second optical pickup 90B are always located in the same position in a tracking direction. Simultaneously with the tracking, a recording beam 170B in a blue wavelength range from a recording and reading optical system 100B of the second optical pickup 90B is applied to the L0 recording and reading layer 34A. Thus, information is recorded on the L0 recording and reading layer 34A. A track pitch P2 of a recording mark formed on the L0 recording and reading layer 34A is also a half of the pitch P1 between the grooves 18B or between the lands 18A in the servo layer 18. The first recording operation and the second recording operation are concurrently advanced to achieve simultaneous recording of information on the first and second groups of recording and reading layers 14 and 34.

On the servo layer 18, information on basic specifications of the optical recording medium 10 or the number of layers of the first groups of recording and reading layers 14 are previously recorded in a recording pit or a BCA (burst cutting area), and is always read by the beam 270A in the red wavelength range before start of the tracking control. Basic information on the optical recording medium includes the position of the servo layer 18, the position of each recording and reading layer, a rule on an inter-layer distance of the group of recording and reading layers.

After necessary information is recorded on the L0 recording and reading layer 14A of the first group of recording and reading layers 14 and the L0 recording and reading layer 34A of the second group of recording and reading layers 34, the current additional information (address information on recording, contents information, or the like) is simultaneously recorded in management areas previously ensured on the L0 recording and reading layers 14A and 34A.

Then, when recording of information on the L0 recording and reading layers 14A and 34A is restarted, the management areas on the L0 recording and reading layers 14A and 34A are first reproduced to check the positions where the previous recording has been completed, and recording is continued from the positions. As such, a recording operation is simultaneously continued until recording of information in all data areas on the L0 recording and reading layers 14A and 34A is completed.

Figure 38:
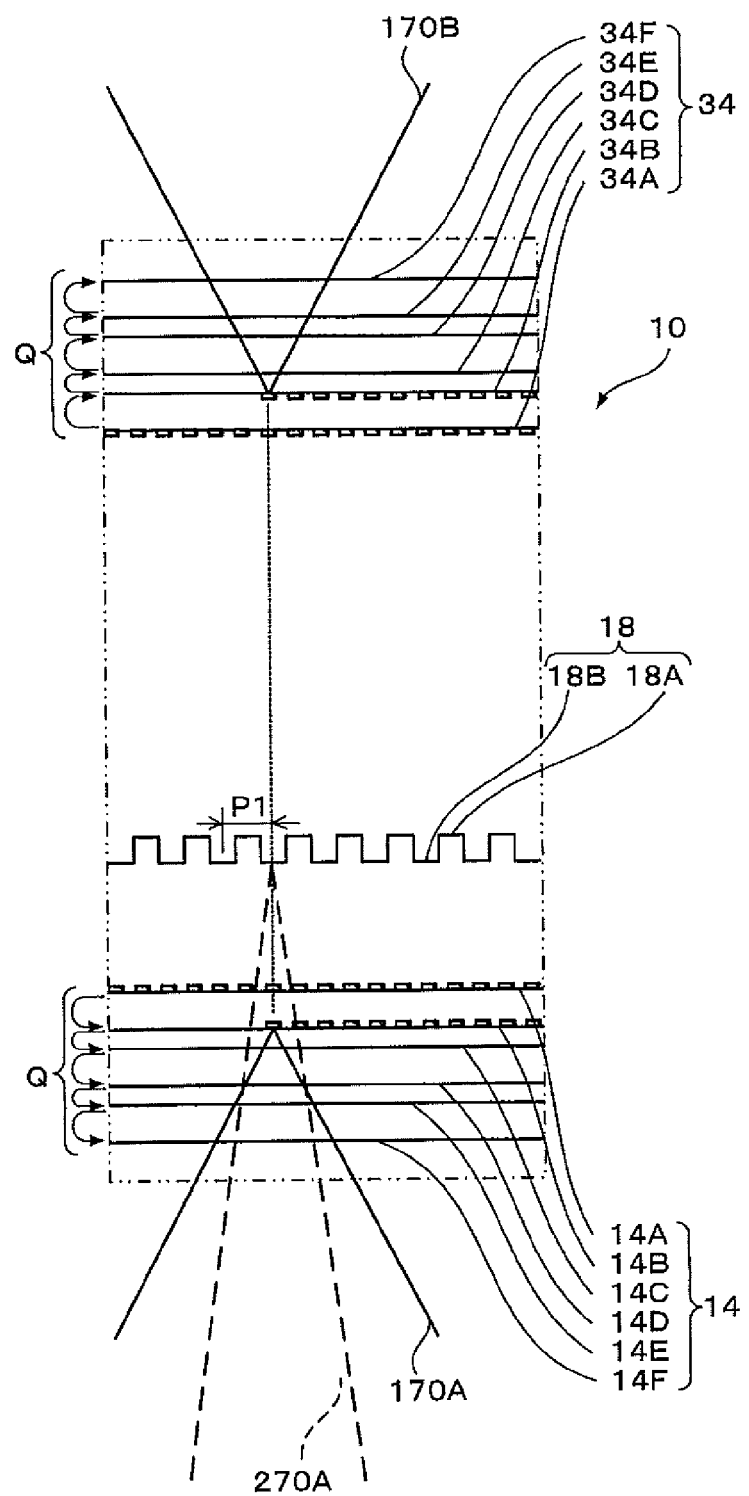
FIG. 38 is an enlarged sectional view illustrating the procedure of recording on the optical recording medium according to the optical recording and reading method.

After recording in the data areas on the L0 recording and reading layers 14A and 34A is completed, as shown in FIG. 38, recording is started in data areas on L1 recording and reading layers 14B and 34B adjacent to the L0 recording and reading layers 14A and 34A. After recording of necessary information on the L1 recording and reading layer 14B is completed, the current additional information (address information on recording, contents information, or the like) is recorded in the management area on the previous L0 recording and reading layer 14A. Such a recording operation is repeated, and thus information is simultaneously recorded on the pair of recording and reading layers in the same ordinal position in the first and second groups of recording and reading layers 14 and 34. In particular, in this embodiment, information is recorded in order from a central side toward an outer side in a thickness direction of the optical recording medium 10 as shown by arrow Q in FIG. 38.

The case where the management areas are ensured in the L0 recording and reading layers 14A and 34A has been exemplified, but another recording and reading layer may be used. In the case where the servo layer 18 includes a recording film, it is preferable that a management area is ensured on the servo layer 18, and additional information is recorded therein. This recording may be performed using the beam 270A performing the tracking control. The management information is concentrated on the servo layer 18, and thus management information on both the first group of recording and reading layers 14 and the second group of recording and reading layers 34 can be simultaneously grasped.

<Simultaneous Reproducing of Information from First and Second Groups of Recording and Reading Layers>

Figure 39:
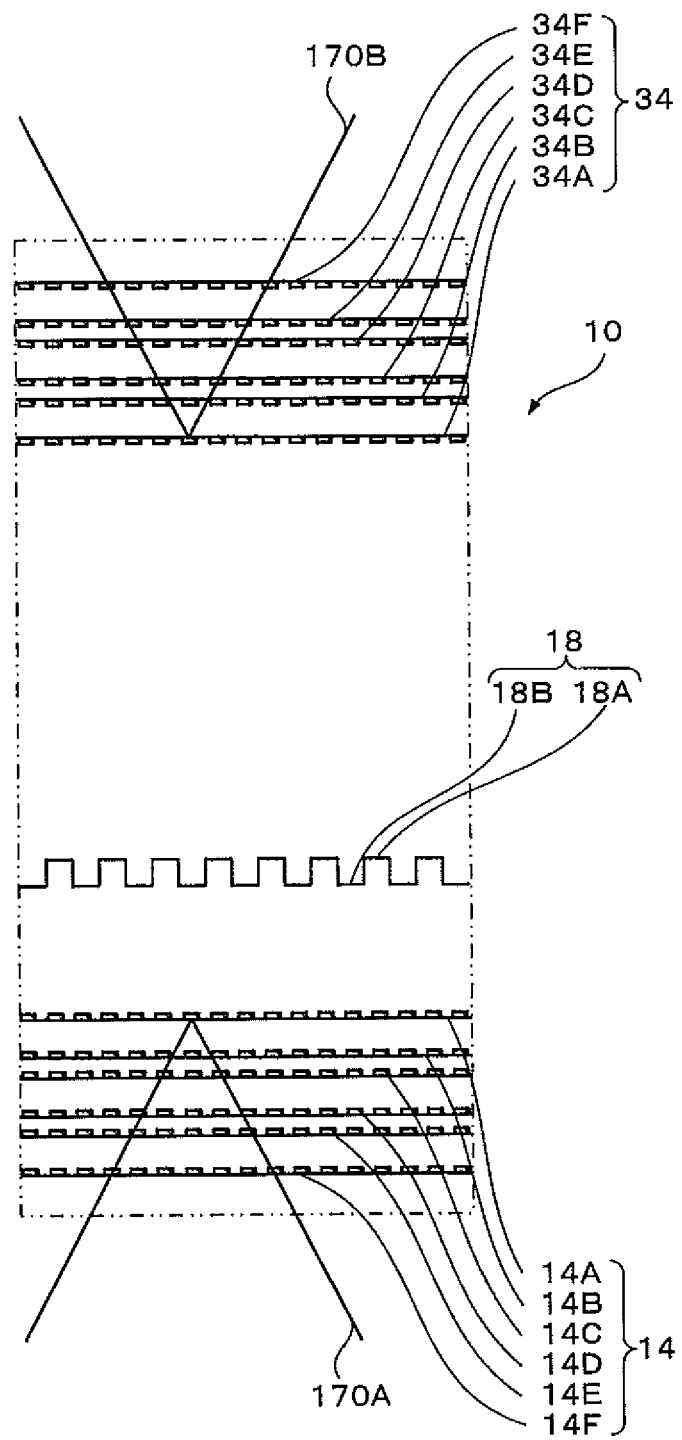
FIG. 39 is an enlarged sectional view illustrating a procedure of reproducing from the optical recording medium according to the optical recording and reading method.

In this embodiment, information simultaneously recorded on the first group of recording and reading layers 14 and the second group of recording and reading layers 34 is simultaneously reproduced. For example, as shown in FIG. 39, as a first reproducing operation, when information on the L0 recording and reading layer 14A of the first group of recording and reading layers 14 is reproduced, the beam 170A from the recording and reading optical system 100A of the first optical pickup 90A is applied to the L0 recording and reading layer 14A to reproduce the information while performing tracking control and focus control.

As a second reproducing operation, when information on the L0 recording and reading layer 34A of the second group of recording and reading layers 34 is reproduced, the beam 170B from the recording and reading optical system 100B of the second optical pickup 90B is applied to the L0 recording and reading layer 34A to reproduce the information while performing tracking control and focus control. The first reproducing operation and the second reproducing operation are concurrently advanced to achieve simultaneous reproducing of the information on the first and second group of recording and reading layers 14 and 34. The tracking control is performed using the servo layer 18 during recording, but tracking control of the first and second optical pickups 90A and 90B is separately performed using the recording and reading optical systems 100A and 100B, respectively, during simultaneous reproducing.

AS described above, according to the optical recording and reading method of this embodiment, while the tracking beam 270A is being applied to the servo layer 18 to perform tracking control, the recording and reading beam 170A of the first optical pickup 90A is applied to the first group of recording and reading layers 14 to record information (first recording operation). Meanwhile, the beam 270A and the servo layer 18 used in the first recording and reading operation are used to perform tracking control of the second optical pickup 90B, and the recording and reading beam 170B of the second optical pickup 90B is applied to the second group of recording and reading layers 34 to record information (second recording operation). Thus, in the second optical pickup 90B in the optical recording and reading apparatus 70, a tracking optical system can be omitted to simplify a structure.

Meanwhile, according to the optical recording and reading method, two independent recording and reading beams 170A and 170B can be used to record information on the first and second groups of recording and reading layers 14 and 34. Thus, a focus movement range of the recording and reading beams 170A and 170B of the first and second optical pickups 90A and 90B can be shared in the thickness direction. Thus, even if the number of recording and reading layers is increased, an effective state for comatic aberration due to a tilt or the like can be brought.

Specifically, in the optical recording and reading method, the recording and reading beam 170A of the first optical pickup 90A used in the first recording operation is incident on the first surface 10A of the optical recording medium 10, and the recording and reading beam 170B of the second optical pickup 90B used in the second recording operation is incident on the second surface 30A of the optical recording medium 10. As a result, for example, in the first optical pickup 90A that performs the first recording operation, recording is performed on the first recording and reading layer 14 placed on one side with reference to the center in the thickness direction of the optical recording medium 10, and in the second optical pickup 90B that performs the second recording operation, recording is performed on the second recording and reading layer 34 placed on the other side with reference to the center in the thickness direction of the optical recording medium 10. Thus, as in the optical recording medium 10, the first recording and reading layer 14 can be brought close to the first surface 10A, and the second group of recording and reading layers 34 can be brought close to the second surface 30A. Therefore, according to this recording and reading method, the number of recording and reading layers can be increased, and further an effective state for comatic aberration due to a tilt or the like can be brought.

In the optical recording medium 10 used in this embodiment, the first group of recording and reading layers 14 and the second group of recording and reading layers 34 are located symmetrically with respect to the center in the thickness direction of the optical recording medium 10. Thus, optical design of the first and second optical pickups 90A and 90B in the optical recording and reading apparatus 70, positional recognition of the recording and reading layer, focus control, or the like can be made uniform to increase a recording and reading speed. Internal stress generated in the first and second groups of recording and reading layers 14 and 34 in the optical recording medium 10 is also symmetrical in the thickness direction, thereby preventing warpage of the optical recording medium 10.

Further, in the optical recording and reading method, the first recording operation using the first optical pickup 90A and the second recording operation using the second optical pickup 90B are simultaneously performed to simultaneously record information on the first and second groups of recording and reading layers 14 and 34, thereby rapidly increasing a transfer rate during recording.

In the optical recording and reading method, the recording and reading beam 170A of the first optical pickup 90A and the recording and reading beam 170B of the second optical pickup 90B are located circumferentially away from each other with respect to the optical recording medium 10. Thus, even if the beams 170A and 170B pass through opposite surfaces, a harmful effect on a reproduction waveform can be avoided. If a large amount of tracking beam 270A applied to the servo layer 18 passes through the servo layer 18, the second optical pickup 90B may receive a harmful effect. Thus, in the optical recording medium 10, transmittance of the beam 270A through the servo layer 18 is set to 10% or less to prevent a harmful effect of the beam 270A on the second optical pickup 90B.

Further, in the optical recording and reading method, a plurality of first groups of recording and reading layers 14 and a plurality of second groups of recording and reading layers 34 are the same in number, and information is simultaneously recorded on recording and reading layers in the same ordinal position from the center in the thickness direction of the optical recording medium 10. Then, for a pair of recording and reading layers as recording targets, distances from the surfaces 10A and 30A of the optical recording medium 10 are approximate, and optical paths of the beams are also symmetrical. Thus, for example, a control signal obtained in the first optical pickup 90A, specifically, control information of a tilt or runout of the optical recording medium 10 can be used as a control signal of the second optical pickup 90B by changing the polarity of the information. As a result, in the second optical pickup 90B, a special photodiode mechanism or the like for obtaining the control signal can be omitted.

For the optical recording and reading method of the embodiment, the case where information is recorded on the first and second groups of recording and reading layers 14 and 34 in layer order from the central side toward the outer side in the thickness direction of the optical recording medium 10 has been exemplified, but the present invention is not limited to this. For example, information may be recorded on the first and second groups of recording and reading layers 14 and 34 in stacking order from the outer side toward the central side of the optical recording medium 10. Also, a pair of recording and reading layers in the same ordinal position may be extracted from the first and second groups of recording and reading layers 14 and 34 at random for recording.

Figure 40:
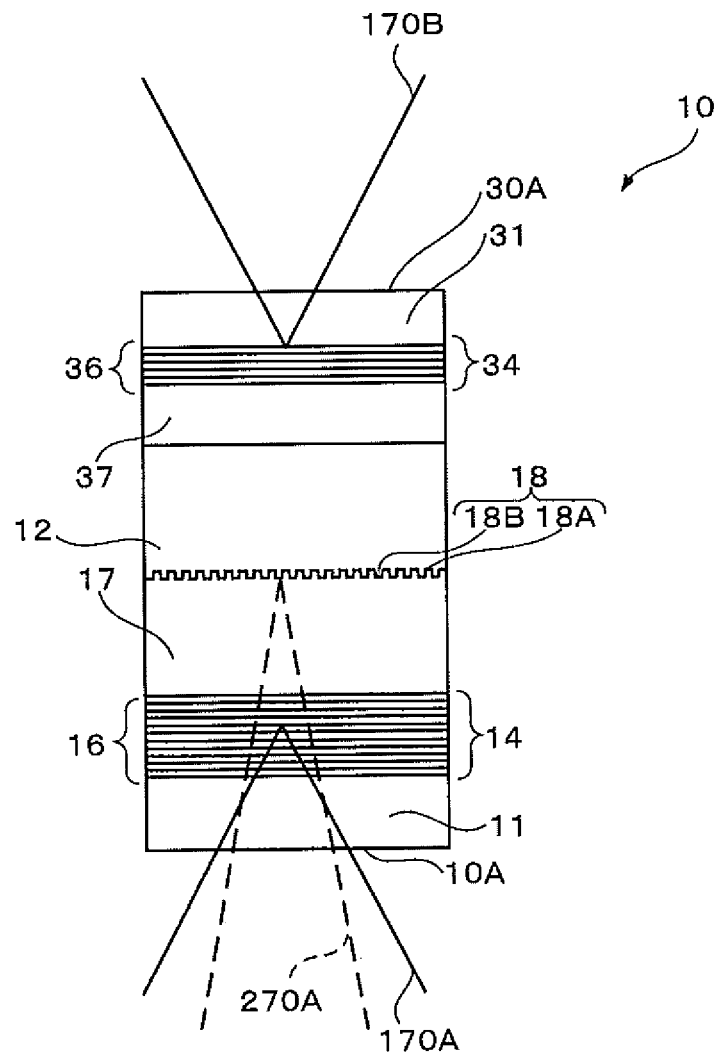
FIG. 40 is a sectional view illustrating another example of a multilayer structure of the optical recording medium to which the optical recording and reading method is applied.

As in the optical recording medium 10 shown in FIG. 40, thicknesses of the first and second buffer layers 17 and 37 may be changed, or inter-layer distances or the numbers of layers of the first and second group of recording and reading layers 14 and 34 may be changed to locate the servo layer 18 at the center in the thickness direction.

Figure 41:
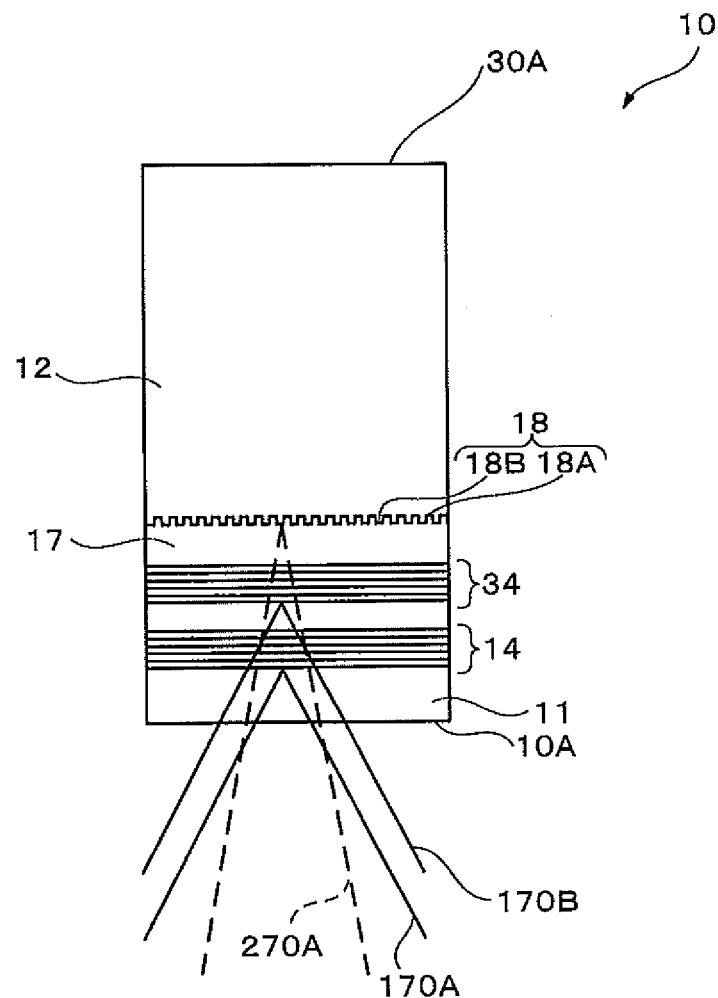
FIG. 41 is a sectional view illustrating another example of a recording procedure of the optical recording and reading method and another example of the optical recording medium.

Further in this embodiment, the case where the first group of recording and reading layers 14 and the second group of recording and reading layers 34 are placed on the sides of the opposite surfaces 10A and 30A of the optical recording medium 10 has been described, but the present invention is not limited to this. For example, as shown in FIG. 41, both the first group of recording and reading layers 14 and the second group of recording and reading layers 34 may be placed with divided regions in the thickness direction on the side of one surface 10A of the optical recording medium 10. In this case, recording and reading is performed on the first group of recording and reading layers 14 using the beam 170A of the first optical pickup 90A, and recording and reading is performed on the second group of recording and reading layers 34 using the beam 170B of the second optical pickup 90B. Tracking control of the first optical pickup 90A and the second optical pickup 90B are performed by applying the common beam 270A to the servo layer 18. The recording and reading layers are shared by the plurality of recording and reading beams 170A and 170B, thereby reducing influences of comatic aberration due to an error in film formation or a tilt, and increasing the number of recording and reading layers. Also in this case, the servo layer 18 may be placed between the first group of recording and reading layers 14 and the second group of recording and reading layers 34.

Figure 42A:
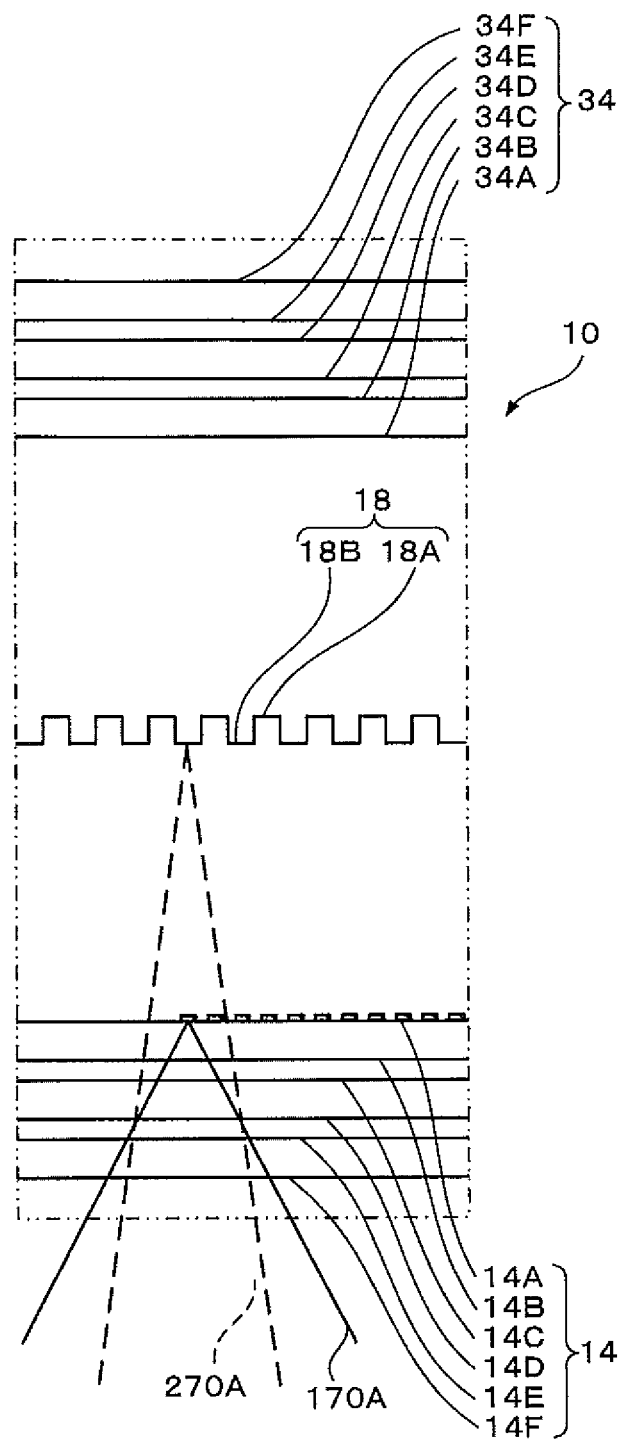
FIG. 42A is an enlarged sectional view illustrating another example of a recording procedure on an optical recording medium according to the optical recording and reading method.
Figure 42B:
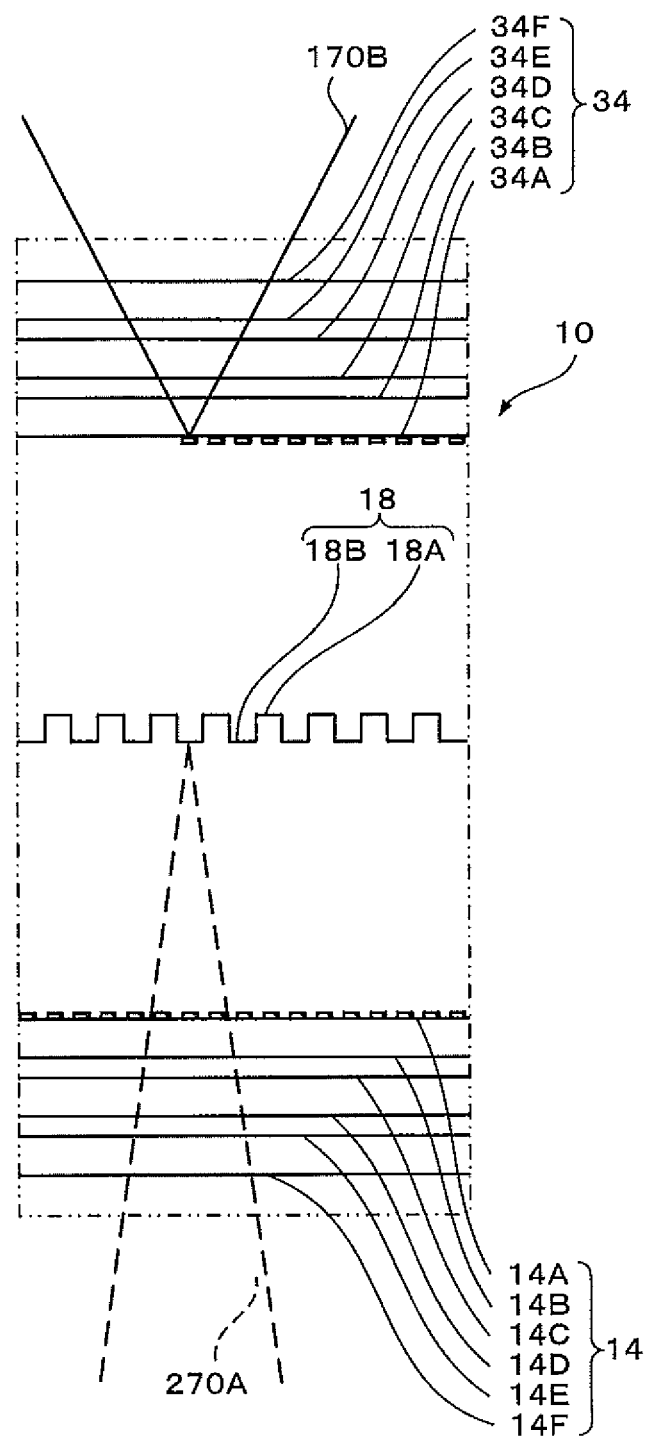
FIG. 42B is an enlarged sectional view illustrating the recording procedure on an optical recording medium according to the optical recording and reading method.

In this embodiment, the case where information is simultaneously recorded on the pair of recording and reading layers using the first and second optical pickups 90A and 90B has been exemplified, but the present invention is not limited to this. For example, when information is recorded on the first group of recording and reading layers 14 using the recording and reading beam 170A with the tracking beam 270A being applied to the servo layer 18 as in the first recording operation shown in FIG. 42A, the beam 170B of the second optical pickup 90B may be stopped. When information is recorded on the second group of recording and reading layers 34 using the beam 170B of the second optical pickup 90B as in the second recording operation shown in FIG. 42B, only the tracking beam 270A of the first optical pickup may be applied to the servo layer 18 to perform tracking control, and the recording and reading beam 170A may be stopped. This reduces the transfer rate during recording and reading, but eliminates the need for information management for simultaneous recording/simultaneous reproducing, thereby simplifying an information control program for recording and reading.

Now, an eighth embodiment of the present invention will be described with reference to the accompanying drawings.

Figure 43:
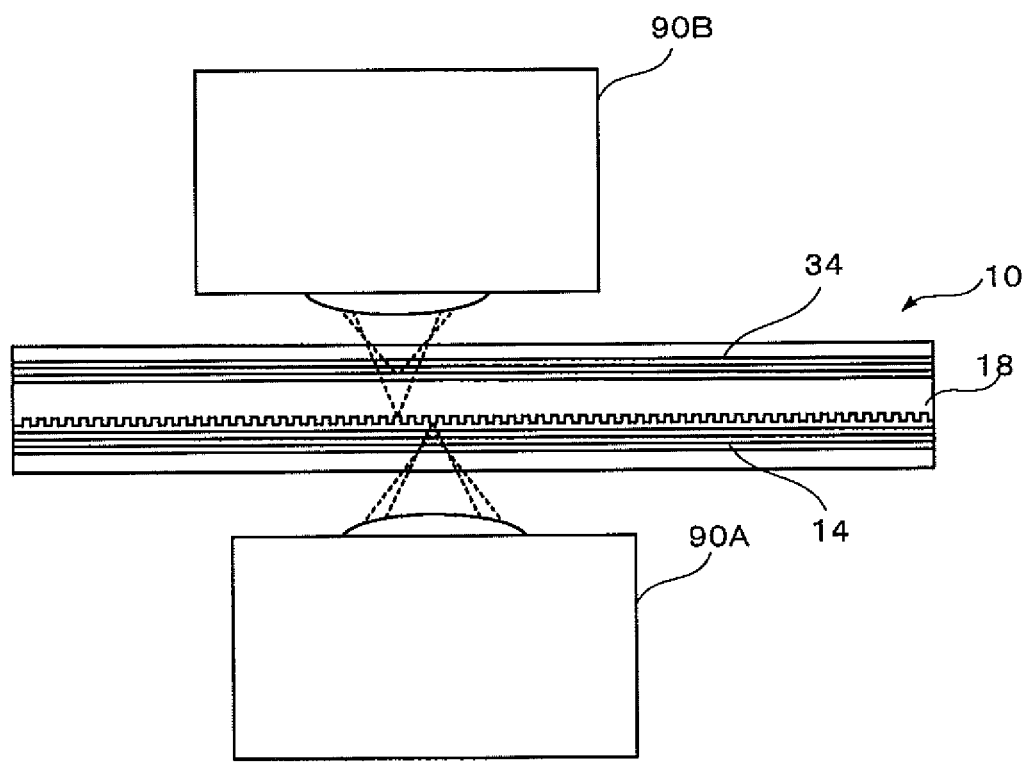
FIG. 43 is a block diagram illustrating an overall configuration of an optical pickup that provides optical recording and reading on an optical recording medium according to an eighth embodiment of the present invention.
Figure 44:
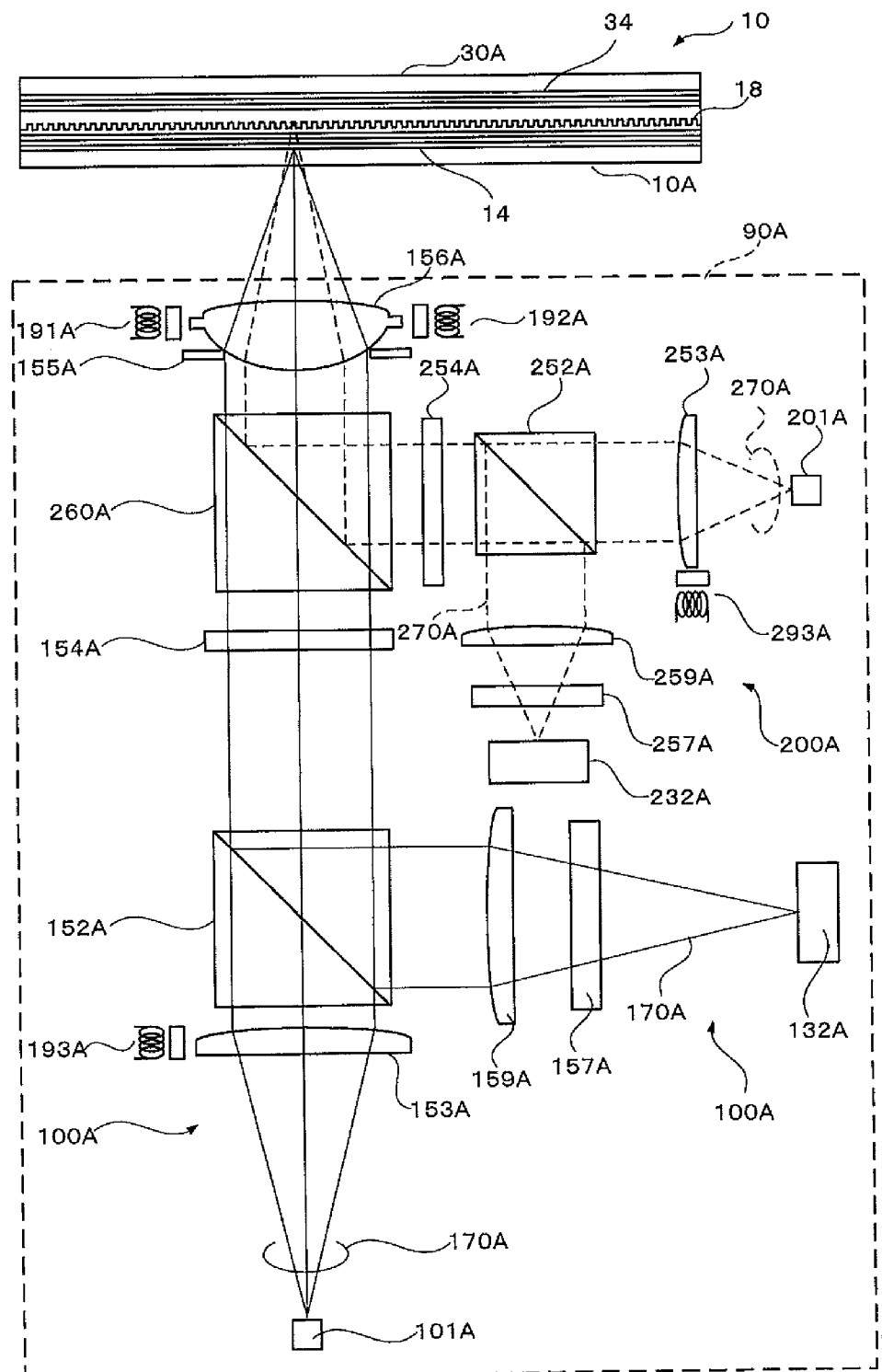
FIG. 44 is a block diagram illustrating an internal configuration example of the optical pickup.
Figure 45:
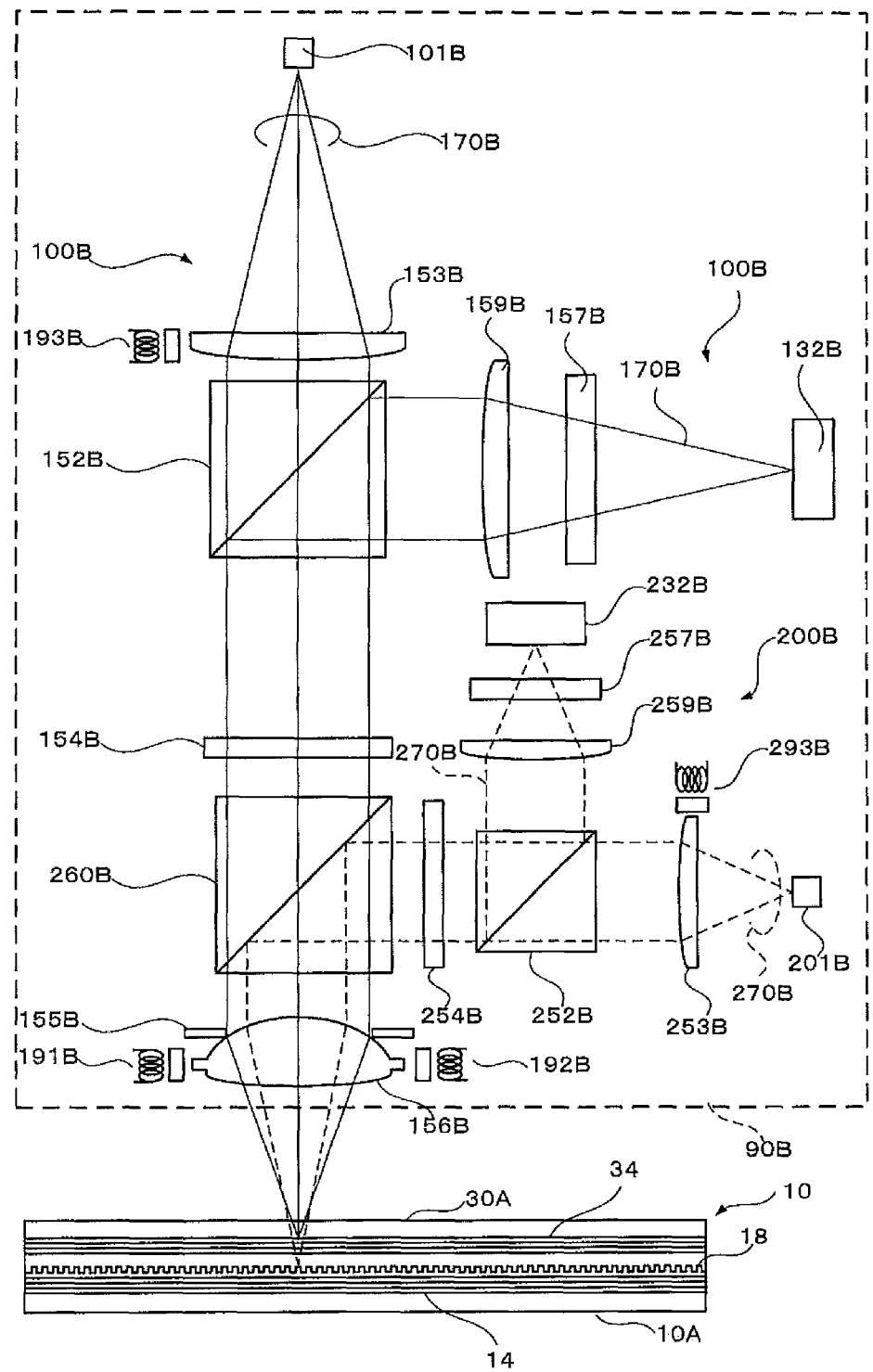
FIG. 45 is a block diagram illustrating another internal configuration example of the optical pickup.
Figure 46:
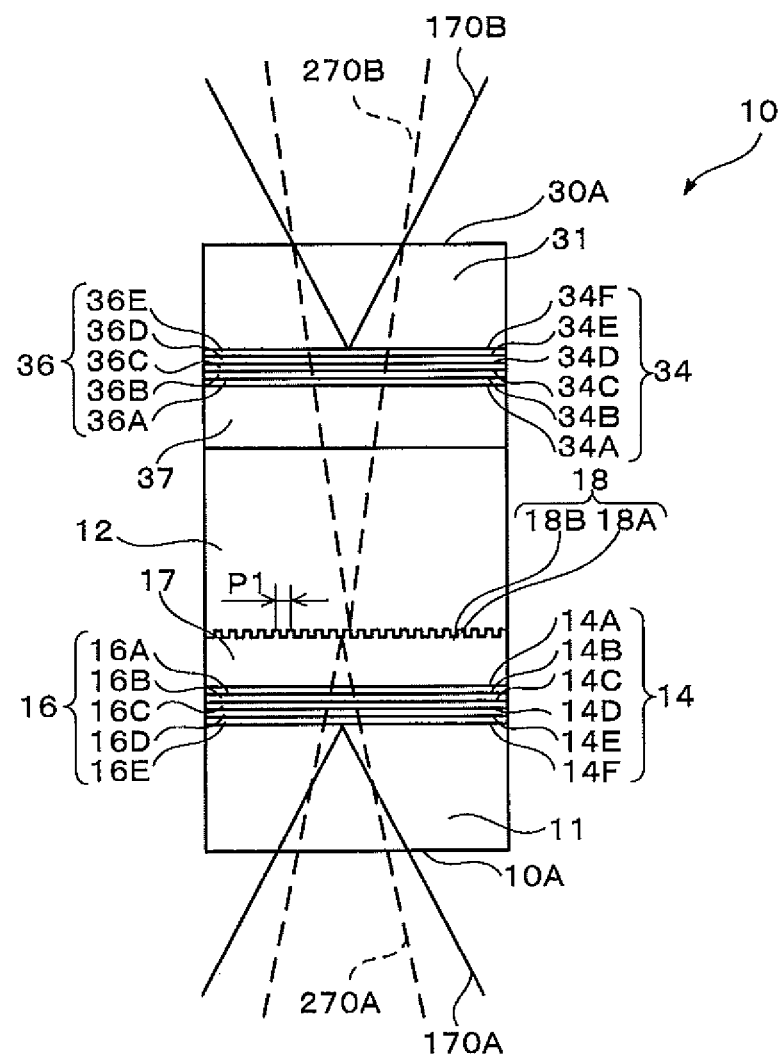
FIG. 46 is a sectional view illustrating a multilayer structure of the optical recording medium.

FIGS. 43 to 45 illustrate configurations of an optical recording medium 10, and first and second optical pickups 90A and 90B used for the recording and reading of the optical recording medium 10 according to the eighth embodiment. The first optical pickup 90A applies a beam to a first surface 10A that is one side of the optical recording medium 10. The second optical pickup 90B applies a beam to a second surface 30A that is the other side of the optical recording medium 10. It should be noted that unlike the fifth embodiment, internal configurations of the first and second optical pickups 90A and 90B are substantially the same. That is, as illustrated in FIG. 3, the second optical pickup 90B also includes a tracking optical system 200B. Thus, in the following drawings and description, A is added to each end of reference numerals of components in the first optical pickup 90A, B is added to each end of reference numerals of components in the second optical pickup 90B, and the other components are denoted by the same reference numerals. Also, because main members of the first and second optical pickups 90A and 90B are similar or identical to those of the first optical pickup 90 as shown in the fifth embodiment, an illustration and a description thereof will be omitted and respects different from the fifth embodiment will be mainly described.

In the eighth embodiment, when information is recorded on the first group of recording and reading layers 14 using the recording and reading optical system 100A, as illustrated in FIG. 44, a TE signal of the tracking optical system 200A is amplified to a desired level and phase compensated, thereafter being fed to the actuators 191A and 192A to perform tracking control. As a result, the recording and reading optical system 100A records information on the first group of recording and reading layers 14 on the basis of the tracking control of the tracking optical system 200A. In the present embodiment, when information recorded on the first group of recording and reading layers 14 is reproduced, tracking control of the recording and reading optical system 100A is independently performed using recording marks on the first group of recording and reading layers 14. Of course, the information may also be reproduced by using tracking control of the tracking optical system 200A.

Recording/reading on the second group of recording and reading layers 34 is performed in the second optical pickup 90B. As illustrated in FIG. 45, when information is recorded on the second group of recording and reading layers 34 using the recording and reading optical system 100B in the second optical pickup, TE signals obtained by applying the tracking optical system 200B to the servo layer 18 are used. Using the TE signals, information is recorded on the second group of recording and reading layers 34 while tracking control of the recording and reading optical system 100B is being performed.

Therefore, the servo layer 18 of the optical recording medium 10 is used by both the first and second optical pickups 90A and 90B for the purpose of tracking. As a result, the pitch P1 (around 0.64 μm) between the lands 18A or between the grooves 18B of the servo layer 18 is a length that allows sufficient tracking with the beams 270A and 270B in a relatively long red wavelength range from the first and second optical pickups 90A and 90B. As a result, the beam 270A of the tracking optical system 200A in the first optical pickup 90A and the beam 270B of the tracking optical system 200B in the second optical pickup 90B are guided by the servo layer 18.

It is noted that a second buffer layer 37 formed at the side of the second surface 30A in the support substrate 12 of the optical recording medium 10 is composed of optically transparent acrylic ultraviolet curable resin and has a film thickness set at 238 μm. Also, a refractive index of a second buffer layer 37 in a wavelength condition of the tracking beam 270B is set at a lower refractive index than that of the support substrate 12 in the same wavelength. As such, the tracking beam 270B incident from the second buffer layer 37 is allowed to smoothly reach the servo layer 18 through the support substrate 12. In the present embodiment, a refractive index of the first buffer layer 17 in a wavelength condition of the tracking beam 270A is set at a lower refractive index than that of the support substrate 12 in the same wavelength. As such, materials of the second buffer layer 37 and the first buffer layer 17 can be made uniform and deposition processes can also be made uniform.

Further, a material selected for the first and second buffer layers 17 and 37 has a larger amount of absorbed light with the shortness of a beam wavelength. As such, an amount of absorbed light of the beams 170A and 170B in the blue wavelength is large, and an amount of absorbed light of the beams 270A and 270B in the red wavelength is small. As a result, since the first and second buffer layers 17 and 37 can reduce an amount of light of the beams 170A and 170B in the blue wavelength that reach the servo layer 18, signal noises can be reduced at the time of reproduction. Also, the first and second buffer layers 17 and 37 actively transmit the beams 270A and 270B in the red wavelength to increase an amount of light of tracking signals.

Next, an optical recording and reading method according to the eighth embodiment will be described.

Figure 47A:
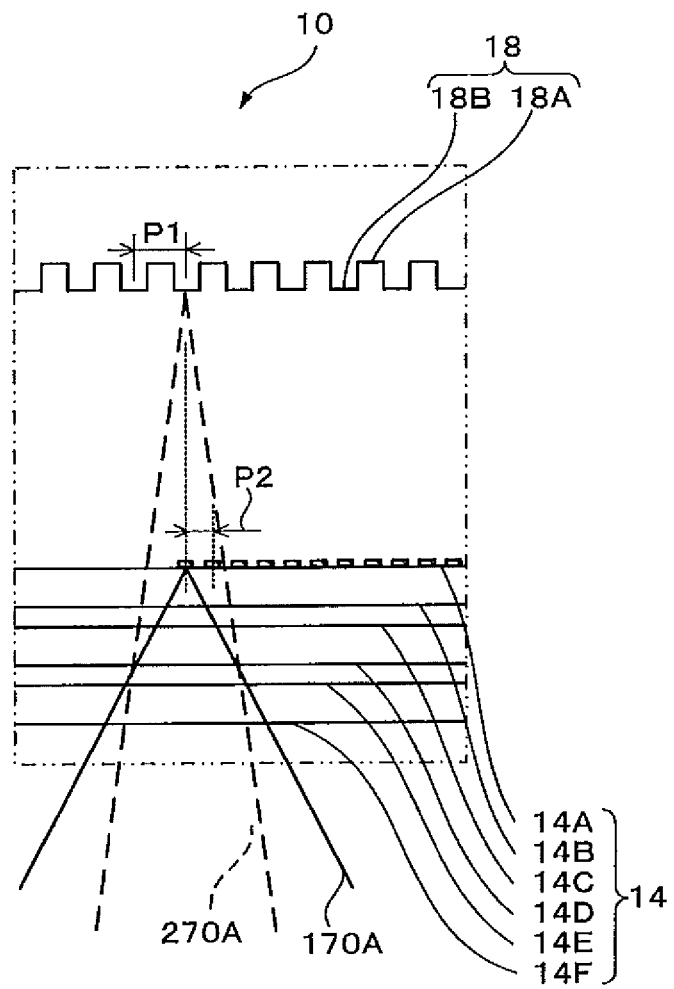
FIG. 47A is an enlarged sectional view illustrating a recording procedure on the optical recording medium by an optical recording and reading method.
Figure 47B:
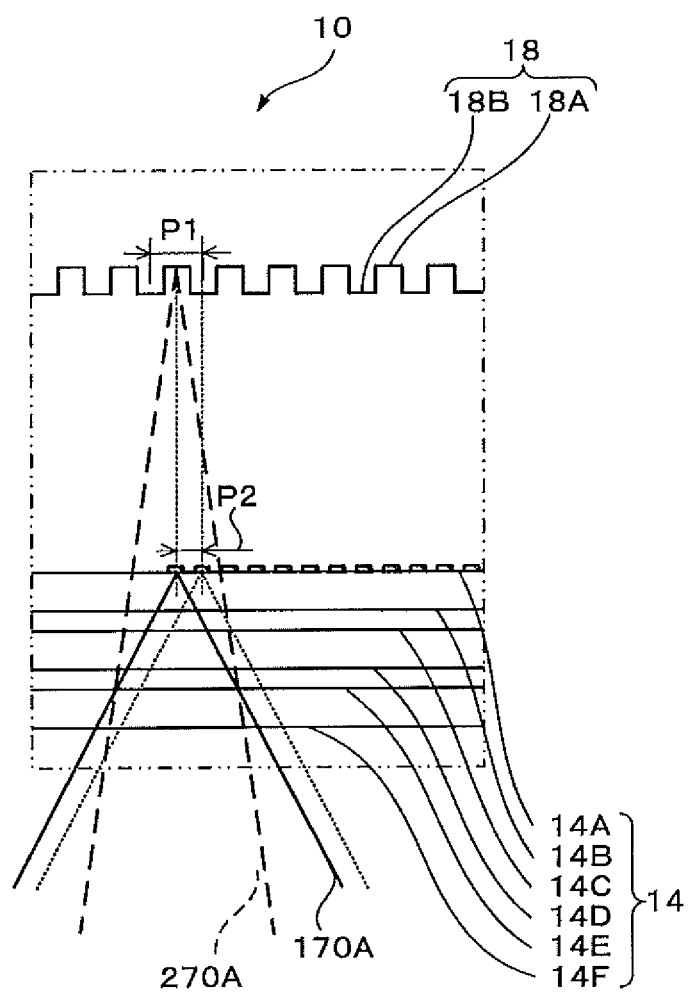
FIG. 47B is an enlarged sectional view illustrating the recording procedure on the optical recording medium by the optical recording and reading method.

When information is recorded on the L0 recording and reading layer 14A in the first group of recording and reading layers 14 adjacent to the servo layer 18 of the support substrate 12, first, the beam 270A, in the red wavelength range, of the tracking optical system 200A in the first optical pickup 90A is applied to the servo layer 18 to perform tracking. Specifically, as illustrated in FIGS. 47A and 47B, a spot of the beam 270A is applied to the groove 18B and the land 18A in the servo layer 18 to perform tracking. Simultaneously therewith, the recording beam 170A, in the blue wavelength range, of the recording and reading optical system 100A in the first optical pickup 90A is applied to the L0 recording and reading layer 14A.

As a result, with both the groove 18B and the land 18A being tracked, information is recorded on the L0 recording and reading layer 14A along the groove 18B and the land 18A. Thus, a track pitch P2 of recording marks formed on the L0 recording and reading layer 14A is a half of a pitch P1 between the grooves 18B or between the lands 18A. On the servo layer 18, information on basic specifications of the optical recording medium 10 or the number of layers of the first groups of recording and reading layers 14 is previously recorded in a recording pit or a BCA (burst cutting area), and is always read by the beam 270A in the red wavelength range before start of the tracking control. Basic information on the optical recording medium includes the position of the servo layer 18, the position of each recording and reading layer, a rule on an inter-layer distance of the group of recording and reading layers.

After necessary information is recorded on the L0 recording and reading layer 14A, the current additional information (address information on recording, content information, or the like) is recorded in a management area previously ensured on a part of the L0 recording and reading layer 14A.

Then, if recording of information on the L0 recording and reading layer 14A is restarted, first, the management area on the L0 recording and reading layer 14A is reproduced to confirm a position at which the previous recording has been completed, and recording is continued from the position. In this manner, the recording is continued until the recording of the information in all data areas on the L0 recording and reading layer 14A is completed. When recording on the data area of the L0 recording and reading layer 14A is finished, recording on the data area of the L1 recording and reading layer 14B is started. After necessary information is recorded on the L1 recording and reading layer 14B, the current additional information (address information on recording, content information, or the like) is recorded in the above-described management area of the L0 recording and reading layer 14A.

<Recording on a Second Group of Recording and Reading Layers>

Figure 47C:
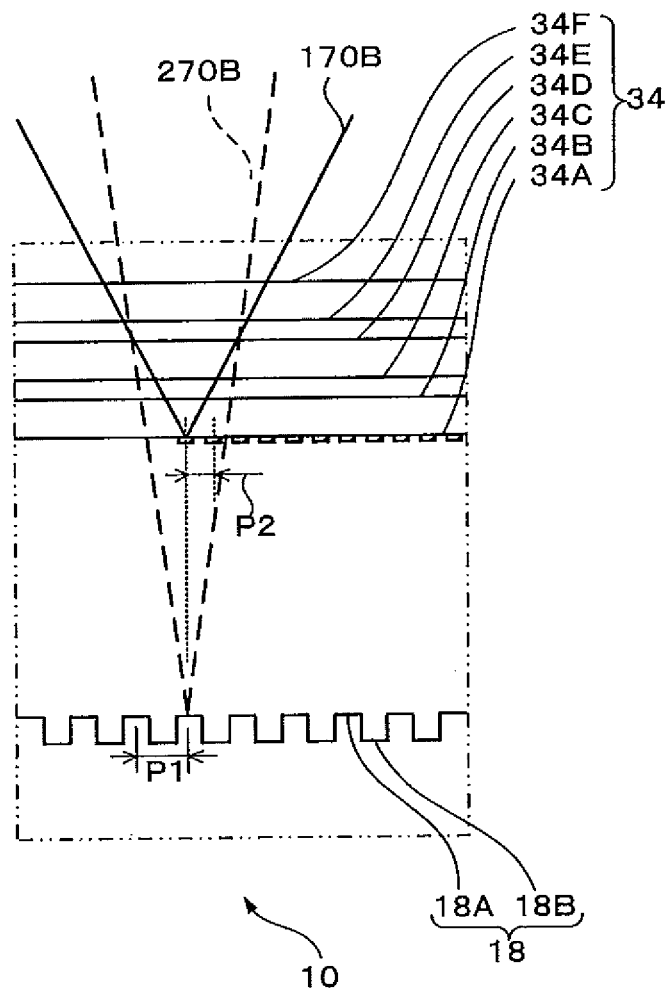
FIG. 47C is an enlarged sectional view illustrating the recording procedure on the optical recording medium by the optical recording and reading method.
Figure 47D:
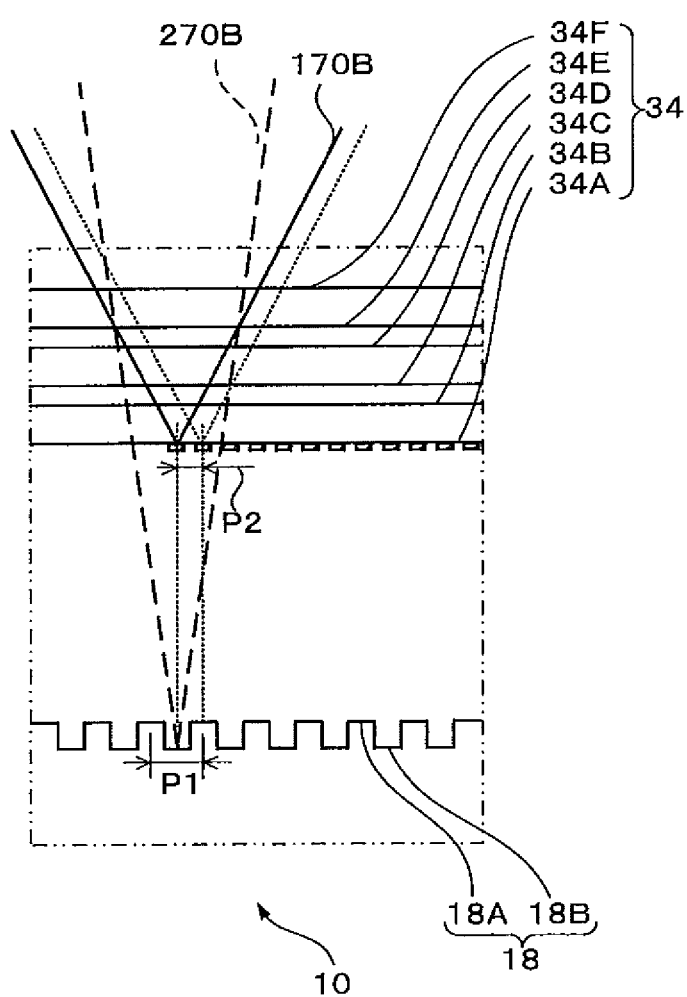
FIG. 47D is an enlarged sectional view illustrating the recording procedure on the optical recording medium by the optical recording and reading method.

If information is recorded on the L0 recording and reading layer 34A of the second group of recording and reading layers 34 disposed opposite to the servo layer 18 of the support substrate 12, first, the beam 270B, in the red wavelength range, of the tracking optical system 200B in the second optical pickup 90B is applied to the servo layer 18 through the support substrate 12 to perform tracking. Specifically, as illustrated in FIGS. 47C and 47D, a spot of the beam 270B is applied to the groove 18B and the land 18A in the servo layer 18 to perform tracking. Simultaneously therewith, the recording beam 170B, in the blue wavelength range, of the recording and reading optical system 100B in the second optical pickup 90B is applied to the L0 recording and reading layer 34A.

As a result, with both the land 18A and the groove 18B being tracked, information is recorded on the L0 recording and reading layer 34A along the land 18A and groove 18B. Thus, a track pitch P2 of recording marks formed on the L0 recording and reading layer 34A is a half of a pitch P1 between the lands 18A or between the grooves 18B. As mentioned above, on the servo layer 18, information on basic specifications of the optical recording medium 10 or the number of layers of the first group of recording and reading layers 14 is previously recorded in a recording pit or a BCA (burst cutting area). Therefore, the information is always read by the beam 270B in the red wavelength range before start of the tracking control.

After necessary information is recorded on the L0 recording and reading layer 34A, the current additional information (address information on recording, content information, or the like) is recorded in a management area previously ensured on a part of the L0 recording and reading layer 34A.

Then, if recording of information on the L0 recording and reading layer 34A is restarted, first, the management area on the L0 recording and reading layer 24A is reproduced to confirm a position at which the previous recording has been completed, and recording is continued from the position. In this manner, the recording is continued until the recording of the information in all data areas on the L0 recording and reading layer 34A is completed. When recording on the data area of the L0 recording and reading layer 34A is finished, recording on the data area of the L1 recording and reading layer 34B is started. After necessary information is recorded on the L1 recording and reading layer 34B, the current additional information (address information on recording, content information, or the like) is recorded in the above-described management area of the L0 recording and reading layer 34A.

The case where the management areas are ensured in the L0 recording and reading layers 14A and 34A has been exemplified, but another recording and reading layer may be used. In the case where the servo layer 18 includes a recording film, it is preferable to ensure a management area on the servo layer 18 and record additional information therein. This recording may be performed using the beams 270A and 270B performing the tracking control. The management information is concentrated on the servo layer 18, and thus management information on both the first group of recording and reading layers 14 and the second group of recording and reading layers 34 can be simultaneously grasped.

As hereinbefore discussed, according to the optical recording medium 10 of the eighth embodiment, the servo layer 18 is formed on one surface of the support substrate 12, and the first group of recording and reading layers 14 and the second group of recording and reading layers 34 are disposed on both surfaces of the support substrate 12. As a result, because internal stress generated when the first and second groups of recording and reading layers 14 and 34 are formed is dispersed into both sides of the support substrate 12, warpage and deformation of the optical recording medium 10 can be prevented. Such dispersion of internal stress enables preventing warpage of the optical recording medium 10 even if a thickness of the support substrate 12 is set within the range of 100 to 1000 μm.

At this time, an attempt to form concavo-convex patterns for tracking on both sides of the support substrate 12 complicates a process for manufacturing the support substrate 12, so that the accuracy of the support substrate 12 tends to be deteriorated. For this reason, in the present embodiment, the accuracy is improved by forming a concavo-convex pattern for tracking on one surface of the support substrate 12 to simplify the manufacture of the support substrate 12. Also, because the servo layer 18 is shared by the first and second groups of recording and reading layers 14 and 34, which sandwich the servo layer 18, concavo-convex patterns for tracking are not needed to be formed on both the recording and reading layers of the first and second groups of recording and reading layers 14 and 34. As a result, the geometric accuracy of the optical recording medium 10 can be more improved. Since the first group of recording and reading layers 14 and the second group of recording and reading layers 34 are disposed at both sides of the support substrate 12, a recording capacity may also be increased.

Further, in this optical recording medium 10, the support substrate 12 is composed of an optically transparent material. As a result, the beam 270B from the second optical pickup 90B can be applied to the servo layer 18 through the support substrate 12. If the support substrate 12 is composed of an opaque material, tracking control of the second optical pickup 90B may be performed using return light of the beam 270A from the first optical pickup 90A.

Also, the first group of recording and reading layers 14 and the second group of recording and reading layers 34 of the optical recording medium 10 are stacked symmetrically with respect to the center of the support substrate 12 in the thickness direction. Therefore, internal stress generated in the first and second groups of recording and reading layers 14 and 34 is also symmetrical, so that warpage of the optical recording medium 10 can be prevented.

In the optical recording medium 10, a refractive index of the support substrate 12 in a wavelength condition of the tracking beam 270B is set at a higher refractive index than that of the second buffer layer 37 in the same wavelength. As such,
a focus point of the tracking beam 270B incident from the second buffer layer 37 is allowed to smoothly reach the servo layer 18 through the support substrate 12. As a result, it is ensured that the tracking control of the second optical pickup 90B can be performed.

Further, in the optical recording medium 10, the reflectance of the servo layer 18 to the tracking beams 270A and 270B in the red wavelength is set to be greater than that to the recording and reading beams 170A and 170B. In order to embody this, a material used for the first and second buffer layers 17 and 37 has a larger amount of absorbed light with the shortness of a beam wavelength. Then, even if the recording and reading beams 170A and 170B in the blue wavelength are incident on the side of the servo layer 18, the incident beams are easily absorbed by the first and second buffer layers 17 and 37, so that an amount of light that reaches the servo layer 18 (an amount of reflected light from the servo layer 18) can be reduced. On the other hand, since the tracking beams 270A and 270B in the red wavelength can be actively transmitted through the first and second buffer layers 17 and 37, an amount of light that reaches the servo layer 418 (an amount of reflected light from the servo layer 18) can be increased. As a result, the quality of reading signals can be improved, as well as stable tracking control can be provided.

In the present embodiment, the first and second buffer layers 17 and 37 have characteristics that light absorptivities are different between the red and blue wavelengths, resulting in different reflectances of the servo layer 18 between the tracking beam and the recording and reading beam, but the present invention is not limited thereto. For example, a reflecting film itself formed on the servo layer 18 may have wavelength selectivity that reflectance is dependent on a wavelength. Also, in addition to the first and second buffer layers 17 and 37, a filter layer having wavelength selectivity of optical transmittance and absorptance may be formed.

Further, if a plurality of servo layers are formed in an optical recording medium as in a conventional manner, decision of which of the servo layers is used to record information on which of recording and reading layers is complex, so that recording and reading control tends to be confused. Thus, like the present embodiment, if one servo layer 18 is shared by the first group of recording and reading layers 14 and the second group of recording and reading layers 34, recording and reading control is simplified, so that the number of recording and reading errors may be reduced.

Figure 48:
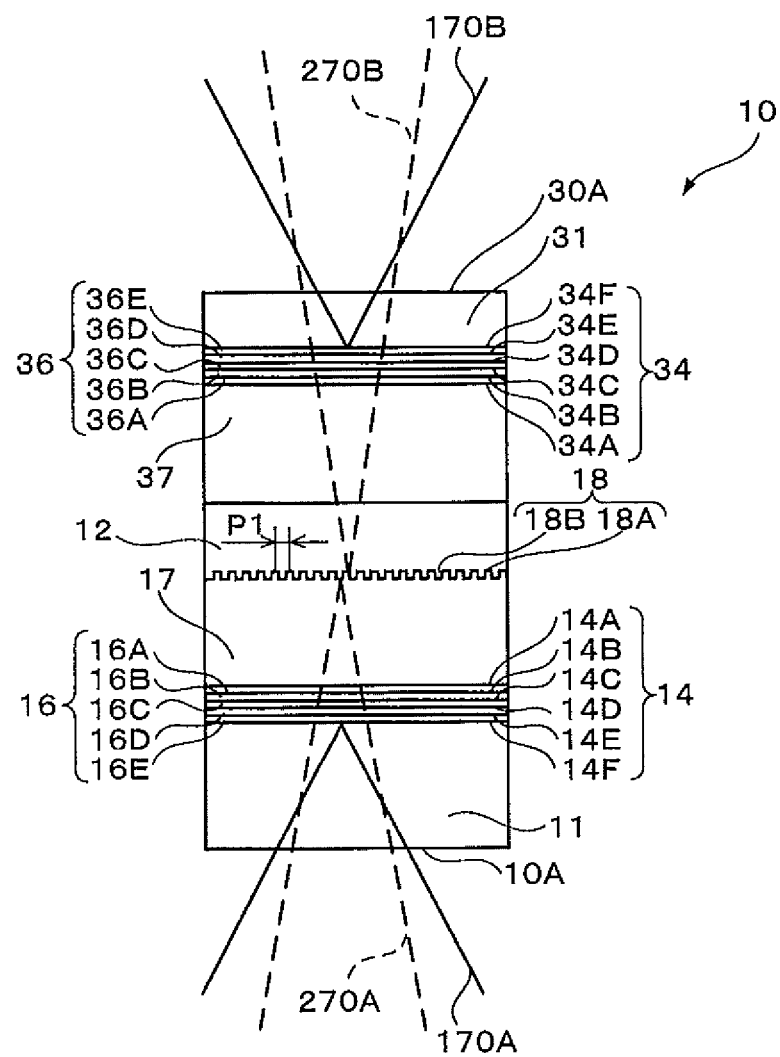
FIG. 48 is a sectional view illustrating another example of the multilayer structure of the optical recording medium according to the present embodiment.

It should be noted that in the foregoing embodiment, the case where the thicknesses of the first cover layer 11 and the second cover layer 31 are the same has been exemplified, but the present invention is not limited thereto. For example, like the optical recording medium 10 illustrated in FIG. 48, it is also preferable that thicknesses of the first cover layer 11 and the second cover layer 31 be different from each other. Specifically, a thickness of the first cover layer 11 is increased to be greater than that of the second cover layer 31 by a thickness of the support substrate 12. As such, the servo layer 18 is disposed at the center of the optical recording medium 10 in a thickness direction. As a result, in the first optical pickup 90A and the second optical pickup 90B, focal lengths of the tracking optical systems 200A and 200B are enabled to match each other. When the optical recording medium 10 is manufactured, it is preferable to separately stack the first cover layer 11 and the second cover layer 31 with different thicknesses. Even if the first and second cover layers 11 and 31 are not simultaneously stacked, since some degree of rigidity has been ensured by the support substrate 12, the first and second buffer layers 17 and 37, the first group of recording and reading layers 14 and first group of intermediate layers 16, and the second group of recording and reading layers 34 and second group of intermediate layers 36, warpage and deformation of the optical recording medium 10 can be sufficiently prevented.

Figure 49:
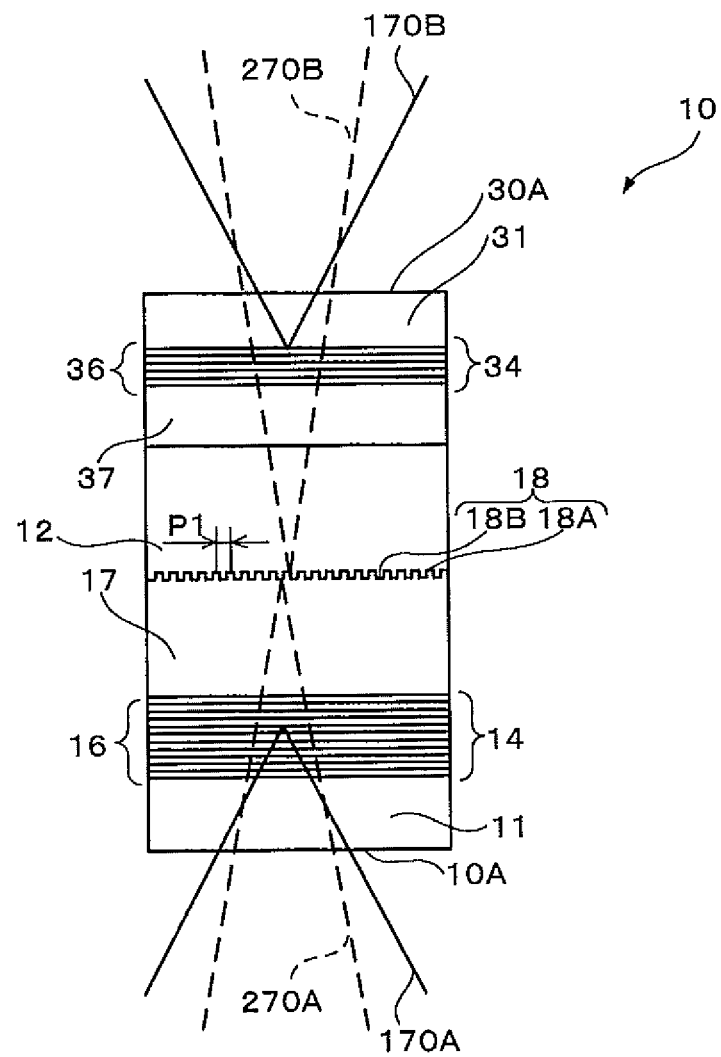
FIG. 49 is a sectional view illustrating yet another example of the multilayer structure of the optical recording medium according to the present embodiment.

Also, like the optical recording medium 10 shown in FIG. 49, thicknesses of the first and second buffer layers 17 and 37 may be changed, or inter-layer distances or the numbers of layers of the first and second group of recording and reading layers 14 and 34 may be changed to locate the servo layer 18 at the center in the thickness direction.

Also, each refractive index of the first cover layer 11 and the second cover layer 31 may be changed, or a refractive index between the first and second groups of recording and reading layers 14 and 34 may be changed to locate the servo layer 18 at the center as an optical distance in the thickness direction.

Figure 50:
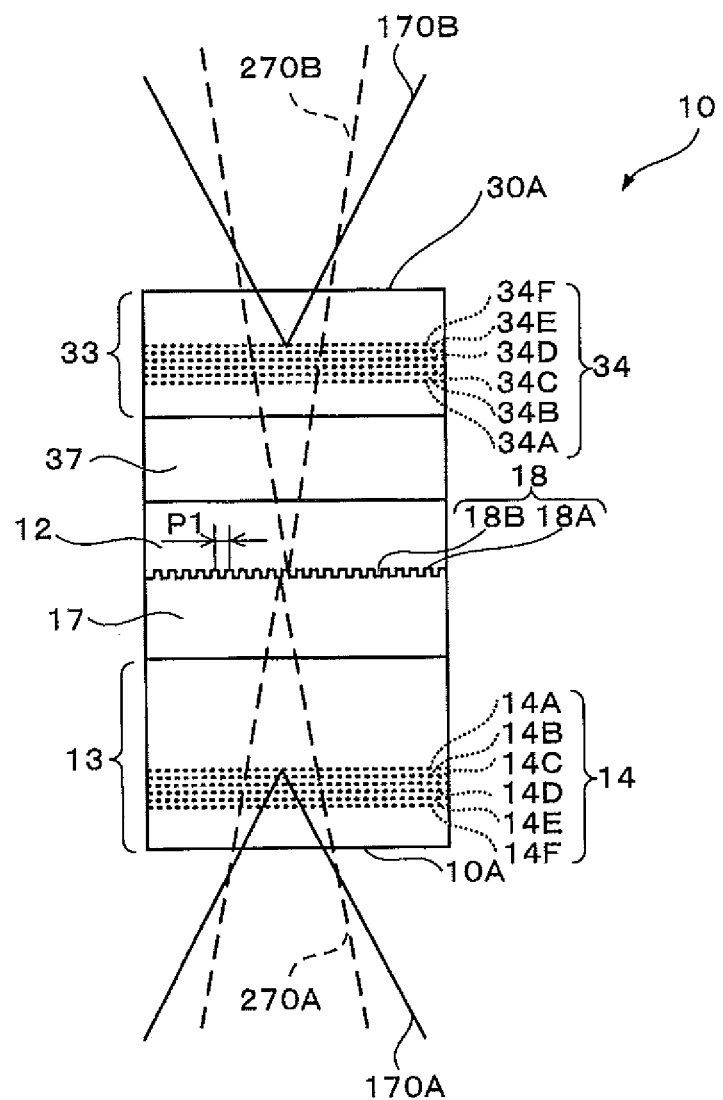
FIG. 50 is a sectional view illustrating still another example of the multilayer structure of the optical recording medium according to the present embodiment.
Figure 51:
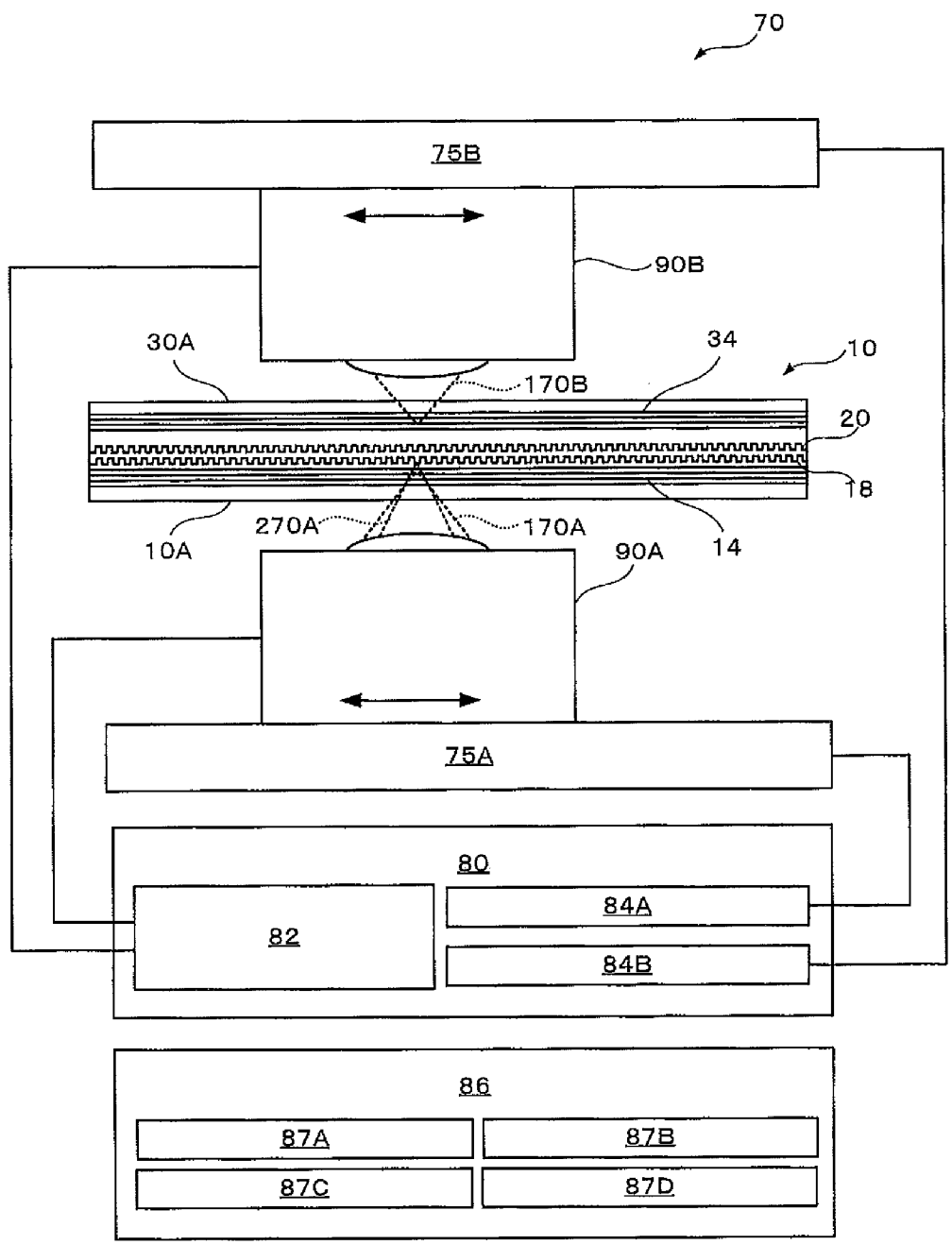
FIG. 51 is a block diagram illustrating an overall configuration of an optical recording and reading apparatus and an optical recording medium for achieving an optical recording and reading method according to a ninth embodiment of the present invention.

Further, in the foregoing embodiment, the case where recording films are previously deposited as recording and reading layers of the first and second groups of recording and reading layers 14 and 34 has been described, but the present invention is not limited thereto. For example, like the optical recording medium 10 illustrated in FIG. 50, an entire area that might become first and second group of recording and reading layers can be first and second bulk layers 13 and 33 having a predetermined thickness. If recording beams 170A and 170B are applied to the first and second bulk layers 13 and 33, the state of only a focus area of a beam spot is changed to form a recording mark. That is, in an optical recording medium according to the present invention, recording and reading layers to which beam are applied may not be previously formed, and recording marks are formed on a planar area at any time, the first and second groups of recording and reading layers 14 and 34 may be post-multi-layered as collections of the recording mark. If the structure of the bulk layers 13 and 33 is adopted as the optical recording medium 10, positions of recording and reading layers may be freely set within the bulk layers 13 and 33. For example, as illustrated in FIG. 50, even if the first bulk layer 13 and the second bulk layer 33 have different thicknesses or arrangements, distances from the first and second groups of recording and reading layers 14 and 34 to the first and second surfaces 10A and 30A are allowed to match each other.

It should be noted that here, the structure in which a cover layer is omitted when the first and second bulk layers 13 and 33 are adopted has been exemplified, but a buffer layer may also be omitted.

A ninth embodiment of the present invention will be described below with reference to the attached drawings. An optical recording medium and an optical recording and reading apparatus of the ninth embodiment are partially identical or similar to those of the fifth embodiment, and thus, a description of such parts will be omitted, and the description will be given focusing on differences from the fifth embodiment.

FIGS. 51 to 54 illustrate an internal configuration of an optical recording medium 10 to which an optical recording and reading method of the ninth embodiment of the present invention is applied and an internal configuration of an optical recording and reading apparatus 70 for achieving the optical recording and reading method. The recording and reading apparatus 70 includes first and second optical pickups 90A and 90B, first and second linear motion mechanisms 75A and 75B that move the first and second optical pickups 90A and 90B in a tracking direction, and a tracking control device 80 that controls the first and second linear motion mechanisms 75A and 75B. Reference numeral 86 denotes a digital signal processing device to/from which user information to be recorded or reproduced is input/output from/to an external information appliance, and controls data recorded on or data reproduced from the optical recording medium 10. Although not specifically illustrated, the first optical pickup 90A and the second optical pickup 90B have optical axes corresponding to each other.

Figure 52:
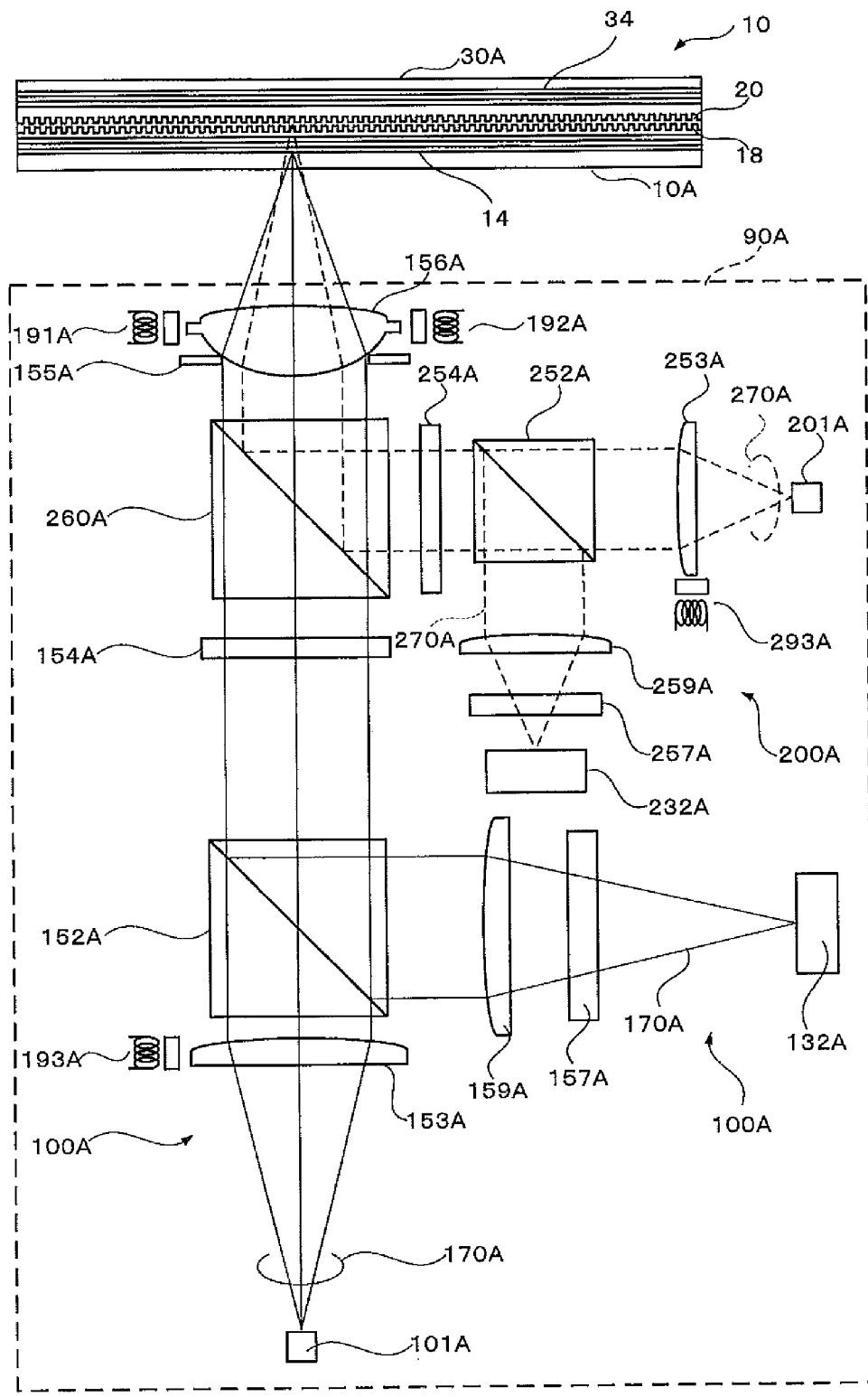
FIG. 52 is a block diagram illustrating an internal configuration example of a first optical pickup in the optical recording and reading apparatus.

As illustrated in FIG. 52, the first optical pickup 90A includes a recording and reading optical system 100A and a tracking optical system 200A. The recording and reading optical system 100A is an optical system that performs recording and reading on/from a first group of recording and reading layers 14 in the optical recording medium 10. The tracking optical system 200A is an optical system that performs tracking control using first and second servo layers 18 and 20 when information is recorded in the first group of recording and reading layers 14 using the recording and reading optical system 100A.

A beam 270A from the tracking optical system 200A is converted into a converging beam by an objective lens 156A and condenses on either of the first and the second servo layers 18 and 20 formed inside the optical recording medium 10. The beam 270A reflected by the first or second servo layer 18 or 20 passes through the objective lens 156A and is reflected by a beam splitter 260A, converted into linearly-polarized light, which is different by 90 degrees in phase from that on the outward path, by a quarter-wave plate 254A, and then further reflected by a polarizing beam splitter 252A.

Figure 53:
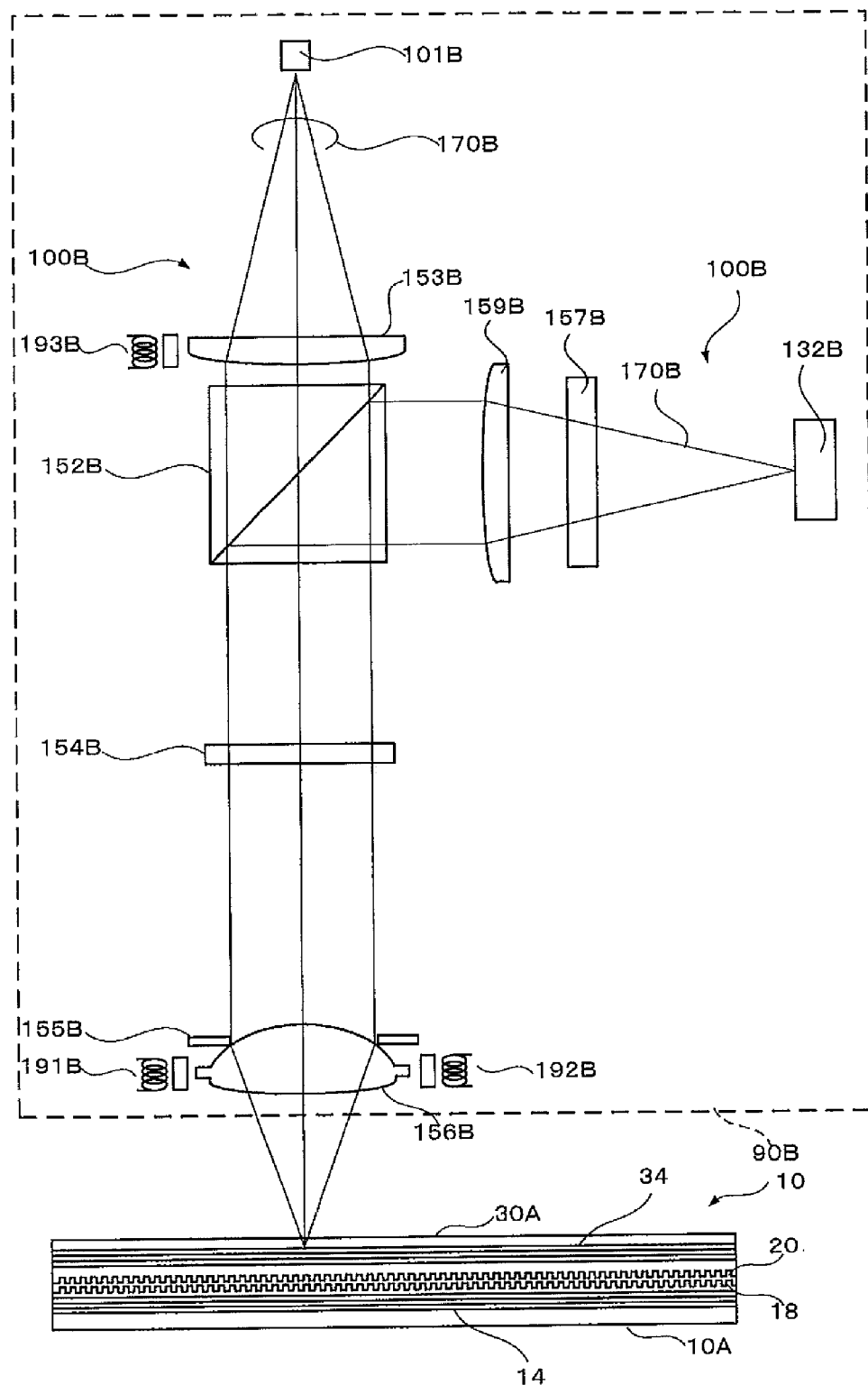
FIG. 53 is a block diagram illustrating an internal configuration example of a second optical pickup in the optical recording and reading apparatus.

As illustrated in FIG. 53, when information is recorded in a second group of recording and reading layers 34 by means of a recording and reading optical system 100B in the second optical pickup 90B, a tracking error (TE) signal obtained as a result of the first or second servo layer 18 or 20 being irradiated by the tracking optical system 200A in the first optical pickup 90A is used.

Referring back to FIG. 51, an access controller 82 in the tracking control device 80 controls the first and second optical pickups 90A and 90B as described below.

(Control performed by access controller during recording)
The access controller 82 receives a recording and reading layer that is a recording target, and a tracking number thereof, from the later-described digital signal processing device 86, and determines whether the recording and reading layer that is a recording target is one that uses the first servo layer 18 to perform recording and reading, or one that uses the second servo layer 20 to perform recording and reading. Furthermore, the access controller 82 applies the tracking beam 270A from the first optical pickup 90A to a land/groove corresponding to a tracking number of the first or second servo layer 18 or 20 obtained as a result of the determination. This can be achieved by the access controller 82 performing feedback control of actuators 191A and 192A and the first linear motion mechanism 75A upon receipt of a tracking error (TE) signal obtained from the beam 270A from the tracking optical system 200A. In this state, the first optical pickup 90A applies a recording and reading beam 170A to the first group of recording and reading layers 14 to record information thereon.

Simultaneously with this, the access controller 82 controls actuators 191B and 192B and the second linear motion mechanism 75B using the tracking error (TE) signal from the first optical pickup 90A. In other words, the actuators 191A, 191B and the actuators 192A and 192B, and the first linear motion mechanism 75A and the second linear motion mechanism 75B operate in a perfectly same manner in the tracking direction. In this state, the second optical pickup 90B applies a recording and reading beam 170B to the second group of recording and reading layers 34 to record information thereon. As a result, in the present embodiment, the first and second optical pickups 90A and 90B are simultaneously subjected to tracking control using the common first or second servo layers 18 or 20 to simultaneously record information on the first and second groups of recording and reading layers 14 and 34.

(Control performed by access controller during reproduction) Reproduction from the first group of recording and reading layers 14 is performed by applying the beam 170A from the recording and reading optical system 100A in the first optical pickup 90A to the first group of recording and reading layers 14. Tracking control in this case is performed by the access controller 82 performing feedback control of the actuators 191A and 192A and the first linear motion mechanism 75A directly using a tracking error (TE) signal obtained from the recording and reading beam 170A, without using the tracking beam 270A.

Reproduction from the second group of recording and reading layers 34 is performed by applying the beam 170B from the recording and reading optical system 100B in the second optical pickup 90B to the second group of recording and reading layers 34. Tracking control in this case is performed by the access controller 82 performing feedback control of the actuators 191B and 192B and the second linear motion mechanism 75B directly using a tracking error (TE) signal obtained from the recording and reading beam 170B from the second optical pickup 90B. In other words, in the present embodiment, the first and second optical pickups 90A and 90B are separately subjected to tracking control, and information on the first group of recording and reading layers 14 and information on the second group of recording and reading layers 34 are simultaneously reproduced.

The digital signal processing device 86 includes a reproducing unit 87A, a recording unit 87B, a dividing/synthesizing unit 87C and an input/output interface unit 87D.

The reproducing unit 87A controls power of light sources 101A and 101B in the first and second optical pickups 90A and 90B to be constantly a predetermined reproduction level, thereby reproducing information recorded on the optical recording medium 10. Furthermore, the reproducing unit 87A receives analog reading signals from the first and second optical pickups 90A and 90B, and converts the analog signals into digital signals.

More specifically, the reproducing unit 87A decodes the analog signals into digital signals by means of, e.g., an A/D converter, a PR equalizer and an ML decoder, which are not specifically illustrated. The A/D converter converts a reproduced waveform into digital values. The PR equalizer performs sampling of the digital values and performs equalization processing so as to bring voltage levels thereof close to a PR reference class characteristic. The ML decoder selects a maximum ideal response from the signals subjected to the equalization processing in the PR equalizer to create binarized digital signals. As a result, the information recorded in the first group of recording and reading layers 14 is reproduced by the first optical pickup 90A into digitalized first data. Also, the information recorded in the second group of recording and reading layers 34 is reproduced by the second optical pickup 90B into digitalized second data. The first and second data are transferred to the dividing/synthesizing unit 87C.

The recording unit 87B individually controls power of the light sources 101A and 101B in the first and second optical pickups 90A and 90B based on a predetermined recording strategy, thereby recording/erasing information on/from the optical recording medium 10. More specifically, the recording unit 87B controls the recording power of the light source 101A in the first optical pickup 90A, thereby recording the first data on the first group of recording and reading layers 14. Also, the recording unit 87B controls the recording power of the light source 101B in the second optical pickup 90B, thereby recording the second data on the second group of recording and reading layers 34. The first data and the second data are ones received from the dividing/synthesizing unit 87C.

The dividing/synthesizing unit 87C divides data to be recorded into first data and second data, which have been received from the input/output interface unit 87D, and conveys the first data and the second to the recording unit 87B. The dividing/synthesizing unit 87C combines the first data and the second data received from the reproducing unit 87A to form one reproduced data, and conveys the reproduced data to the input/output interface unit 87D.

The input/output interface unit 87D receives/provides an input/output of information from/to an external information appliance. More specifically, the input/output interface unit 87D receives data to be recorded, from the external information appliance, and/or outputs reproduced data from the optical recording medium 10 to the external information appliance.

Figure 54:
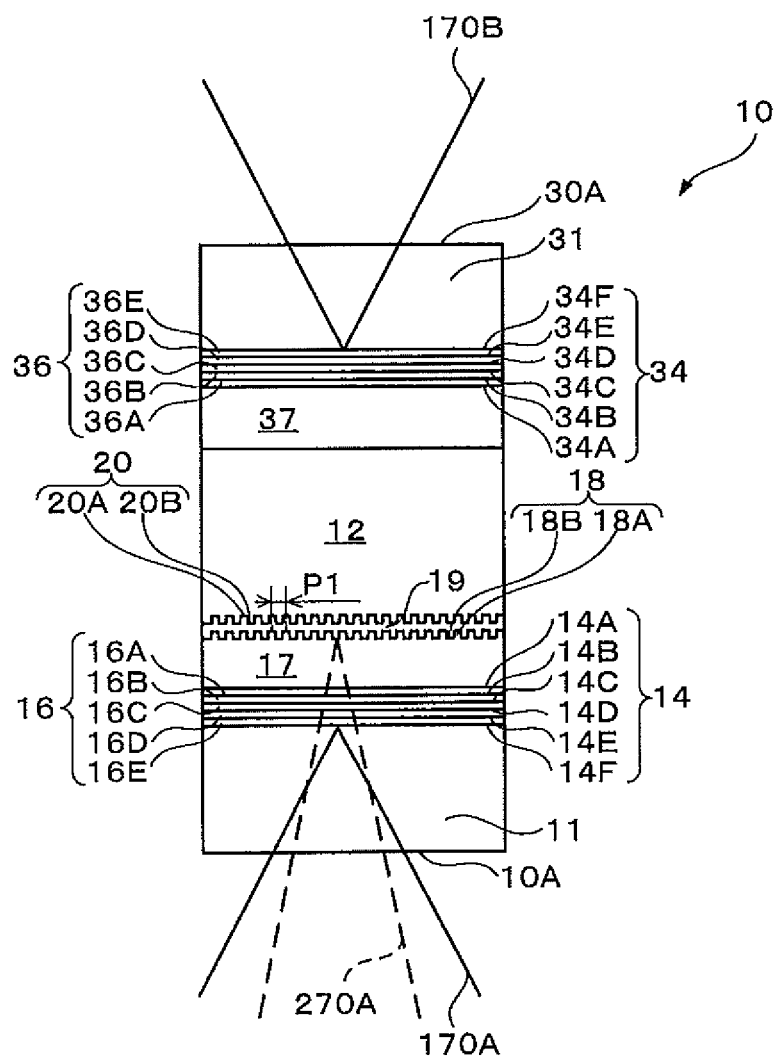
FIG. 54 is a sectional view illustrating a multilayer structure of the optical recording medium.

FIG. 54 is an enlarged view of a cross-sectional structure of the optical recording medium 10 of the present embodiment.

The optical recording medium 10 has a discoid shape with an outer diameter of approximately 120 mm and a thickness of approximately 1.2 mm. The optical recording medium 10 includes a first surface 10A, a first cover layer 11, the first group of recording and reading layers 14 and a first group of intermediate layers 16, a first buffer layer 17, the first servo layer 18, an inter-servo buffer layer 19, the second servo layer 20, a support substrate 12, a second buffer layer 37, the second group of recording and reading layers 34 and a second group of intermediate layers 36, a second cover layer 31 and a second surface 30A in this order from the first surface 10A side.

On the first surface 10A side of the support substrate 12, a land 20A and a groove 20B are provided in spirals. The land 20A and the groove 20B form a concavo-convex pattern (groove) for tracking control. The land 20A and the groove 20B will serve as a future second servo layer 20, which is used for tracking control.

In other words, the second servo layer 20 formed on the support substrate 12 includes the concavo-convex pattern (the land 20A and the groove 20B) for tracking control, which has been formed on a surface of the support substrate 12, and a reflective layer formed thereon.

Here, a pitch P1 between adjacent lands 20A or between adjacent grooves 20B of the second servo layer 20 is set to be smaller than 0.74 µm. More specifically, the pitch P1 is preferably set to be within a range from 0.6 to 0.7 µm, and more preferably set to around 0.64 µm. The pitch P1 (around 0.64 µm) between adjacent lands 20A or adjacent grooves 20B of the second servo layer 20 has a size allowing sufficient tracking to be performed using the beam 270A in a relatively-long, red wavelength range. In the present embodiment, tracking is performed using both the land 20A and the groove 20B. Consequently, a track pitch P2 of recording marks is set to be smaller than 0.37 µm relative to the pitch P1 of the second servo layer 20, is preferably set to be within a range from 0.26 to 0.35 nm, and more preferably set to around 0.32 µm, which is a half (½) of the pitch P1. Consequently, the track pitch P2 between the recording marks is around 0.32 µm, which is compatible with the BD standards. As described above, tracking control is performed using the land 20A and the groove 20B, respectively, enabling the track pitch P2 between the recording marks of the group of recording and reading layers 14 to be reduced even though the pitch P1 of the second servo layer 20 is not reduced.

The inter-servo buffer layer 19, which is provided on a surface of the second servo layer 20, includes a light transmissive, acrylic ultraviolet curable resin. A thickness of the inter-servo buffer layer 19 is set to, for example, 30 μm. On a surface of the inter-servo buffer layer 19, a land 18A and a groove 18B are formed in spirals using a stamper for a light transmitting resin. The land 18A and the groove 18B form a concavo-convex pattern (groove) for tracking control in the first servo layer 18. A direction of the spirals of the land 18A and the groove 18B are opposite to that of the land 20A and the groove 20B of the second servo layer 20.

The first servo layer 18 formed on the inter-servo buffer layer 19 includes the concavo-convex pattern for tracking control (the land 18A and the groove 18B), which have been formed on the surface of the inter-servo buffer layer 19, and a reflective layer formed thereon. Here, a metal film of, e.g., Al or Ag is formed as a reflective layer by sputtering so as to function as a simple light-reflecting film. The first servo layer 18 is set to have a high transmittance compared to the second servo layer 20. If a recording film that can record information in addition to the reflecting function is provided, a film configuration that is substantially similar to that of recording and reading layers 14A to 14F, which will be described later, may be provided.

A pitch P1 between adjacent lands 18A or between adjacent grooves 18B of the first servo layer 18 is made to correspond to that of the second servo layer 20. More specifically, the pitch P1 is set to around 0.64 μm.

The first buffer layer 17 includes a light transmissive, acrylic ultraviolet curable resin, and a thickness of the first buffer layer 17 is set to 208 μm.

With the above-described configuration, a boundary between the support substrate 12 and the first buffer layer 17 (i.e., the second servo layer 20) in the optical recording medium 10 is located 350 μm from the first surface 10A. Also, the first servo layer 18 is located 320 μm from the first surface 10A.

The rest of the structure is the same as that of the optical recording medium of the fifth embodiment. Consequently, the optical recording medium 10 has a symmetrical structure in a thickness direction except asymmetrical arrangement of the first and second servo layers 18 and 20.

Next, a method for producing the optical recording medium 10 of the ninth embodiment will be described.

Figure 55A:
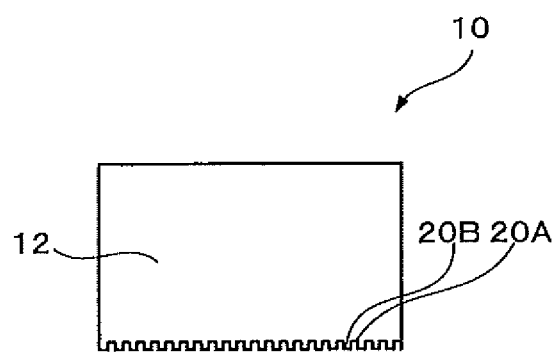
FIG. 55A is a sectional view illustrating a procedure for producing the optical recording medium.

As illustrated in FIG. 55A, a support substrate 12 with a groove and a land formed only on one side thereof is fabricated. Subsequently, a servo layer 20 is formed on a surface of the support substrate 12 on the side where the groove and the land are provided. The servo layer 20 is formed by forming a film having reflectivity for light from the light source in the tracking optical system 200A (for example, a metal film of, e.g., Al or Ag) by means of, e.g., sputtering.

Figure 55B:
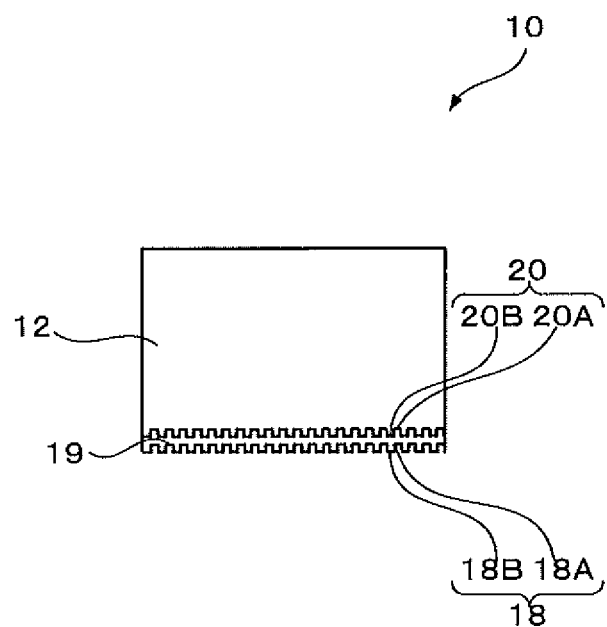
FIG. 55B is a sectional view illustrating a procedure for producing the optical recording medium.

Next, as illustrated in FIG. 55B, an inter-servo buffer layer 19 is formed on the second servo layer 20 side of the support substrate 12 where the second servo layer 20 has been formed. Here, a groove 18B and a land 18A are formed on a surface of the inter-servo buffer layer 19. More specifically, two opposite surfaces of the support substrate 12 are coated with an acrylic or epoxy ultraviolet curable resin with an adjusted viscosity, by means of, e.g., spin coating, and a groove 18B and a land 18A are formed using a transparent resin stamper on the inter-servo buffer layer 19 side of the support substrate 12, and then irradiated with ultraviolet light and thereby cured. Consequently, the inter-servo buffer layer 19 is formed. An inter-servo buffer layer 19 can be formed on the surface of the second servo layer 20 by means of, e.g., spraying or dipping, instead of an ultraviolet curable resin.

Subsequently, a first servo layer 18 is formed on a surface of the inter-servo buffer layer 19. More specifically, a film having both reflectivity and transmissivity for light from the light source in the tracking optical system 200A (for example, a metal thin film of, e.g., Al or Ag) is formed on the surface of the inter-servo buffer layer 19 by means of, e.g., sputtering.

Figure 55C:
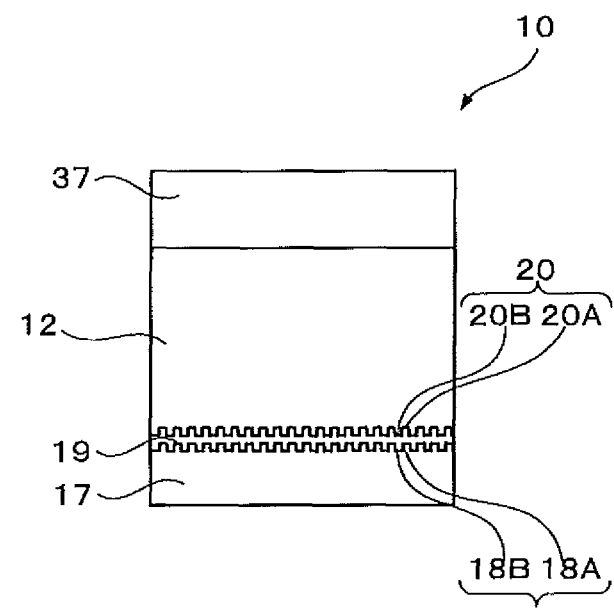
FIG. 55C is a sectional view illustrating a procedure for producing the optical recording medium.

Next, as illustrated in FIG. 55C, a first buffer layer 17 and a second buffer layer 37 are simultaneously formed on a surface of the first servo layer 18 and a surface 30A on the opposite side of the support substrate 12.

Figure 55D:
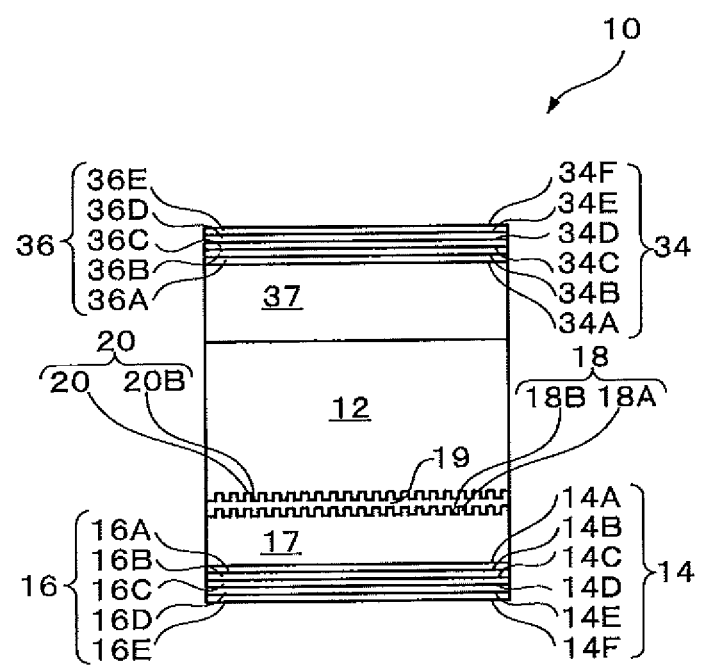
FIG. 55D is a sectional view illustrating a procedure for producing the optical recording medium.
Figure 55E:
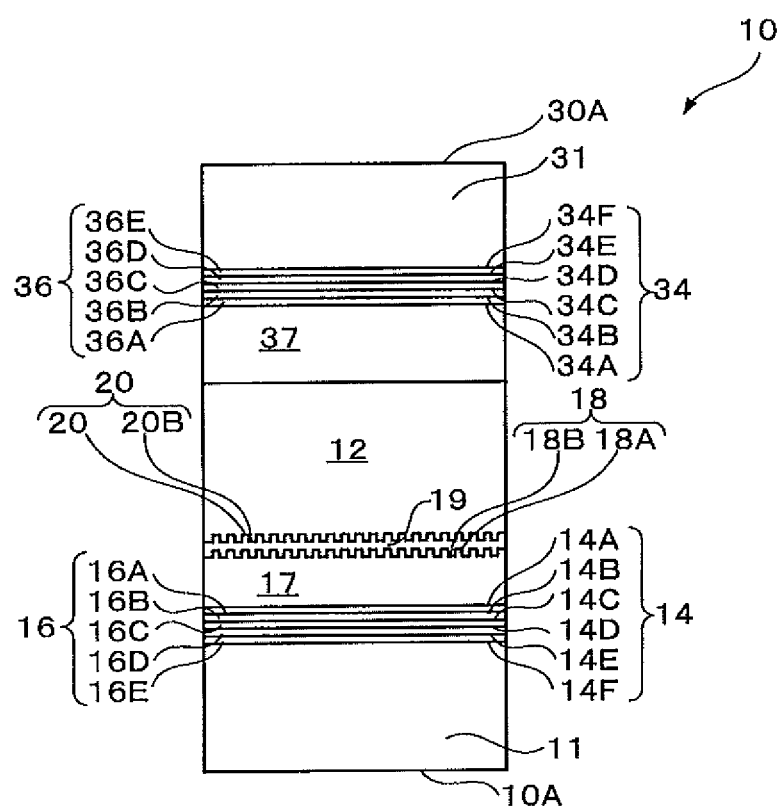
FIG. 55E is sectional view illustrating a procedure for producing the optical recording medium.

Next, as illustrated in FIG. 55D, an L0 recording and reading layer 14A in the first group of recording and reading layers 14 and an L0 recording and reading layer 34A in the second group of recording and reading layers 34 are simultaneously formed on the first buffer layer 17 and the second buffer layer 37, respectively.

Upon completion of formation of an L5 recording and reading layer 14F in the first group of recording and reading layers 14 and an L5 recording and reading layer 34F in the second group of recording and reading layers 34, as illustrated in FIG. 55D, first and second cover layers 11 and 31 are simultaneously formed thereon, whereby the optical recording medium 10 is completed.

Next, an optical recording and reading method for recording and reading information on/from the optical recording medium 10 using the optical recording and reading apparatus 70 of the present embodiment will be described with reference to FIGS. 56 to 59. In the present embodiment, a step of recording information simultaneously on the first and second groups of recording and reading layers using the first servo layer 18, and a step of recording information simultaneously on the first and second groups of recording and reading layers using the second servo layer 20 are alternately repeated.

Figure 59:
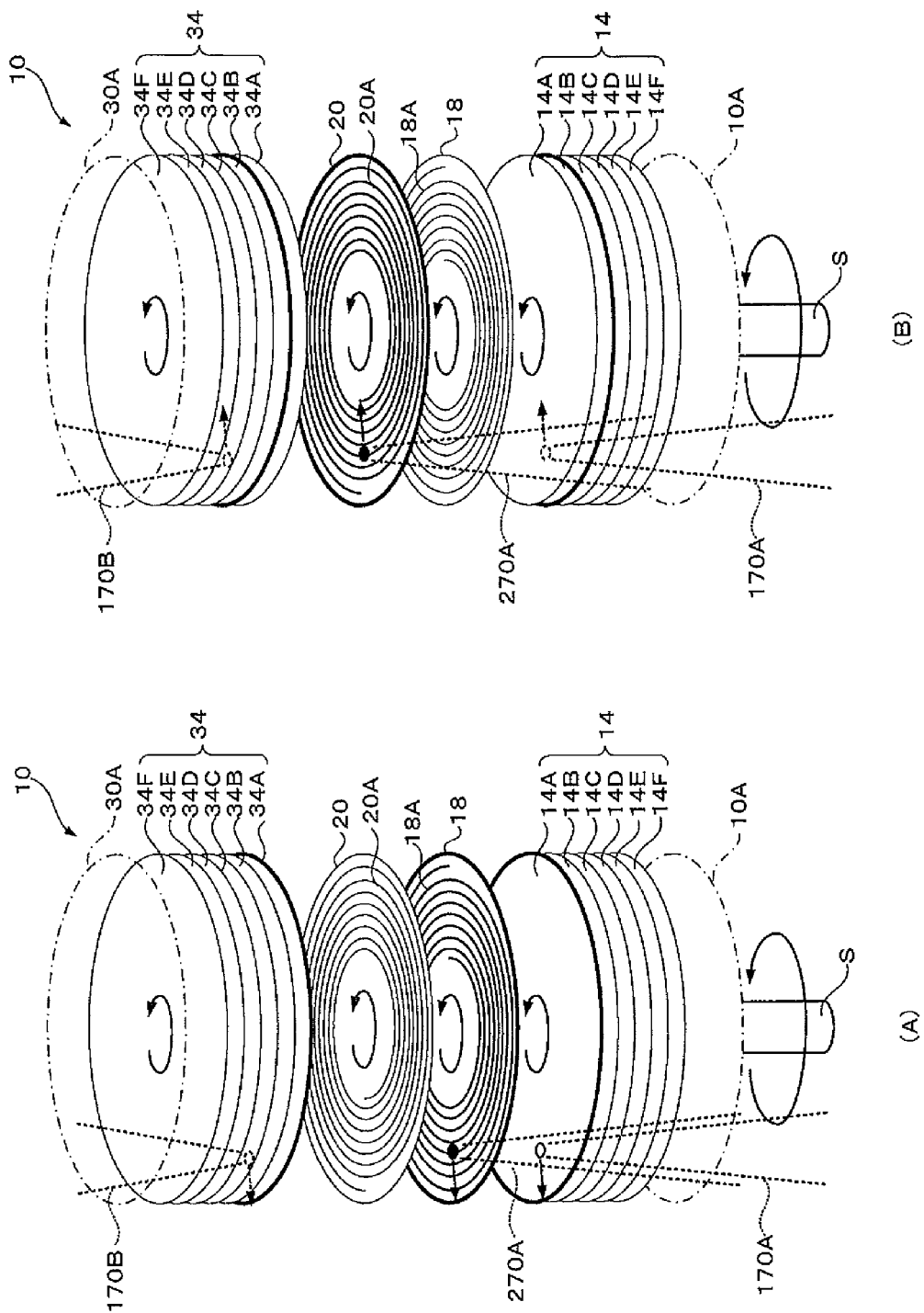
FIG. 59 is a perspective diagram illustrating a recording and reading procedure for an optical recording medium according to the optical recording and reading method.

First, a precondition for executing the optical recording and reading method will be described. As illustrated in FIG. 59, the optical recording medium 10 is arranged on a spindle S with the first surface 10A downside and the second surface 30A upside. Viewed from below the spindle S in an axis direction, the optical recording medium 10 rotates clockwise. A first spiral direction of the land 18A and the groove 18B of the first servo layer 18 is set to a direction in which the spirals spread counterclockwise from the inner peripheral side toward the outer peripheral side when the optical recording medium 10 is viewed from the first surface 10A side. Meanwhile, a second spiral direction of the land 20A and the groove 20B of the second servo layer 20 is set to a direction that the spirals spread clockwise from the inner peripheral side toward the outer peripheral side when the optical recording medium 10 is viewed from the first surface 10A side, that is, a direction opposite to the first spiral direction. Here, recording or reading on/from the first group of recording and reading layers 14 using the first optical pickup 90A is referred to as a first recording and reading operation, and recording or reading on/from the second group of recording and reading layers 34 using the second optical pickup 90B is referred to as a second recording and reading operation.

<Simultaneous Recording of Information in First and Second Groups of Recording and Reading Layers Using First Servo Layer>

The input/output interface unit 87D in the digital signal processing device 86 receives data to be recorded, from the external information appliance, and transmits the data to the dividing/synthesizing unit 87C. The dividing/synthesizing unit 87C divides the received data to be recorded into first data and second data and conveys the first data and the second data to the recording unit 87B. The recording unit 87B controls the recording power of the light source 101A in the first optical pickup 90A to record the first data on the first group of recording and reading layers 14 (first recording and reading operation). Simultaneously with that, the recording unit 87B controls the recording power of the light source 101B in the second optical pickup 90B to record the second data on the second group of recording and reading layers 34 (second recording and reading operation). Details of the first and second recording and reading operations will be described below.

Figure 56:
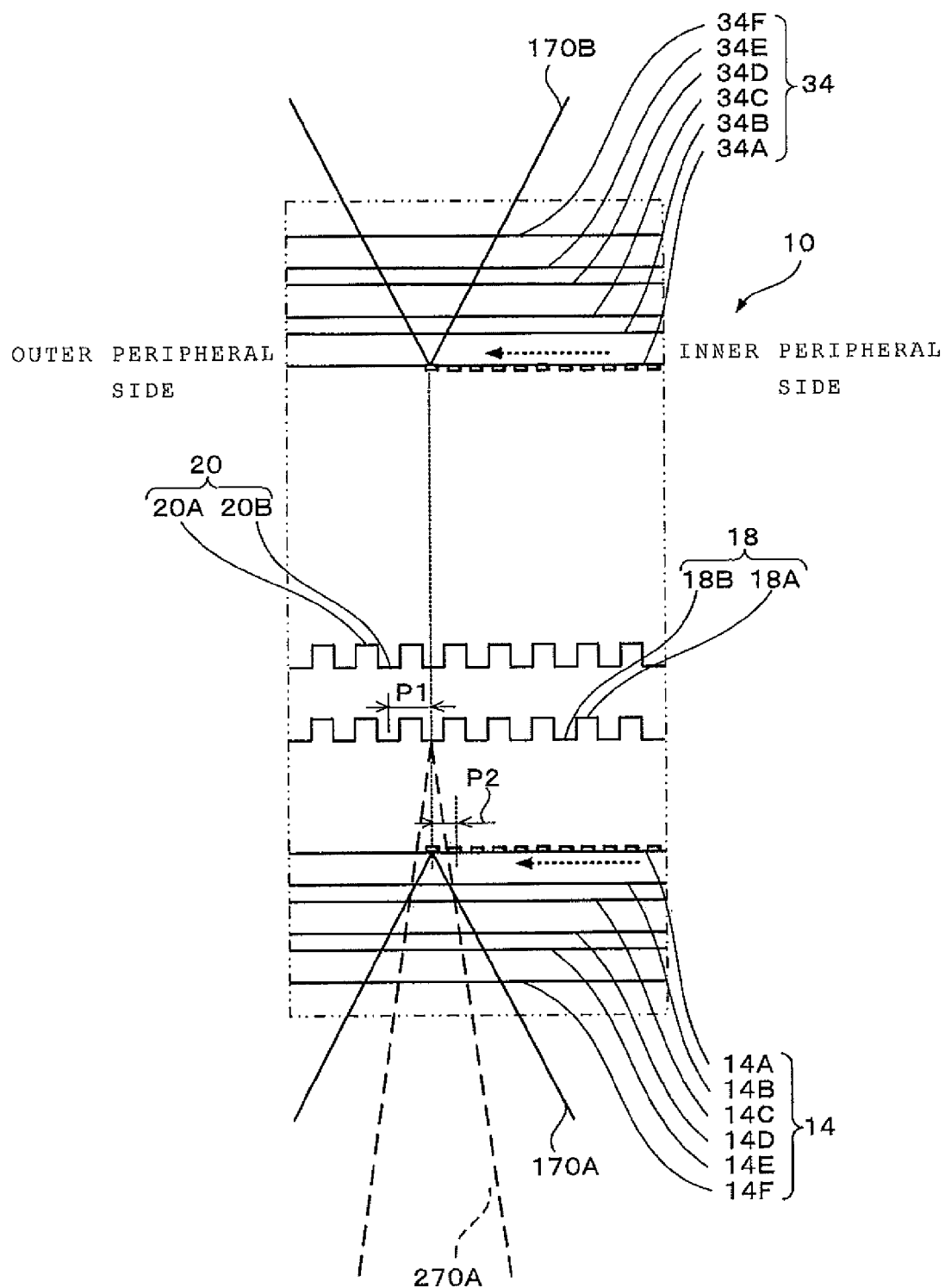
FIG. 56 is an enlarged sectional view illustrating a recording procedure for an optical recording medium according to the optical recording and reading method.

(First recording and reading operation) As illustrated in FIGS. 56 and 59A, when recording information on the L0 recording and reading layer 14A in the first group of recording and reading layers 14, the beam 270A in the red wavelength range from the tracking optical system 200A in the first optical pickup 90A is applied to the first servo layer 18 from the first surface 10A to perform tracking. More specifically, a spot of the beam 270A is applied to the groove 18B and the land 18A of the first servo layer 18 to perform tracking.

Furthermore, simultaneously with the tracking, the recording beam 170A in a blue wavelength range from the recording and reading optical system 100A in the first optical pickup 90A is applied to the L0 recording and reading layer 14A from the first surface 10A.

As a result, information is recorded on the L0 recording and reading layer 14A from the inner peripheral side toward the outer peripheral side along the groove 18B and the land 18A relative to the optical recording medium 10 that rotates clockwise viewed from the first surface 10A side. The track pitch P2 of recording marks formed at the L0 recording and reading layer 14A is a half of the pitch P1 between grooves 18B or between lands 18A.

(Second recording and reading operation) When recording information on the L0 recording and reading layer 34A in the second group of recording and reading layers 34, tracking control of the second optical pickup 90B is performed using a tracking error signal from the first optical pickup 90A in the first recording and reading operation. Consequently, the optical axes of the first optical pickup 90A and the second optical pickup 90B face each other and substantially correspond to each other. In this state, a recording beam 170B in a blue wavelength range from the recording and reading optical system 100B in the second optical pickup 90B is applied to the L0 recording and reading layer 34A.

As a result, as illustrated in FIG. 59A, information is recorded on the L0 recording and reading layer 34A from the inner peripheral side toward the outer peripheral side along the groove 18B and the land 18A of the first servo layer 18 relative to the optical recording medium 10 that rotates counterclockwise viewed from the second surface 30A side. The track pitch P2 of recording marks formed at the L0 recording and reading layer 34A is also a half of the pitch P1 between grooves 18B or between lands 18A of the first servo layer 18.

The first recording operation and the second recording operation, which have been described above, are concurrently performed, thereby achieving simultaneous recording of information on the first and second groups of recording and reading layers 14 and 34 using the first servo layer 18.

Information on basic specifications of the optical recording medium 10 and the number of layers stacked in each of the first and second groups of recording and reading layers 14 and 34 are previously recorded in a recording pit or a BCA (burst cutting area) of the first servo layer 18. Accordingly, such information is always read by the beam 270A in the red wavelength range before start of tracking control. The basic specifications of the optical recording medium 10 include positions of the first and second servo layers 18 and 20, positions of the respective recording and reading layers, and rules on an inter-layer distance in the groups of recording and reading layers.

After completion of necessary information recording on the L0 recording and reading layer 14A in the first group of recording and reading layers 14 and the L0 recording and reading layer 34A in the second group of recording and reading layers 34, relevant additional information (e.g., address information on recording and content information) is simultaneously recorded in management areas provided in advance in parts of the L0 recording and reading layers 14A and 34A.

Subsequently, when information recording on the L0 recording and reading layers 14A and 34A is resumed, first, the information in the management areas of the L0 recording and reading layers 14A and 34A is reproduced to check positions where the previous recording has been completed, and recording is continued from those positions. As described above, recording is simultaneously continued until completion of information recording on all data areas of the L0 recording and reading layers 14A and 34A.

<Simultaneous Recording of Information in First and Second Groups of Recording and Reading Layers Using Second Servo Layer>

Figure 57:
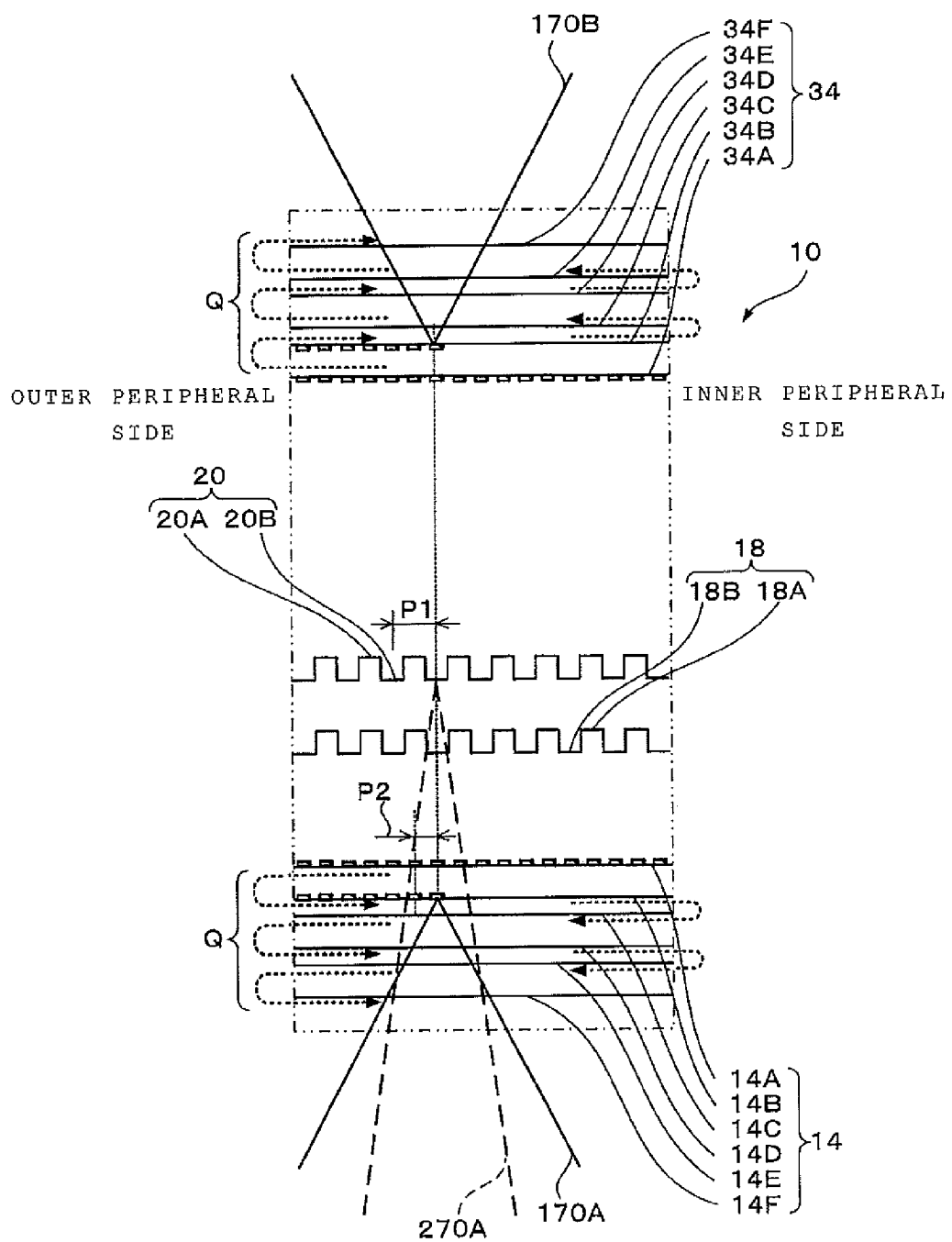
FIG. 57 is an enlarged sectional view illustrating a recording procedure for an optical recording medium according to the optical recording and reading method.

Upon end of recording on data areas of the L0 recording and reading layers 14A and 34A, as illustrated in FIGS. 57 and 59B, recording on data areas of the L1 recording and reading layers 14B and 34B adjacent to the L0 recording and reading layers 14A and 34A is started.

(First recording and reading operation) When recording information on the L1 recording and reading layer 14B in the first group of recording and reading layers 14, the beam 270A in the red wavelength range from the first optical pickup 90A is applied to the second servo layer 20 from the first surface 10A to perform tracking. More specifically, a spot of the beam 270A is applied to the groove 20B and the land 20A of the second servo layer 20 to perform tracking.

Furthermore, simultaneously with the tracking, the recording beam 170A in the blue wavelength range from the recording and reading optical system 100A in the first optical pickup 90A is applied from the first surface 10A to the L1 recording and reading layer 14B.

As a result, information is recorded on the L1 recording and reading layer 14B from the outer peripheral side toward the inner peripheral side along the groove 20B and the land 20A relative to the optical recording medium 10 that rotates clockwise (first rotation direction) viewed from the first surface 10A side. A track pitch P2 of recording marks formed on the L1 recording and reading layer 14B is a half of the pitch P1 between grooves 20B or between lands 20A.

(Second recording and reading operation) When recording information on the L1 recording and reading layer 34B in the second group of recording and reading layers 34, tracking control of the second optical pickup 90B is performed using a tracking error signal from the first optical pickup 90A in the first recording and reading operation. Simultaneously with the tracking, the recording beam 170B in the blue wavelength range from the recording and reading optical system 100B in the second optical pickup 90B is applied to the L1 recording and reading layer 34B.

As a result, information is recorded on the L1 recording and reading layer 34B from the outer peripheral side toward the inner peripheral side along the groove 20B and the land 20A of the second servo layer 20 relative to the optical recording medium 10 that rotates counterclockwise (second rotation direction) viewed from the second surface 30A side. A track pitch P2 of recording marks formed on the L1 recording and reading layer 34B is also a half of the pitch P1 between grooves 20B or between lands 20A of the second servo layer 20.

The first recording operation and the second recording operation, which have been described above, are concurrently performed, thereby achieving simultaneous recording of information on the first and second groups of recording and reading layers 14 and 34 using the second servo layer 20.

After completion of necessary information recording on the L1 and L2 recording and reading layers 14B and 34B, relevant additional information (e.g., address information on the recording and content information) is recorded in the aforementioned management areas of the L0 recording and reading layers 14A and 34A.

As a result of repetition of the above recording operations, in the present optical recording and reading method, as indicated by arrow Q in FIG. 57, recording from the inside toward the outside in a radial direction of the optical recording medium 10 using the first servo layer 18 and recording from the outside toward the inside in the radial direction of the optical recording medium 10 using the second servo layer 20 are alternately performed.

Furthermore, in the present embodiment, information is recorded simultaneously on a pair of recording and reading layers in a same ordinal position from the center side in the thickness direction in the first and second groups of recording and reading layers 14 and 34. Specifically, a pair of recording and reading layers is selected in stacking order from the center side toward the outside in the thickness direction of the optical recording medium 10, and information is recorded on the pair of recording and reading layers.

Here, although a case where management areas are provided in the L0 recording and reading layers 14A and 34A has been described, management areas can be provided in other recording and reading layers. Also, where the first and second servo layers 18 and 20 have recording films, it is preferable that management areas be provided in the first and second servo layers 18 and 20 to record additional information therein. Recording on the first and second servo layers 18 and 20 may be performed using the beam 270A used for tracking control. Concentration of management information in the first and second servo layers 18 and 20 enables simultaneous obtainment of management information on both the first group of recording and reading layers 14 and the second group of recording and reading layers 34.

<Simultaneous Reproducing of Information from First and Second Groups of Recording and Reading Layers>

When the digital signal processing device 86 receives a request for reproducing data recorded on the optical recording medium 10, from the external information appliance, the reproducing unit 87A in the digital signal processing device 86 controls the power of the light sources 101A and 101B in the first and second optical pickups 90A and 90B to be constantly a predetermined reproduction level, thereby reproducing the information recorded on the optical recording medium 10. As already described in the recording operations, in the present embodiment, data to be recorded is divided into first data and second data, which are then separately recorded in paired recording and reading layers in a same ordinal position in the first and second groups of recording and reading layers 14 and 34. Thus, during reproduction, the first data and the second data are simultaneously reproduced and combined to reconstruct reproduced data.

Figure 58:
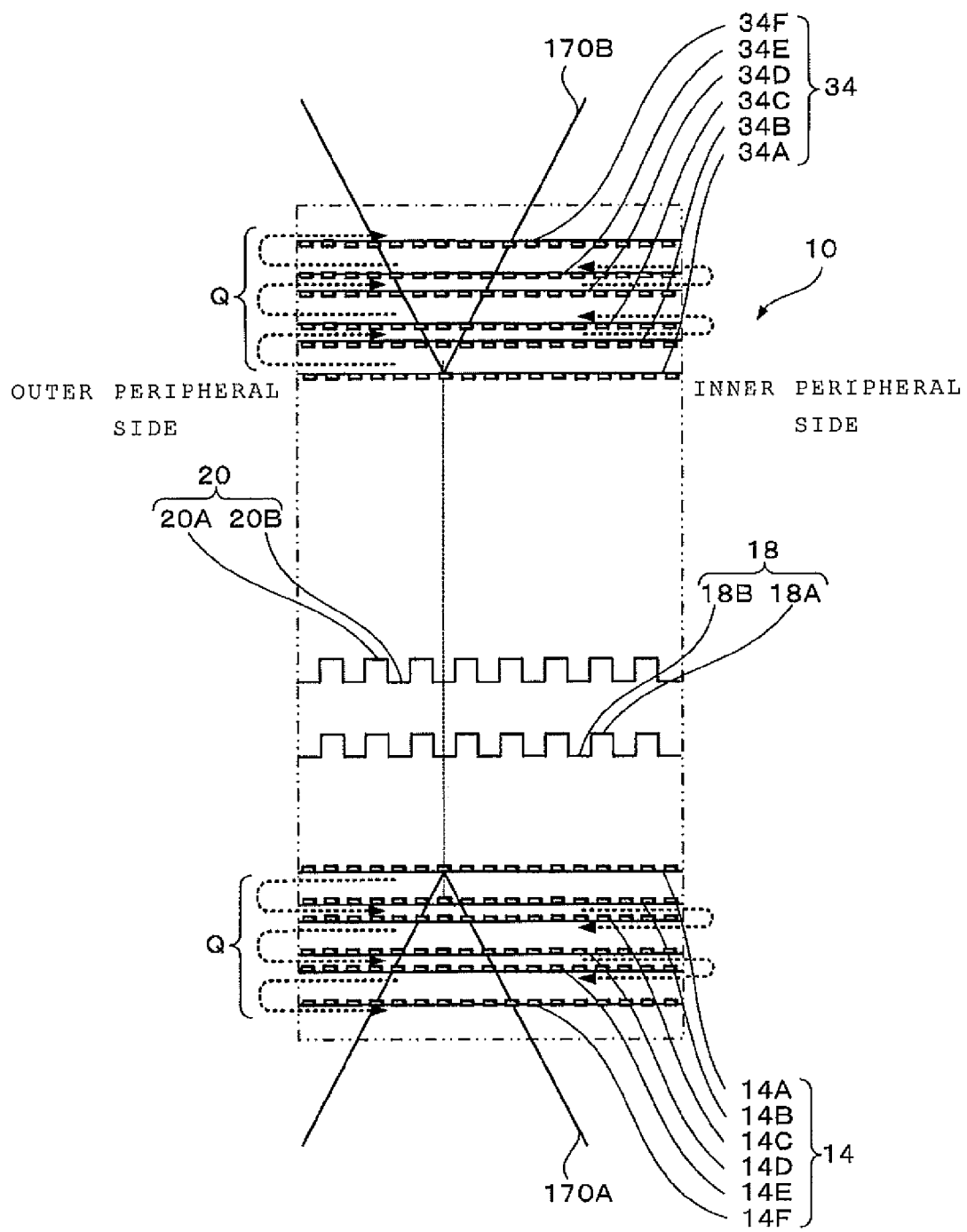
FIG. 58 is an enlarged sectional view illustrating a reproducing procedure for an optical recording medium according to the optical recording and reading method.

(First recording and reading operation) As illustrated in FIG. 58, when the first data recorded on the L0 recording and reading layer 14A in the first group of recording and reading layers 14 is reproduced, the reproduction is performed while the beam 170A from the recording and reading optical system 100A in the first optical pickup 90A is applied to the L0 recording and reading layer 14A to perform tracking control and focus control.

(Second recording and reading operation) When the second data recorded on the L0 recording and reading layer 34A in the second group of recording and reading layers 34 is reproduced, the reproduction is performed while the beam 170B from the recording and reading optical system 100B in the second optical pickup 90B is applied to the L0 recording and reading layer 34A to perform tracking control and focus control.

The first reproducing operation and the second reproducing operation are concurrently performed, thereby achieving simultaneous reproducing of the first data and the second data on the first and second groups of recording and reading layers 14 and 34. Although tracking control is performed using the first and second servo layers 18 and 20 during recording, during simultaneous reproducing, the first and second optical pickups 90A and 90B are separately and respectively subjected to tracking control using the recording and reading optical systems 100A and 100B.

The reproducing unit 87A receives analog reading signals from the first and second optical pickups 90A and 90B, and converts the analog signals into digital signals, thereby obtaining the first data and the second data. Furthermore, the reproducing unit 87A transfers the first and second data to the dividing/synthesizing unit 87C. The dividing/synthesizing unit 87C combines the first and second data received from the reproducing unit 87A to form one reproduced data, and conveys the reproduced data to the input/output interface unit 87D. The input/output interface unit 87D outputs the reproduced data to the external information appliance.

As described above, according to the optical recording and reading method of the ninth embodiment, while tracking control is performed by applying the tracking beam 270A to the first or second servo layer 18 or 20, the recording and reading beam 170A is applied to the first group of recording and reading layers 14 that rotates clockwise viewed from the first surface 10A side, thereby recording or reading information, and simultaneously with that, the recording and reading beam 170B is applied to the second group of recording and reading layers 34 that rotates counterclockwise viewed from the second surface 30A side, thereby recording or reading information. Consequently, information can be recorded or reproduced on or from a pair of recording and reading layers simultaneously, enabling a substantial increase in information transfer rate.

Furthermore, in the optical recording and reading method, either of the first and second servo layers 18 and 20 is shared to simultaneously record information on a pair of recording and reading layers while an optical axis of the recording and reading beam 170A from the first optical pickup 90A and an optical axis of the recording and reading beam 170B from the second optical pickup 90B are maintained to substantially correspond to each other. As a result, the first data and the second data are always recorded in a same tracking position, enabling simplification of reproducing control for simultaneous reproducing. Furthermore, in the second optical pickup 90B in the optical recording and reading apparatus 70, a tracking optical system can be omitted, enabling simplification of the structure.

In the present embodiment, if a large amount of the tracking beam 270A applied to the second servo layer 20 passes through the second servo layer 20, such large amount of the tracking beam 270A may adversely affect the second optical pickup 90B arranged on the same axis. Therefore, in the optical recording medium 10, a transmittance for the tracking beam 270A of the second servo layer 20 is set to no greater than 10%, thereby suppressing the adverse effect of the beam 270A on the second optical pickup 90B side.

Also, the digital signal processing device 86 in the optical recording and reading apparatus 70 divides data to be recorded, which has been received from the external information appliance, into first data for first recording operation and second data for second recording operation to simultaneously record the first data and the second data on paired recording and reading layers. Furthermore, the digital signal processing device 86 simultaneously reproduces the first data and the second data recorded simultaneously on the paired recording and reading layers, and combines the first data and the second data to output the combined data to the external information appliance as if the combined data is one reproduced data. Accordingly, an interface that is the same as those of conventional optical recording and reading apparatuses that perform recording or reading on or from one recording and reading layer can be provided for the external information appliance, and thus, the need to change specifications of the external information appliance can be eliminated.

Furthermore, in the present optical recording and reading method, the optical recording medium 10 includes the first servo layer 18 that includes a concavo-convex pattern or a groove for tracking control, which extend in the first spiral direction, and a second servo layer 20 including a concavo-convex pattern or a groove for tracking control, which extend in the second spiral direction opposite to the first spiral direction, as servo layers. Furthermore, a step of performing the first recording operation and the second recording operation simultaneously while the first servo layer 18 is shared to perform tracking control of the optical recording medium 10 from the inner peripheral side toward the outer peripheral side and a step of performing the first recording operation and the second recording operation simultaneously while the second servo layer 20 is shared to perform tracking control of the optical recording medium 10 from the outer peripheral side toward the inner peripheral side are alternately switched from each other every time the recording and reading layer is switched from one another. Accordingly, as illustrated in FIG. 57, when the recording and reading layer is switched to another, merely moving the recording and reading beams 170A and 170B from the first and second optical pickups 90A and 90B in a focus direction enables the recording and reading beams 170A and 170B to be quickly moved to a recording start position or a reproducing start position in a pair of recording and reading layers, which are destinations of the movement. Consequently, a decrease in transfer rate at the time of switching of recording and reading layers can be suppressed.

Furthermore, in the present optical recording and reading method, a wavelength of the tracking beam 270A and a wavelength of the recording and reading beams 170A and 170B are set to be different from each other. Specifically, the wavelength of the tracking beam 270A is set to 630 to 680 nm in the red wavelength range, and the wavelength of the recording and reading beams 170A and 170B are set to 380 to 450 nm in the blue wavelength range.

In addition, in the optical recording medium 10, a reflectance of the first and second servo layers 18 and 20 when the tracking beam 270A in the red wavelength range is applied thereto is set to be larger compared to a reflectance assuming that the recording and reading beam 170A is applied to the first and second servo layers 18 and 20. More specifically, in order to provide such reflectance, a material that absorbs a larger amount of light as the wavelength of the beam is shorter is selected for the first buffer layer 17.

Consequently, even if the recording and reading beam 170A having a wavelength in the blue wavelength range is incident on the first and second servo layers 18 and 20, such recording and reading beam 170A is easily absorbed by the first buffer layer 17, enabling suppression of an amount of light reaching the first and second servo layers 18 and 20 (amount of reflected light from the first and second servo layers 18 and 20). Meanwhile, the tracking beam 270A from the first optical pickup 90A can actively pass through the first buffer layer 17, and thus, the amount of light reaching the first and second servo layers 18 and 20 (amount of reflected light from the first and second servo layers 18 and 20) can be increased. Consequently, stable tracking control can be provided while the quality of reading signal is increased.

While in the present embodiment, the first buffer layer 17 is provided with a characteristic exhibiting different absorptivities for a tracking beam (red wavelength) and a recording and reading beam (blue wavelength), and the first and second servo layers 18 and 20 consequently have different reflectances for the tracking beam and the recording and reading beam, the present invention is not limited to this case. For example, the reflecting films formed on the first and second servo layers 18 and 20 themselves may be provided with wavelength dependence so as to exhibit different reflectances for different wavelengths. Also, separately from the first buffer layer 17, a filter layer having wavelength dependence for light transmittance and/or absorptance may be formed.

Furthermore, in the optical recording and reading method, information is recorded simultaneously on recording and reading layers in a same ordinal position in the first group of recording and reading layers 14 and the second group of recording and reading layers 34, from a center in the thickness direction of the optical recording medium 10. Consequently, the paired recording and reading layers that are recording targets are similar to each other in their distances from the respective surfaces 10A and 30A of the optical recording medium 10, and the beams have optical paths symmetrical to each other. Consequently, for example, a control signal obtained in the first optical pickup 90A, more specifically, control information such as inclination or wobbling of the optical recording medium 10 can be used as it is for a control signal for the second optical pickup 90B by reversing the polarity of such information. Consequently, in the second optical pickup 90B, a special photodiode mechanism or the like for obtaining such control signal can be omitted.

Furthermore, in the optical recording medium 10, the first buffer layer 17 and the second buffer layer 37, which are relatively thick, are made to have thicknesses similar to each other, and the first and second buffer layers 17 and 37 are simultaneously formed, enabling suppression of warpage of the support substrate 12. This means that the support substrate 12 can be made to be thin and can also be made to include a material having a low rigidity, and thus, the spaces for forming recording and reading layers can be accordingly increased.

In particular, in the present embodiment, when producing the optical recording medium 10, except the inter-servo buffer layer 19, the first buffer layer 17 and the second buffer layer 37, the first group of recording and reading layers 14 and the second group of recording and reading layers 34, and the first group of intermediate layers 16 and the second group of intermediate layers 36 are simultaneously formed on surfaces on the opposite sides. Consequently, internal stress generated during ultraviolet curing is equally imposed on the opposite sides of the support substrate 12, enabling further reduction of warpage of the optical recording medium 10.

While the optical recording and reading method of the above-described embodiment has been described in terms of a case where information is recorded on the layers in the first and second groups of recording and reading layers 14 and 34 in stacking order from the center side toward the outside in the thickness direction of the optical recording medium 10, the present invention is not limited to this case. For example, information can be recorded on layers in the first and second groups of recording and reading layers 14 and 34 in layer order from the outside toward the center side of the optical recording medium 10. Also, a pair of recording and reading layers in a same ordinal position is randomly extracted from the first and second groups of recording and reading layers 14 and 34 to perform recording thereon.

Figure 60:
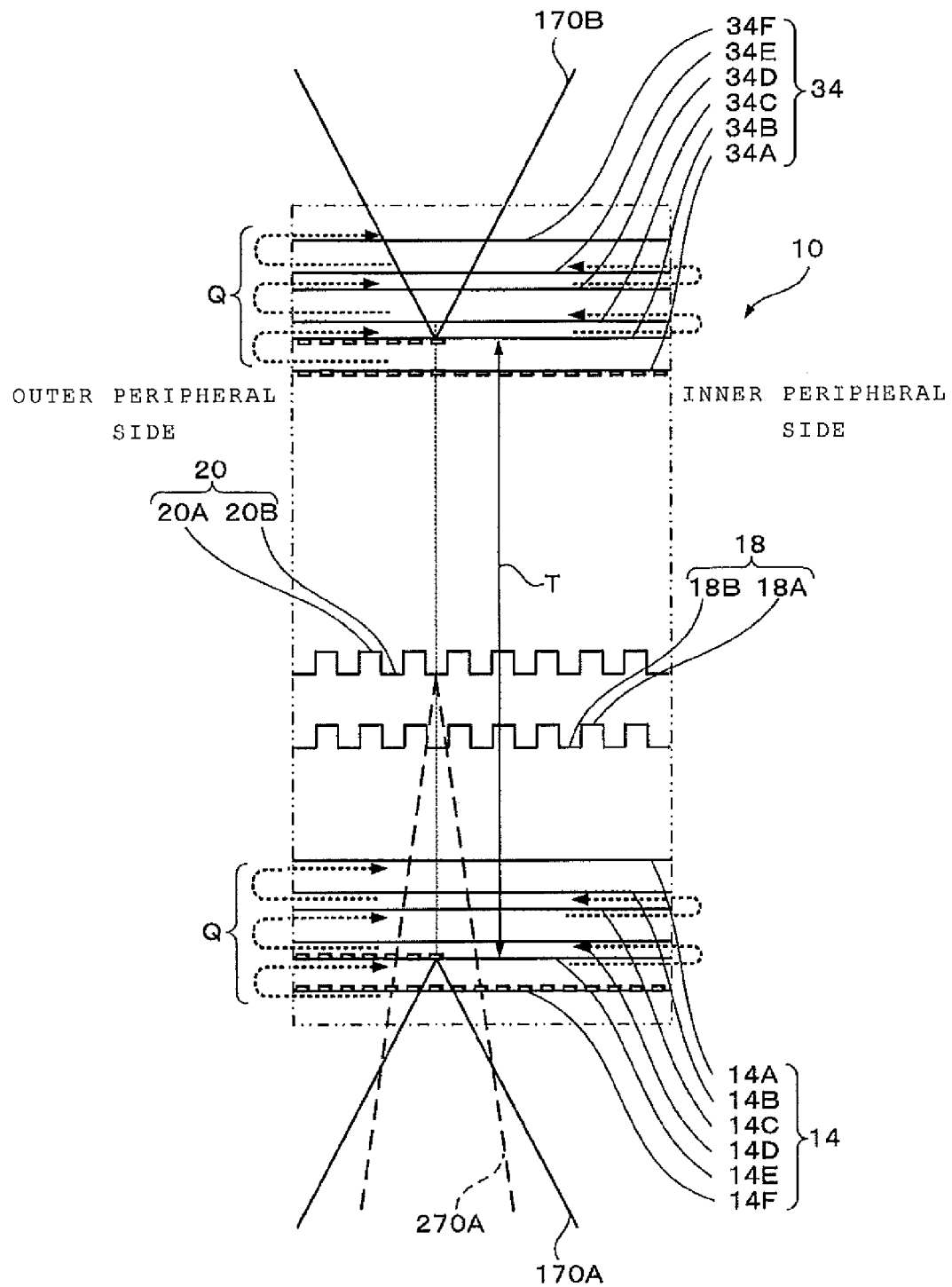
FIG. 60 is an enlarged sectional view illustrating another reproducing procedure for an optical recording medium according to the optical recording and reading method.

Furthermore, although the optical recording and reading method of the above-described embodiment has been described in terms of a case where information is recorded or reproduced on or from a pair of recording and reading layers in a same ordinal position from the center side in the thickness direction of the optical recording medium 10, the present invention is not limited to this case. For example, as indicated by arrow Q in FIG. 60, a pair of recording and reading layers can be selected from the first and second groups of the recording and reading layers 14, 34 such that the ordinal position of the recording and reading layer of the first group in order from the first surface 10A side for the first recording and reading operation corresponds to the ordinal position of the recording and reading layer of the second group in order from the center side in the thickness direction of the optical recording medium 10 for the second recording and reading operation Consequently, an interfocal distance T between a focal point of the recording and reading beam 170A on the first optical pickup 90A side and a focal point of the recording and reading beam 170B on the second optical pickup 90B side can be made to be constant or relatively stable. As a result, the number of intermediate layers 16 and 36 that are present between the focal points of the paired beams 170A and 170B are made to be always constant. Accordingly, an amount of change in the interfocal distance T due to errors in film formation of the groups of intermediate layers 16 and 36 can be kept within a fixed range, which leads to reduction in, e.g., focus errors. In particular, when the beams 170A and 170B jump on next recording and reading layers, also, the probability of the beams 170A and 170B jumping to wrong recording and reading layers can be reduced if the focal points of the beams 170A and 170B are simultaneously moved with the interfocal distance T fixed.

Figure 61:
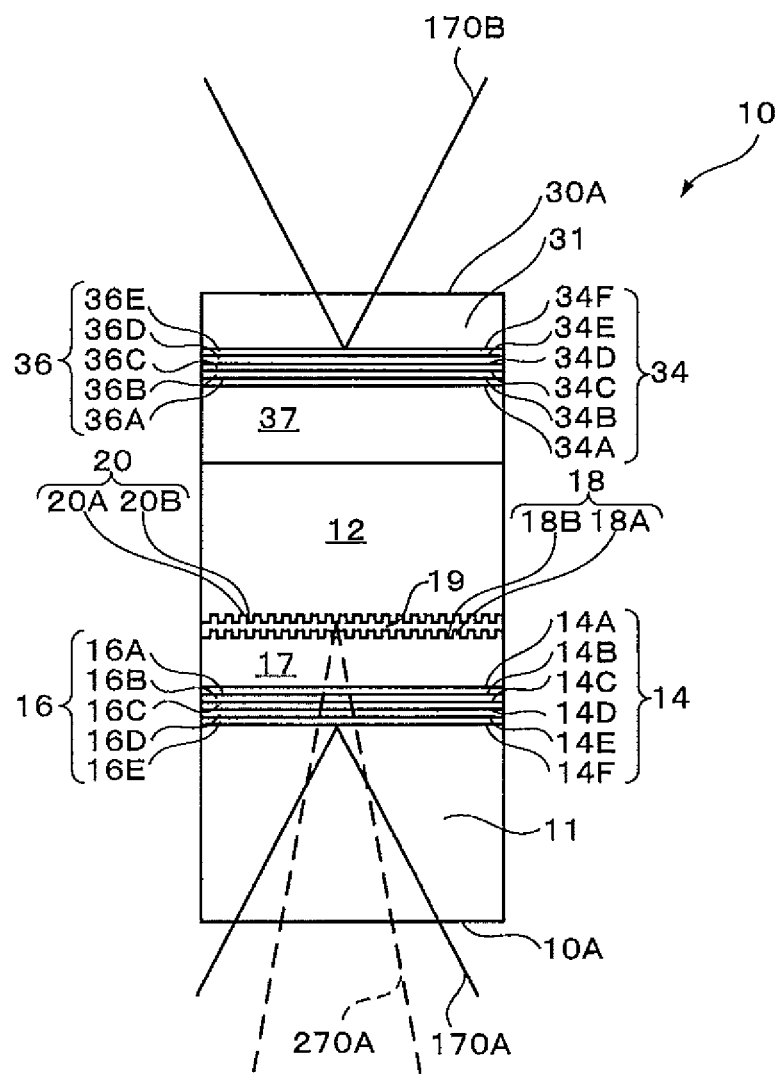
FIG. 61 is a sectional view illustrating another example multilayer structure of an optical recording medium to which the optical recording and reading method is applied.

Furthermore, although the optical recording medium 10 of the above-described embodiment has been described in terms of a case where the first cover layer 11 and the second cover layer 31 are made to have a same thickness, the present invention is not limited to this case. For example, like the optical recording medium 10 illustrated in FIG. 61, it is preferable that the first cover layer 11 and the second cover layer 31 be made to have different thicknesses. More specifically, the thickness of the first cover layer 11 is set to be larger by the amount of the thickness of the support substrate 12, compared to the thickness of the second cover layer 31. Consequently, the first and second servo layers 18 and 20 are positioned at the center in the thickness direction of the optical recording medium 10. Also, when producing the optical recording medium 10, it is preferable to separately stack a first cover layer 11 and a second cover layer 31 having different thicknesses. Even though these layers are not simultaneously stacked, a certain level of rigidity has already been provided by the support substrate 12, the first and second buffer layers 17 and 37, the first group of recording and reading layers 14 and the first group of intermediate layers 16, and the second group of recording and reading layers 34 and the second group of intermediate layers 36, and thus, warpage and/or deformation of the optical recording medium 10 are sufficiently suppressed.

Figure 62:
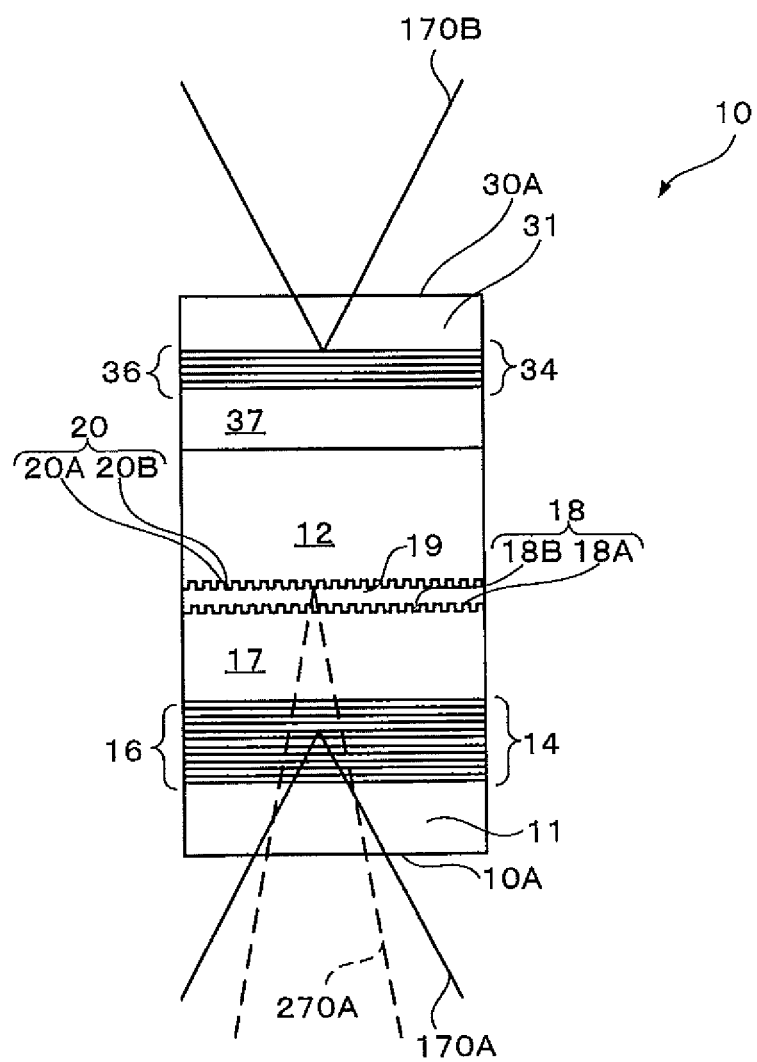
FIG. 62 is a sectional view illustrating another example multilayer structure of an optical recording medium to which the optical recording and reading method is applied.

Also, like the optical recording medium 10 illustrated in FIG. 62, thicknesses of the first and second buffer layers 17 and 37 or the inter-layer distance or the number of layers in the first and second groups of recording and reading layers 14 and 34 can be made to be different from each other to consequently position the first and second servo layers 18 and 20 at the center in the thickness direction.

Figure 63:
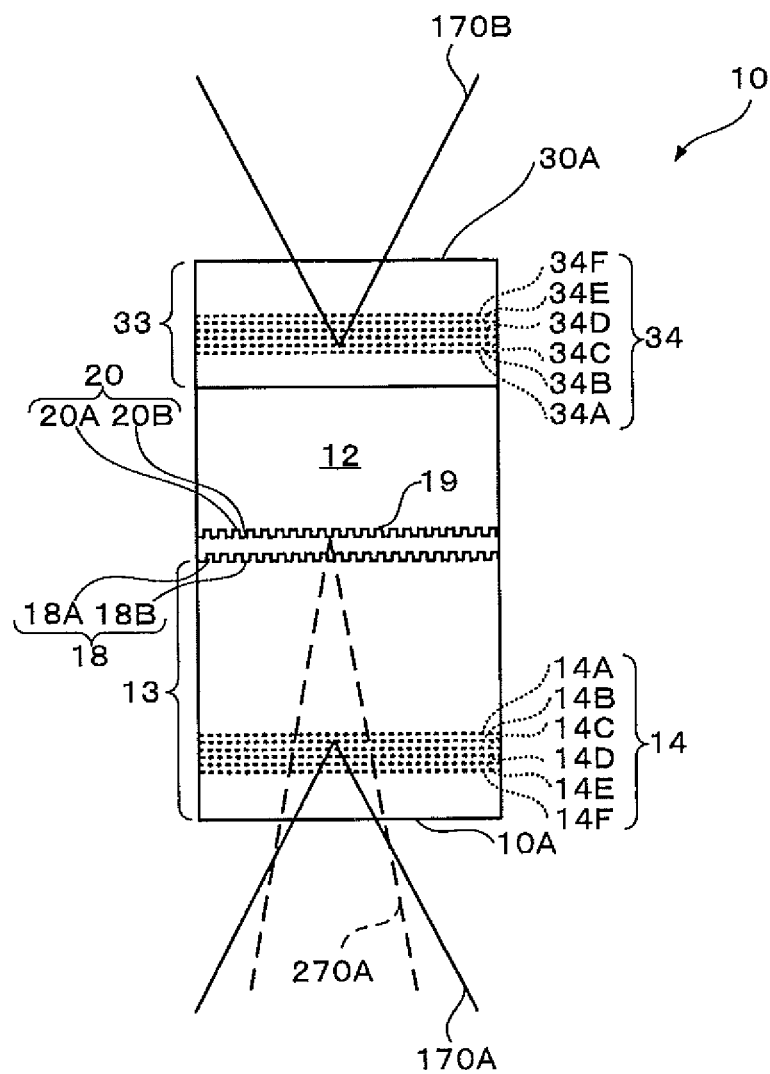
FIG. 63 is a sectional view illustrating another example multilayer structure of an optical recording medium to which the optical recording and reading method is applied.

Furthermore, although the above embodiment has been described only in terms of a case where recording layers have already been formed in advance as recording and reading layers in the first and second groups of recording and reading layers 14 and 34, the present invention is not limited to this case. For example, like the optical recording medium 10 illustrated in FIG. 63, first and second bulk layers 13 and 33 having predetermined thicknesses can be formed in entire areas in which future first and second groups of recording and reading layers may be formed. Upon application of the recording beams 170A and 170B to the first and second bulk layers 13 and 33, only the focal point parts of beam spots change in state, thereby recording marks being formed. In other words, an optical recording medium according to the present invention is not limited to those including recording and reading layers formed in advance, to which beams are applied, and includes an example in which recording marks are formed in planar areas as needed, and as aggregates of the recording marks, the first and second groups of recording and reading layers 14 and 34 are formed ex post facto in multiple layers. Employment of the structures of the bulk layers 13 and 33 in the optical recording medium 10 enables positions of recording and reading layers to be freely set within the areas of the bulk layers 13 and 33. For example, even though the first bulk layer 13 and the second bulk layer 33 have different thicknesses or are arranged at different positions, distances of the first and second groups of recording and reading layers 14 and 34 from the first and second surfaces 10A and 30A can be made to correspond to each other. Here, a structure in which cover layers and buffer layers are omitted when the first and second bulk layers 13 and 33 are employed is illustrated.

Figure 64:
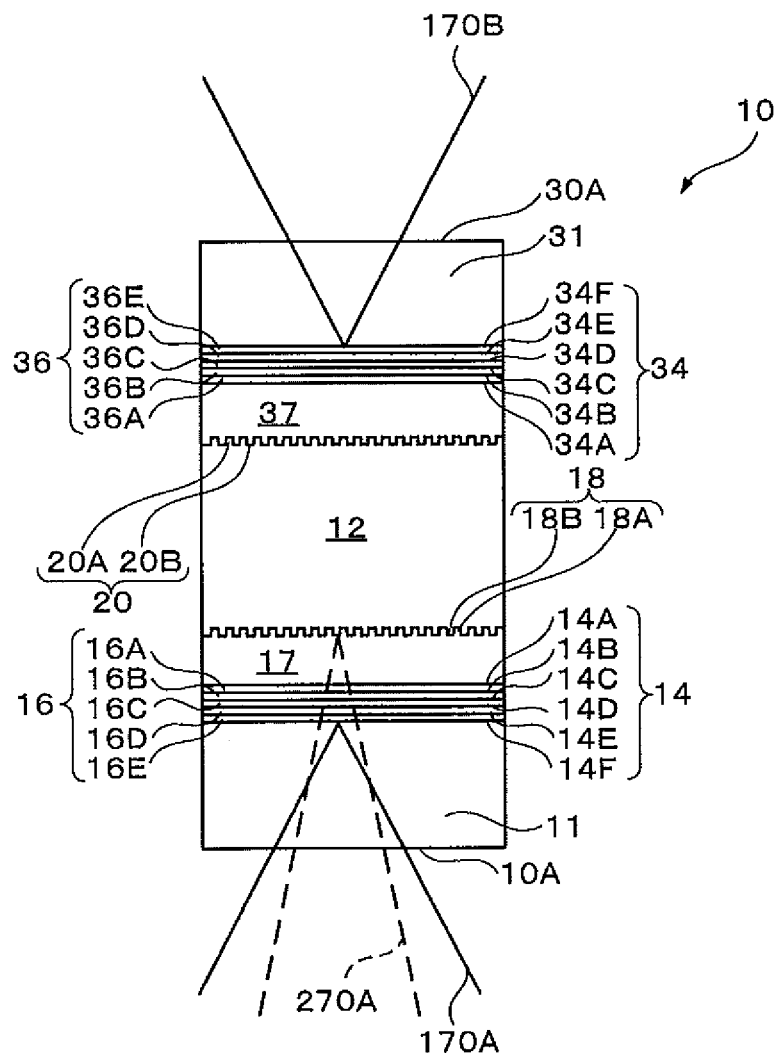
FIG. 64 is a sectional view illustrating another example multilayer structure of an optical recording medium to which the optical recording and reading method is applied.

Also, although the optical recording medium 10 to which the optical recording and reading method according to the present embodiment is applied has been described in terms of a case where both the first and second servo layers 18 and 20 are formed on one side of the support substrate 12 and the first group of recording and reading layers 14 and the second group of recording and reading layers 34 are arranged on opposite surfaces of the support substrate 12, the present invention is not limited to this case. For example, as illustrated in FIG. 64, it is possible to arrange the first servo layer 18 on one side of the support substrate 12 and the second servo layer 20 on another side of the support substrate 12. The symmetry in the thickness direction of the optical recording medium 10 is further enhanced, enabling reduction of warpage.

INDUSTRIAL APPLICABILITY

The optical recording medium and the optical recording and reading method according to the present invention are applicable to various types of optical recording medium having servo layers and recording and reading layers.

The entire disclosure of Japanese Patent Applications No. 2011-22478 filed on Feb. 4, 2011, 2011-073934 filed on Mar. 30, 2011, 2011-073929 filed on Mar. 30, 2011, 2011-073931 filed on Mar. 30, 2011, 2011-073930 filed on Mar. 30, 2011, 2011-073932 filed on Mar. 30, 2011 and 2011-073933 filed on Mar. 30, 2011 including specifications, claims, drawings, and summaries are incorporated herein by reference in its entirety.

What is claimed is:

1. An optical recording and reading method for recording information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein,
wherein a recording and reading beam having a second wavelength shorter than a first wavelength is applied to the recording and reading layer to record or read information while a tracking beam having the first wavelength is applied to the servo layer to perform tracking control, and
wherein a reflectance of the servo layer at a time when light of the recording and reading beam having the second wavelength is applied through the recording and reading layer to the servo layer is lower than a reflectance of the servo layer at a time when light of the tracking beam having the first wavelength is applied through the recording and reading layer to the servo layer.

2. The optical recording and reading method according to claim 1, wherein an amount of reflected light from the servo layer at a time when the recording and reading beam is applied through the recording and reading layer to the servo layer is less than or equal to five times of an amount of reflected light from the recording and reading layer at a time when the recording and reading beam is applied to the recording and reading layer.

3. The optical recording and reading method according to claim 2, wherein an amount of reflected light from the servo layer at a time when the recording and reading beam is applied through the recording and reading layer to the servo layer is less than an amount of reflected light from the recording and reading layer at a time when the recording and reading beam is applied to the recording and reading layer.

4. The optical recording and reading method according to claim 1, wherein an inter-layer distance between the recording and reading layer and the servo layer is 10 to 200 μm.

5. The optical recording and reading method according to claim 1, wherein the reflectance of the servo layer at a time when the tracking beam is applied through the recording and reading layer to the servo layer is 40% to 95%, and the reflectance of the servo layer at a time when the recording and reading beam is applied through the recording and reading layer to the servo layer by way of experiment is less than or equal to 60%.

6. The optical recording and reading method according to claim 1, wherein the servo layer has a reflecting film that contains metal as a major component, and an auxiliary film that is arranged adjacent to the reflecting film and is different in refractive index from the reflecting film.

7. The optical recording and reading method according to claim 6, wherein the servo layer has the reflecting films the number of which is two or more, and the auxiliary films the number of which is three or more.

8. The optical recording and reading method according to claim 1, wherein a filter layer in which dye is bound or dispersed is provided between the servo layer and the recording and reading layer, and
wherein the filter layer has a low absorbance for the first wavelength of the tracking beam, and a high absorbance for the second wavelength of the recording and reading beam.

9. The optical recording and reading method according to claim 1,
wherein a first recording and reading layer is arranged on one side of the servo layer,
wherein a second recording and reading layer is arranged on a side opposite to the first recording and reading layer with respect to the servo layer, and
wherein information is recorded in the second recording and reading layer while tracking control is performed using the servo layer.

10. The optical recording and reading method according to claim 9,
wherein the servo layer is formed directly on a side of the first recording and reading layer with respect to a substrate, and
wherein the second recording and reading layer is formed on a side opposite to the servo layer with respect to the substrate.

11. The optical recording and reading method according to claim 10, wherein the substrate is made of a light transmitting material.

12. The optical recording and reading method according to claim 9, wherein the first recording and reading layer and the second recording and reading layer are previously stacked or formed afterward in symmetrical positions with respect to a center of a thickness of the substrate.

13. The optical recording and reading method according to claim 9, wherein the thickness of the substrate is 10 to 600 μm.

14. An optical recording and reading method for recording information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein,
wherein information is recorded in the recording and reading layer while tracking is performed using the servo layer,
wherein the optical recording medium has a first set of a plurality of the recording and reading layers arranged on a side of a first surface, and a second set of a plurality of the recording and reading layers arranged on a side of a second surface opposite to the first surface, wherein the number of layers of the second set of the recording and reading layers is equal to the number of layers of the first set of the recording and reading layers, and
wherein a first recording and reading operation for recording or reading information by applying a first recording and reading beam through the first surface to the first set of the recording and reading layers and a second recording and reading operation for recording or reading information by applying a second recording and reading beam through the second surface to the second set of the recording and reading layers are performed simultaneously.

15. The optical recording and reading method according to claim 14, wherein ordinal positions of the first set of the recording and reading layers during the first recording and reading operation and ordinal positions of the second set of the recording and reading layers during the second recording and reading operation correspond to each other, wherein the ordinal positions of the first set of the recording and reading layers are in order from closest to the side of the first surface, and the ordinal positions of the second set of the recording and reading layers are in order from closest to a center of a thickness of the optical recording medium.

16. The optical recording and reading method according to claim 15, wherein recording or reading is performed on the first set of the plurality of the recording and reading layers in order from closest to the first surface, and recording or reading is performed on the second set of the plurality of the recording and reading layers in order from closest to the center of the thickness of the optical recording medium.

17. The optical recording and reading method according to claim 15, wherein recording or reading is performed simultaneously in or from recording and reading layers of the first set and the second set such that the recording and reading layers of the first set and the second set are in a same ordinal position in order from closest to the center of the thickness of the recording and reading layers.

18. The optical recording and reading method according to claim 14, wherein tracking control is performed using the tracking beam and the servo layer in the first recording and reading operation and the second recording and reading operation, wherein the tracking beam and the servo layer are common in the first and second recording and reading operations.

19. The optical recording and reading method according to claim 14,
wherein the servo layer is formed on at least one face of a substrate of the optical recording medium, and
wherein the substrate is substantially transparent.

20. The optical recording and reading method according to claim 14, wherein when information is recorded simultaneously in the first set and the second set of the recording and reading layers by the first recording and reading operation and the second recording and reading operation, trial writing is performed by the first or second recording and reading beam on a trial writing area of either the first set or the second set of the recording and reading layers, to set optimum recording powers for both the first and second recording and reading beams.

21. The optical recording and reading method according to claim 20,
wherein when recording is performed simultaneously in recording and reading layers of the first set and the second set such that the recording and reading layers of the first set and the second set are in even number-th ordinal positions in order from closest to a center of a thickness of the optical recording medium, trial writing is performed by the first recording and reading beam on a trial writing area of the first set of the recording and reading layers, to set optimum recording powers for both the first and second recording and reading beams, and
wherein when recording is performed simultaneously in recording and reading layers of the first set and the second set such that the recording and reading layers of the first set and the second set are in odd number-th ordinal positions in order from closest to the center of the thickness of the optical recording medium, trial writing is performed by the second recording and reading beam on a trial writing area of the second set of the recording and reading layers, to set optimum recording powers for both the first and second recording and reading beams.

22. The optical recording and reading method according to claim 14,
wherein when an optimum recording power of the first recording and reading beam for recording in an n-th recording and reading layer of the first set of the recording and reading layers in order from closest to the center of the thickness of the optical recording medium has been undetermined and is to be set,
if an optimum recording power of the second recording and reading beam for recording in an n-th recording and reading layer of the second set of the recording and reading layers in order from closest to the center of the thickness of the optical recording medium has already been determined, the optimum recording power of the second recording and reading beam is determined to be the optimum recording power of the first recording and reading beam, and
if the optimum recording power of the second recording and reading beam for recording in the n-th recording and reading layer of the second set of the recording and reading layers has been undetermined, trial writing is performed by the first recording and reading beam on a trial writing area of the n-th recording and reading layer of the first set of the recording and reading layers, to determine the optimum recording power of the first recording and reading beam, and
wherein when an optimum recording power of the second recording and reading beam for recording in an m-th recording and reading layer of the second set of the recording and reading layers in order from closest to the center of the thickness of the optical recording medium has been undetermined and is to be set,
if an optimum recording power of the first recording and reading beam for recording in an m-th recording and reading layer of the first set of the recording and reading layers in order from closest to the center of the thickness of the optical recording medium has already been determined, the optimum recording power of the first recording and reading beam is determined to be the optimum recording power of the second recording and reading beam, and
if the optimum recording power of the first recording and reading beam for recording in the m-th recording and reading layer of the first set of the recording and reading layers has been undetermined, trial writing is performed by the second recording and reading beam on a trial writing area of the m-th recording and reading layer of the second set of the recording and reading layers, to determine the optimum recording power of the second recording and reading beam.

23. The optical recording and reading method according to claim 14, wherein the first set of the recording and reading layers and the second set of the recording and reading layers are arranged in symmetrical positions with respect to the center of the thickness of the optical recording medium.

24. An optical recording and reading method for recording information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein,
the optical recording medium has a substrate, the substrate is made of a light transmitting material,
the servo layer is formed on one face of the substrate, a first recording and reading layer is arranged on a side of the servo layer of the substrate, and a second recording and reading layer is arranged on a side opposite to the servo layer of the substrate, and information is recorded in the first recording and reading layer and the second recording and reading layer while tracking control is performed using the servo layer, wherein a first cover layer is stacked outside a recording and reading layer of the first recording and reading layer that is farthest from the substrate, and a second cover layer is stacked outside a recording and reading layer of the second recording and reading layer that is farthest from the substrate, and wherein a thickness of the first cover layer is set to be larger by a thickness of the substrate than a thickness of the second cover layer.

25. The optical recording and reading method according to claim 24, wherein a first buffer layer is stacked between the first recording and reading layer that has been previously stacked and the servo layer, and a second buffer layer is stacked between the second recording and reading layer that has been previously stacked and the substrate, wherein a thickness of the first buffer layer and a thickness of the second buffer layer are substantially equal to each other.

26. The optical recording and reading method according to claim 24, wherein at a wavelength of a tracking beam applied to the servo layer, a refractive index of the substrate is higher than a refractive index of the second buffer layer.

27. The optical recording and reading method according to claim 24, wherein at a wavelength of a tracking beam applied to the servo layer, a refractive index of the substrate is higher than a refractive index of the first buffer layer.

28. The optical recording and reading method according to claim 24, wherein the first recording and reading layer and the second recording and reading layer are previously stacked or formed afterward in symmetrical positions with respect to a center of a thickness of the substrate.

29. The optical recording and reading method according to claim 24, wherein the first recording and reading layer comprises a plurality of the recording and reading layers, and the second recording and reading layer comprises a plurality of the recording and reading layers.

30. An optical recording and reading method for recording information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, the optical recording medium has a substrate, the substrate is made of a light transmitting material, the servo layer is formed on one face of the substrate, a first recording and reading layer is arranged on a side of the servo layer of the substrate, and a second recording and reading layer is arranged on a side opposite to the servo layer of the substrate, and information is recorded in the first recording and reading layer and the second recording and reading layer while tracking control is performed using the servo layer, wherein a tracking beam applied to the servo layer is set to be longer in wavelength than a recording and reading beam applied to the first or the second recording and reading layer, and wherein a reflectance of the servo layer in a case where the tracking beam is applied is greater than a reflectance of the servo layer in a case where the recording and reading beam is applied to the servo layer by way of experiment.

31. An optical recording and reading method for recording information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, the optical recording medium has a substrate, the substrate is made of a light transmitting material, the servo layer is formed on one face of the substrate, a first recording and reading layer is arranged on a side of the servo layer of the substrate, and a second recording and reading layer is arranged on a side opposite to the servo layer of the substrate, and information is recorded in the first recording and reading layer and the second recording and reading layer while tracking control is performed using the servo layer, wherein a thickness of the substrate is 10 to 600 µm.

32. An optical recording and reading method for recording information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, a first recording operation for recording information by applying a first recording and reading beam to a first recording and reading layer while performing tracking control by applying a tracking beam to the servo layer; and a second recording operation for recording information by applying a second recording and reading beam to a second recording and reading layer while performing tracking control using the tracking beam and the servo layer that are common with the first recording operation, wherein the first recording and reading beam in the first recording operation is incident from a first surface of the optical recording medium, and wherein the second recording and reading beam in the second recording operation is incident from a second surface opposite to the first surface of the optical recording medium.

33. The optical recording and reading method according to claim 32, wherein the first recording operation and the second recording operation are simultaneously performed to record information simultaneously in the first and the second recording and reading layers.

34. An optical recording and reading method for recording information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, a first recording operation for recording information by applying a first recording and reading beam to a first recording and reading layer while performing tracking control by applying a tracking beam to the servo layer; and a second recording operation for recording information by applying a second recording and reading beam to a second recording and reading layer while performing tracking control using the tracking beam and the servo layer that are common with the first recording operation, wherein in the first recording operation, recording is performed in the first recording and reading layer that is arranged on one side with respect to a center of a thickness of the optical recording medium, and wherein in the second recording operation, recording is performed in the second recording and reading layer that is arranged on an opposite side with respect to the center of the thickness of the optical recording medium.

35. The optical recording and reading method according to claim 34, wherein the first recording and reading layer and the second recording and reading layer are arranged in symmetrical positions with respect to the center of the thickness of the optical recording medium.

36. An optical recording and reading method for recording information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, a first recording operation for recording information by applying a first recording and reading beam to a first recording and reading layer while performing tracking control by applying a tracking beam to the servo layer; and a second recording operation for recording information by applying a second recording and reading beam to a second recording and reading layer while performing tracking control using the tracking beam and the servo layer that are common with the first recording operation, wherein a transmittance of the tracking beam through the servo layer of the optical recording medium is set to be less than or equal to 10%.

37. An optical recording and reading method for recording information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, first recording and reading layer is arranged on a side of a first surface of the optical recording medium with respect to the servo layer, and a second recording and reading layer is arranged on a side of a second surface of the optical recording medium with respect to the servo layer, the method comprising:

a first recording operation for recording information in a first rotation direction as viewed from the first surface by applying a first recording and reading beam through the first surface to the first recording and reading layer while performing tracking control by applying a tracking beam to the servo layer; and a second recording operation for recording operation in a second rotation direction opposite to the first rotation direction as viewed from the second surface by applying a second recording and reading beam through the second surface to the second recording and reading layer while performing tracking control using the servo layer that is common with the first recording operation, wherein the second recording operation is performed simultaneously with the first recording operation.

38. The optical recording and reading method according to claim 37, wherein the first recording operation and the second recording operation are simultaneously performed while keeping the first recording and reading beam and the second recording and reading beam to be substantially coaxial with each other.

39. The optical recording and reading method according to claim 37, wherein the first recording operation and the second recording operation are simultaneously performed by applying the tracking beam to the servo layer wherein the tracking beam is common in the first recording operation and the second recording operation.

40. The optical recording and reading method according to claim 37, wherein data to be recorded in the optical recording medium is divided by a digital signal processor that controls the first and second recording and reading beams, into first data on a side of the first recording operation and second data on a side of the second recording operation.

41. The optical recording and reading method according to claim 37, wherein the optical recording medium has, as the servo layer, a first servo layer having a concavo-convex pattern or a groove for the tracking control in a first spiral direction and a second servo layer having a concavo-convex pattern or a groove for the tracking control in a second spiral direction opposite to the first spiral direction, the method comprising:

a step of performing the first recording operation and the second recording operation while performing tracking control from an inner periphery side of the optical recording medium toward an outer periphery side of the optical recording medium using the first servo layer, wherein the first servo layer is common in the first recording operation and the second recording operation; and a step of performing the first recording operation and the second recording operation while performing tracking control from the outer periphery side of the optical recording medium toward the inner periphery side of the optical recording medium using the second servo layer, wherein the second servo layer is common in the first recording operation and the second recording operation.

42. The optical recording and reading method according to claim 37, wherein a wavelength of the tracking beam and a wavelength of the first or second recording and reading beam are different from each other.

43. The optical recording and reading method according to claim 37, wherein a wavelength of the first or second recording and reading beam is in a range of 380 to 450 nm.

44. An optical recording and reading apparatus that records information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, the optical recording and reading apparatus records information in the recording and reading layer while performing tracking using the servo layer, wherein the optical recording medium has a first set of a plurality of the recording and reading layers on a side of a first surface, and a second set of a plurality of the recording and reading layers on a side of a second surface opposite to the first surface, wherein the number of layers of the second set of the recording and reading layers is equal to the number of layers of the first set of the recording and reading layers, the optical recording and reading apparatus comprising:
a first recording and reading optical system that is arranged on the side of the first surface of the optical recording medium, and that records or reads information by applying a first recording and reading beam through the first surface to the first set of the recording and reading layers; and
a second recording and reading optical system that is arranged on the side of the second surface of the optical recording medium, and that records or reads information by applying a second recording and reading beam through the second surface to the second set of the recording and reading layers.

45. The optical recording and reading apparatus according to claim 44, wherein the first recording and reading optical system and the second recording and reading optical system simultaneously perform recording or reading in or from recording and reading layers of the first set and the second set such that the recording and reading layers of the first set and the second set are in a same ordinal position in order from closest to a center of a thickness of the optical recording medium.

46. The optical recording and reading apparatus according to claim 44, wherein ordinal positions of the first set of the recording and reading layers on which recording is performed by the first recording and reading optical system and ordinal positions of the second set of the recording and reading layers on which recording is performed by the second recording and reading optical system correspond to each other, wherein the ordinal positions of the first set of the recording and reading layers are in order from closest to the side of the first surface, and the ordinal positions of the second set of the recording and reading layers are in order from closest to a center of a thickness of the optical recording medium.

47. The optical recording and reading apparatus according to claim 44, further comprising an output controller that, when information is recorded simultaneously in the first set and the second set of the recording and reading layers by the first recording and reading optical system and the second recording and reading optical system, performs trial writing by the first or second recording and reading beam on a trial writing area of either the first set or the second set of the recording and reading layers, to set optimum recording powers for both the first and second recording and reading beams.

48. The optical recording and reading apparatus according to claim 44, further comprising an output controller that determines optimum recording powers of the first and second recording and reading beams and stores the optimum recording powers in a memory,
wherein when an optimum recording power of the first recording and reading beam for recording in an n-th recording and reading layer of the first set of the recording and reading layers in order from closest to a center of a thickness of the optical recording medium has been undetermined and is to be set,
if an optimum recording power of the second recording and reading beam for recording in an n-th recording and reading layer of the second set of the recording and reading layers in order from closest to the center of the thickness of the optical recording medium has already been stored with reference to the memory, the output controller determines the optimum recording power of the second recording and reading beam to be the optimum recording power of the first recording and reading beam, and
if the optimum recording power of the second recording and reading beam for recording in the n-th recording and reading layer of the second set of the recording and reading layers has not been stored, the output controller performs trial writing by the first recording and reading beam on a trial writing area of the n-th recording and reading layer of the first set of the recording and reading layers to determine the optimum recording power of the first recording and reading beam, and stores the optimum recording power in the memory, and
wherein when an optimum recording power of the second recording and reading beam for recording in an m-th recording and reading layer of the second set of the recording and reading layers in order from closest to the center of the thickness of the optical recording medium has been undetermined and is to be set,
if an optimum recording power of the first recording and reading beam for recording in an m-th recording and reading layer of the first set of the recording and reading layers in order from closest to the center of the thickness of the optical recording medium has already been stored with reference to the memory, the output controller determines the optimum recording power of the first recording and reading beam to be the optimum recording power of the second recording and reading beam, and
if the optimum recording power of the first recording and reading beam for recording in the m-th recording and reading layer of the first set of the recording and reading layers has not been stored, the output controller performs trial writing by the second recording and reading beam on a trial writing area of the m-th recording and reading layer of the second set of the recording and reading layers to determine the optimum recording power of the second recording and reading beam, and stores the optimum recording power in the memory.

49. An optical recording and reading apparatus that records information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, the optical recording and reading apparatus records information in the recording and reading layer while performing tracking using the servo layer,
wherein the optical recording medium has a substrate, and a plurality of the recording and reading layers are arranged on a side of the servo layer with respect to the substrate,
the recording and reading apparatus further comprising:
a tracking optical system that applies a tracking beam to the servo layer;
a first recording and reading optical system that records information by applying a first recording and reading beam to a first recording and reading layer while tracking control using the tracking optical system is performed; and
a second recording and reading optical system that records information by applying a second recording and reading beam to a second recording and reading layer while tracking control using the tracking optical system is performed.

50. The optical recording and reading apparatus according to claim 49,
wherein the tracking optical system and the first recording and reading optical system are arranged on a side of a first surface of the optical recording medium, and wherein the second recording and reading optical system is arranged on a side of a second surface opposite to the first surface of the optical recording medium.

51. The optical recording and reading apparatus according to claim 49, further comprising:
a first linear motion mechanism that moves both the first recording and reading optical system and the tracking optical system in tracking direction; and
a second linear motion mechanism that moves the second recording and reading optical system in tracking direction,
wherein the second linear motion mechanism is controlled using a tracking signal of the tracking optical system.

52. An optical recording and reading apparatus that records information in a recording and reading layer in an optical recording medium, the optical recording medium comprising the recording and reading layer and a servo layer, the recording and reading layer being previously stacked or formed afterward and having no concavo-convex pattern for tracking control, the servo layer having a concavo-convex pattern or a groove for tracking control formed therein, the optical recording and reading apparatus records information in the recording and reading layer while performing tracking using the servo layer,
wherein the optical recording medium has a first set of a plurality of the recording and reading layers between a first surface of the optical recording medium and the servo layer, and a second set of a plurality of the recording and reading layers between a second surface of the optical recording medium and the servo layer,
the optical recording and reading apparatus further comprising:
a tracking optical system that applies a tracking beam to the servo layer;
a first recording and reading optical system that records information in a first rotation direction as viewed from the first surface by applying a first recording and reading beam through the first surface to the first recording and reading layer while tracking control using the tracking optical system is performed; and
a second recording and reading optical system that records information in a second rotation direction opposite to the first rotation direction as viewed from the second surface by applying a second recording and reading beam through the second surface to the second recording and reading layer while tracking control using the tracking optical system is performed, wherein the second recording and reading optical system performs the recording simultaneously with the recording which the first recording and reading optical system performs.

53. The optical recording and reading apparatus according to claim 52, further comprising:
a first linear motion mechanism that moves both the first recording and reading optical system and the tracking optical system in tracking direction; and
a second linear motion mechanism that moves the second recording and reading optical system in tracking direction,
wherein the second linear motion mechanism is controlled using a tracking signal of the tracking optical system.

54. The optical recording and reading apparatus according to claim 52, further comprising a digital signal processor that divides data to be recorded in the optical recording medium into first data to be recorded in the first recording and reading layer by the first recording and reading optical system and second data to be recorded in the second recording and reading layer by the second recording and reading optical system.

55. An optical recording medium comprising a servo layer having a concavo-convex pattern or a groove for tracking control and a recording and reading layer having no concavo-convex pattern for tracking control, the recording and reading layer being previously stacked or formed afterward, wherein information is recorded or read by applying a recording and reading beam to the recording and reading layer while applying a tracking beam to the servo layer to perform tracking control,
wherein information is recorded or read by applying a recording and reading beam having a second wavelength shorter than a first wavelength to the recording and reading layer while applying a tracking beam having the first wavelength to the servo layer to perform tracking control, and
wherein a reflectance of the servo layer at a time when light of the recording and reading beam having the second wavelength is applied through the recording and reading layer to the servo layer is lower than a reflectance of the servo layer at a time when light of the tracking beam having the first wavelength is applied through the recording and reading layer to the servo layer.

56. The optical recording medium according to claim 55, wherein an amount of reflected light from the servo layer at a time when the recording and reading beam is applied through the recording and reading layer to the servo layer is less than or equal to five times of an amount of reflected light from the recording and reading layer at a time when the recording and reading beam is applied to the recording and reading layer.

57. The optical recording medium according to claim 55, wherein an amount of reflected light from the servo layer at a time when the recording and reading beam is applied through the recording and reading layer to the servo layer is less than an amount of reflected light from the recording and reading layer at a time when the recording and reading beam is applied to the recording and reading layer.

58. The optical recording medium according to claim 55, wherein an inter-layer distance between the recording and reading layer and the servo layer is 10 to 200 μm.

59. The optical recording medium according to claim 55, wherein the reflectance of the servo layer at a time when the tracking beam is applied through the recording and reading layer to the servo layer is 40% to 95%, and the reflectance of the servo layer at a time when the recording and reading beam is applied through the recording and reading layer to the servo layer by way of experiment is less than or equal to 60%.

60. The optical recording medium according to claim 55, wherein the servo layer has a reflecting film that contains metal as a major component, and an auxiliary film that is arranged adjacent to the reflecting film and is different in refractive index from the reflecting film.

61. The optical recording medium according to claim 60, wherein the servo layer has the reflecting films the number of which is two or more, and the auxiliary films the number of which is three or more.

62. The optical recording medium according to claim 55,
wherein a filter layer in which dye is bound or dispersed is provided between the servo layer and the recording and reading layer, and
wherein the filter layer has a low absorbance for the first wavelength of the tracking beam, and a high absorbance for the second wavelength of the recording and reading beam.

63. The optical recording medium according to claim 55, comprising the recording and reading layer as a first recording and reading layer, and further comprising a second recording and reading layer having no concavo-convex pattern for tracking control and being previously stacked or formed afterward on a side opposite to the first recording and reading layer with respect to the servo layer,
wherein information is recorded in the second recording and reading layer while tracking control is performed using the servo layer.

64. The optical recording medium according to claim 63, wherein the servo layer is formed directly on a side of the first recording and reading layer with respect to a substrate, and
wherein the second recording and reading layer is formed on a side opposite to the servo layer with respect to the substrate.

65. The optical recording medium according to claim 64, wherein the substrate is made of a light transmitting material.

66. The optical recording medium according to claim 64, wherein the first recording and reading layer and the second recording and reading layer are previously stacked or formed afterward in symmetrical positions with respect to a center of a thickness of the substrate.

67. The optical recording medium according to claim 64, wherein the thickness of the substrate is 10 to 600 μm.

68. An optical recording medium comprising a servo layer having a concavo-convex pattern or a groove for tracking control and a recording and reading layer having no concavo-convex pattern for tracking control, the recording and reading layer being previously stacked or formed afterward, wherein information is recorded or read by applying a recording and reading beam to the recording and reading layer while applying a tracking beam to the servo layer to perform tracking control, further comprising a substrate,
wherein the servo layer is formed on one face of the substrate,
wherein a first recording and reading layer is arranged on a side of the servo layer of the substrate, and a second recording and reading layer is arranged on a side opposite to the servo layer of the substrate, and
wherein information is recorded in the first recording and reading layer and the second recording and reading layer while tracking control is performed using the servo layer,
wherein a first cover layer is stacked outside the first recording and reading layer that is farthest from the substrate, and a second cover layer is stacked outside the second recording and reading layer that is farthest from the substrate, and
wherein a thickness of the first cover layer is set to be larger by a thickness of the substrate than a thickness of the second cover layer.

69. The optical recording medium according to claim 68, wherein the substrate is made of a light transmitting material.

70. The optical recording medium according to claim 68, wherein a first buffer layer is stacked between the first recording and reading layer that has been previously stacked and the servo layer, and a second buffer layer is stacked between the second recording and reading layer that has been previously stacked and the substrate,
wherein a thickness of the first buffer layer and a thickness of the second buffer layer are substantially equal to each other.

71. The optical recording medium according to claim 68, wherein at a wavelength of the tracking beam applied to the servo layer, a refractive index of the substrate is higher than a refractive index of the second buffer layer.

72. The optical recording medium according to claim 68, wherein at a wavelength of the tracking beam applied to the servo layer, a refractive index of the substrate is higher than a refractive index of the first buffer layer.

73. The optical recording medium according to claim 68, wherein the first recording and reading layer and the second recording and reading layer are previously stacked or formed afterward in symmetrical positions with respect to a center of a thickness of the substrate.

74. The optical recording medium according to claim 68, wherein the first recording and reading layer comprises a plurality of the recording and reading layers, and the second recording and reading layer comprises a plurality of the recording and reading layers.

75. An optical recording medium comprising a servo layer having a concavo-convex pattern or a groove for tracking control and a recording and reading layer having no concavo-convex pattern for tracking control, the recording and reading layer being previously stacked or formed afterward, information is recorded or read by applying a recording and reading beam to the recording and reading layer while applying a tracking beam to the servo layer to perform tracking control,
a substrate, the servo layer is formed on one face of the substrate,
a first recording and reading layer is arranged on a side of the servo layer of the substrate, and a second recording and reading layer is arranged on a side opposite to the servo layer of the substrate, and
wherein information is recorded in the first recording and reading layer and the second recording and reading layer while tracking control is performed using the servo layer, and
wherein the tracking beam applied to the servo layer is set to be longer in wavelength than the recording and reading beam applied to the first or the second recording and reading layer, and
wherein a reflectance of the servo layer in a case where the tracking beam is applied is greater than a reflectance of the servo layer in a case where the recording and reading beam is applied to the servo layer by way of experiment.

76. An optical recording medium comprising a servo layer having a concavo-convex pattern or a groove for tracking control and a recording and reading layer having no concavo-convex pattern for tracking control, the recording and reading layer being previously stacked or formed afterward, information is recorded or read by applying a recording and reading beam to the recording and reading layer while applying a tracking beam to the servo layer to perform tracking control,
a substrate, the servo layer is formed on one face of the substrate,
a first recording and reading layer is arranged on a side of the servo layer of the substrate, and a second recording and reading layer is arranged on a side opposite to the servo layer of the substrate, and
wherein information is recorded in the first recording and reading layer and the second recording and reading layer while tracking control is performed using the servo layer, and wherein a thickness of the substrate is 10 to 600 μm.

77. An optical recording medium comprising a servo layer having a concavo-convex pattern or a groove for tracking control and a recording and reading layer having no concavo-convex pattern for tracking control, the recording and reading layer being previously stacked or formed afterward, wherein information is recorded or read by applying a recording and reading beam to the recording and reading layer while applying a tracking beam to the servo layer to perform tracking control, the servo layer comprising:
- a first servo layer having a concavo-convex pattern or a groove for the tracking control in a first spiral direction; and
- a second servo layer having a concavo-convex pattern or a groove for the tracking control in a second spiral direction opposite to the first spiral direction,
- wherein a first set of a plurality of the recording and reading layers are arranged on a side of a first surface of the optical recording medium with respect to the first and second servo layers, and
- wherein a second set of a plurality of the recording and reading layers are arranged on a side of a second surface of the optical recording medium with respect to the first and second servo layers.

* * * * *